US012476677B2

(12) United States Patent
Rakib et al.

(10) Patent No.: US 12,476,677 B2
(45) Date of Patent: Nov. 18, 2025

(54) MULTI-LAYER MULTI-BEAM COMMUNICATION SYSTEMS

(71) Applicant: Cohere Technologies, Inc., San Jose, CA (US)

(72) Inventors: Shlomo Selim Rakib, San Jose, CA (US); Ronny Hadani, San Jose, CA (US); Shachar Kons, San Jose, CA (US)

(73) Assignee: Cohere Technologies, Inc., San Jose, CA (US)

( * ) Notice: Subject to any disclaimer, the term of this patent is extended or adjusted under 35 U.S.C. 154(b) by 59 days.

(21) Appl. No.: 18/626,033

(22) Filed: Apr. 3, 2024

(65) Prior Publication Data

US 2024/0313834 A1 Sep. 19, 2024

Related U.S. Application Data

(63) Continuation of application No. 17/754,206, filed as application No. PCT/US2020/053045 on Sep. 28, 2020, now Pat. No. 11,962,373.

(Continued)

(51) Int. Cl.

*H04B 7/0456* (2017.01)
*H04B 7/0408* (2017.01)

(Continued)

(52) U.S. Cl.

CPC ......... *H04B 7/0456* (2013.01); *H04B 7/0408* (2013.01); *H04L 5/0023* (2013.01); *H04L 5/0062* (2013.01); *H04L 5/14* (2013.01)

(58) Field of Classification Search

CPC .... H04B 7/0617; H04B 7/024; H04B 17/309; H04B 17/318; H04B 7/0452;

(Continued)

(56) References Cited

U.S. PATENT DOCUMENTS 6,426,814 B1 7/2002 Berger et al.
8,265,697 B2 * 9/2012 Khojastepour ....... H04W 52/42 375/267

(Continued)

FOREIGN PATENT DOCUMENTS

WO 2019/089986 5/2019
WO 2019/113046 6/2019

OTHER PUBLICATIONS

International Search Report and Written Opinion for PCT/US2020/53045, dated Jan. 5, 2021, 13 pages.

(Continued)

*Primary Examiner* — Eva Y Puente
(74) *Attorney, Agent, or Firm* — Perkins Coie LLP

(57) ABSTRACT

A wireless communication device includes a feed port comprising multiple input feeds, a precoding subsystem that is electrically connected to the feed port; and an antenna subsystem electrically connected to the precoding subsystem. The antenna subsystem is configured to transmit an output signal of the precoding subsystem to multiple wireless stations using multiple beams. The precoding subsystem is configured to perform a precoding operation on an input signal from the feed port, wherein the precoding operation maximizes a desired signal level to interference ratio of transmissions to the multiple wireless stations.

20 Claims, 88 Drawing Sheets

Related U.S. Application Data

(60) Provisional application No. 62/906,584, filed on Sep. 26, 2019.

(51) Int. Cl.
*H04L 5/00* (2006.01)
*H04L 5/14* (2006.01)

(58) Field of Classification Search
CPC ...... H04B 7/0456; H04B 7/10; H04B 7/0413; H04B 7/0408; H04B 7/0421; H04B 7/0697; H04B 1/385; H04B 17/373; H04W 16/28; H04W 84/06; H04W 36/0005; H04W 36/0088; H04W 4/021; H04W 72/0453; H04W 24/08; H04W 28/084; H04W 84/12; H04W 88/085; H04W 88/12; H04W 16/24; H04W 16/30; H04L 5/0007; H04L 5/0037; H04L 5/14; H04L 5/0023; H04L 27/2639; H04L 5/0044; H04L 5/0048; H04L 5/0053; H04L 5/003; H04L 27/2603; H04L 27/0008; H04L 27/206; H04L 27/2602
See application file for complete search history.

(56) References Cited

U.S. PATENT DOCUMENTS

| | | | | |
|---|---|---|---|---|
| 10,812,992 | B1 * | 10/2020 | Tran | H04B 7/0695 |
| 2007/0160162 | A1 | 7/2007 | Kim et al. | |
| 2013/0201932 | A1 * | 8/2013 | Ko | H04L 5/0053 370/329 |
| 2017/0041830 | A1 * | 2/2017 | Davis | H04B 7/1851 |
| 2019/0058510 | A1 * | 2/2019 | Raghavan | H04B 7/0417 |
| 2020/0389268 | A1 * | 12/2020 | Sathyanarayan | H04L 27/26532 |
| 2021/0058114 | A1 * | 2/2021 | Molisch | H04L 5/0037 |
| 2022/0311489 | A1 * | 9/2022 | Rakib | H04B 7/0452 |

OTHER PUBLICATIONS

Co Pending EP Application No. 20867681.7, Extended Search Report, dated Oct. 7, 2022, 7 pages.
Co Pending EP Application No. 20867681.7, Article 94 Communication dated Nov. 29, 2024, 5 pages.

* cited by examiner

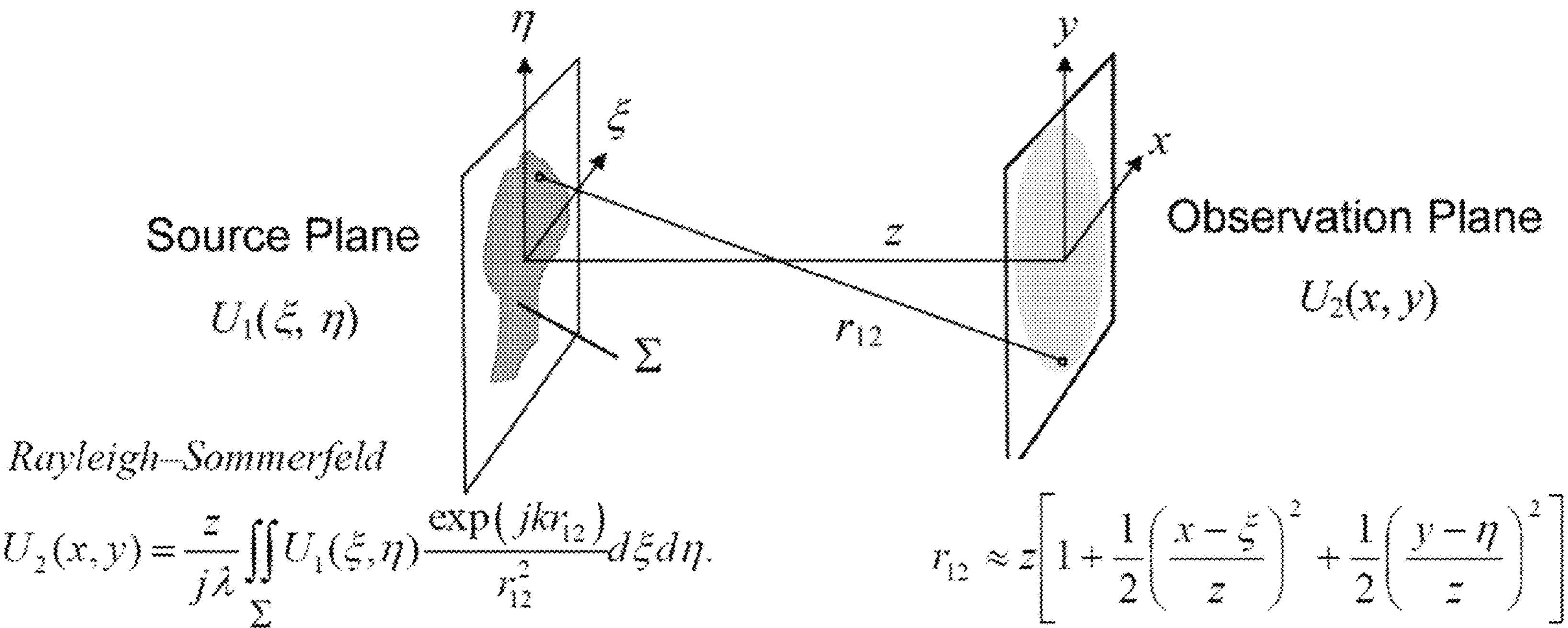

*Rayleigh–Sommerfeld*

$$U_2(x,y)=\frac{z}{j\lambda}\iint_{\Sigma}U_1(\xi,\eta)\frac{\exp(jkr_{12})}{r_{12}^2}d\xi d\eta.$$

$$r_{12}\approx z\left[1+\frac{1}{2}\left(\frac{x-\xi}{z}\right)^2+\frac{1}{2}\left(\frac{y-\eta}{z}\right)^2\right].$$

$$U_2(x,y)=\frac{e^{jkz}}{j\lambda z}\iint U_1(\xi,\eta)\exp\left\{j\frac{k}{2z}\left[(x-\xi)^2+(y-\eta)^2\right]\right\}d\xi d\eta.$$

$$U_2(x_2,y_2)=\frac{\exp(jkz)}{j\lambda z}\exp\left[j\frac{k}{2z}\left(x^2+y^2\right)\right]$$

$$\times\iint U_1(\xi,\eta)\exp\left[-j\frac{2\pi}{\lambda z}(x\xi+y\eta)\right]d\xi d\eta.$$

$$z\gg\left(\frac{k(\xi^2+\eta^2)}{2}\right)_{\max},$$

Fraunhofer approximation

FIG. 16

Radiation Pattern (in units of dB) $\propto 20\log_{10}\left(\left|\frac{\sin(X)}{X}\right|\right)$ First null = $\mathrm{Sin}^{-1}(\frac{\lambda}{D}) \approx \frac{\lambda}{D}$ $[rad]$

| | Radiation Pattern | Explanation |
|---|---|---|
| 0 | 0 dB | peak of main beam |
| 3.14 = π | − ∞ dB | first null |
| 4.49 ≈ 3 π/2 | − 13.26 dB | peak of first sidelobe |
| 6.28 = 2 π | − ∞ dB | second null |
| 7.72 ≈ 5 π/2 | − 17.83 dB | peak of second sidelobe |

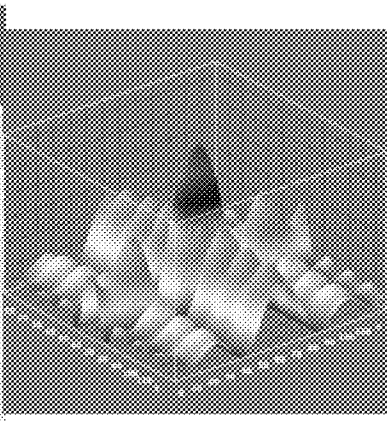

Radiation Pattern (in units of dB) $\propto 10\log_{10}\left(\left|2\frac{J_1(X)}{X}\right|^2\right)$ $ka\theta_1 = 3.832$ $\theta_1 = 1.22\frac{\lambda}{D}$ Logarithmic scale

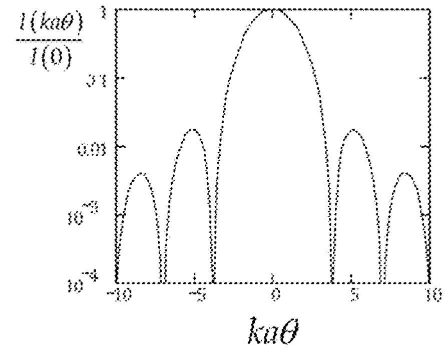

| | Radiation Pattern | Explanation |
|---|---|---|
| 0 | 0 dB | peak of main beam |
| 3.83 | − ∞ dB | first null |
| 5.14 | − 17.57 dB | peak of first sidelobe |
| 7.02 | − ∞ dB | second null |
| 8.42 | − 23.81 dB | peak of second sidelobe |

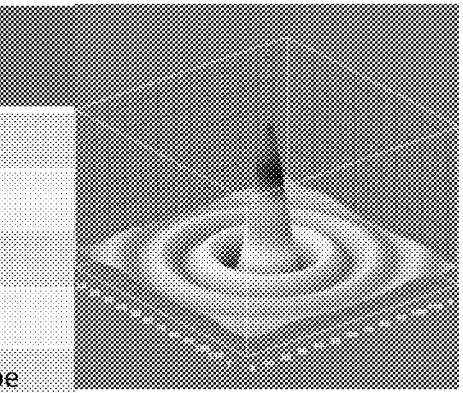

FIG. 18

The power pattern of a circular aperture

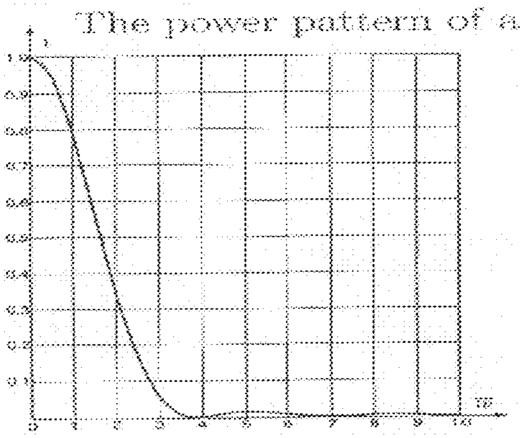

Fig. 3.102. Fraunhofer diffraction at a circular aperture showing the function $I = \left[\frac{2J_1(v)}{v}\right]^2$ (after Born-Wolf [3.120(b)])

Table 3.25. The first 3 subsidiary minima and maxima of the function $\left[\frac{2J_1(v)}{v}\right]^2$ (after Born-Wolf [3.120(b)])

| Case | $v$ | $\left[\frac{2J_1(v)}{v}\right]^2$ |
|---|---|---|
| Central max. | 0 | 1 |
| First min. | $1.220\pi = 3.832$ | 0 |
| Max. | $1.635\pi = 5.136$ | 0.0175 |
| Second min. | $2.233\pi = 7.016$ | 0 |
| Max. | $2.679\pi = 8.417$ | 0.0042 |
| Third min. | $3.238\pi = 10.174$ | 0 |
| Max. | $3.699\pi = 11.620$ | 0.0016 |

Table 6.1. Normalized power pattern characteristics produced by different aperture illumination according to (5.82)

| $p$ | $\alpha$ | HPBW $= k_1 \frac{\lambda}{D}$ /rad | BWFN $= k_2 \frac{\lambda}{D}$ /rad | $\eta_A$ | First side lobe /dB |
|---|---|---|---|---|---|
| 0 | | 1.02 | 2.44 | 1.00 | −17.6 |
| 1 | | 1.27 | 3.20 | 0.75 | −24.6 |
| 2 | | 1.47 | 4.06 | 0.56 | −30.6 |
| 3 | | 1.65 | 4.84 | 0.44 | |
| 4 | | 1.81 | 5.58 | 0.36 | |
| 1 | 0.25 | 1.17 | 2.98 | 0.87 | −23.7 |
| 2 | 0.25 | 1.23 | 3.36 | 0.81 | −32.3 |
| 1 | 0.50 | 1.13 | 2.66 | 0.92 | −22.0 |
| 2 | 0.50 | 1.16 | 3.02 | 0.88 | −26.5 |

FIG. 21

Uniform $$w(n) = \cos^{\alpha}\left(\frac{\pi n}{N-1} - \frac{\pi}{2}\right)$$

$$w(n) = \cos^{\alpha}\left(\frac{\pi n}{N-1} - \frac{\pi}{2}\right)$$

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | PDCCH | PDCCH | PDSCH | CRS | PDSCH | PDSCH | PDSCH | PDSCH | PDSCH | CRS | PDSCH | PDSCH | PDSCH | PDSCH |
| 2 | CRS | PDCCH | PDSCH | PDSCH | PDSCH | PDSCH | CRS | PDSCH | PDSCH | PDSCH | PDSCH | PDSCH | CRS | PDSCH |
| 3 | PDCCH | PDCCH | PDSCH | PDSCH | PDSCH | PDSCH | PDSCH | PDSCH | PDSCH | PDSCH | PDSCH | PDSCH | PDSCH | PDSCH |
| 4 | PDCCH | PDSCH | PDSCH | PDSCH | PDSCH | PDSCH | PDSCH | PDSCH | PDSCH | PDSCH | PDSCH | PDSCH | PDSCH | PDSCH |
| 5 | PDCCH | PDCCH | PDSCH | CRS | PDSCH | PDSCH | PDSCH | PDSCH | PDSCH | CRS | PDSCH | PDSCH | PDSCH | PDSCH |
| 6 | CRS | PDCCH | PDSCH | PDSCH | PDSCH | PDSCH | CRS | PDSCH | PDSCH | PDSCH | PDSCH | PDSCH | CRS | PDSCH |
| 7 | PDCCH | PDCCH | PDSCH | PDSCH | PDSCH | PDSCH | PDSCH | PDSCH | PDSCH | PDSCH | PDSCH | PDSCH | PDSCH | PDSCH |
| 8 | PBCH | PBCH | PBCH | PBCH | PBCH | PBCH | PBCH | PBCH | PBCH | PBCH | PBCH | PBCH | PBCH | PBCH |
| 9 | PBCH | PBCH | PBCH | PBCH | PBCH | PBCH | PBCH | PBCH | PBCH | PBCH | PBCH | PBCH | PBCH | PBCH |
| 10 | ... | ... | ... | ... | ... | ... | ... | ... | ... | ... | ... | ... | ... | ... |
| 11 | PBCH | PBCH | PBCH | PBCH | PBCH | PBCH | PBCH | PBCH | PBCH | PBCH | PBCH | PBCH | PBCH | PBCH |
| 12 | PBCH | PBCH | PBCH | PBCH | PBCH | PBCH | PBCH | PBCH | PBCH | PBCH | PBCH | PBCH | PBCH | PBCH |
| 13 | PDSCH | PDSCH | PDSCH | PDSCH | PDSCH | PDSCH | PDSCH | PDSCH | PDSCH | PDSCH | PDSCH | PDSCH | PDSCH | PDSCH |
| 14 | ... | ... | ... | ... | ... | ... | ... | ... | ... | ... | ... | ... | ... | ... |
| 15 | PDSCH | PDSCH | PDSCH | PDSCH | PDSCH | PDSCH | PDSCH | PDSCH | PDSCH | PDSCH | PDSCH | PDSCH | PDSCH | PDSCH |
| 16 | PDSCH | DMRS | PDSCH | CRS | PDSCH | PDSCH | PDSCH | PDSCH | DMRS | CRS | PDSCH | PDSCH | PDSCH | PDSCH |
| 17 | CRS | PDSCH | PDSCH | PDSCH | PDSCH | DMRS | CRS | PDSCH | PDSCH | PDSCH | PDSCH | DMRS | CRS | PDSCH |
| 18 | PDSCH | PDSCH | PDSCH | PDSCH | PDSCH | PDSCH | PDSCH | PDSCH | PDSCH | PDSCH | PDSCH | PDSCH | PDSCH | PDSCH |
| 19 | PDSCH | DMRS | PDSCH | PDSCH | PDSCH | PDSCH | PDSCH | PDSCH | DMRS | PDSCH | PDSCH | PDSCH | PDSCH | PDSCH |
| 20 | PDSCH | PDSCH | PDSCH | CRS | PDSCH | DMRS | PDSCH | PDSCH | PDSCH | CRS | PDSCH | DMRS | PDSCH | PDSCH |
| 21 | CRS | PDSCH | PDSCH | PDSCH | PDSCH | PDSCH | CRS | PDSCH | PDSCH | PDSCH | PDSCH | PDSCH | CRS | PDSCH |
| 22 | PDSCH | PDSCH | PDSCH | PDSCH | PDSCH | PDSCH | PDSCH | PDSCH | PDSCH | PDSCH | PDSCH | PDSCH | PDSCH | PDSCH |

FIG. 89A

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | PUSCH | PUSCH | DMRS | PUSCH | PUSCH | PUSCH | PUSCH | DMRS | PUSCH | PUSCH | PUSCH | PUSCH | PUSCH | PUSCH |
| 2 | PUSCH | PUSCH | DMRS | PUSCH | PUSCH | PUSCH | PUSCH | DMRS | PUSCH | PUSCH | PUSCH | PUSCH | PUSCH | PUSCH |
| 3 | ... | ... | ... | ... | ... | ... | ... | ... | ... | ... | ... | ... | ... | ... |
| 4 | PUSCH | PUSCH | DMRS | PUSCH | PUSCH | PUSCH | PUSCH | DMRS | PUSCH | PUSCH | PUSCH | PUSCH | PUSCH | PUSCH |
| 5 | PUCCH | PUCCH | PUCCH | PUCCH | PUCCH | PUCCH | PUCCH | PUCCH | PUCCH | PUCCH | PUCCH | PUCCH | PUCCH | PUCCH |
| 6 | PUCCH | PUCCH | PUCCH | PUCCH | PUCCH | PUCCH | PUCCH | PUCCH | PUCCH | PUCCH | PUCCH | PUCCH | PUCCH | PUCCH |
| 7 | ... | ... | ... | ... | ... | ... | ... | ... | ... | ... | ... | ... | ... | ... |
| 8 | PUCCH | PUCCH | PUCCH | PUCCH | PUCCH | PUCCH | PUCCH | PUCCH | PUCCH | PUCCH | PUCCH | PUCCH | PUCCH | PUCCH |
| 9 | PRACH | PRACH | PRACH | PRACH | PRACH | PRACH | PRACH | PRACH | PRACH | PRACH | PRACH | PRACH | PRACH | PRACH |
| 10 | PRACH | PRACH | PRACH | PRACH | PRACH | PRACH | PRACH | PRACH | PRACH | PRACH | PRACH | PRACH | PRACH | PRACH |
| 11 | ... | ... | ... | ... | ... | ... | ... | ... | ... | ... | ... | ... | ... | ... |
| 12 | PRACH | PRACH | PRACH | PRACH | PRACH | PRACH | PRACH | PRACH | PRACH | PRACH | PRACH | PRACH | PRACH | PRACH |
| 13 | PUSCH | PUSCH | DMRS | PUSCH | PUSCH | PUSCH | PUSCH | DMRS | PUSCH | PUSCH | PUSCH | PUSCH | PUSCH | SRS |
| 14 | PUSCH | PUSCH | DMRS | PUSCH | PUSCH | PUSCH | PUSCH | DMRS | PUSCH | PUSCH | PUSCH | PUSCH | PUSCH | SRS |
| 15 | ... | ... | ... | ... | ... | ... | ... | ... | ... | ... | ... | ... | ... | ... |
| 16 | PUSCH | PUSCH | DMRS | PUSCH | PUSCH | PUSCH | PUSCH | DMRS | PUSCH | PUSCH | PUSCH | PUSCH | PUSCH | SRS |
| 17 | PUSCH | PUSCH | DMRS | PUSCH | PUSCH | PUSCH | PUSCH | DMRS | PUSCH | PUSCH | PUSCH | PUSCH | PUSCH | PUSCH |
| 18 | PUSCH | PUSCH | DMRS | PUSCH | PUSCH | PUSCH | PUSCH | DMRS | PUSCH | PUSCH | PUSCH | PUSCH | PUSCH | PUSCH |
| 19 | ... | ... | ... | ... | ... | ... | ... | ... | ... | ... | ... | ... | ... | ... |
| 20 | PUSCH | PUSCH | DMRS | PUSCH | PUSCH | PUSCH | PUSCH | DMRS | PUSCH | PUSCH | PUSCH | PUSCH | PUSCH | PUSCH |

FIG. 89B

MULTI-LAYER MULTI-BEAM COMMUNICATION SYSTEMS

CROSS-REFERENCE TO RELATED APPLICATION

This patent document is a continuation of U.S. patent application Ser. No. 17/754,206, filed Mar. 25, 2022 which is a 371 National Phase Application of PCT Application No. PCT/US2020/053045, entitled "MULTI-LAYER MULTI-BEAM COMMUNICATION SYSTEMS" filed on Sep. 28, 2020, which claims priority to and benefits of U.S. Provisional Patent Application No. 62/906,584 filed on Sep. 26, 2019. The entire content of the aforementioned patent application is incorporated by reference as part of the disclosure of this patent document.

TECHNICAL FIELD

The present document relates to wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques that may be embodied in fixed wireless or mobile wireless systems in which a multi-layer wireless connectivity is established for multiple wireless device to accommodate greater device density and wireless throughput than conventional wireless systems.

In one example aspect, a wireless communication device is disclosed. The device includes a feed port comprising multiple input feeds and a precoding subsystem that is electrically connected to the feed port and an antenna subsystem electrically connected to the precoding subsystem. The antenna subsystem is configured to transmit an output signal of the precoding subsystem to multiple wireless stations using multiple beams. The precoding subsystem is configured to perform a precoding operation on an input signal from the feed port, wherein the precoding operation maximizes a desired signal level to interference ratio of transmissions to the multiple wireless stations.

In another example aspect, a method of wireless communication is disclosed. The method includes receiving communication signals on multiple input feeds, precoding the communication signals to generate precoded signals, and transmitting the precoded signals using an antenna subsystem to multiple wireless stations, wherein the precoding maximizes a desired signal level to interference ratio of transmissions to the multiple wireless stations.

In yet another example aspect, a wireless communication device is disclosed. The device includes a feed port comprising multiple output feeds, a postcoding subsystem that is electrically connected to the feed port, and an antenna subsystem electrically connected to the postcoding subsystem. The antenna subsystem is configured to receive wireless transmissions from multiple wireless stations over multiple beams and provide the wireless transmissions as an input signal to the postcoding subsystem. The postcoding subsystem is configured to perform a postcoding operation on the input signal and provide an output signal to the feed port, wherein the postcoding operation maximizes a desired signal level to interference ratio of transmissions from the multiple wireless stations.

In yet another example aspect, a method of wireless communication is disclosed. The method includes receiving wireless transmissions from multiple wireless stations over multiple beams and providing the wireless transmission as an input to a post coding system, postcoding the input to generate postcoded signals, outputting the postcoded signals over a feed port comprising multiple output feeds, wherein the postcoding maximizes a desired signal level to interference ratio of transmissions from the multiple wireless stations.

In yet another example aspect, a method of wireless communication is disclosed. The method includes determining, based on a precoding matrix, locations of one or more input feeds for at least one Luneburg antenna, performing, using the precoding matrix, a precoding operation on a plurality of input symbols to generate an output signal, and transmitting, using the at least one Luneburg antenna, the output signal to multiple wireless stations using multiple beams.

In yet another example aspect, a method of wireless communication is disclosed. The method includes receiving, using at least one Luneburg antenna, a wireless transmission from multiple wireless stations over multiple beams, wherein the wireless transmission comprises a plurality of input symbols precoded using a precoding matrix, and performing a postcoding operation on the wireless transmission to generate an estimate of the plurality of input symbols, wherein positions of multiple feeds of the at least one Luneburg antenna are based on the precoding matrix.

In yet another example aspect, a wireless system that includes the above-described devices and multiple wireless stations is disclosed.

In yet another example aspect, the methods may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 16 depicts antenna source plane and observation plane examples.

FIG. 18 shows another example of windows function.

FIG. 21 shows an example of a power pattern for a circular aperture antenna.

FIGS. 89A and 89B show tabular representations of examples of sharing downlink and uplink physical channels, respectively.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other. Section headings are used in the present document for ease of understanding and do not limit scope of the embodiments and techniques described in a section only to that section.

In the description, the example of a fixed wireless access (FWA) system is used only for illustrative purpose and the disclosed techniques can apply to other wireless networks, such as cellular or mobile communication networks further described in the present document.

Figure 1A:
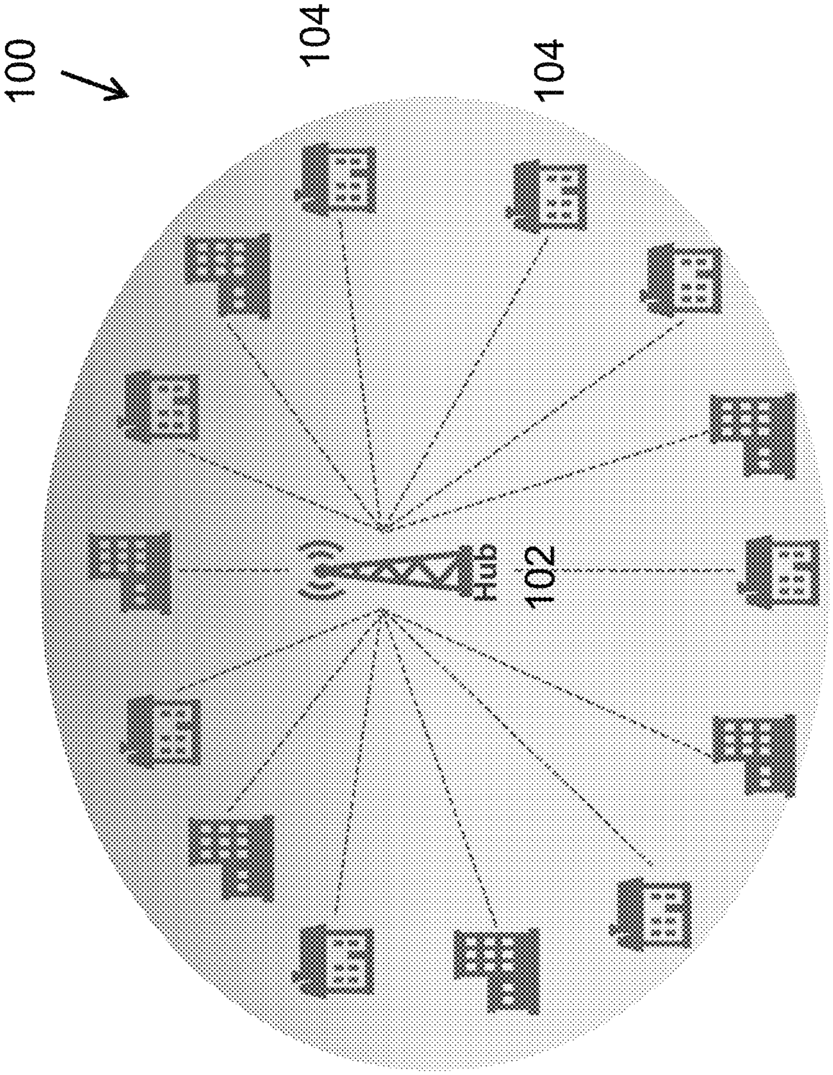
FIG. 1A shows an example of a fixed wireless access network.

FIG. 1A shows an example of a fixed wireless access system 100. A hub 102, that includes a transmission facility such as a cell tower, is configured to send and receive transmissions to/from multiple locations 104. For example, the locations could be user premises or business buildings. As described throughout this document, the disclosed embodiments can achieve very high cell capacity fixed wireless access, when compared to traditional fixed access technology. Some techniques disclosed herein can be embodied in implementations at the hub 102 or at transceiver apparatus located at the locations 104.

Figure 1B:
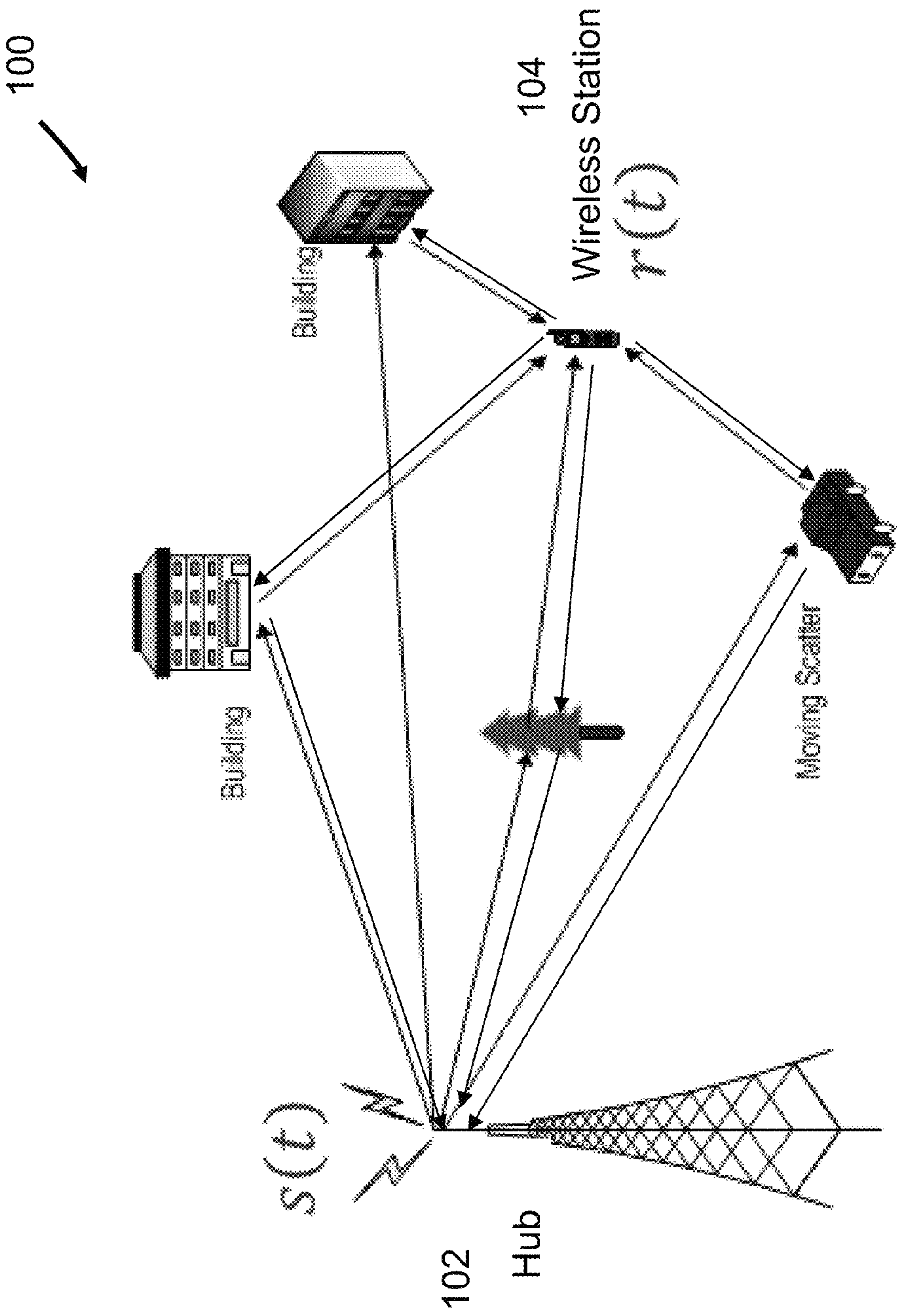
FIG. 1B shows an example communication network.

FIG. 1B show another example of a wireless network 100 in which a wireless link is shown between a mobile wireless station 104 and a hub 102 that may be a backhaul hub. The link may experience various paths that are reflected by reflectors such as buildings, trees or moving scatterers such as vehicles. The presently disclosed techniques may be used to provide wireless connectivity between multiple wireless stations 104 and the hub 102.

Figure 2:
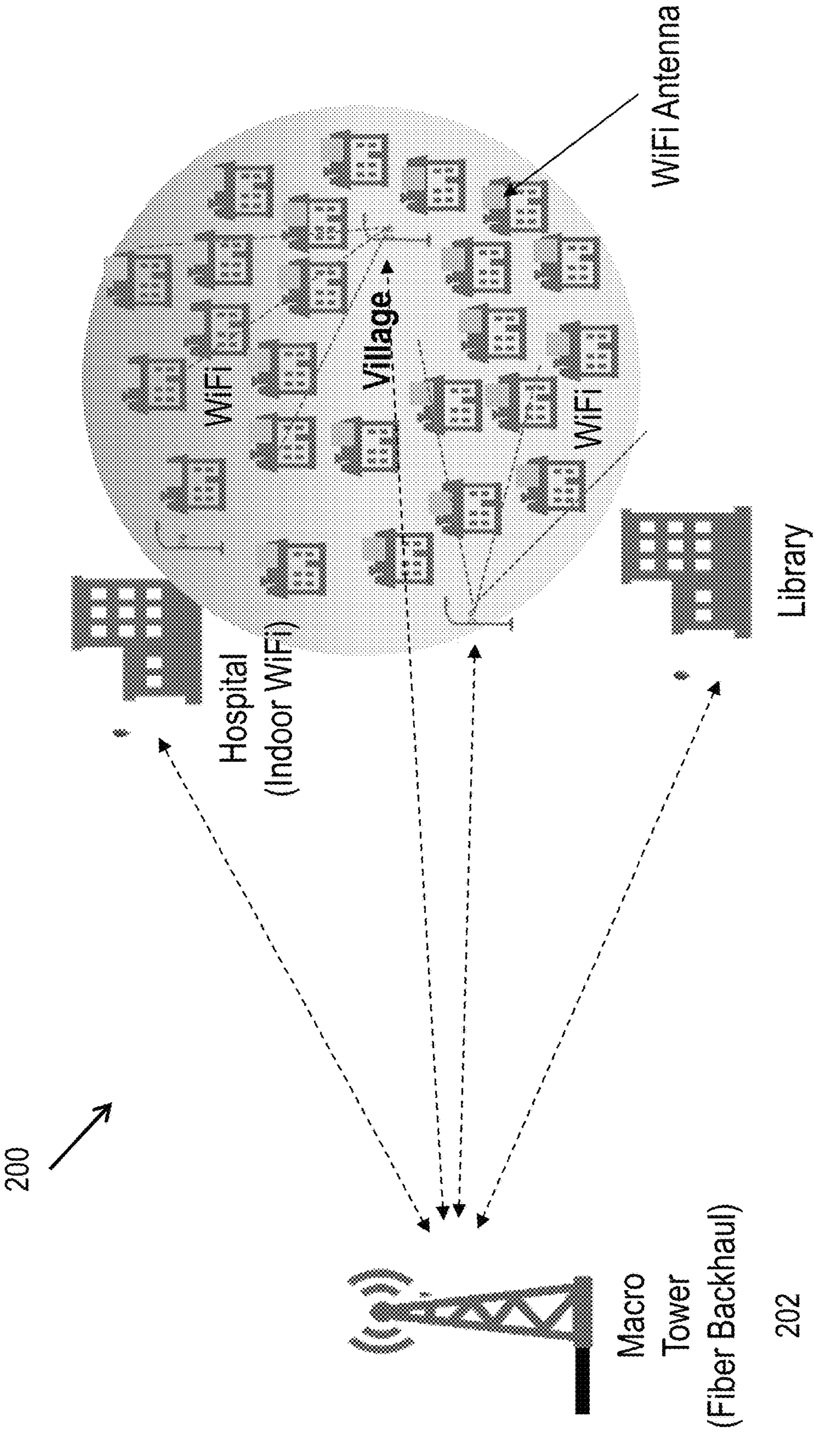
FIG. 2 shows another example of a fixed wireless access network.

FIG. 2 shows yet another configuration of a fixed access wireless communication system 200 in which hops are used to reach users. For example, one cell tower may transmit/receive from another cell tower, which would then relay the transmissions between the principle cell tower and the users, thus extending range of the fixed wireless access system. A backhaul may connect the transmission tower 202 with an aggregation router. For example, in one configuration, a 10 Gbps fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point. Some techniques disclosed herein can be embodied in implementations at the macro tower 202 or at transceiver apparatus located at the other locations. Furthermore, the disclosed techniques may be implemented for wireless communication among various macro towers that use wireless backhaul connections in place of, or in addition to, the fiber backhaul.

1. Introduction and Overview

This document describes a novel method for a point-to-multi-point (PTMP) communication system, using multi-beams. A hub with one or more antennas (or antenna arrays) is communicating with multiple devices on multiple beams pointing towards these devices. Each one of these devices may have a single antenna or multiple antennas. Also, the hub and devices antennas may have a single or a dual polarization. In this way, a multi-layer link, also known as MIMO (multiple-in-multiple-out) may be established between the hub and each one of these devices, simultaneously.

One novelty aspect of the proposed system is that the beams are designed to maximize the desired signal energy at each device, while minimizing the interference from other beams, e.g., as disclosed in Section 2. For example, a beam may be notched at the angular directions of the other beams, thus minimizing the interference to them. This is achieved by precoding the transmitted symbols, or postcoding the received symbols.

Another novelty aspect of the proposed system is the usage of special antennas instead of linear antenna arrays, such as a Luneburg multi-beam antenna, e.g., as disclosed Section 3. This antenna typically requires a one-to-one ratio between the number of input feeds and the number target devices, in contrast to linear antenna arrays, where this ratio is typically higher, due to the beam widening effect in the higher angles.

Yet another novelty aspect of the proposed system is the integration of precoding and postcoding operations in the deployment of the antenna systems, e.g., Luneburg multi-beam antennas. Various aspects of precoding as applied to the described embodiments are detailed in Sections 4 through 7.

Section 8 discloses spectral sharing wireless systems in which hub-to-hub backhaul links may be used for operation of a cellular network such that the presently disclosed techniques can be used to increase the amount of data throughput between the hubs.

In the present document, while various techniques are described with primarily referencing to transmission-side functionalities, it will be appreciated by one of skill in the art that similar techniques may be implemented on the receive side. For example, beam directionality and signal to interference optimization may be performed by a transmitter by using precoding, and with same mathematical principles, a postcoding operation may be implemented by a receiver.

2. Multi-Layer Multi-Beam Systems for Stationary Devices

Figure 3:
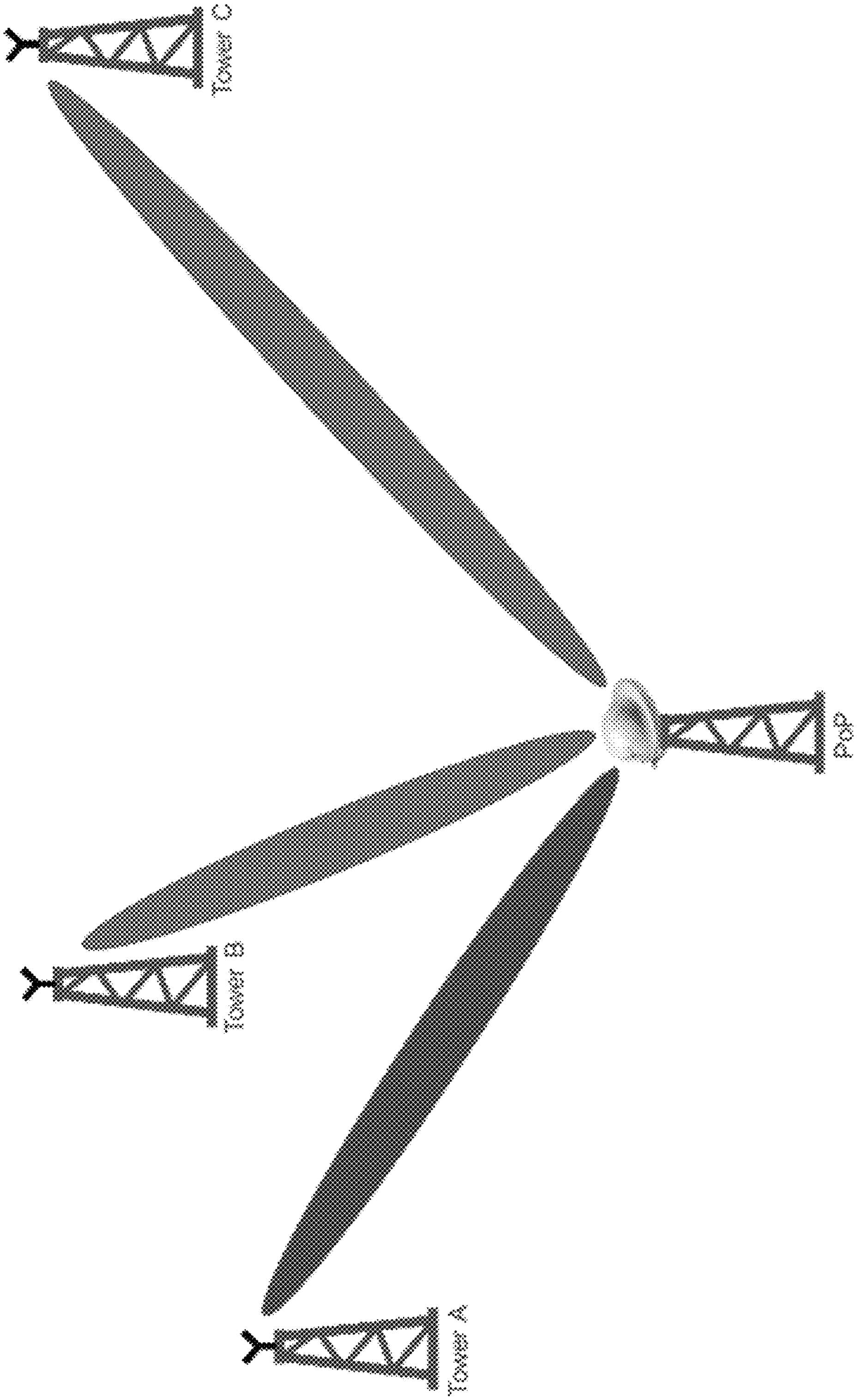
FIG. 3 shows an example of a cellular backhaul network.

For stationary devices, the beams may be set at fixed directions, pointing to the devices. An example of such a system, is a cellular backhaul, where a hub, connected to a fiber feed, is communicating with remote towers (which have no fiber connection). FIG. 3 illustrates such an example.

FIG. 3 shows a cellular backhaul example. A hub, denoted as a PoP (Point of Presence), is connected to a fiber (not explicitly shown) and communicates with remote towers using a Luneburg antenna and three different beams pointing towards these towers. If the Luneburg has dual-polarization input feeds and the remote antennas are dual-polarized as well, a two-layer link may be established between the hub and each tower.

Figure 4:
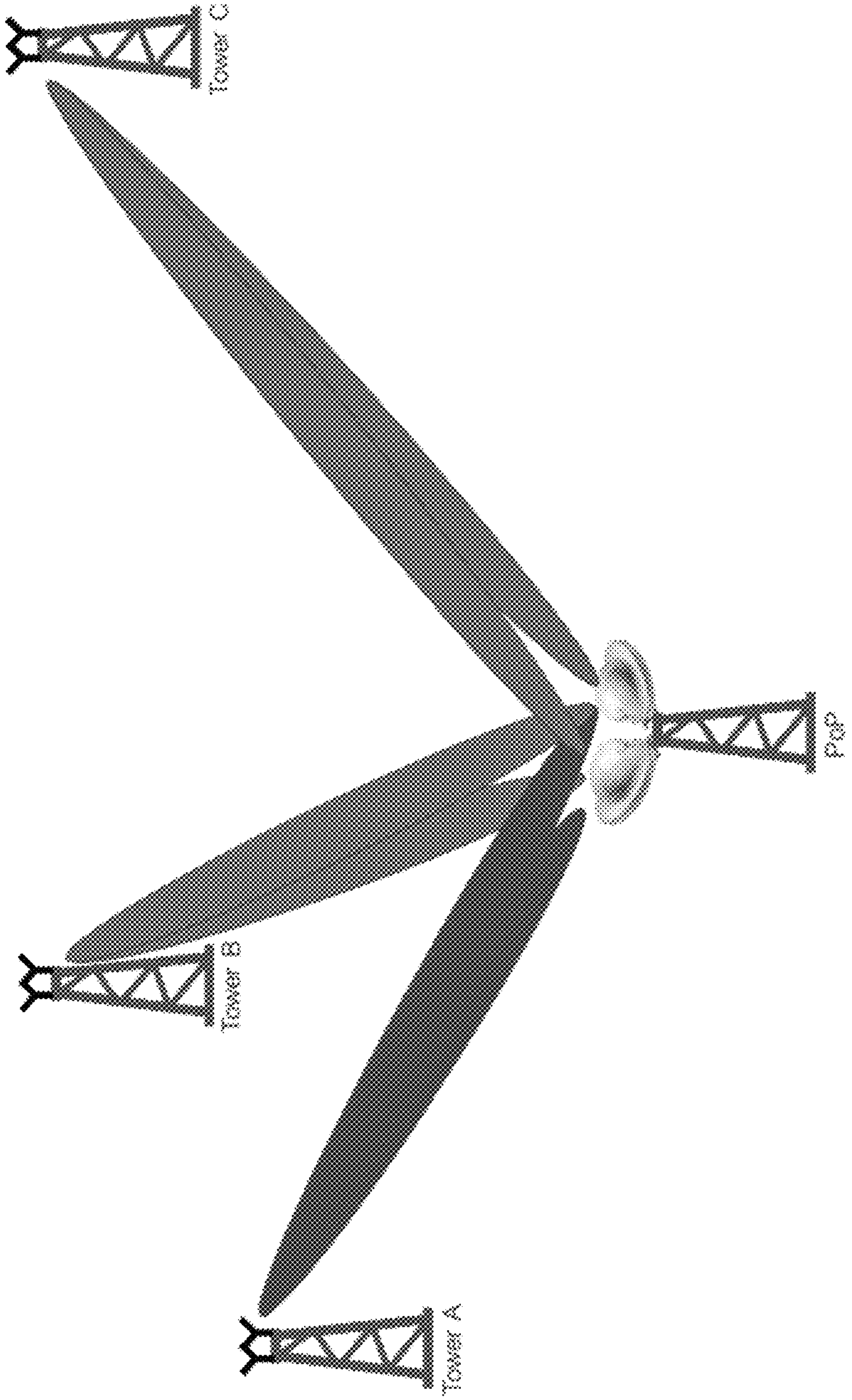
FIG. 4 shows an example of a multiple hub antenna configuration.

Dual polarization antennas and multiple antennas at the remote devices and the hub may all be used to create a multi-layer link between the hub and the devices. Note, that multiple antennas should be spatially separated for a good quality multi-layer link. FIG. 4 illustrates an example of such a system.

In FIG. 4, the hub has two Luneburg antennas, each having three beams targeting three remote towers with dual antennas. If all the antennas are dual-polarized, a 4-layer link between the hub and each tower may be established.

In some embodiments, linear antenna arrays may be used in a multi-layer multi-beam system. However, their beams at angle $\theta$, are a function of $\sin(\theta)$ and not $\theta$ and therefore become wider at higher angles. In other words, a target device at a small angle, will have a narrower beam than a target device at a higher angle. This disadvantage may be overcome with the use of special antennas, like a Luneburg antenna. For a Luneburg antenna the beams are the same for any angular target. Therefore, fewer input feeds will be typically required comparing to an equivalent antenna array.

Figure 5:
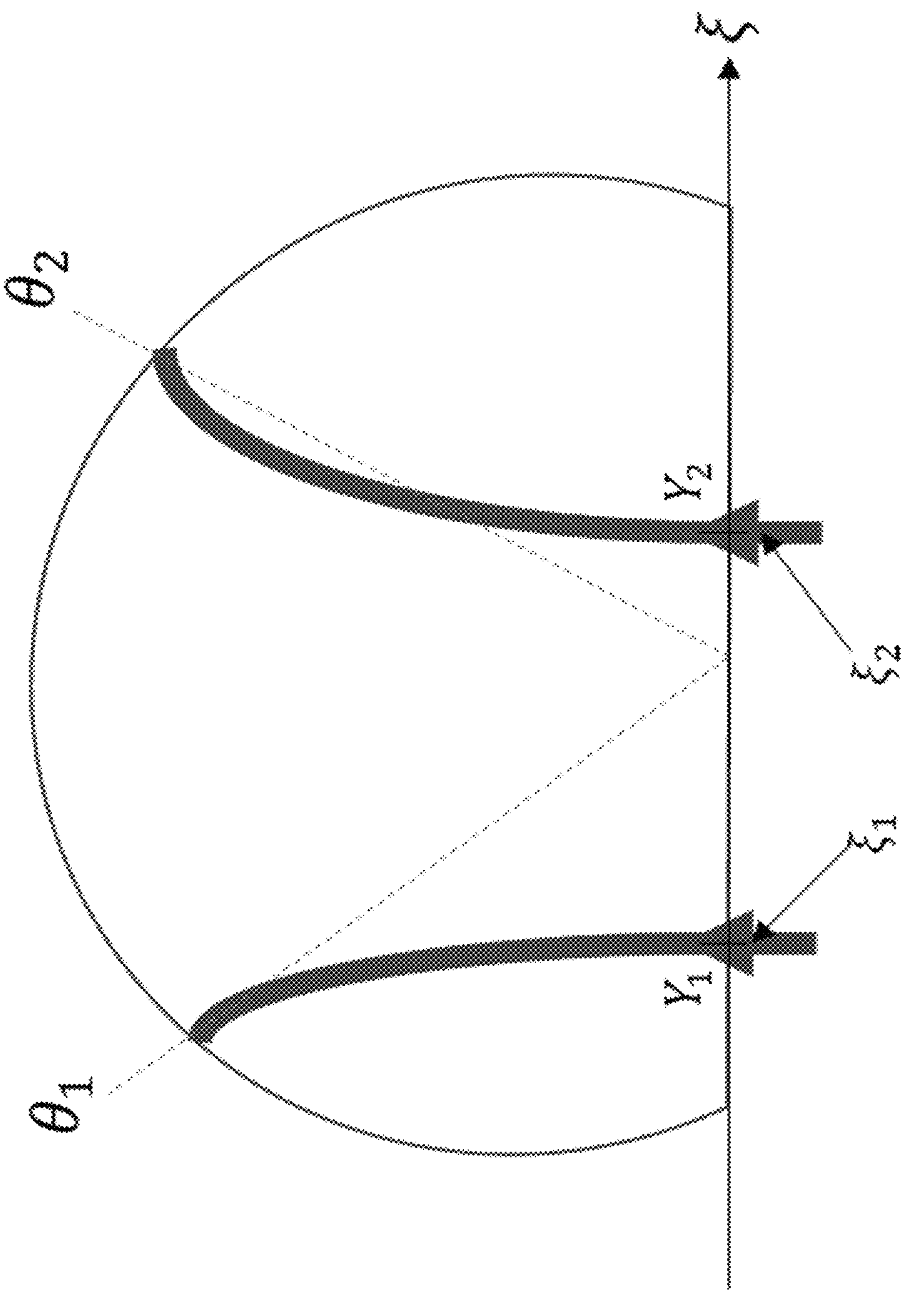
FIG. 5 shows an example of a Luneburg antenna with adjustable input feeds.

One of the properties of a Luneburg antenna is that the angular direction of the beams is a function of the locations of the input feeds, as seen in FIG. 5.

FIG. 5 shows an example of a Luneburg antenna with adjustable input feeds. Two input feeds $Y_1$ and $Y_2$ are set at locations $\xi_1$ and $\xi_2$, creating beams pointing to angles $\theta_1$ and $\theta_2$. Changing the locations $\xi_1$ and $\xi_2$ along horizontal axis will also change $\theta_1$ and $\theta_2$.

Figure 6:
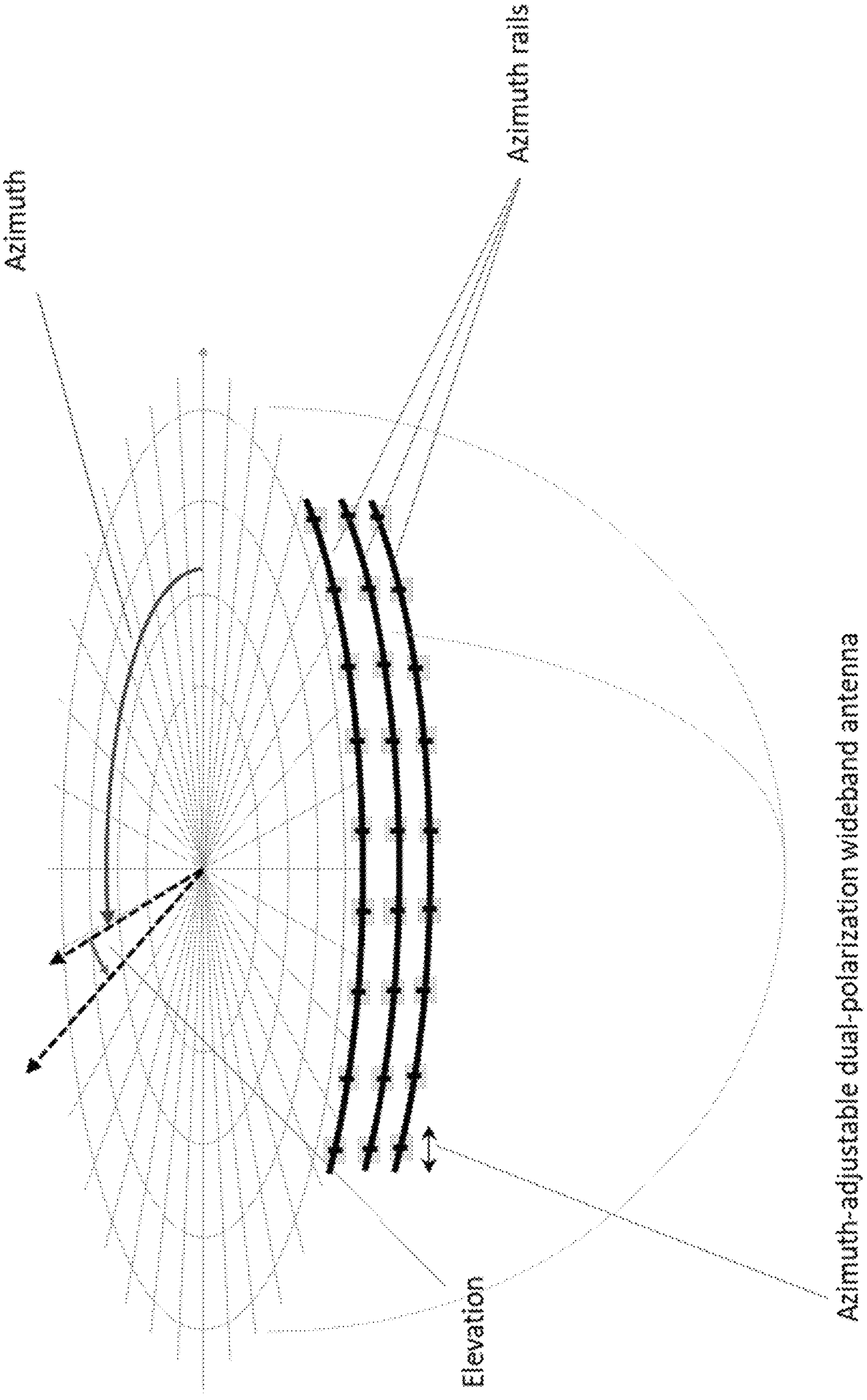
FIG. 6 shows an example of a Luneburg antenna with mechanically adjustable input feed locations.

When using a Luneburg antenna, it is possible to adjust the locations of the input feeds, such that non-precoded output beams will be pointing towards the remote devices. For this, a Luneburg antenna with mechanically adjustable locations of the input feeds is useful, as shown in the example of FIG. 6, which shows an example of a Luneburg antenna with mechanically adjustable input feeds' locations. In this example, the Luneburg lens has 27 input feeds which are dual-polarization antennas, arranged in 3 different elevation rows, each consisting of 9 antennas. In each row, the antenna elements are placed on an azimuth rail and the location of each antenna may be adjusted in azimuth. Similarly, an elevation rail may also be used to adjust the elevation of each beam.

On top of the mechanical adjustment, further shaping of the radiation pattern of the beams is possible by means of precoding (or postcoding of received signals).

Figure 7:
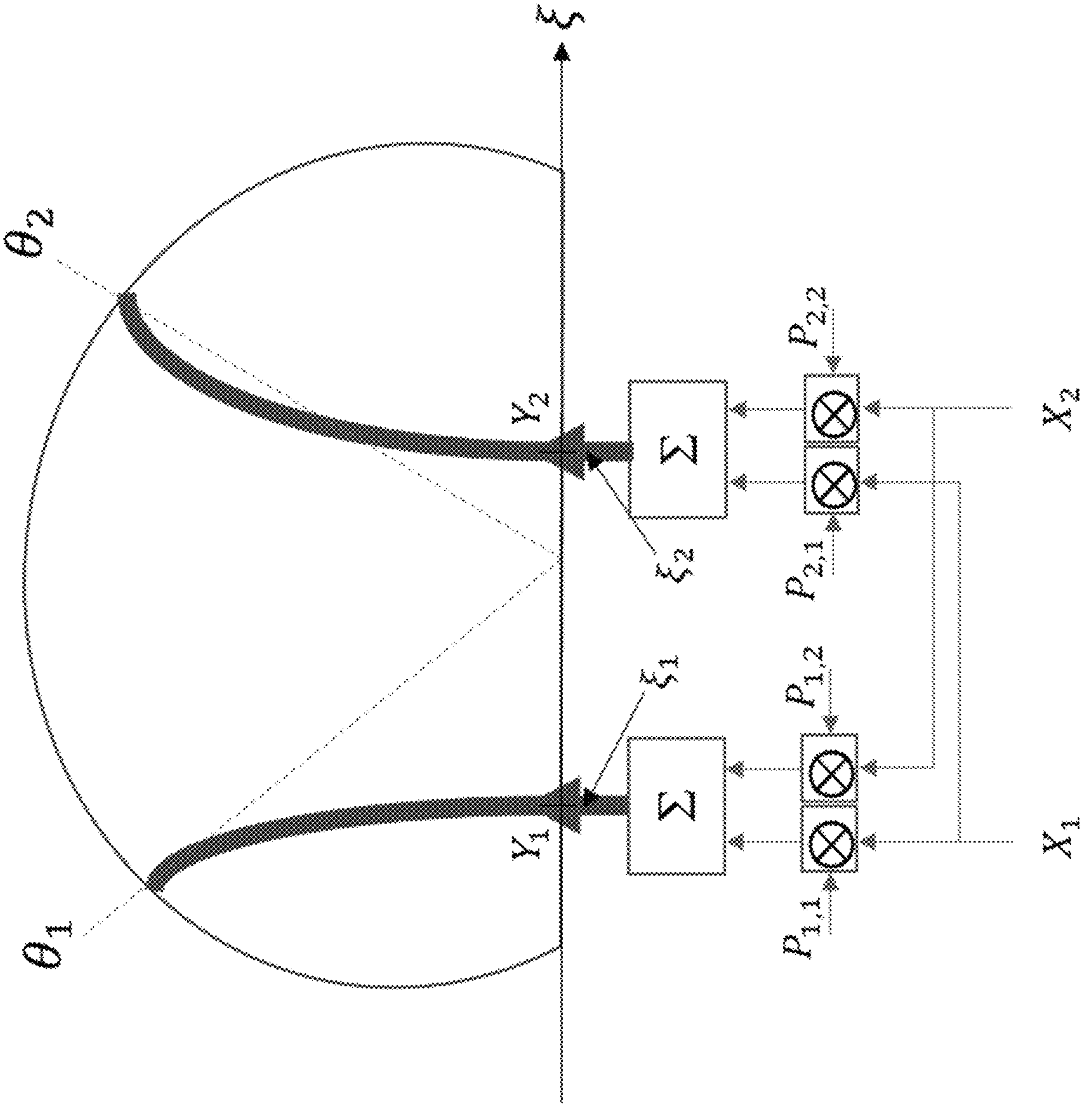
FIG. 7 shows an example of precoding in a Luneburg antenna based transmission system.

FIG. 7 illustrates a precoding example for two input streams and two output beams. In some embodiments, the number of signals passed between the precoding (or post-coding) operation and feed inputs (or outputs) of the antenna may be greater than the number of wireless stations. For example, multiple signals may be combined via additive or subtractive combination to achieve directionality to/from some wireless stations.

By feeding each input symbol to all antenna feeds, but with different weights, the transmitted beams may be shaped to maximize the SINR (signal to interference and noise ratio) at each target. Similarly, the received symbols from all antenna feeds, may be processed after applying different weights to them, to maximize the receive SINR.

2.1 Luneburg Precoding Example

Two input symbols $X_1$ and $X_2$ are precoded with weights $P_{i,j}$ creating the two input feeds to the antenna $Y_1$ and $Y_2$. In a vector notation, $Y=P\cdot X$, where P is a matrix with elements $P_{i,j}$.

2.2 Multi-Layer Multi-Beam Systems for Mobile Devices

For mobile devices, such as the case of a Radio-Access-Network (RAN), the beams may be dynamically generated to point to the directions of a selected set of devices. As described in Section 4, Section 7 and Section 8, uplink channel measurements are enough to design these beams.

When using a Luneburg antenna for this purpose, the input feeds may be adjusted to output non-precoded beams, which are evenly spaced in the angular domain. After precoding, the beams will approximately maximize the SINR at each target device.

2.3 Multi-Beam Precoding

For an antenna with K input ports, let $b_k(\theta)$, be a function modeling the $k^{th}$ beam generated by input ports $k=1, \ldots, K$, as a function of the angle $\theta$. For example, a linear antenna array may be modeled by $b_k(\theta)$=constant and a Luneburg antenna may be modeled by a one-dimensional jinc function, as given by $$b_k(\theta) = jinc(u) = 2\frac{J_1(2\pi u)}{2\pi u}$$

where $J_1(\bullet)$ is a Bessel function of the first kind, $$u = \frac{a}{\lambda}\sin(\theta - \overline{\theta}_k),$$

λ is the wavelength and $\overline{\theta}_k$ is the center of the desired angular beam.

For the purpose of precoding N≤K different streams of information symbol, define N output ports, which are angular targets, defined by $\theta_i$, i=1, . . . , N, where an embodiment may target to focus each stream's energy and avoid interference from other streams.

Note that, for a Luneburg antenna, it is recommended that $\overline{\theta}_k=\theta_k$, for k=1, . . . , N and the remaining beams (if exist), k=N+1, . . . , K, are at chosen angles that will meet side-lobes radiation constraints and desired SINR.

The precoder will shape the radiation patterns, such that around any angle $\theta_i$, the energy of output port i is maximized, while the energy of all other ports j≠i are minimized. To achieve this, each input symbol $X_i$ is fed to all the K input ports after multiplying it with a weight vector. More formally, let P be a K×N weights matrix. Then, the actual K inputs feeding the Luneburg antenna are computed as Y=P·X. An example of precoding with two ports was given in FIG. 7. The precoder, P, is computed from a mathematical basis derived from $B_k(x)$, the Fourier transform of $b_k(\theta)$, and angular windows around $\theta_i$, specifying angular constraints.

3. Multibeam Antenna Designs and Operation

This section provides example embodiments of Luneburg antenna that may be used to implement the techniques described herein. For example, in some embodiments, a lens antenna may be used to create spatially defined sectors of coverage. Using such multibeam antennas, signal coverage may be provided to users by combining multiple feeds using the signal processing techniques described herein. In some embodiments, a graded index lens may be used to generate or receive the multiple beam of coverage.

Figure 8:
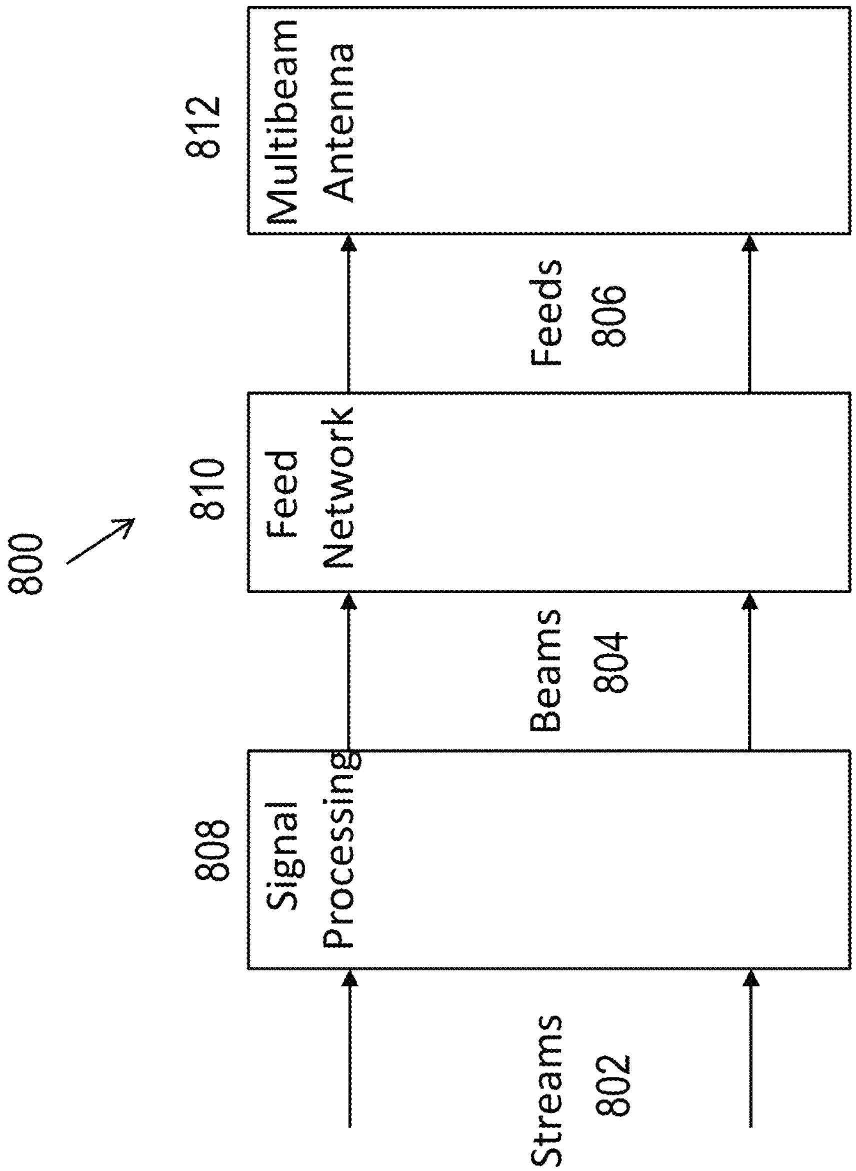
FIG. 8 shows an example workflow for using multi-beam antennas.

FIG. 8 shows an example workflow 800 for using multibeam antennas. For transmission, multiple streams 802, representing data to be transmitted, may be converted using signal processing 808 into multiple beams 804 that are fed to a feed network 810. The output feeds from the feed network 810 are fed to multiple feeds 806, into a multibeam antenna 812. Thus, multiple spatial beams of transmission or reception may be formed and changed according to network conditions by using a combination of one or more of stream processing and constructive or destructive contributions from individual antenna elements, as is further described throughout the document. In doing so, the signal processing 808 may be used to control the phases of signal fed into the antenna, the feed network 810 may be controlled to use particular antenna elements in an array of antenna elements and the multibeam antenna 812 may be used to control the beam orientation towards a target far-end device (e.g., a user equipment) for transmission or reception of signals.

Figure 9:
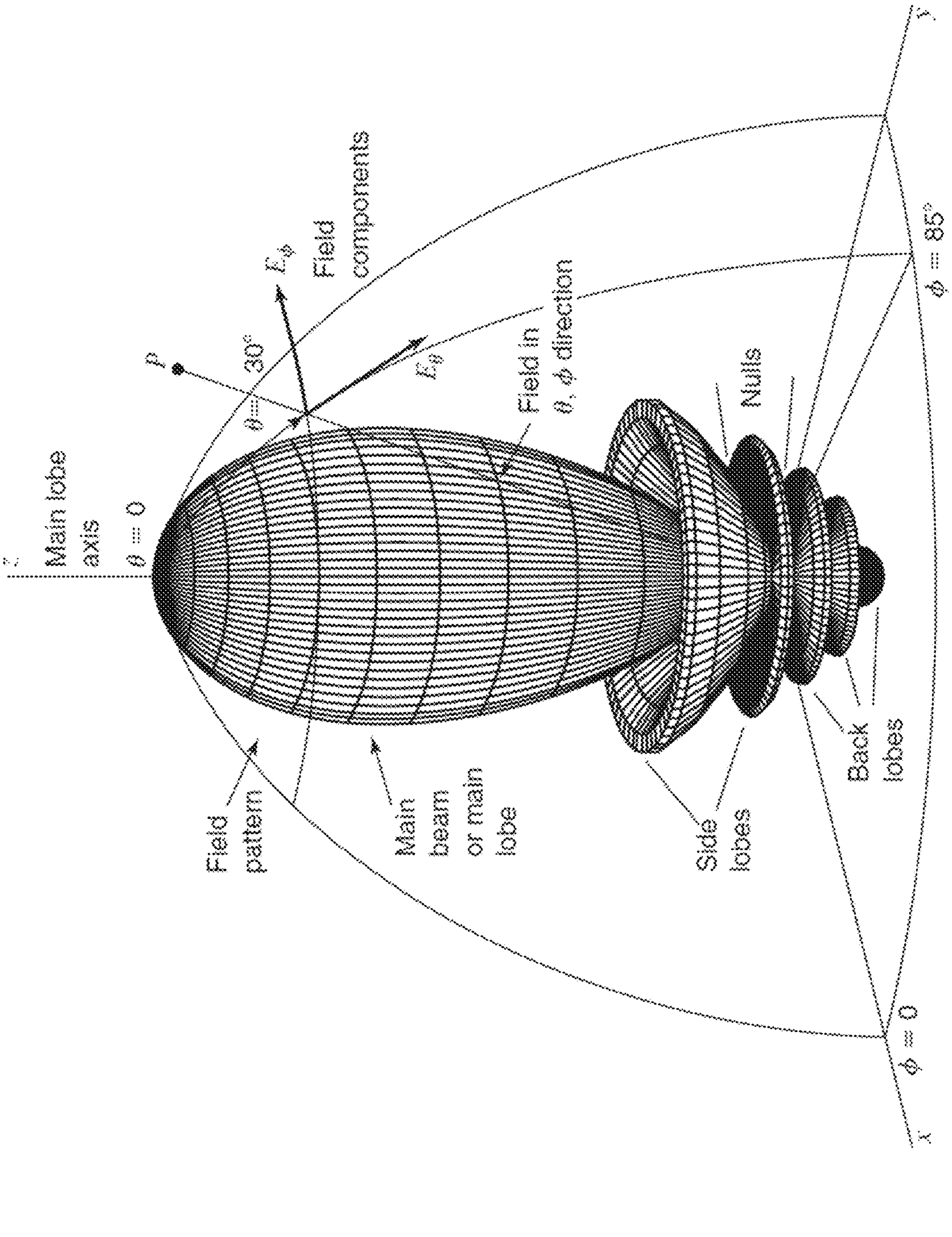
FIG. 9 shows an example of an antenna radiation pattern.

FIG. 9 shows an example of an antenna radiation pattern. As depicted, antenna beam from single antenna elements are often shaped to have a main lobe that is the primary direction in which data communication occurs.

Figure 10:
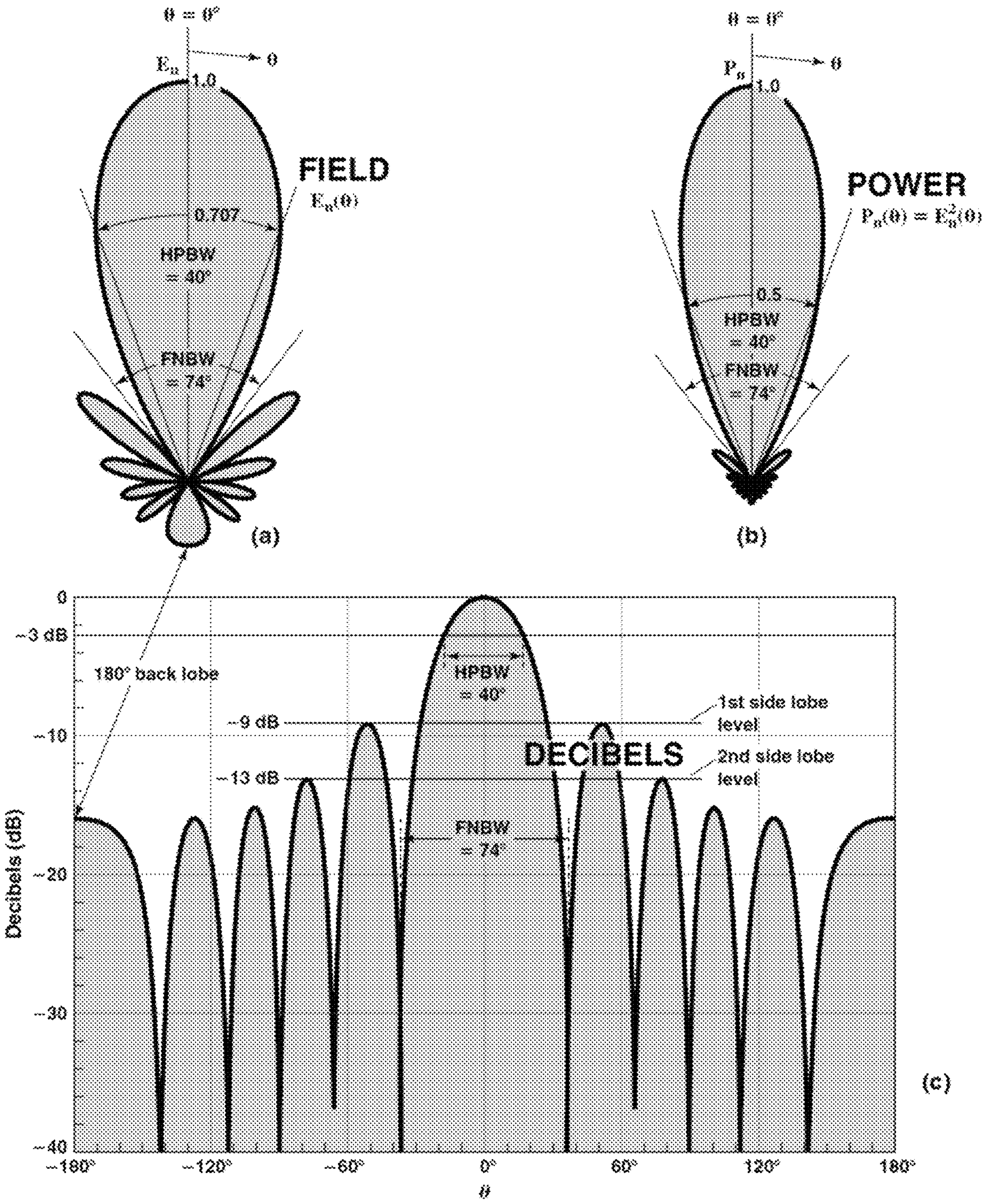
FIG. 10 shows another example of an antenna radiation pattern.

FIG. 10 shows another example of an antenna radiation pattern. In the depicted example, the gain of the main lobe is about 9 dB above the first side lobe and 13 dB above the second side lobe. The half power bandwidth (HPBW) is spread over a 40 degree angle and first null beam width (FNBW is about 74 degrees in this example.)

Figure 11:
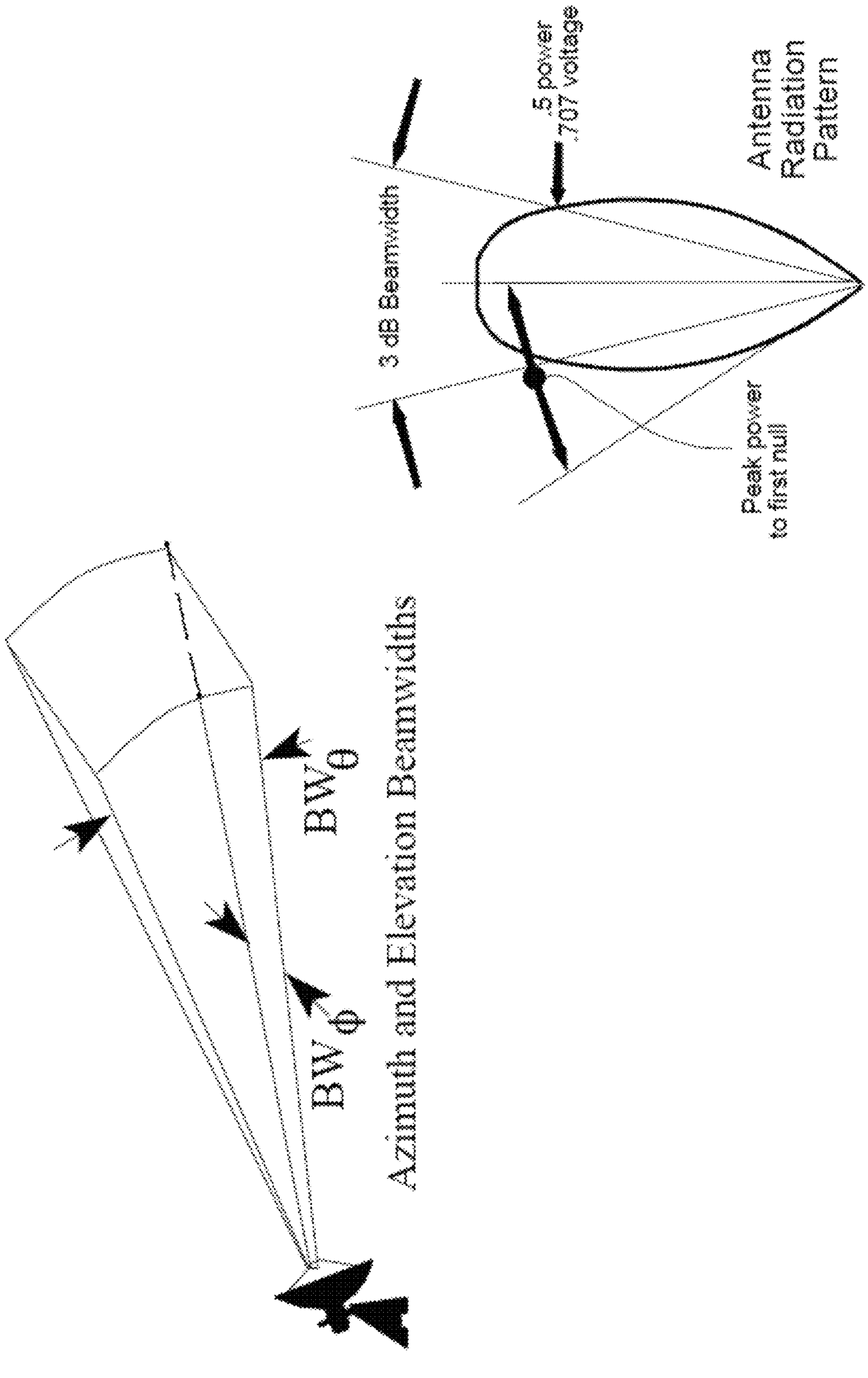
FIG. 11 shows examples of parameters relevant to the calculation of antenna gain.

FIG. 11 shows examples of parameters relevant to the calculation of antenna gain. Antenna gain is often defined as the ration of the radiation intensity in a given direction to the radiation intensity averaged over all directions. The gain of an antenna with losses is given by:

$$G=\frac{4\pi\eta A}{\lambda^2} \quad \text{Eq. (1)}$$

Herein, η=Efficiency, A=Physical Aperture Area, and λ=Wavelength.

Gain may be calculated as:

$$G=\frac{X\eta}{BW_\theta BW_\varphi} \quad \text{Eq. (2)}$$

Herein, BWθ, φ are elevation and azimuth beamwidths in degrees, X=41253 $\eta_{typical}$=0.7 (rectangle approximation), and X=52525 $\eta_{typical}$=0.55 (ellipsoid approximation).

Gain of an isotropic antenna radiating in a uniform spherical pattern is one (0 dB).

An antenna with a 20 degree beamwidth has a 20 dB gain. The 3 dB beamwidth is approximately equal to the angle from the peak of the power to the first null.

Antenna Efficiency—η, is a factor which includes all reductions from the maximum gain (Illumination efficiency, Phase error loss, Spillover loss, Mismatch (VSWR) loss, RF losses, etc. . . . )

Figure 12:
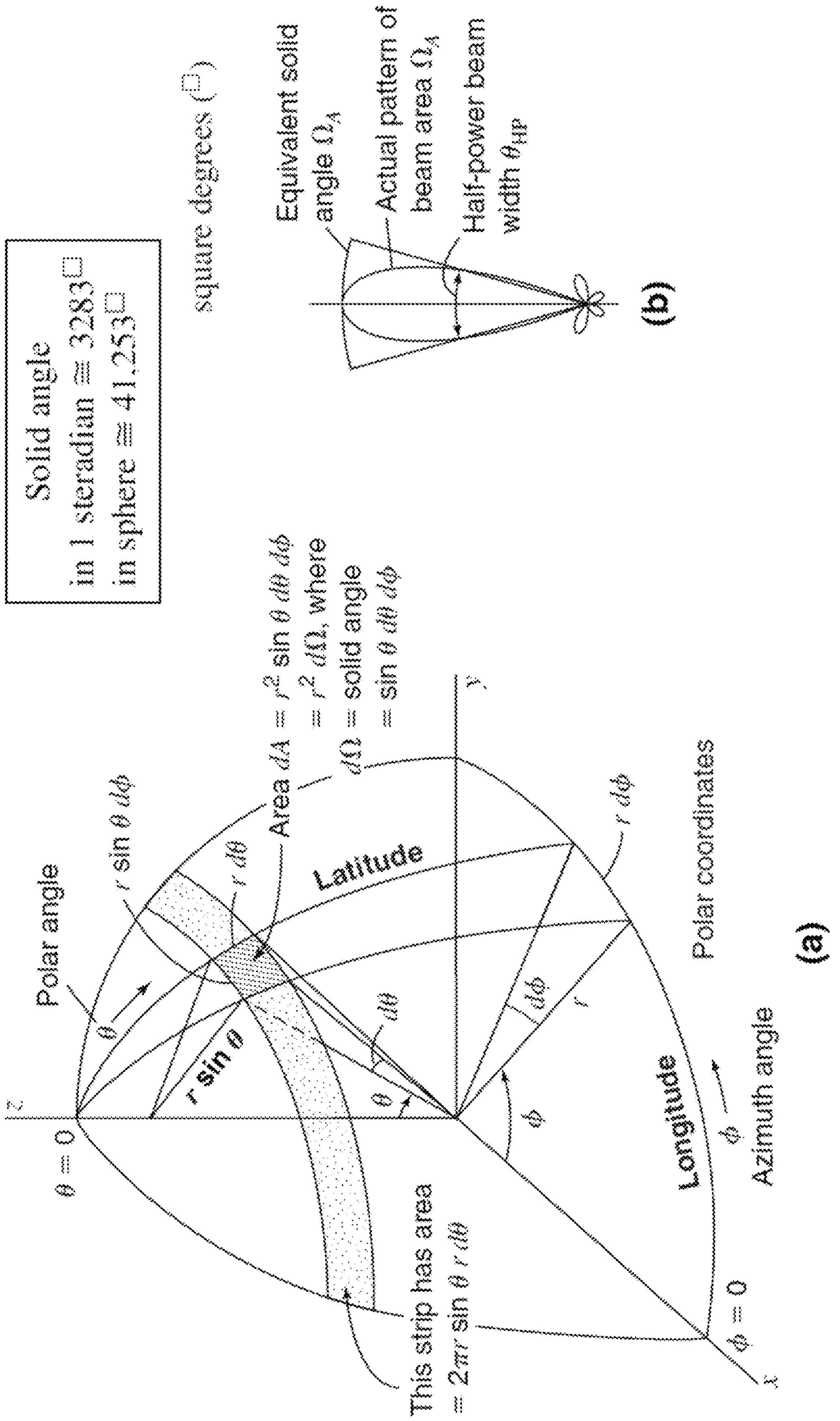
FIG. 12 shows a representation example of antenna radiation in polar coordinates.

FIG. 12 shows a representation example of antenna radiation in polar coordinates, along with definitions of certain measures of directivity or spatial characteristics of the antenna measured as half-power beam width and an equivalent solid angle.

Figure 13:
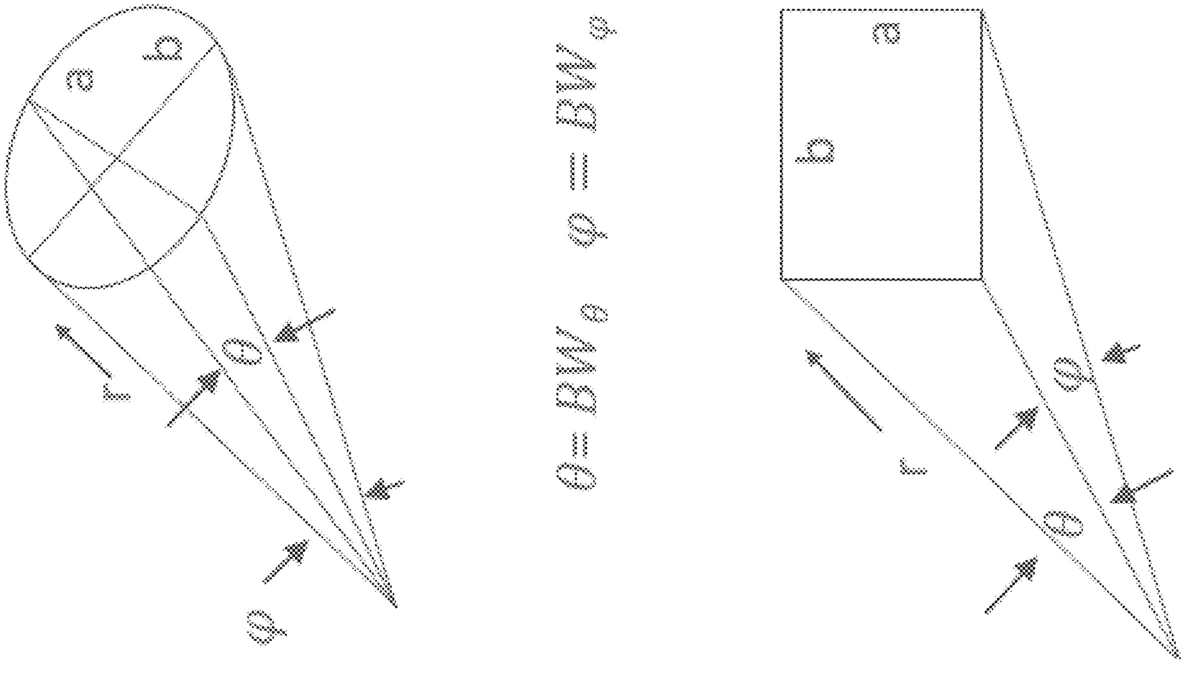
FIG. 13 depicts an example of parametric representation of an antenna beam.

FIG. 13 depicts an example of parametric representation of an antenna beam. The elliptical and the rectangular cross-sections show two different geometrical techniques of representing spatial characteristics of antenna beams.

$$G=\frac{\text{Area of Sphere}}{\text{Area of Antenna Pattern}}=\frac{16}{\sin(\theta)\sin(\varphi)} \quad \text{Eq. (3)}$$

$$G=\frac{16}{\sin(\theta)\sin(\varphi)}\approx\frac{16}{\theta\varphi\,[\text{radians}]}=\frac{52525}{BW_\theta BW_\varphi} \quad \text{Eq. (4)}$$

Herein, θ=BWθ and φ=BWφ.

Referring to FIG. 13, $$G=\frac{\text{Area of Sphere}}{\text{Area of Antenna Pattern}}=\frac{4\pi}{\sin(\theta)\sin(\varphi)} \quad \text{Eq. (5)}$$

Furthermore, $$G=\frac{4\pi}{\sin(\theta)\sin(\varphi)}\approx\frac{4\pi}{\theta\varphi\,[\text{radians}]}=\frac{41253}{BW_\theta BW_\varphi} \quad \text{Eq. (6)}$$

Herein, the area of rectangle=a*b=[r sin(θ)][r sin(φ)].

Figure 14:
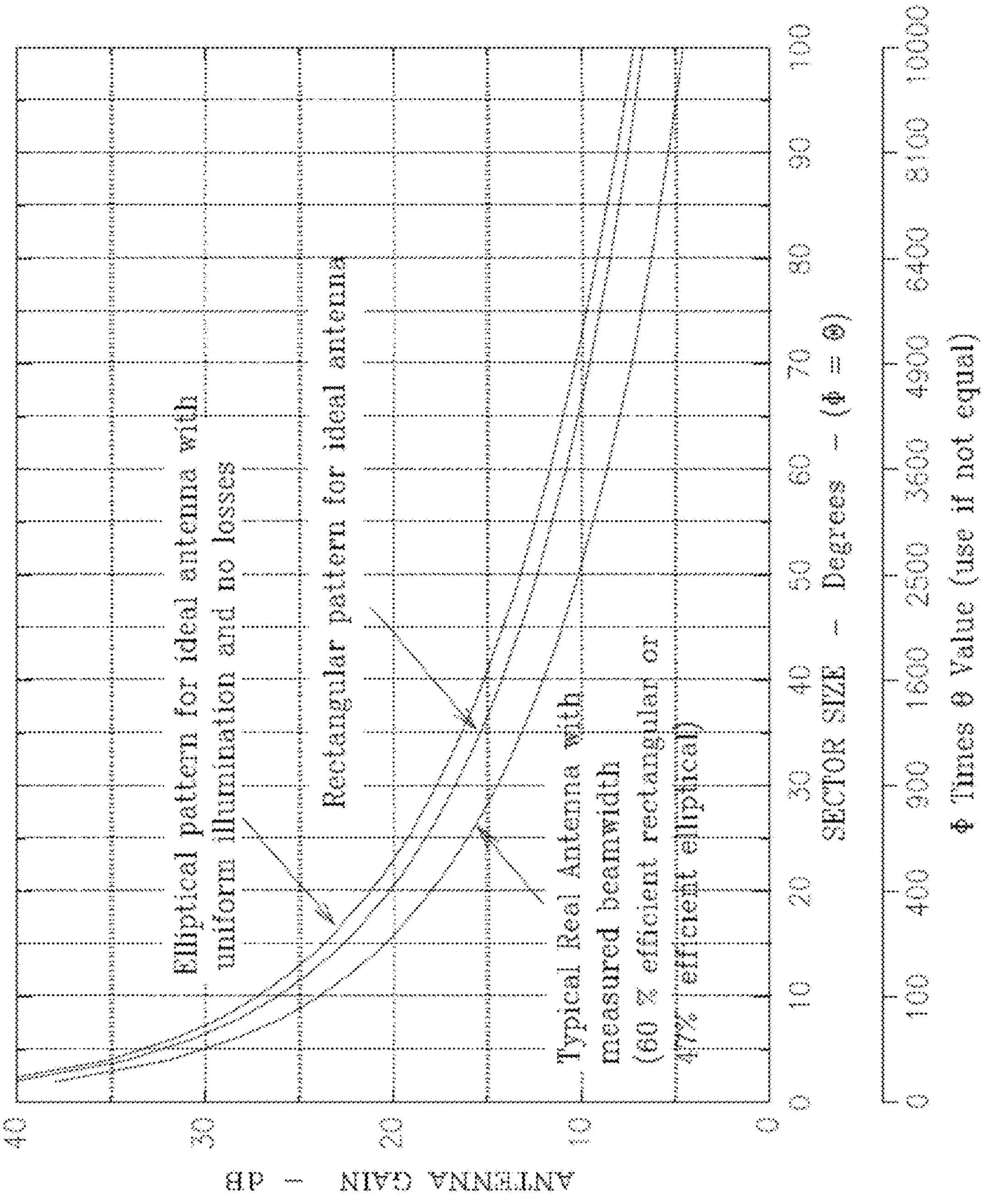
FIG. 14 is a graph showing an example of antenna gain as a function of sector size.

FIG. 14 is a graph showing an example of antenna gain as a function of sector size. The graph illustrates differences between elliptical pattern antenna and rectangular pattern antenna.

Figure 15:
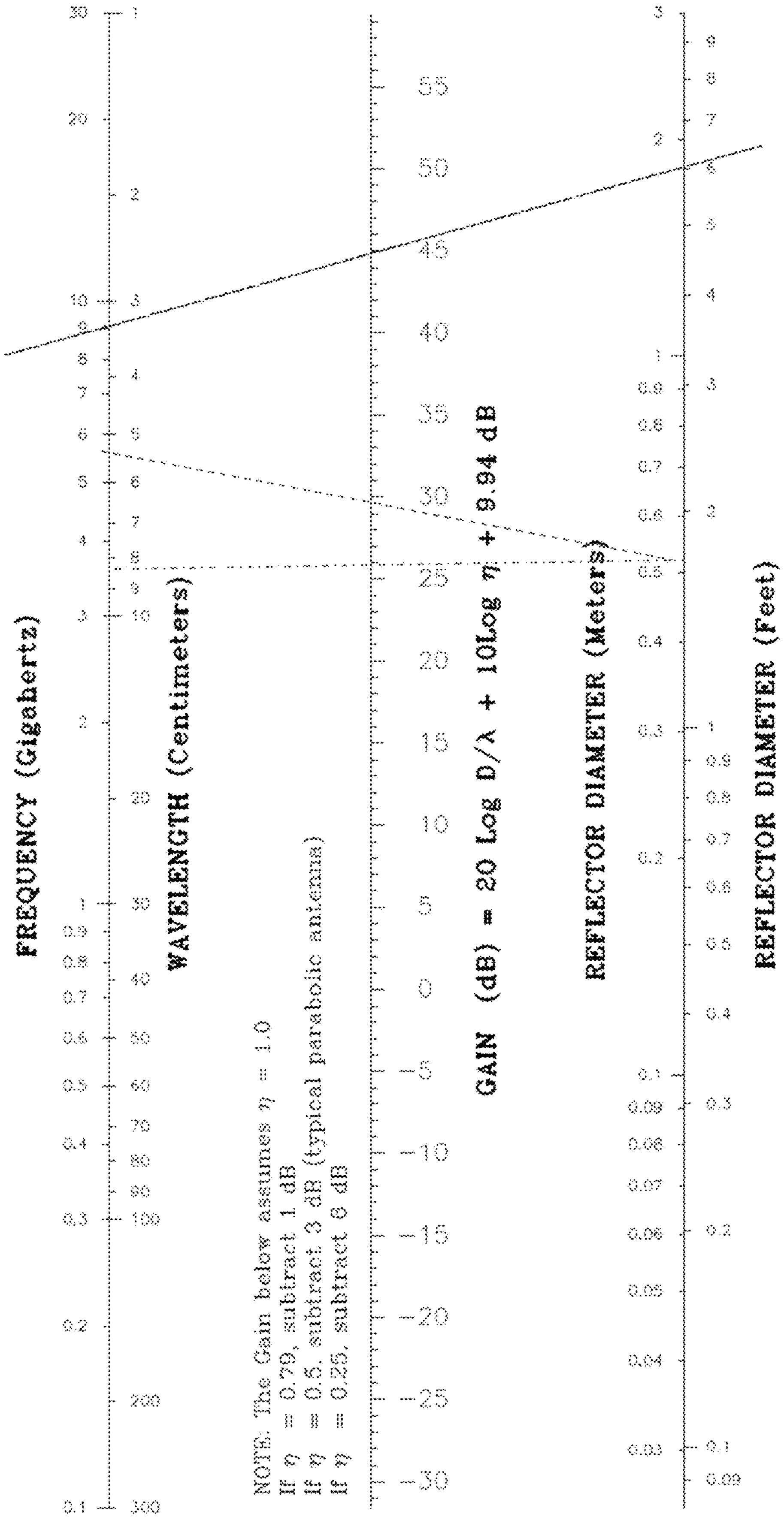
FIG. 15 shows examples of relationships between antenna frequency of operation and dimensions.

FIG. 15 shows examples of relationships between antenna frequency of operation and dimensions of antenna for the corresponding frequencies. As can be seen from this graph, optimal antenna size (e.g., length of linear elements) could be different for different for different operational frequencies. In particular, lens diameter between 0.5 and 0.6 meters may be suitable for 3 and 5 GHz operations of RF antennas, but have corresponding different gain values.

FIG. 16 depicts antenna source plane and observation plane examples. The variable U represents the amplitude and phase of the wave.

$U_1$ can be expressed as:

$$U_1(\xi, \eta) = circ\left(\frac{\sqrt{\xi^2 + \eta^2}}{w}\right). \quad \text{Eq. (7)}$$

$U_2$ can be expressed as:

$$U_2(x, y) = \frac{\exp(jkz)}{j\lambda z}\exp\left(j\frac{k}{2z}(x^2 + y^2)\right) \times w^2 \frac{J_1\left(2\pi\frac{w}{\lambda z}\sqrt{x^2 + y^2}\right)}{\frac{w}{\lambda z}\sqrt{x^2 + y^2}}. \quad \text{Eq. (8)}$$

$I_2$ can be expressed as:

$$I_2(x, y) = \left(\frac{w^2}{\lambda z}\right)^2 \left[\frac{J_1\left(2\pi\frac{w}{\lambda z}\sqrt{x^2 + y^2}\right)}{\frac{w}{\lambda z}\sqrt{x^2 + y^2}}\right]^2. \quad \text{Eq. (9)}$$

The first zero in the pattern occurs when:

$$2\pi\frac{w}{\lambda z}x = 1.22\pi. \quad \text{Eq. (10)}$$

Figure 17:
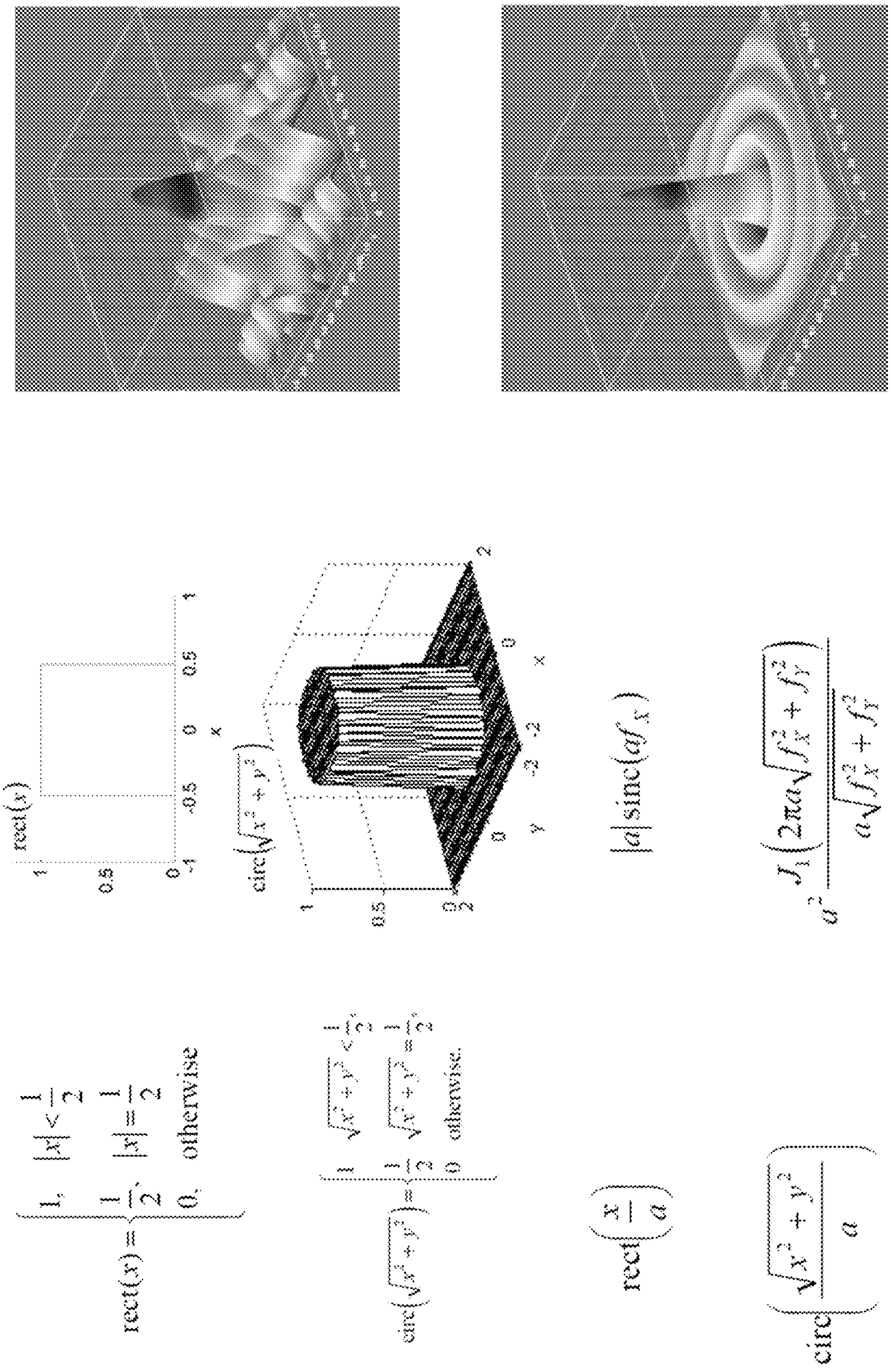
FIG. 17 shows examples of window functions.

FIG. 17 shows examples of window functions. It may be noted that window functions can be used to concentrate passband signal energy to within a frequency. As such, windowing in the spatial domain can be used to shape the gain pattern of a beam to lie within certain spatial region, while suppressing gain outside of the beam area.

FIG. 18 shows graphs and equations for uniform rectangular and circular aperture antennas and corresponding spatial selectivity (directivity) that can be achieved.

Figure 19:
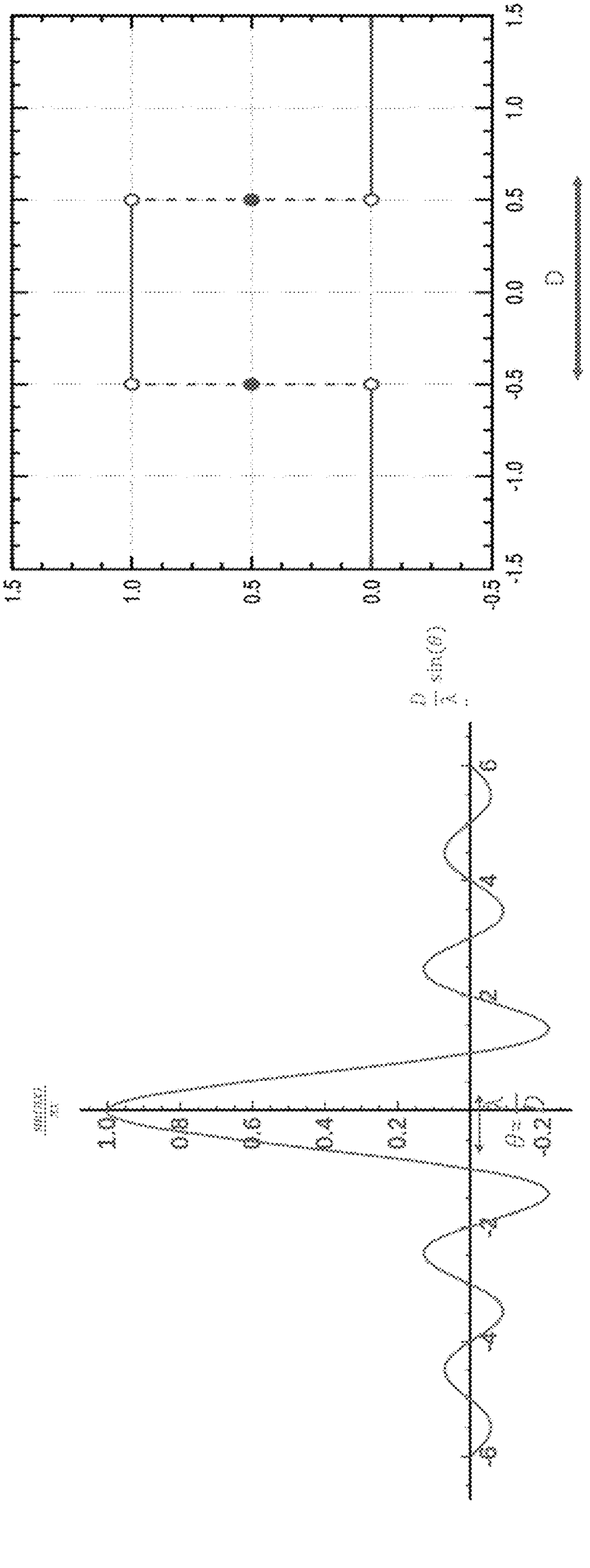
FIG. 19 shows an example of a sinc pulse and its transformed representation.

FIG. 19 shows an example of a sinc pulse and its transformed representation. In this example, Fourier transform is used for the transformation.

Figure 20:
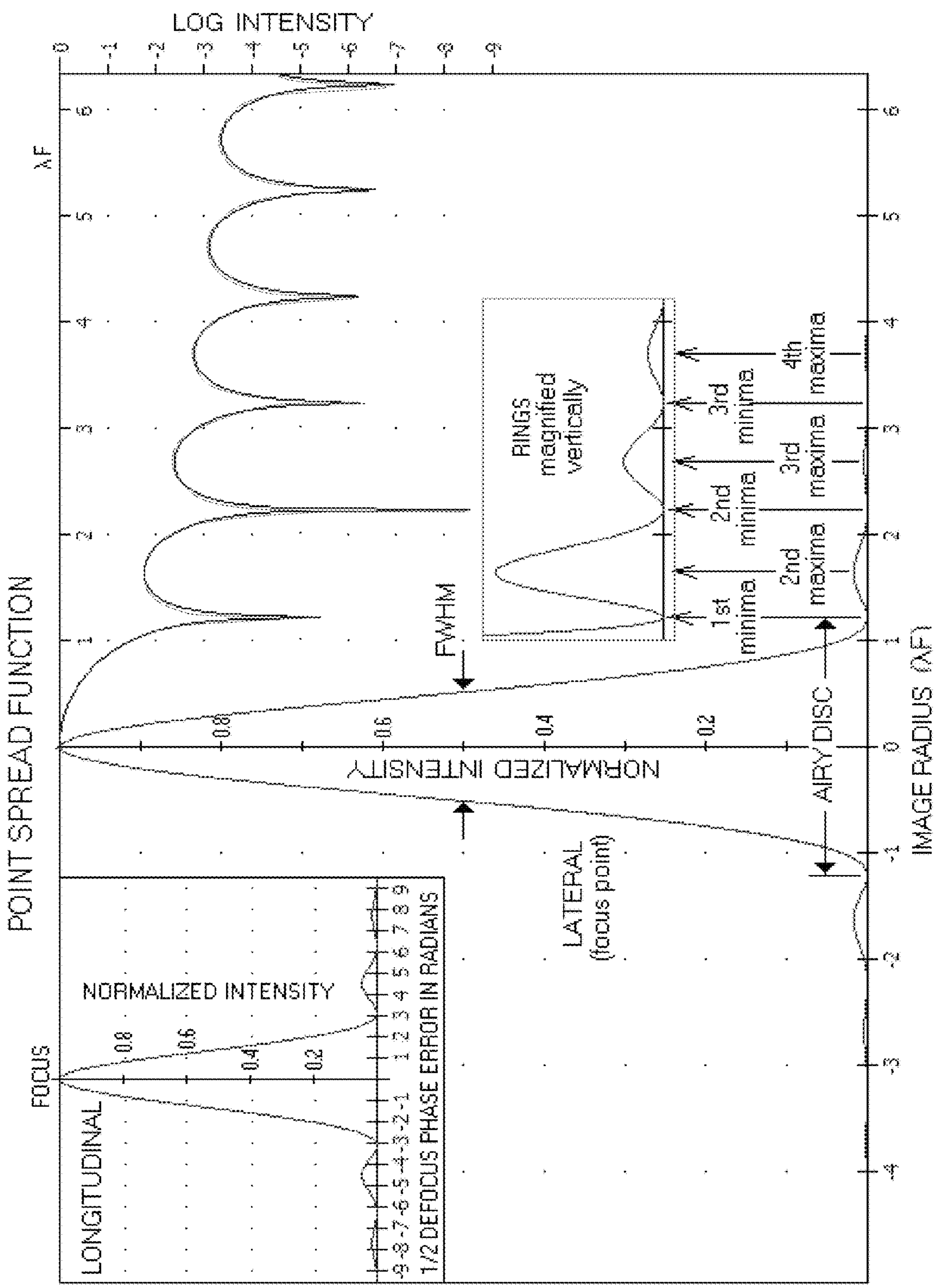
FIG. 20 depicts an example of a Jinc function.

FIG. 20 depicts an example of a Jinc function (which is a Bessel function similar to sinc function). As further described in this document, the sinc and Jinc functions can be implemented to achieve windowing of antenna beams for spatial selectivity.

FIG. 21 shows an example of a power pattern for a circular aperture antenna. Such an antenna may also be used as an antenna element in the described embodiments.

Figure 22:
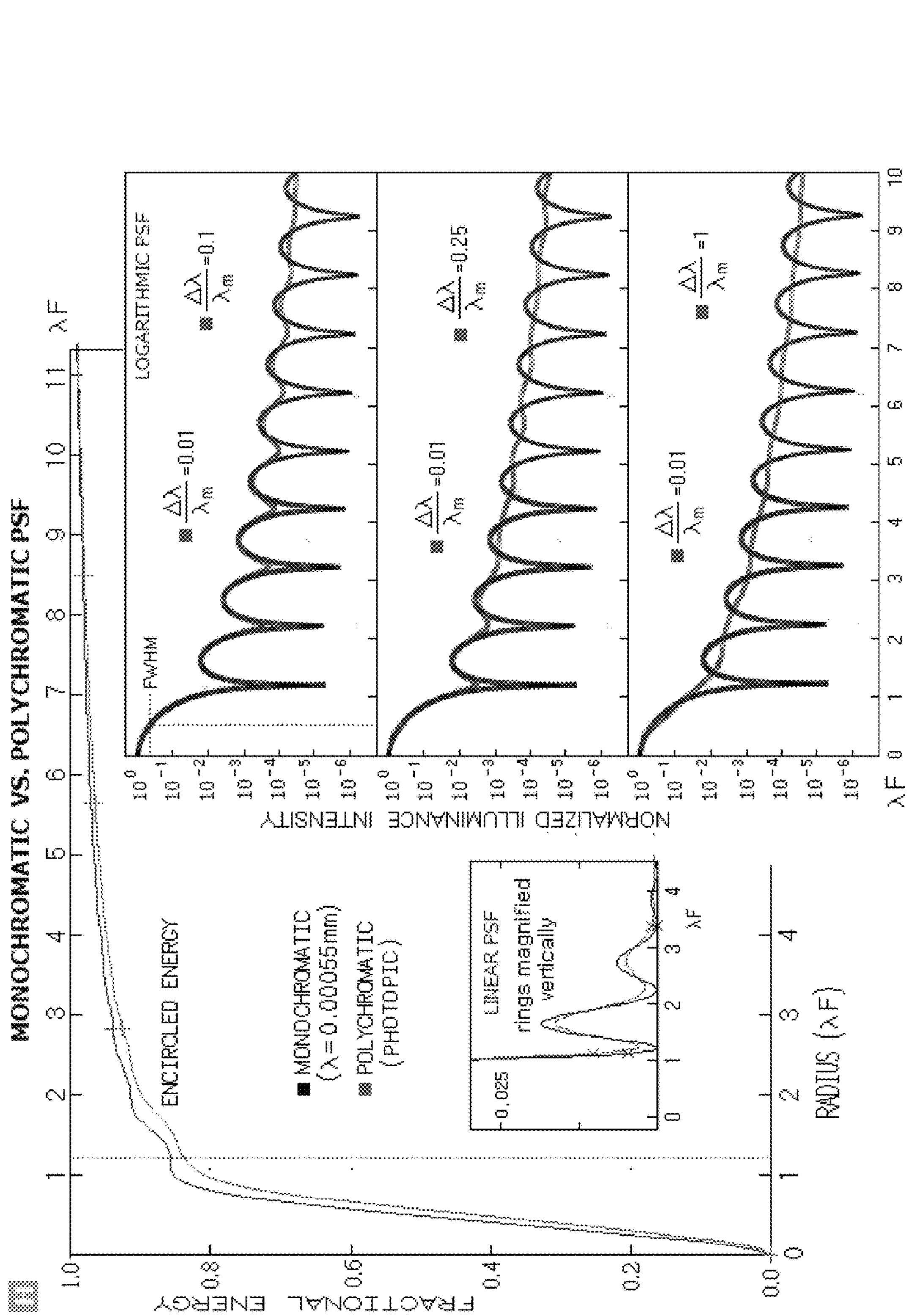
FIG. 22 shows examples of monochromatic and polychromatic point spread functions.

FIG. 22 shows examples of monochromatic and polychromatic point spread functions. These functions represent the beams formed by point antennas.

Figure 23:
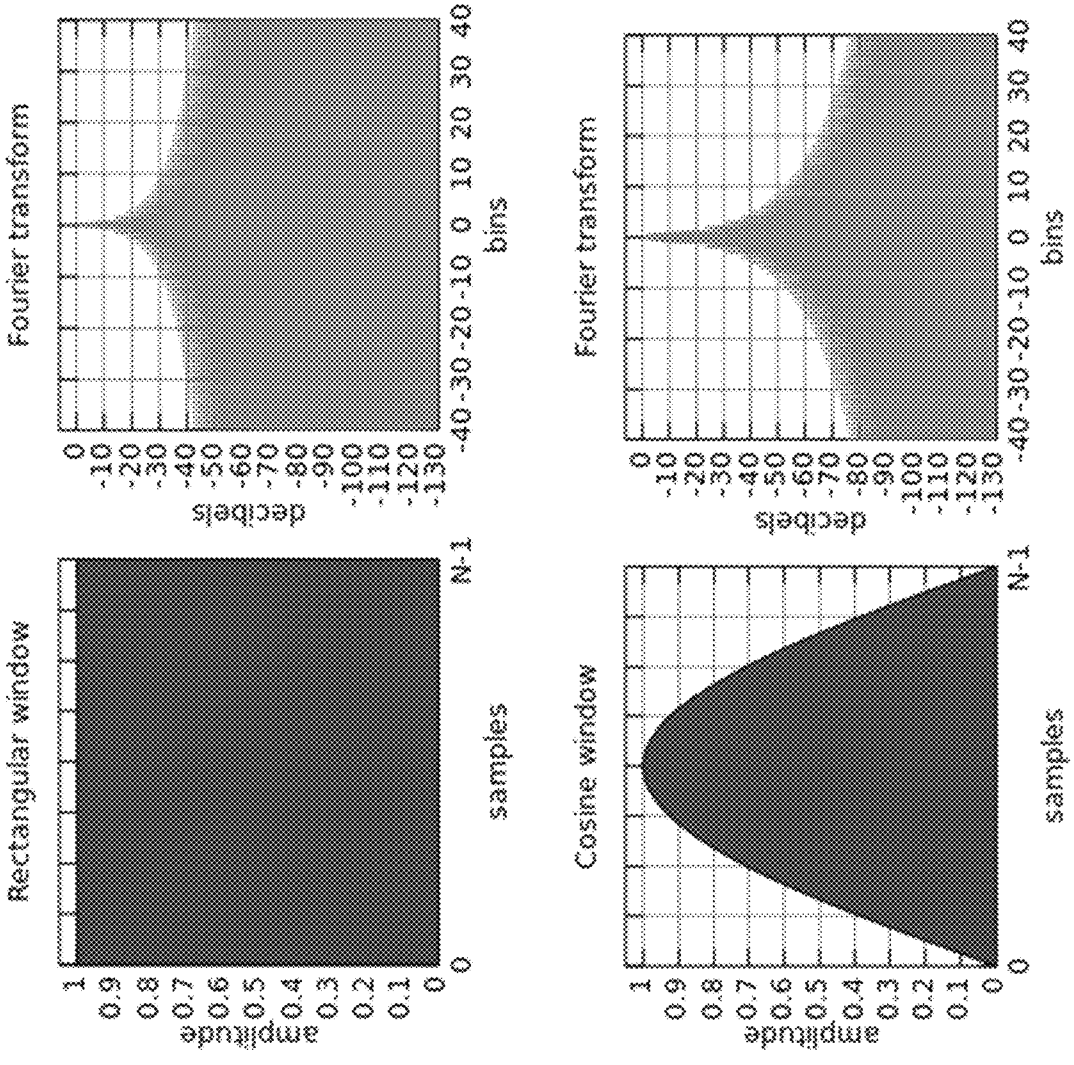
FIG. 23 shows examples of window functions.

FIG. 23 shows examples of window functions. It can be seen that, in comparison with the rectangular window function, a cosine window exhibits a transform domain spectrum that has a wider main lobe, but significantly lower side lobes, e.g., 30 dB or lower amplitude. Windowing using functions as depicted in FIG. 23 could be achieved by using linear weighted ums of signal streams in the arrangement as depicted in FIG. 8.

Figure 24:
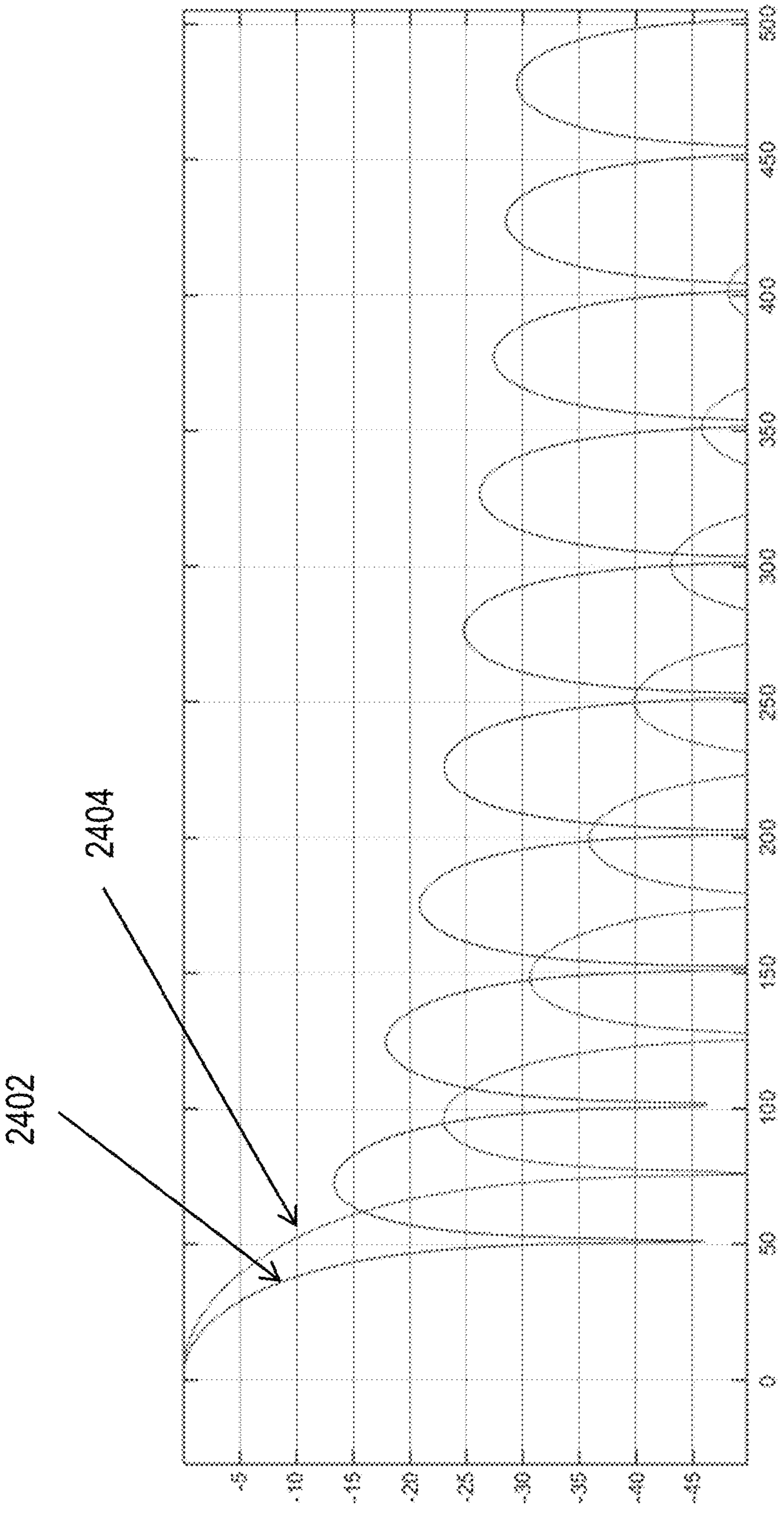
FIG. 24 shows examples of power cosine and window functions.

FIG. 24 shows examples of power cosine and uniform window functions. As can be seen from the graph, in comparison with uniform window (2402), a cosine window 2404 offers greater side lobe suppression at the expense of wider main lobe. In particular, while the first side lobe of the uniform window is around 13 dB, the first side lobe of the cosine window is down by almost 23 dB, with the remaining side lobes having at least 30 dB attenuation.

Figure 25:
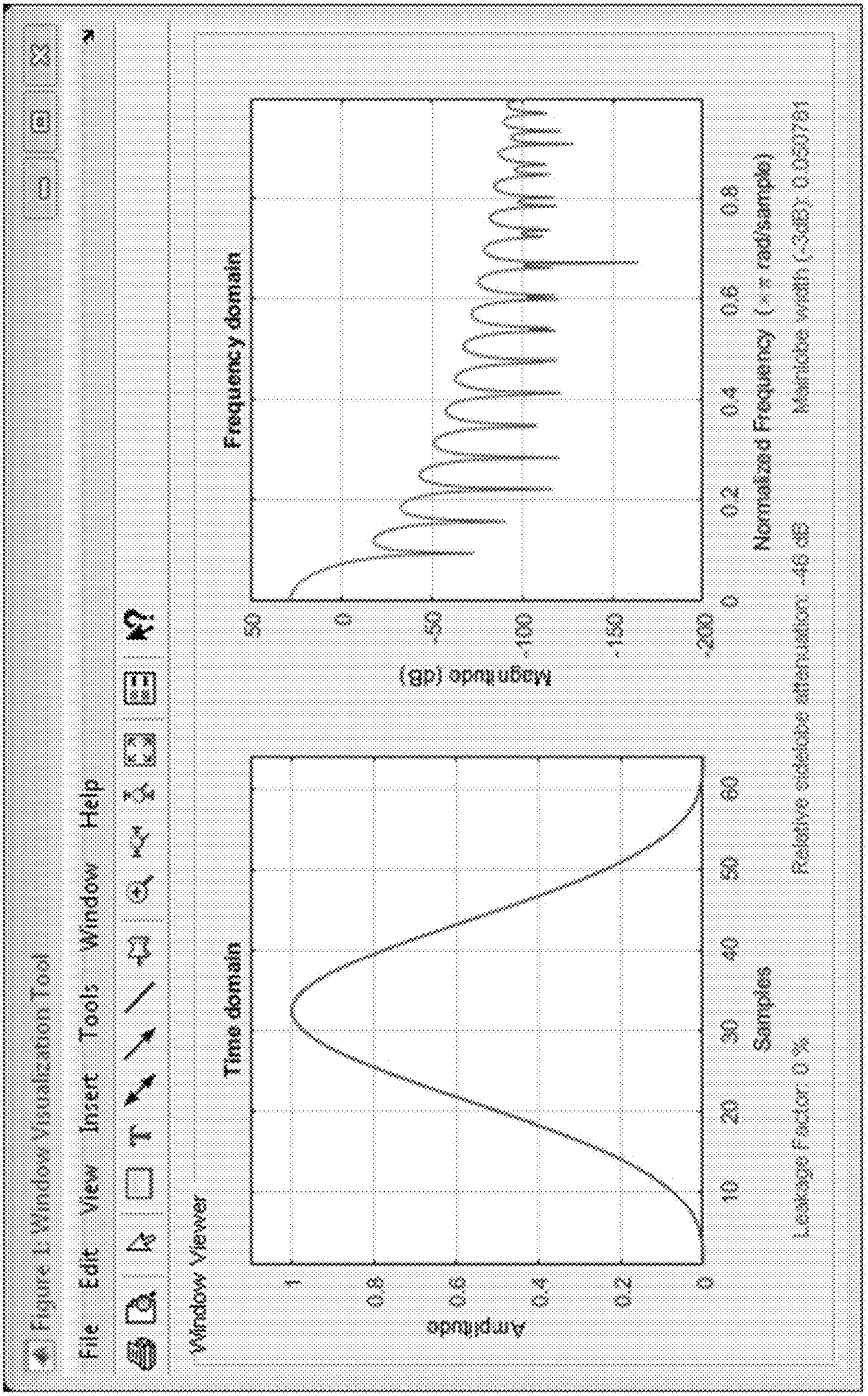
FIG. 25 shows an example of Bohman's window.

FIG. 25 shows an example of Bohman's window, which is obtained by convolution of a cosine window by itself.

Figure 26:
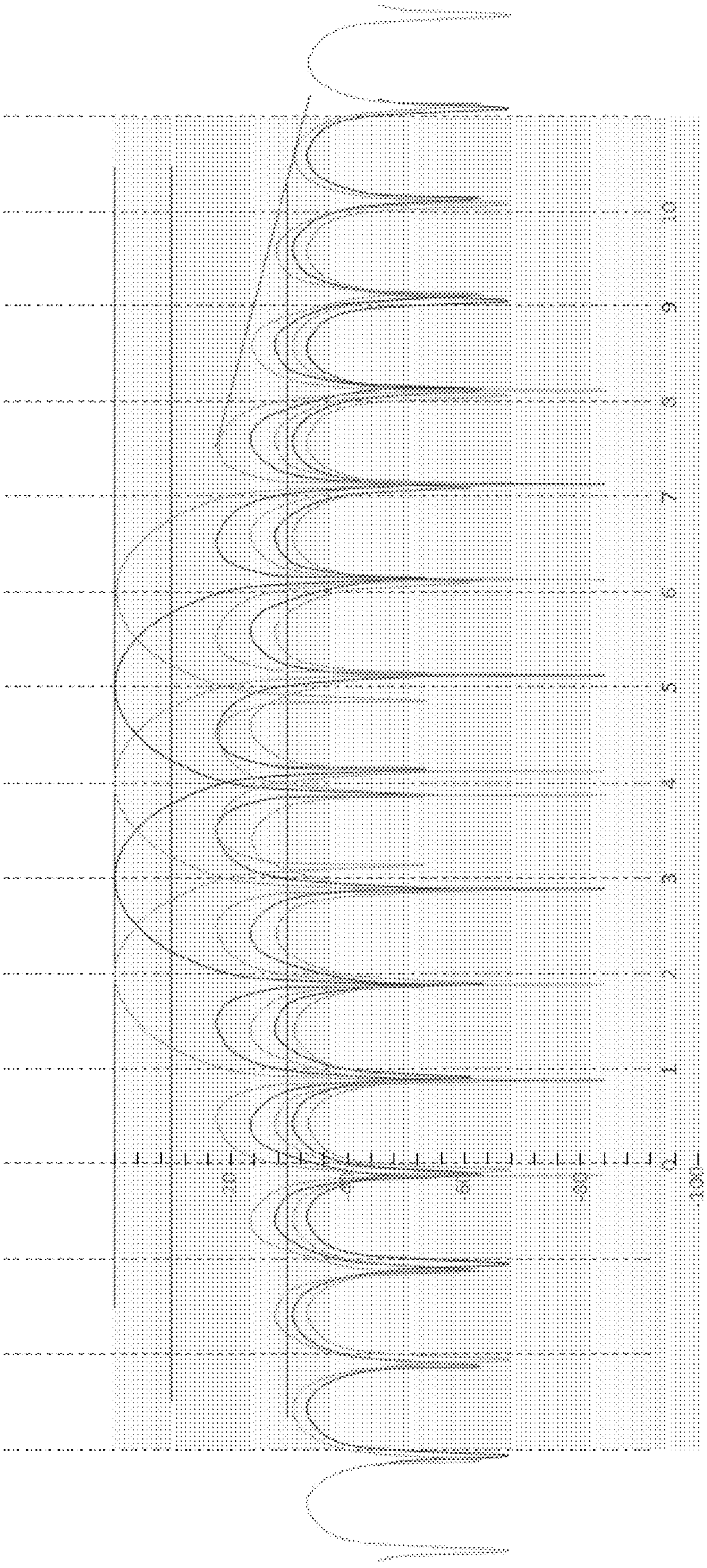
FIG. 26 shows an example of radiation pattern of a multibeam circular aperture antenna without windowing.

FIG. 26 shows an example of radiation pattern of a multibeam circular aperture antenna without windowing. Five main lobes, e.g., corresponding to 5 radiating elements, are depicted. No windowing is used in the depicted radiation pattern.

Figure 27:
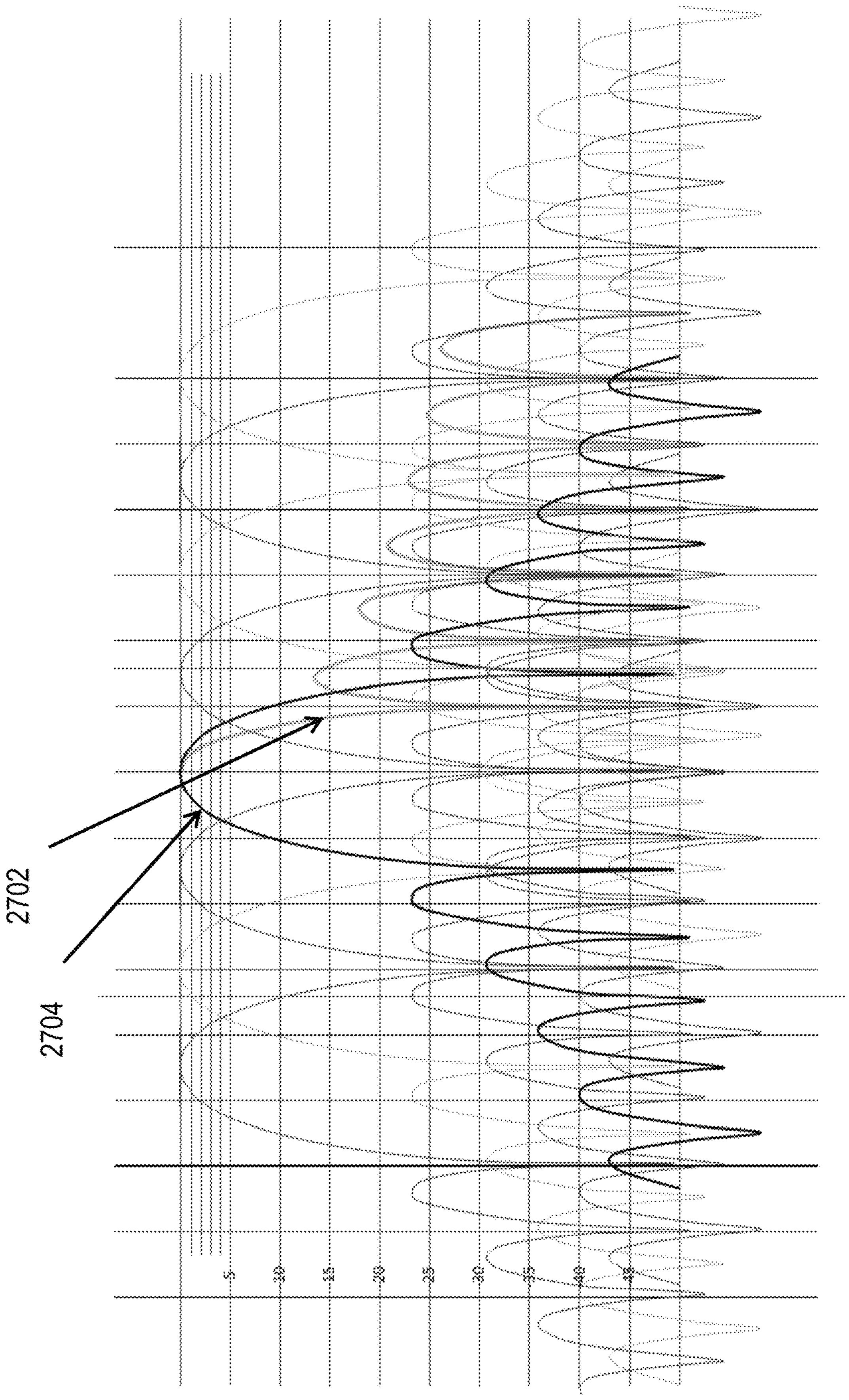
FIG. 27 shows an example of radiation pattern of a multibeam circular aperture antenna with cosine windowing.

FIG. 27 shows an example of radiation pattern of a multibeam circular aperture antenna with cosine windowing. The depicted embodiment shows eight main lobes corresponding to eight radiative elements. The curve 2702 represents an example of a sinx/x window. The curve 2704 represents an example of a cosine windowed beam, which, as a result of the windowing, has a wider beam and lower side lobes compared to the curve 2702. The x-axis represents beam angle and the Y axis represents radiative power in dB.

Figure 28:
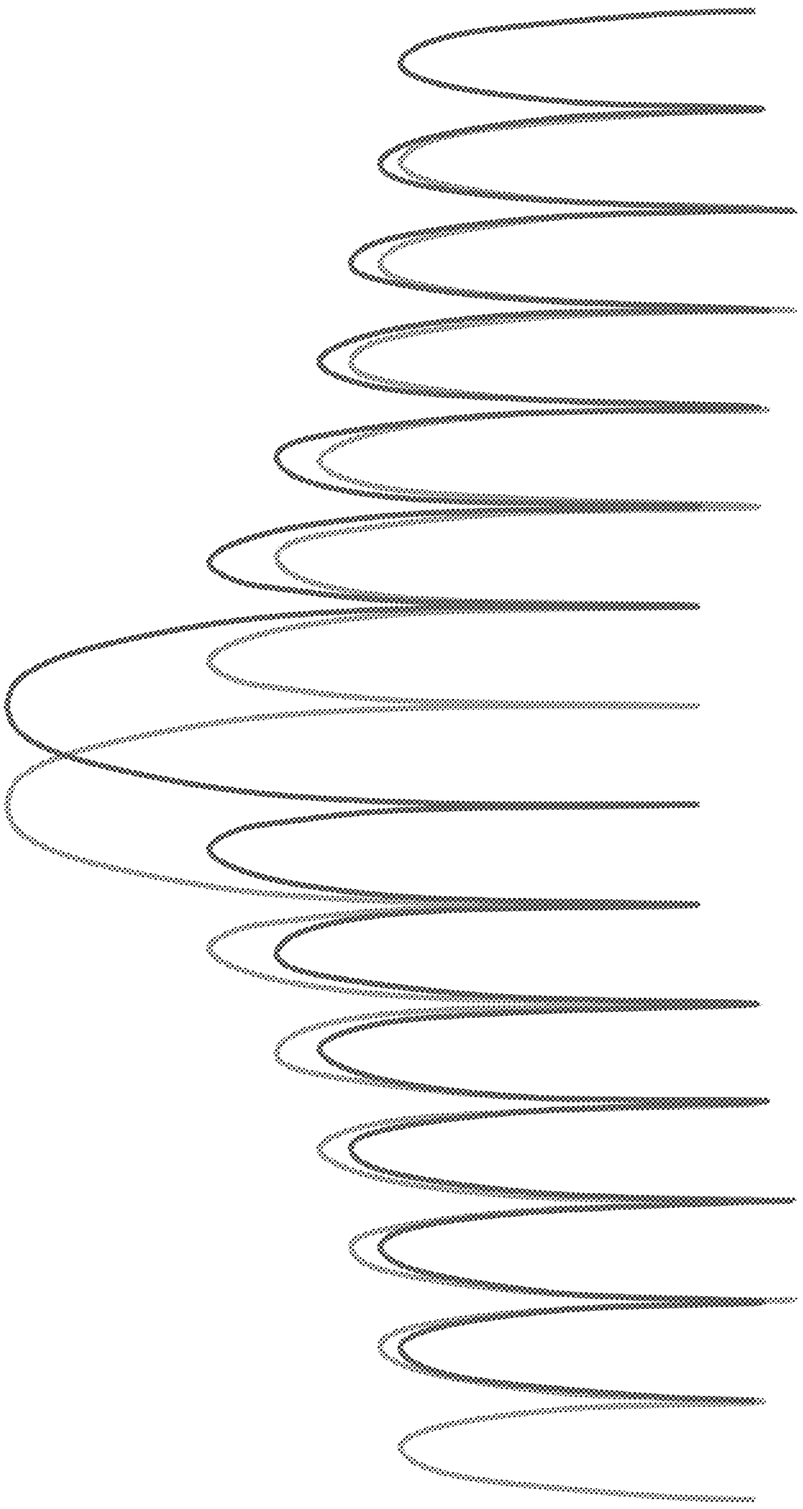
FIG. 28 shows two adjacent radiation lobes.

FIG. 28 shows two adjacent radiation lobes in a cosine windowed radiation pattern.

Figure 29:
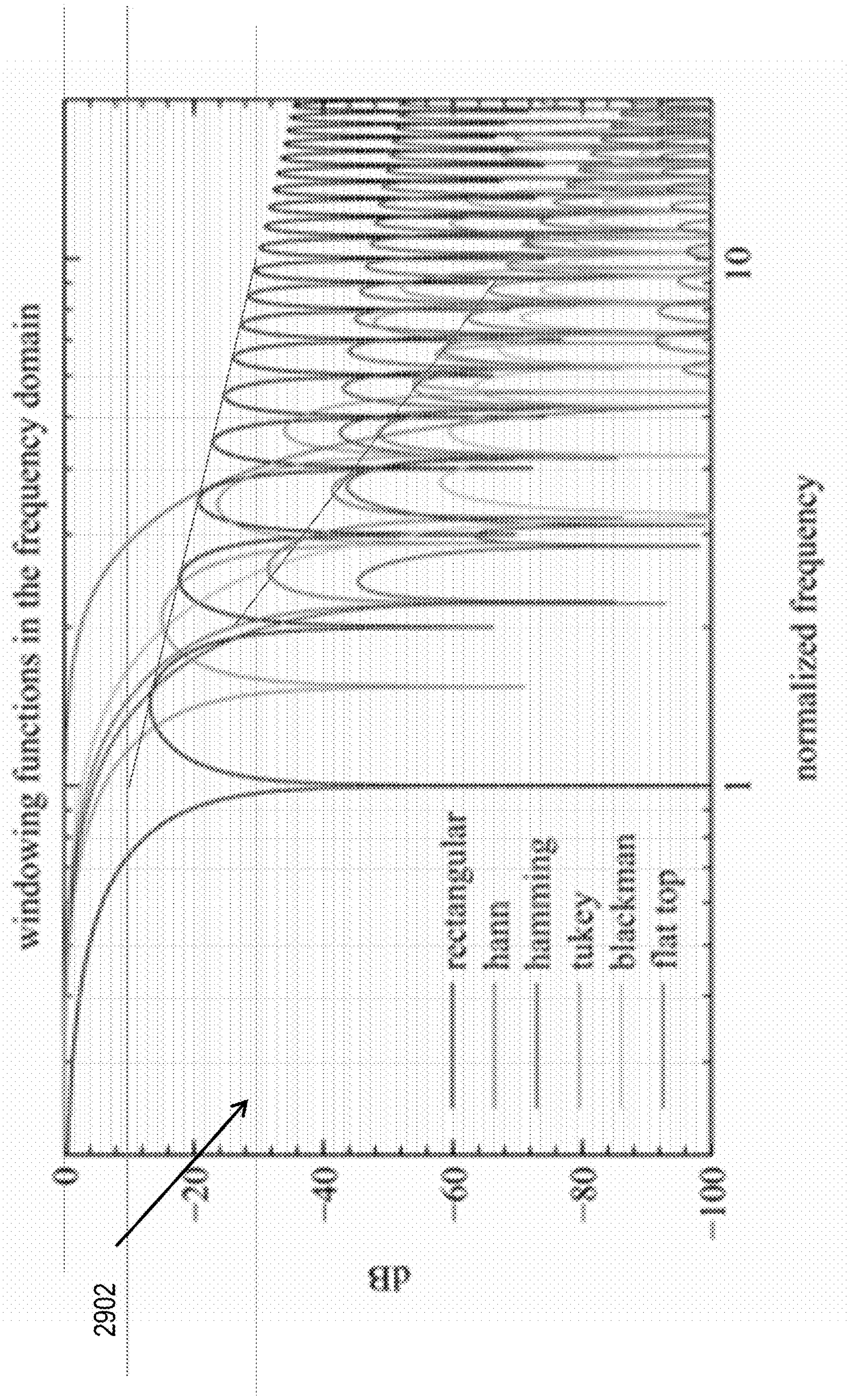
FIG. 29 pictorially depicts the use of windowing to shape radiation pattern.

FIG. 29 pictorially depicts the use of windowing to shape radiation pattern. The graph depicts relative frequency domain characteristics of six window functions: rectangular, Hann, Hamming, Tukey, Blackman and Flat top. FIG. 29 shows that there is a trade-off between the width of the main lobe, and how fast side lobes of the window function attenuate away from the main lobe. The slopes in the stopband indicate how much a given antenna beam will interfere with radiative patterns of neighboring antenna elements conforming to each window function. For example, roughly speaking, a rectangular window may have narrowest main lobe, but relatively low side lobe suppression, implying signal interference of neighboring antenna elements.

By contrast, a flat top window may have a relatively broad main lobe, but side lobes are attenuated below −80 dB, so that adjacent antenna elements will not radiate to interfere with each other. Thus, FIG. 29 shows a trade-off between spacing in antenna elements on an antenna and the implementation of a windowing function for the radiated beam such that, for that spacing, the resulting beams are relatively free of interference from each other. The horizontal line 2902 may represent a target side lobe attenuation for a given antenna configuration. This target attenuation may be based on a calculation related to the symbol complexity of QAM symbols being transmitted by the antenna. For example, high order QAM constellations such as 64 QAM and above may target at least 30 dB attenuation of sidebands to reduce interference from neighboring beams.

Figure 30:
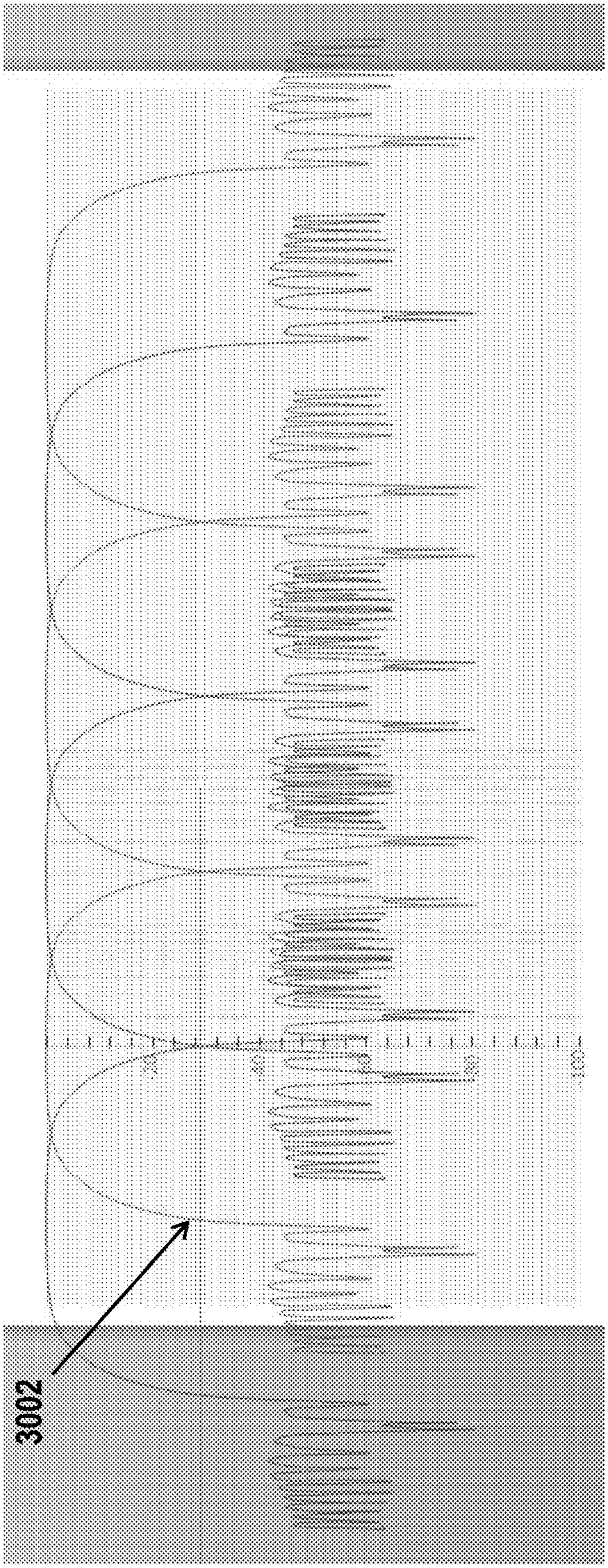
FIG. 30 shows a multibeam radiation pattern with Hamming window.

FIG. 30 shows a multibeam radiation pattern with Hamming window. The example shows six beams, with each beam having side lobes suppressed to at least −40 dB level, far below the target attenuation threshold shown by the horizontal line around −30 dB. While the beam patterns of adjacent lobes overlap, alternate lobes do not overlap and their amplitudes are down to the target attenuation level at the midway point between the alternate lobes.

Figure 31:
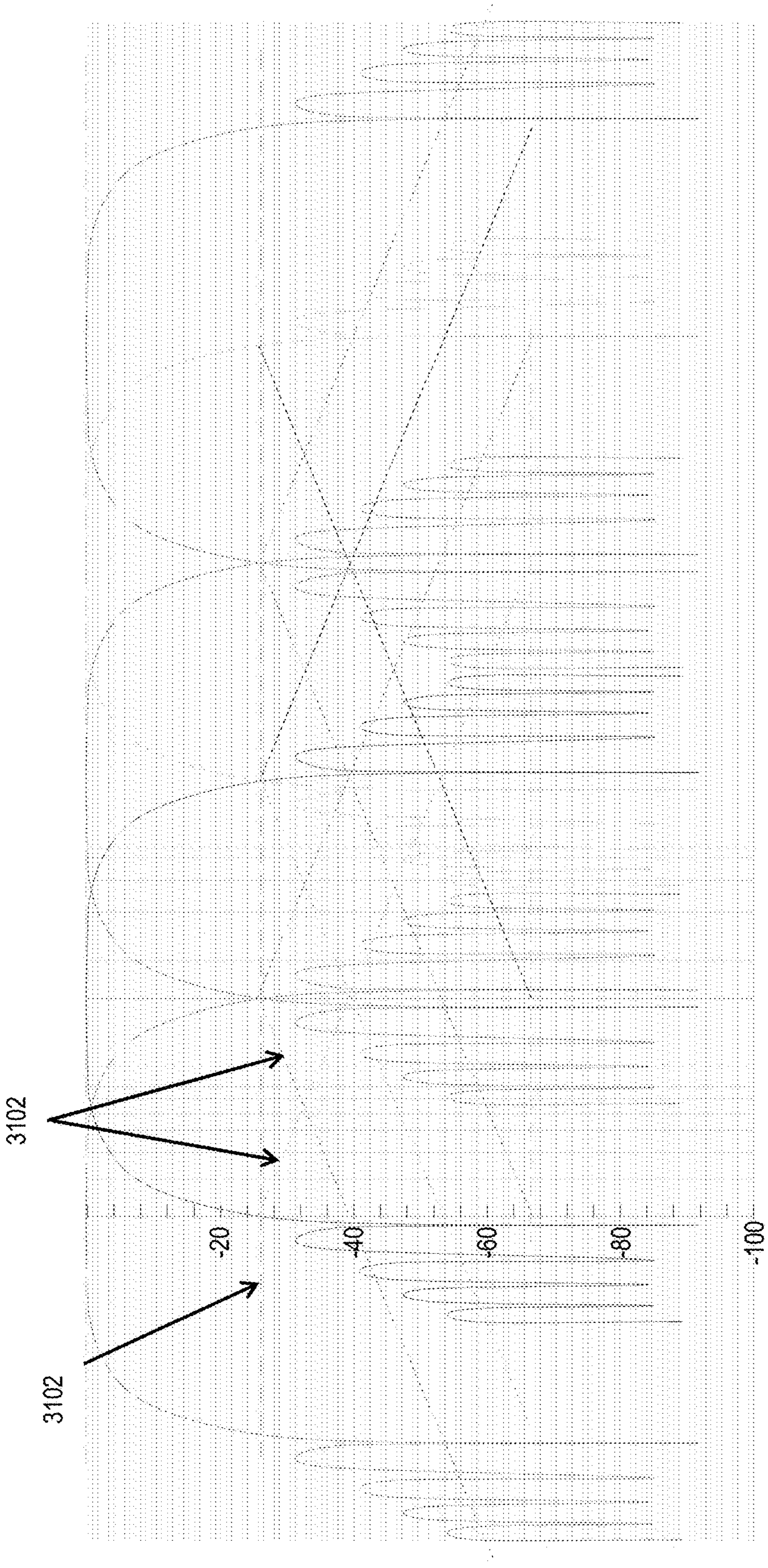
FIG. 31 shows a multibeam radiation pattern with Hann window.

FIG. 31 shows a multibeam radiation pattern with Hann window. The slopes 3102 represent the out-of-band attenuation achieved by beams shaped with the Hann window function.

Figure 32:
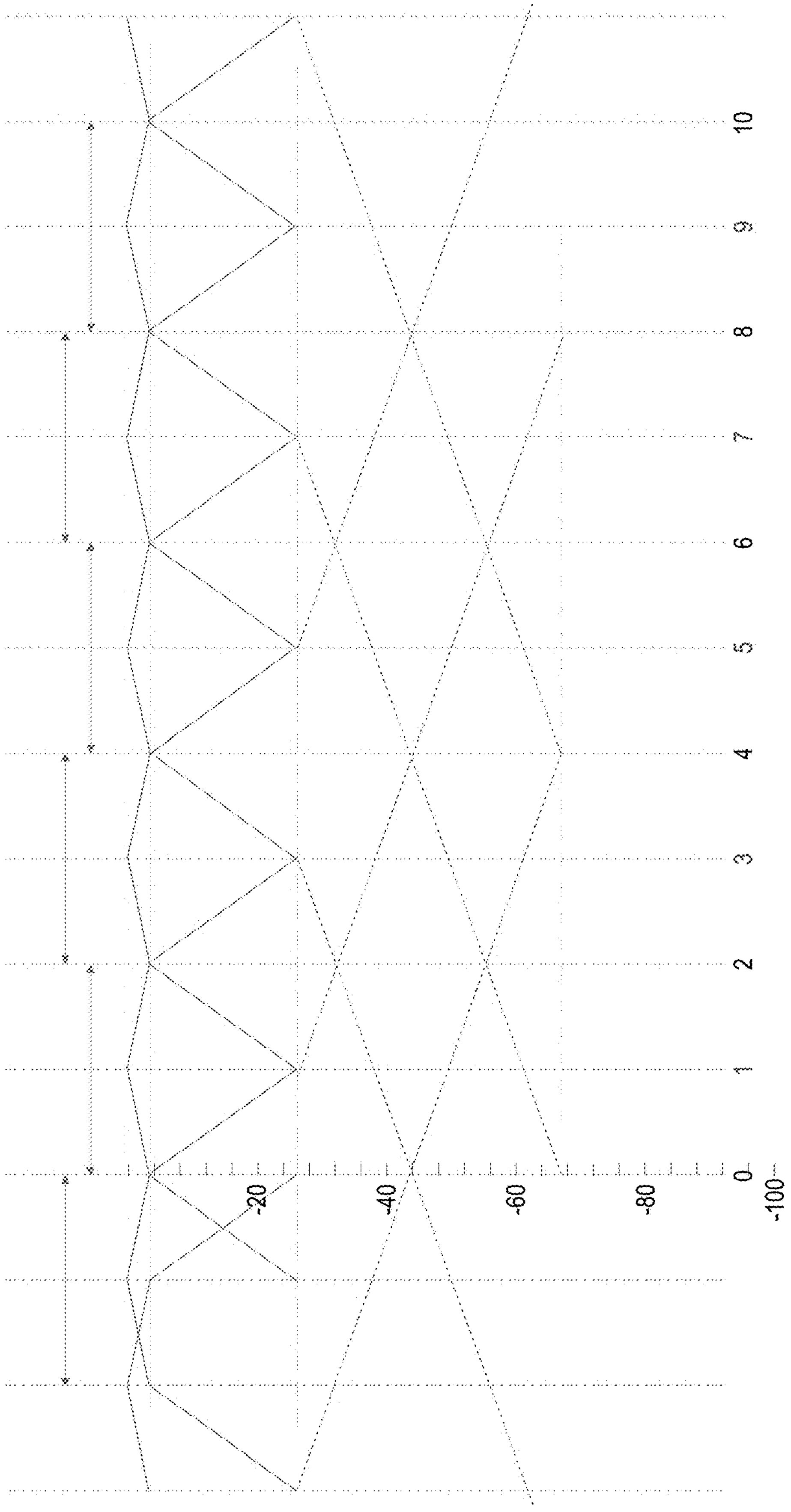
FIG. 32 shows a multibeam radiation example on linear scale.
Figure 33:
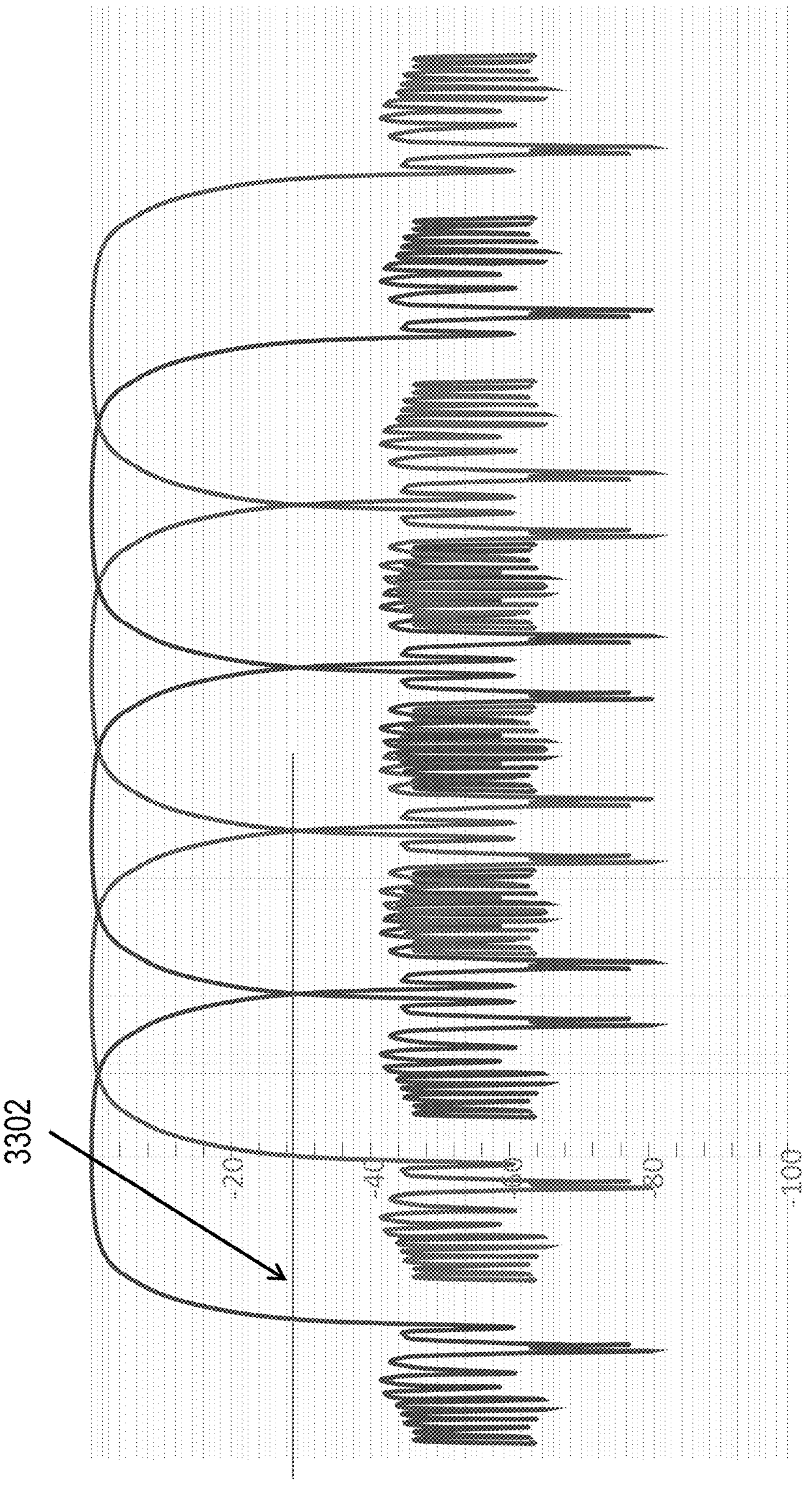
FIG. 33 shows an example of a multibeam antenna pattern.
Figure 34:
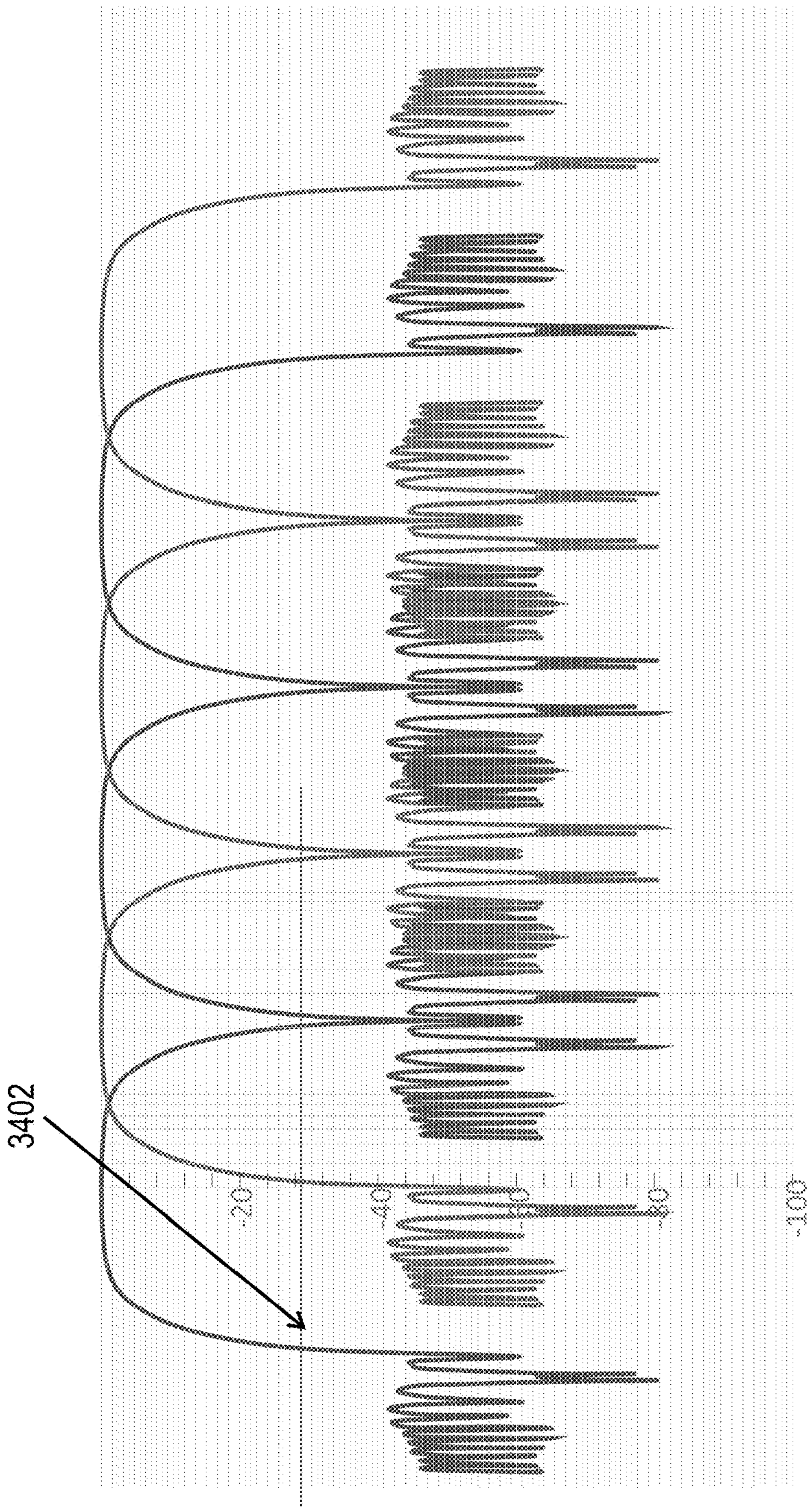
FIG. 34 shows another example of a multibeam antenna pattern.
Figure 35:
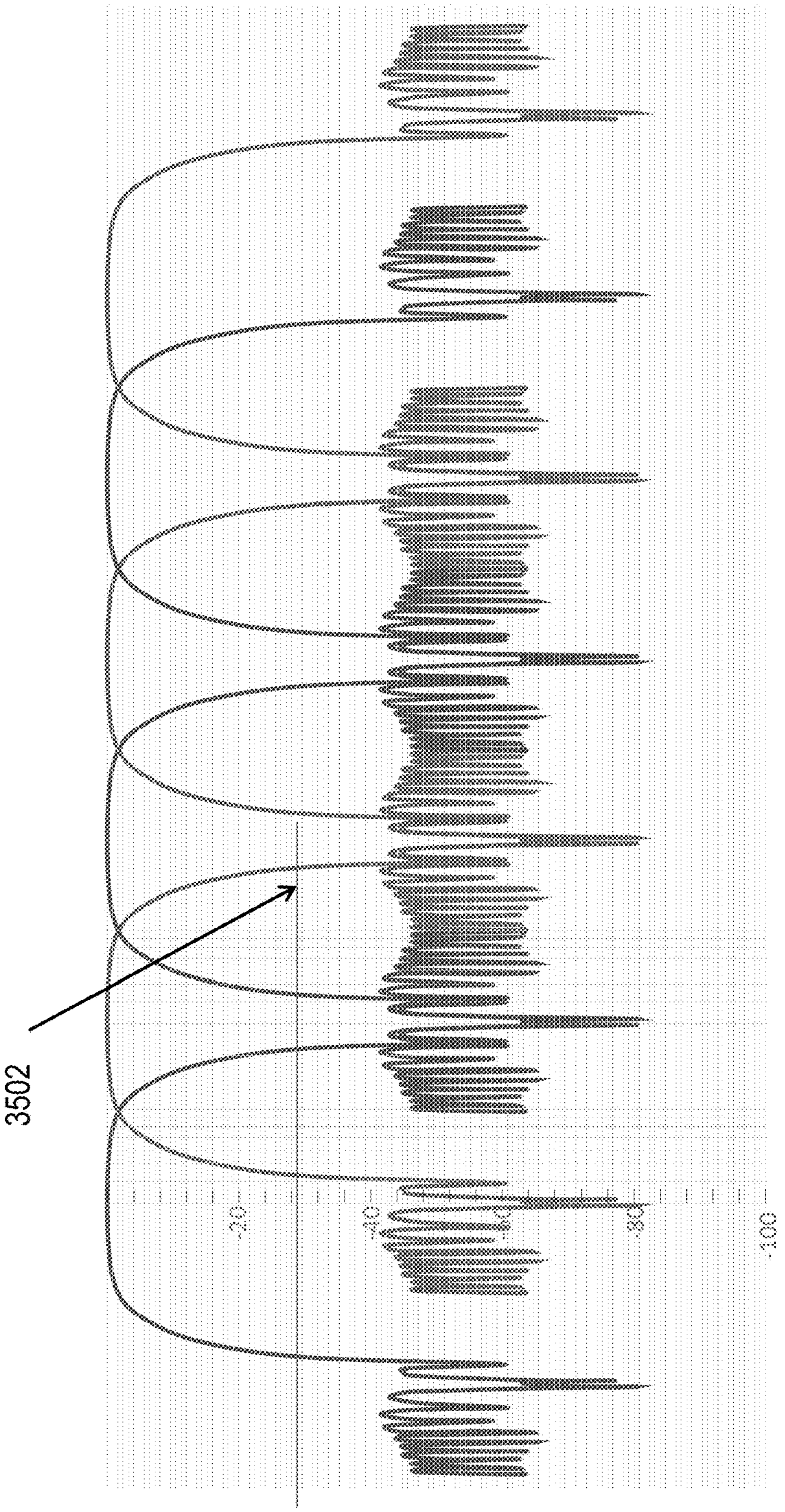
FIG. 35 shows another example of a multibeam antenna pattern.
Figure 36:
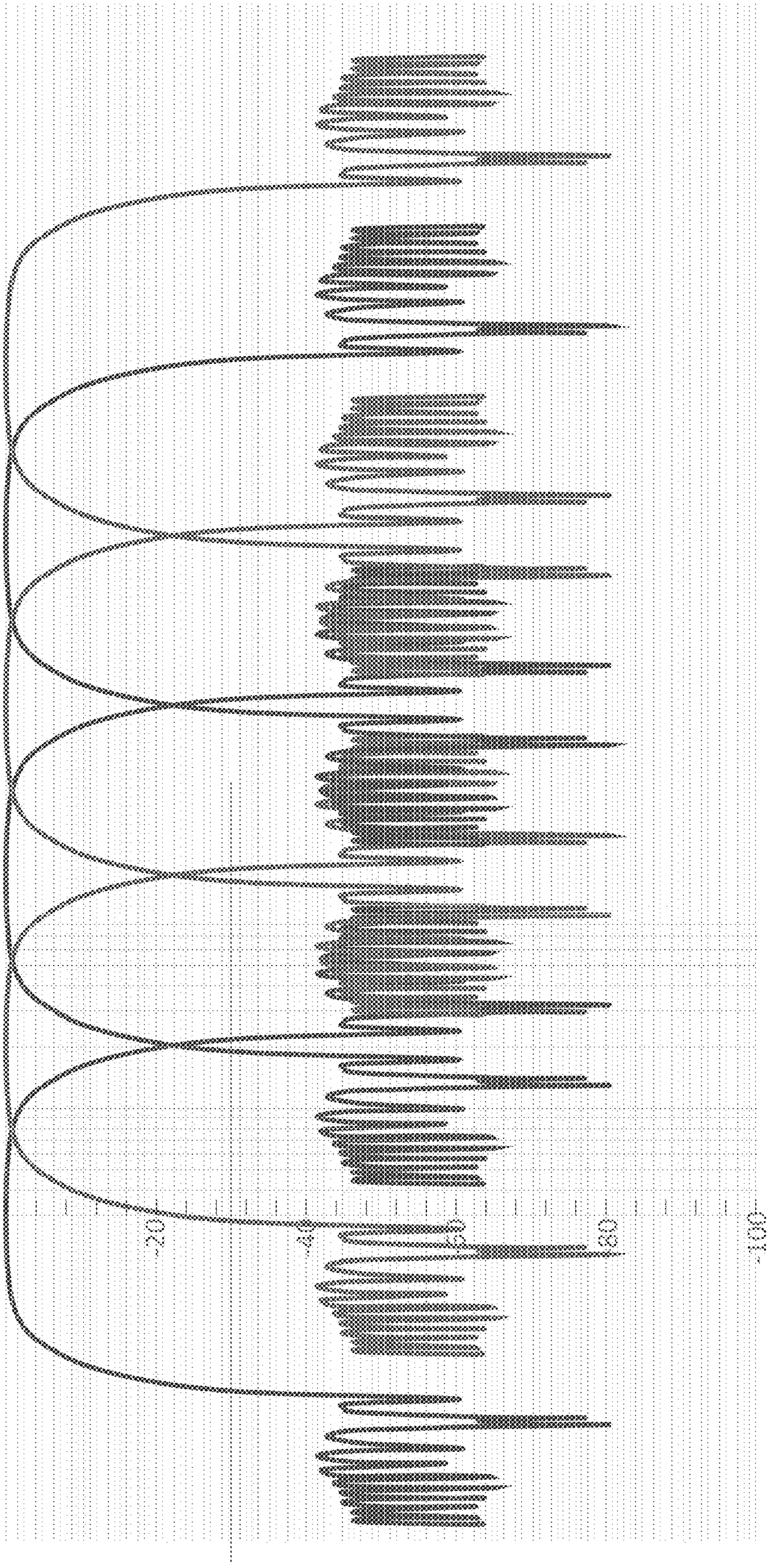
FIG. 36 shows another example of a multibeam antenna pattern.
Figure 37:
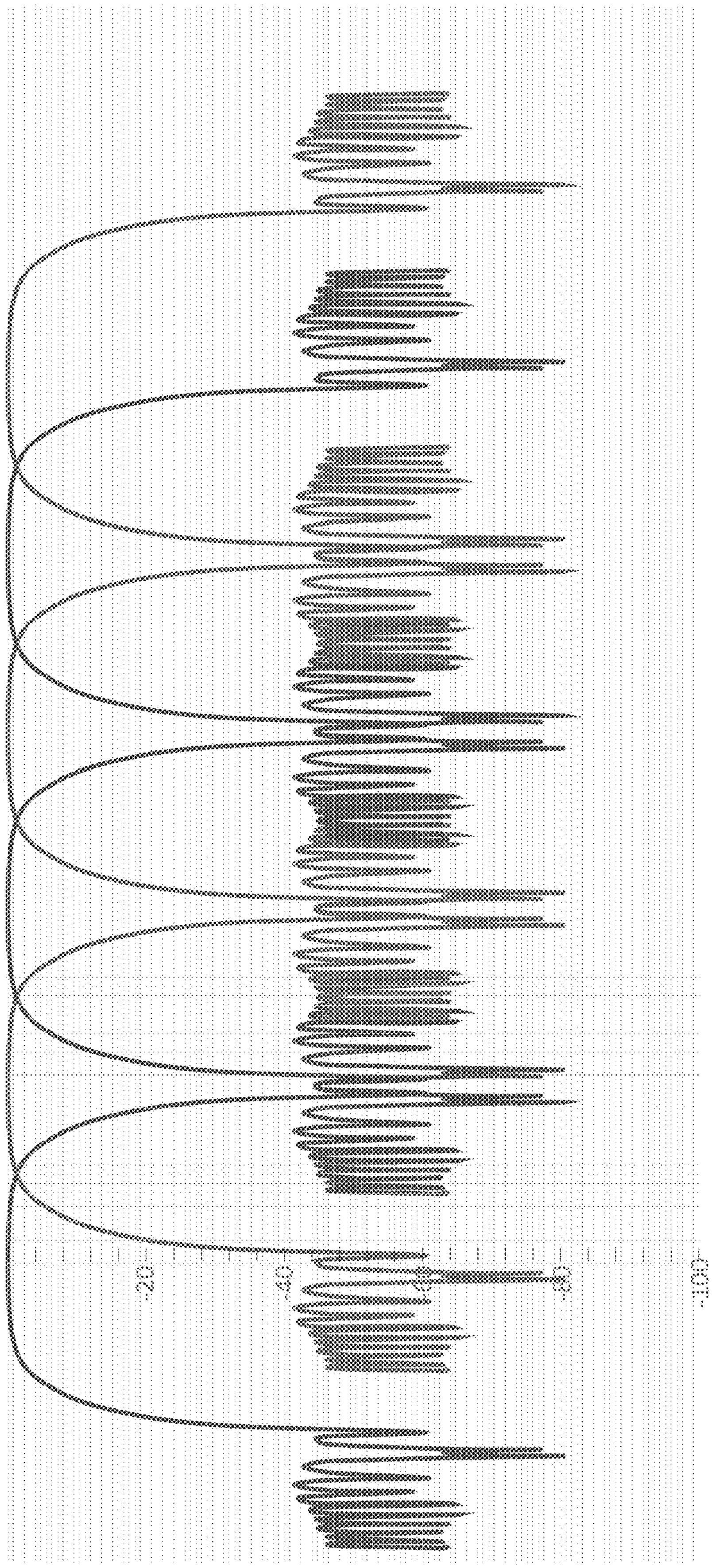
FIG. 37 shows another example of a multibeam antenna pattern.

FIG. 32 shows a multibeam radiation example of the Hann window, where the passband and stopbands of the radiation patterns are simplified for visual presentation on a linear scale.

FIG. 33, FIG. 34, FIG. 35, FIG. 36 and FIG. 37 graphically show the effect of varying separation between antenna elements resulting in varying amount of overlap between adjacent and other neighboring beam patterns.

Figure 38:
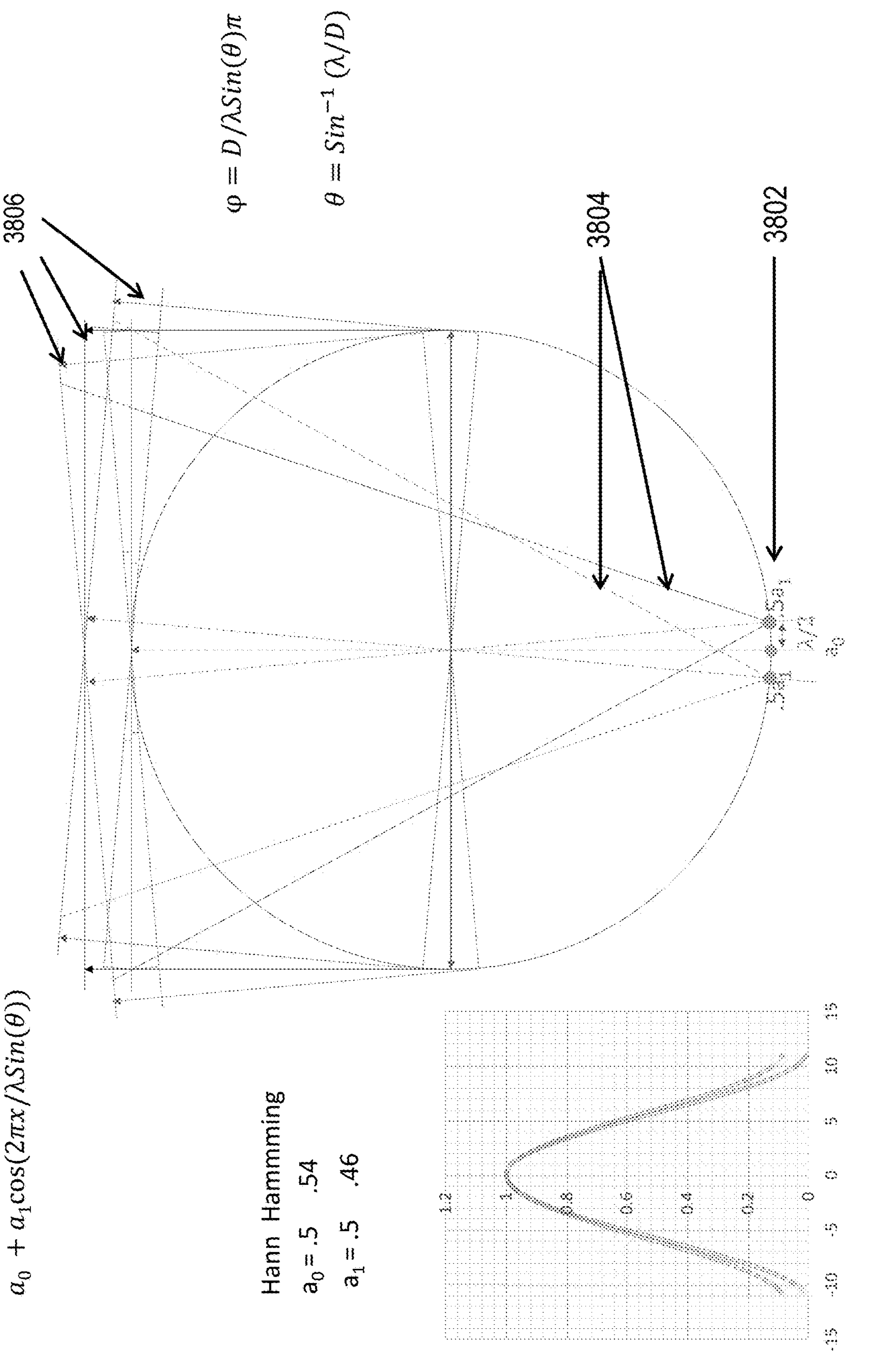
FIG. 38 shows an example beam generation using multiple radiation sources.

FIG. 38 shows an example beam generation using multiple radiation sources. Three antenna elements 3802 are located at half-wavelength distance around a hemispherical surface. The antenna elements 3802 radiate beams in the directions as depicted by 3804. At the radiating surface of the antenna, the radiations from each antenna elements appear as planar radiations, indicated by rectangles 3806.

A beam can be generated by splitting the input signal into multiple feeds, each feeding a corresponding antenna element after having gone through the attenuation coefficient a0 or a1. At the far end, the radiated signals proportionally add (and subtract) together to provide a windowed version of the beam. FIG. 38 depicts two windowing options—a Hann window with both a0 and a1 having values 0.5, and a Hamming window in which a0 is 0.54 and a1 are 0.46. In the depicted embodiment, three antenna elements are used to implement the windowing. It would be appreciated by one of skill in the art that, as described herein, a different number of antenna elements may be used for a window, with the corresponding taps, or attenuating coefficients, having values that provide the windowing effect to the final beam emanated due to the combination of radiation from each antenna element. Furthermore, the distance between antenna elements can also be adjusted to meet a target beam width and/or side lobe attenuation.

Figure 39:
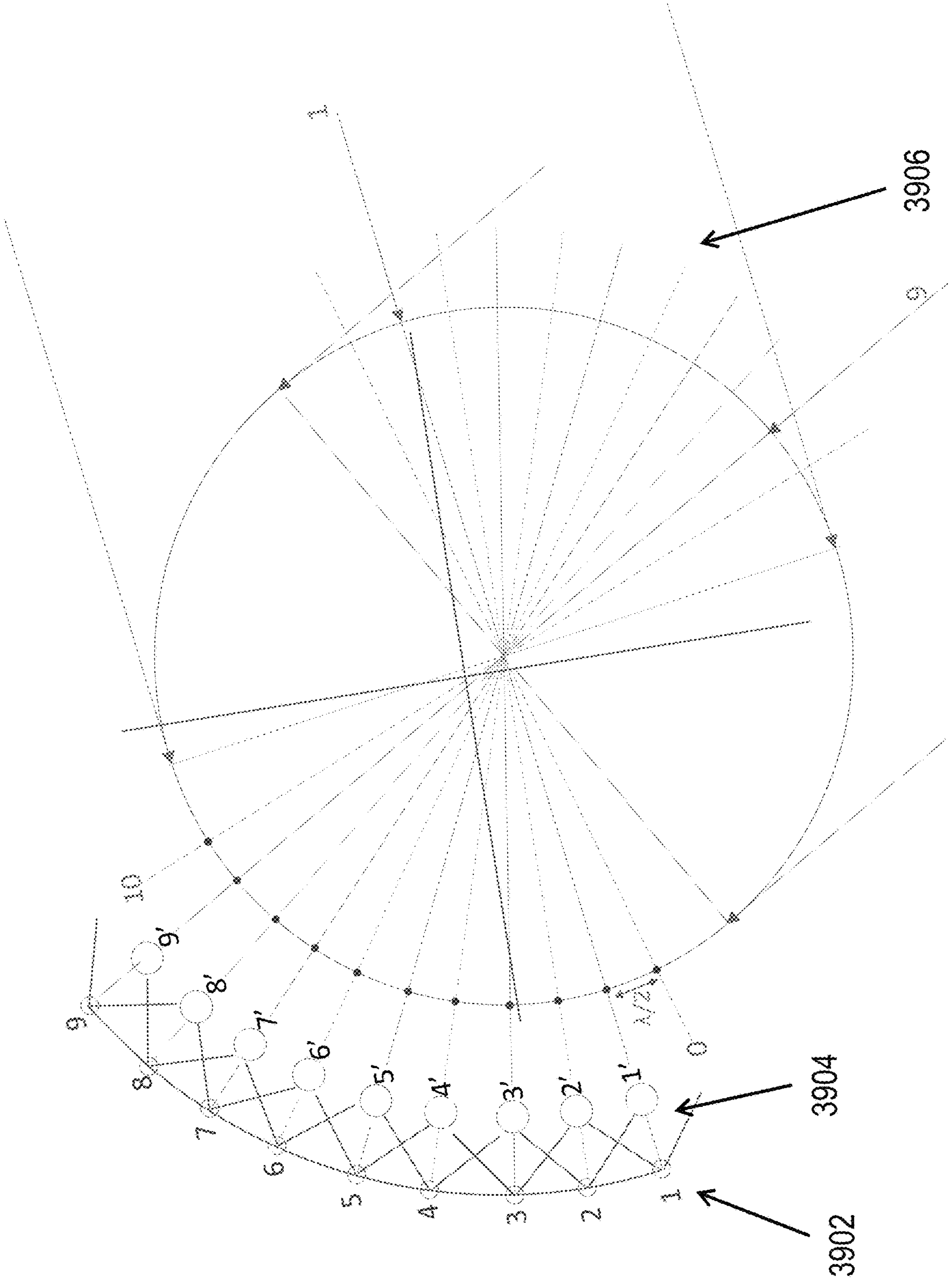
FIG. 39 shows an example of a feed network for beam shaping.

FIG. 39 shows an example of a feed network for forming multibeam patterns at antenna output. One or more beams 3902 (numbered 1 to 9 in the depicted embodiment) may be input to the multibeam antenna. Each beam may be split into a corresponding number of output feeds to the antenna elements 3904. During operation, beams 1, 3, 5, 7 and 9 may be operated simultaneously and beams 2, 4, 6, 8 may be operated simultaneously. As can be seen, by using 3-tap split for each beam, a windowing function can be implemented as described previously. Each antenna element 1' to 9' receives input from two beams at the same time. The resulting beam pattern emanating from the transmitting side 3906 of the antenna thus includes multiple beams, each windowed and having a main lobe and attenuated side lobes, in the direction as indicated by the straight line arrows from the antenna elements to the transmitting side 3906.

Figure 40:
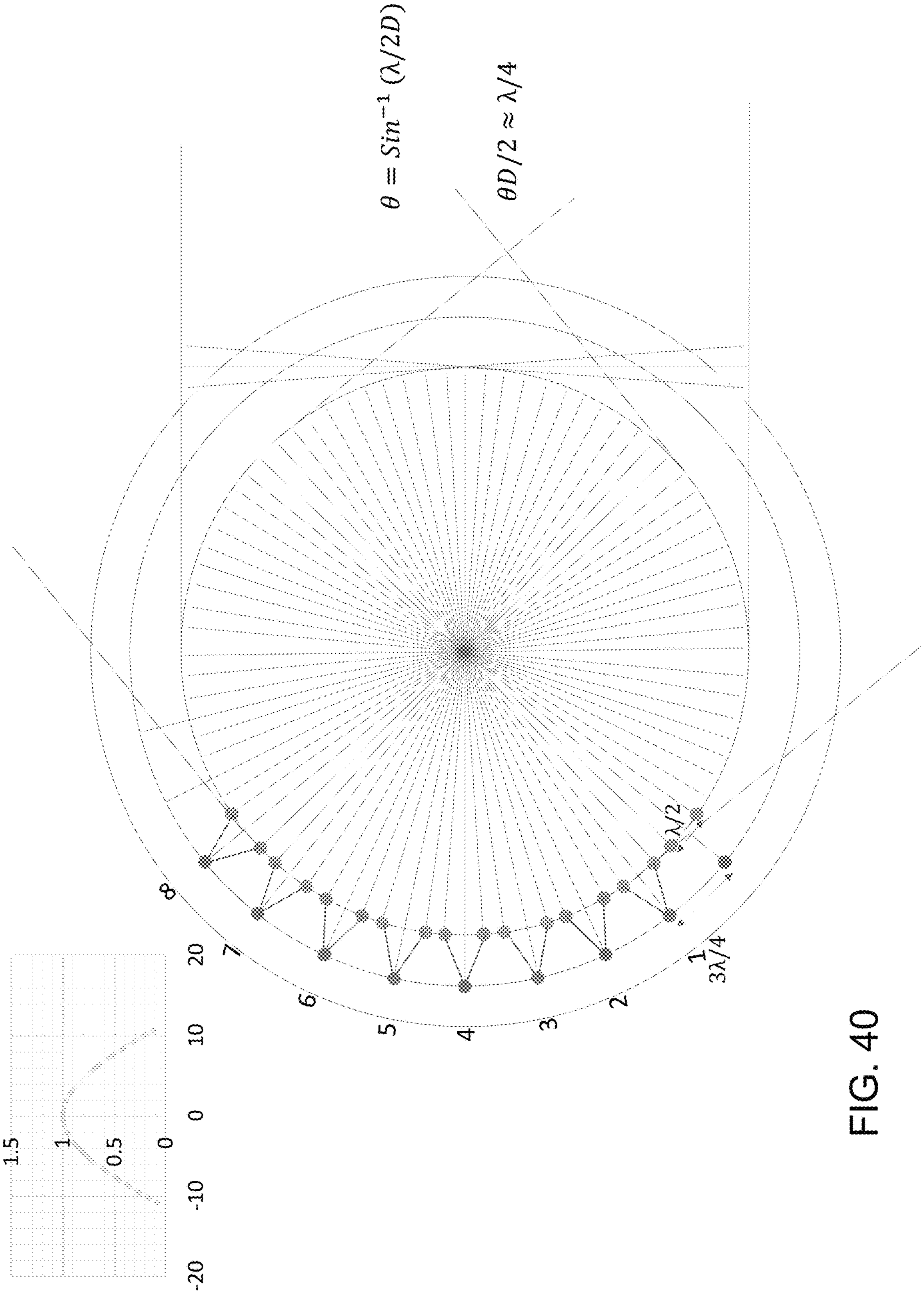
FIG. 40 shows another example of a feed network for beam shaping.

FIG. 40 shows an example of a feed network for beam shaping. In this feed network, multiple beams are split via a feed network into adjacent feeds that are placed at a fractional multiple of the operating wavelength λ. The beam themselves may be separated by fractional multiple of the wavelength. For example, in the depicted embodiment, feeds are separated by λ/2 and the beams are separated by 3λ/4. Compared to the antenna depicted in FIG. 39, the antenna embodiment of FIG. 40 uses a two-tap window, such as the previously described cosine window, such that each beam is split and fed to two antenna elements. As described in the present document and depicted, for example, in FIG. 8, the advantageous placement of multiple antenna elements (taps of a window filter) can be used to perform spatial windowing operation on the beams emanated from the antenna elements to achieve a directionality of transmission (or reception) along the main lobe of the windowed function.

In some embodiments, a lens antenna may be constructed to include multiple layers each having slightly different refractive index from its neighboring layers so that an antenna beam is formed when a radiative element is placed at or near the focal point of the lens antenna. The lens antenna could be one of several types. Some examples include Luneburg antenna, Eaton antenna, Goodman antenna, and so on. Only for the sake of illustration, Luneburg antenna is used as an example. The lens antenna may be fitted with multiple feeds to generate multiple antenna beams, as described herein.

3.1 Examples of Physical Parameters of Antenna Embodiments

In some embodiments, multiple feeds may be positioned such that the resulting beams may emanate spatially adjacent to each other. The signal being fed into each feed may be windowed using signal processing. The choice of window may affect the beamwidth of the main lobe and the attenuation of side lobes, which in turn relates to how much signals from one antenna element will interfere with signals from its neighboring antenna elements.

The separation between adjacent radiative elements may be selected to meet desired spatial separation and performance including values such as λ/2, 3λ/4, and so on. In general, the spacing between feed elements will dictate the interference from harmonics.

In some embodiments, each radiative element may be placed at an offset from the focal point of the lens antenna, thereby spatially offsetting its beam from that of another radiative element.

The radiative elements may be modeled as point sources at aperture. The spacing between the feeds may detect the harmonics that interfere with each other. In some embodiments, the feed elements may be separated by one wavelength (λ) of the operating frequency band.

3.2 Multi-Dimensional Arrangements

In some embodiments, the radiative elements may be arranged in an array structure that is two dimensional—e.g., extends along azimuth and elevation of the lens antenna. The two-dimensional placement of the antenna elements provides an additional degree of freedom in generating windowed beam versions, where beams can be split and fed to antenna elements in a two-dimensional space to achieve a desired 2-dimensional windowing of the beam as it emanates out of the antenna. In some embodiments, the antenna may be shaped as half-cylinder instead of a hemisphere. In the cylindrical embodiment, the beams may be arranged along a first semi-cylinder and the feed elements may be organized along a concentric half-cylinder, with one dimension of placement along the curved surface of the cylinder and the other dimension of placement along the length of the cylinder.

3.3 Multi-Band Operation

In some embodiments, the lens antenna may be designed to operate in multiple frequency bands. Without loss of generality, some example embodiments of a two-band antenna operation are described herein, but it is understood that similar designs can be extended to antennas that are suitable for operation in more than two frequency bands. For example, a single antenna may be designed to operate both in the 3 GHZ and in the 5 GHZ cellular frequency bands. A separate set of feeds may be used for each band of operation, with the separation between feed elements for each frequency band being fractional multiple of the center frequency of operation of the corresponding band. However, because of the frequency separation between the bands and out-of-band attenuation of the beams, the same lens may be used for both bands, thereby allowing savings in the size and weight of the antenna.

In some embodiments, because separation of feed elements depends on the band of operation, the angular beam width may therefore depend on the frequency band of operation. As an example, using the same lens antenna, a beam width of 12 degrees may be achieved or 3 GHz operation, while a beam width of 9 degrees may be achieved for 5 GHz operation.

In some embodiments, these beam widths may be adjusted by placing the feed elements at an off-focal point that is closer or farther from the transmitting side. Appendix A provides some examples of such placement of antenna elements to achieve different beam widths. Therefore, in some embodiments, a same beam width can be achieved regardless of the band of operation.

3.4 Signal Processing to Cancel Effect of Neighboring Beams

In some embodiments, the interference caused by overlapping neighboring lobes can be cancelled by performing signal processing. Because a signal of a given beam may at most experience interference from a neighboring beam, but not from beams that are two or more lobes away, the effect of such interference can be cancelled by inverting a banded diagonal matrix that has non-zero entries along at most 3-diagonals. The matrix can be inverted relatively easily to recover signal for a specific user equipment. In such a formulation, beams and UEs can be written as columns of a matrix and the problem of isolating and separating signal to a specific UE can be posed as a matrix inversion problem. One of skill in the art will appreciate that such signal processing is much simpler than prior art MU-MIMO system calculations. The signal processing arrangement thus may be used to implement window functions as described in the present document, where the signals fed to the various antenna elements are weighted according to the window pattern, thus resulting in a spatial beam of the corresponding window spectral pattern.

3.5 Lens Antenna Embodiments

In some conventional lens antennas, a fiber glass lens may be used for signal transmission/reception. Such lenses tend to be prohibitively heavy and cannot be easily installed in compact installations. For example, fiber glass lenses could weigh as much as 400 lbs, and their deployment poses an operation challenge and relatively capex and opex.

The lens technology described herein can be embodied using layers of foam material that are shaped as concentric shells with increasing radii along a sphere. The foam may be made of an insulation material and the shells may be glued to each other for structural rigidity. For example, the entire lens antenna may include 6 to 12 shell layers that enclose each other. Such material is light in weight (e.g., total weight of 20 to 50 lbs) and can be transported and assembled on-site. In some embodiments, the lens antenna may be a Luneburg type lens antenna.

3.6 Tiling Embodiments

In some embodiments, the shells may themselves be constructed as continuous sheets of material, bent into hemispherical shape. Alternatively, in some embodiments, the hemispherical shape may be achieved by joining together tiles of material into a hemispherical shape. The tiles may be joined, or stitched, to minimize surface discontinuities such that the beams emanating from the radiative elements have a beamwidth smaller than that of individual tiles so that beams are not distorted by the edges between tiles. For example, in some embodiments, square tiles of dimension 22 inches may be used to build a hemispherical lens antenna that can be installed on a neighborhood cellular tower.

3.7 Examples of Mesh Network Embodiments

In a typical mesh network scenario, devices within transmission range can discover each other and then establish communication. Conventional mesh networks can suffer from the shortcoming that nearby devices may interfere with each other's transmission. In some embodiments, the lens antenna technology described herein could be used to establish dense mesh networks. A transmitter may initially start transmission in omni-directional mode. Using the omni-directional transmission and reception, the device may discover nearby devices. Once nearby devices are discovered, signal processing may be performed to form beams for communicating with these devices. Therefore, interference with other devices is minimized using the lens antenna technology.

3.8 Examples of Satellite Communication Embodiments

In some embodiments, a wireless access device may be installed in a neighborhood. The access device may enable connectivity of user devices in the neighborhood to the Internet. For example, the access device may be able to communicate with user devices using the ubiquitously available communication interfaces such as LTE or Wi Fi. At the same time, the access device may also communicate with a satellite for wide area access, thereby allowing user devices to be communicatively connected with wide area of coverage. In some examples, the access device may be operated to communicate with the satellite using the multibeam technology described herein. For example, the lens antenna of the access device may form multiple beams in the directions of the satellite and user devices.

3.9 Examples of Relay Embodiments

In some embodiments, a multi-beam antenna may be used to establish communication with user devices and wide area network. In some embodiments, user devices may use a return path (uplink) via a network that is different from the network over which the downlink signal is received via a relay device that communicates using a multibeam antenna.

3.10 Examples of Automotive Embodiments

The multibeam antenna technology described herein may also be used in implementations of automotive communication. For example, a car may be fitted with a communication device that uses a multibeam lens antenna for communication with other automobiles or other network nodes. In some embodiments, a hemispherical antenna may be fitted on the roof of a car. In some embodiments, the antenna may be cylindrical in shape and this shape may be used to generate a wider beam (main lobe).

In some embodiments, an antenna system includes a lens portion that is hemispherical in shape and comprises multiple hemispherical concentric shells having varying radio frequency refractive indices, and one or more antenna elements arranged in a three-dimensional array, each antenna element communicatively coupled to one or more radio frequency (RF) transmit or receive chain and being able to transmit or receive data from a corresponding transmit or receive chain according to a transmission scheme.

In some embodiments, an antenna system includes multiple data stream inputs, each data stream input carrying source data bits for one or more users, a signal processing stage that processes the multiple data stream inputs to generate multiple beams, where each beam represents a signal carried over one radio frequency beam, a feed network that couples each of the multiple beam to a number of antenna elements, and a lens portion positioned to radiate radio frequency transmissions from the antenna elements in a target direction.

Figure 41:
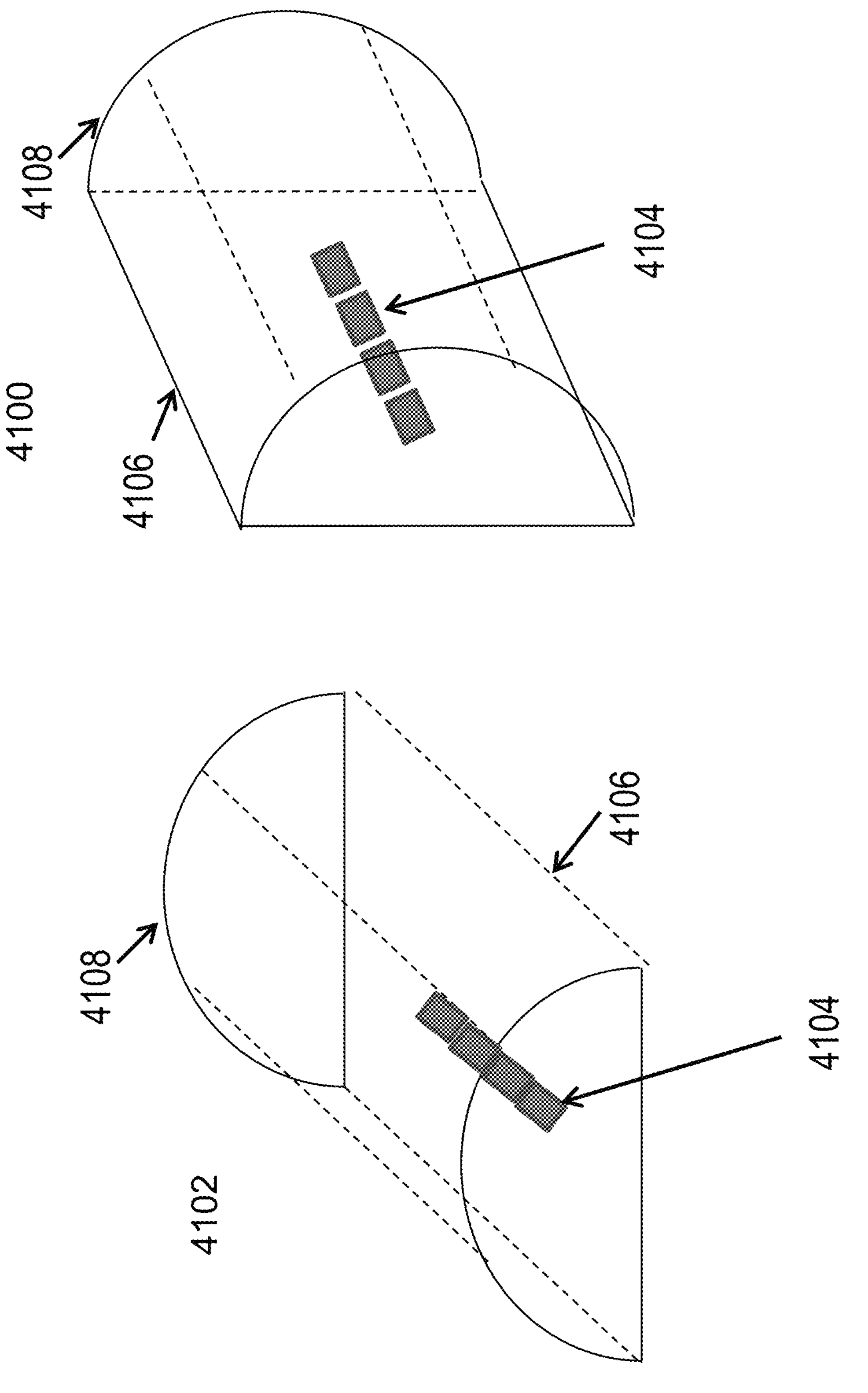
FIG. 41 shows an example of an antenna system having a semi-cylindrical lens.

In some embodiments, e.g., as depicted in FIG. 41, an antenna system 4100 (with its side view 4102) includes a lens portion 4108 that is semi-cylindrical in shape and comprises multiple semi-cylindrical concentric shells having varying radio frequency refractive indices, and one or more antenna elements 4104 arranged in a three dimensional array, each antenna element communicatively coupled to one or more radio frequency transmit and/or receive chain and being able to transmit and/or receive data from a corresponding chain according to a transmission scheme. The antenna elements 4104 may be arranged along a flat surface 4106 of the semi-cylindrical lens portion 4108.

In some embodiments, an antenna system includes a lens portion that is spherical in shape and comprises multiple spherical concentric shells having varying radio frequency refractive indices, and one or more antenna elements positioned at or near a focal point of the lens portion, each antenna element communicatively coupled to one or more radio frequency transmit and/or receive chain and being able to transmit and/or receive data from the beams according to a transmission scheme.

In some embodiments, an antenna system includes a lens portion having a radiation-side curved surface and a feed reception surface, the lens portion structured to focus radio frequency radiations entering from the radiation-side curved surface on a focal point located at the feed reception surface, and one or more antenna elements positioned at or near the focal point, the one or more antenna elements being separated from each other by a fractional multiple of a center wavelength of a frequency band of operation, and each antenna element communicatively coupled to one or more radio frequency transmit and/or receive chain and being able to transmit and/or receive data from the radio frequency transmit chain according to a transmission scheme.

In some embodiments, an antenna system includes a lens portion that is semi-cylindrical in shape, and one or more antenna elements arranged in a three dimensional array on a surface of the lens, each antenna element communicatively coupled to one or more radio frequency transmit and/or receive chain and being able to transmit and/or receive data from a corresponding chain according to a transmission scheme.

Figure 42:
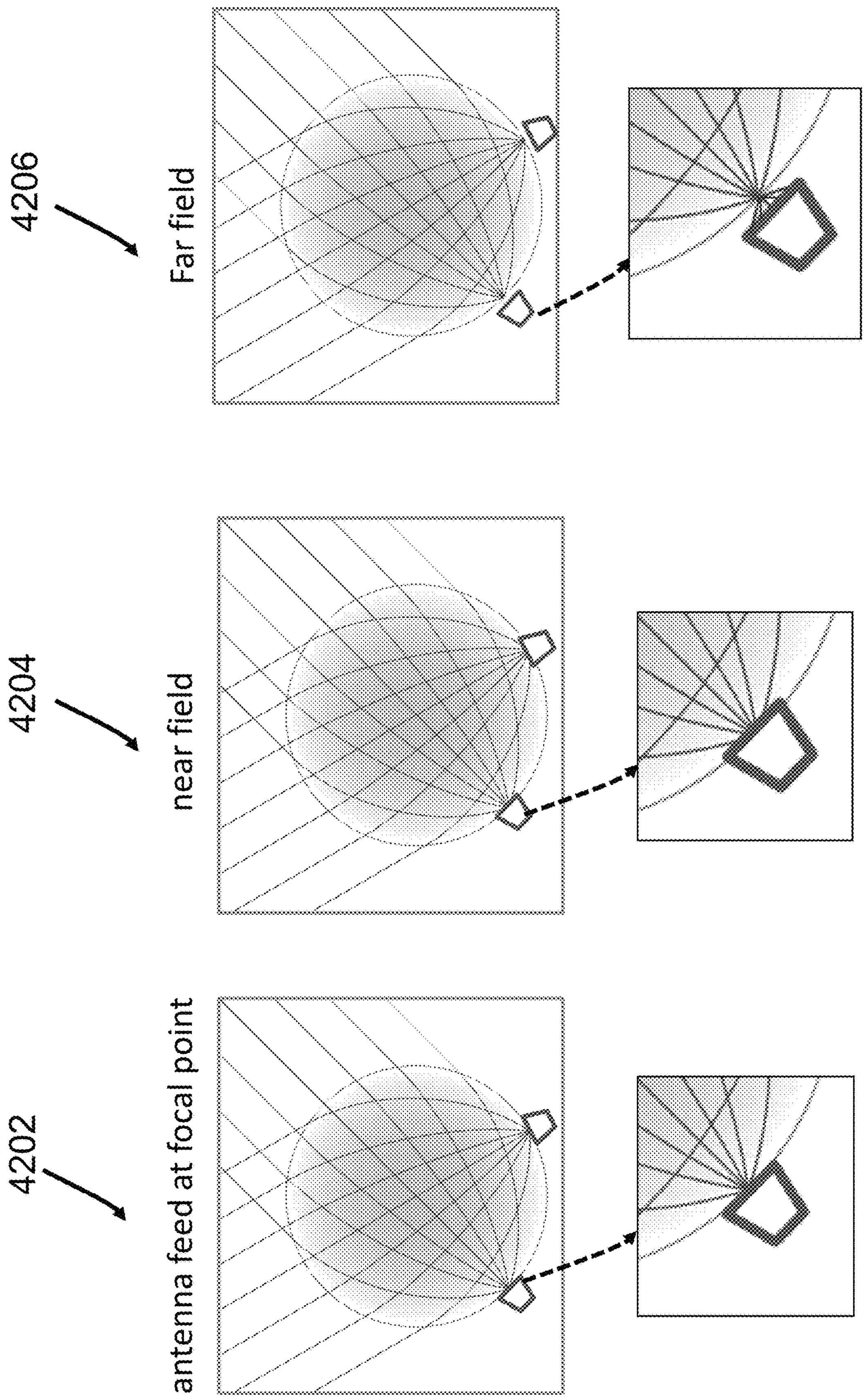
FIG. 42 shows examples of focal and off-focal placement of antennas in an antenna system.

The various antenna system embodiments described herein and their various features can be seen in the illustrations in FIG. 8, and FIG. 38 to FIG. 42 and the associated description, In particular, FIG. 42 shows some embodiments that show the three-dimensional placement of antenna elements where two-dimensional arrays are placed at a location at the focal point (4202) closer than the focal point (4204, closer to the radiation-side curved surface of the lens) and/or farther than the focal point (4206, away from the radiative surface) and/or in the focal plane. While spherical lenses are depicted in the illustration of FIG. 42, similar placement of arrays of radiative antenna elements can be used with hemispherical and semi-cylindrical lenses. In arrangement 4206, the antenna feed is off-focal point in a direction away from the lens. As a result, received signals may first converge at a focal point and then begin to diverge beyond the focal point prior to impinging on the surface of the antenna feed. Similar to the arrangement 4204, when multiple antenna feed elements are located on the surface of the antenna feed, in the arrangement 4206, the multiple antenna feed elements may receive/transmit signals similar to each other in strength.

With respect to the above-described antenna systems, in some embodiments, the antenna elements may be configured to transmit and receive using time division multiplexing. In such a mode of operation, the antenna beam patterns may be adjusted by using different windowing weights on a time slot by time slot basis, which may thus act as receiving antenna in one time slot and a transmitting antenna in another time slot. In a frequency division multiplexing mode of operation, the antenna elements may be simultaneously acting in two different frequency bands-in one band, for receiving signals, and in another band for transmitting signals. In such a mode of operation, the windowing functions and gains may be adjusted to match the corresponding target transmission or reception signal to noise ratios. This may be achieved, for example, by adjusting the signal processing gains in the stream processing stage, as depicted in FIG. 8. For example, using the cascaded three-step arrangement in FIG. 8, a windowing function that may include a multiplicative effect of up to three cascaded windows may be achieved. For example, feeds 806 (number and power) may be controlled to feed the multibeam antenna 812, to achieve beam-selective signal power radiation. In turn, each feed element may be generated from the feed network 810 based on the corresponding signal inputs that map to beams 804. The signal processing stage 808 may perform additional windowing of signals by linearly weighting the streams 302 that represent data transmissions to/from groups of far-end devices (e.g., user equipment) to which data is being transmitted, or from which data is being received.

4. Multiple Access and Precoding in OTFS

Figure 43:
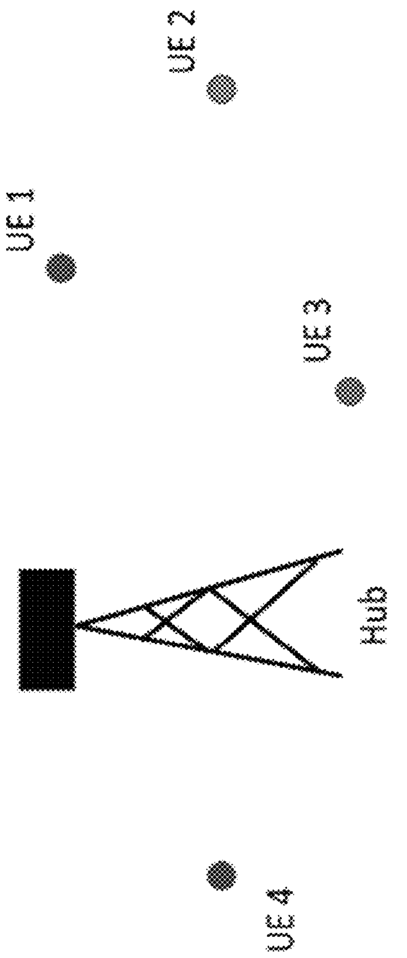
FIG. 43 depicts an example network configuration in which a hub services for user equipment (UE).

This section covers multiple access and precoding protocols that are used in typical OTFS systems. FIG. 43 depicts a typical example scenario in wireless communication is a hub transmitting data over a fixed time and bandwidth to several user devices (UEs). For example: a tower transmitting data to several cell phones, or a Wi-Fi router transmitting data to several devices. Such scenarios are called multiple access scenarios.

Orthogonal Multiple Access

Figure 44:
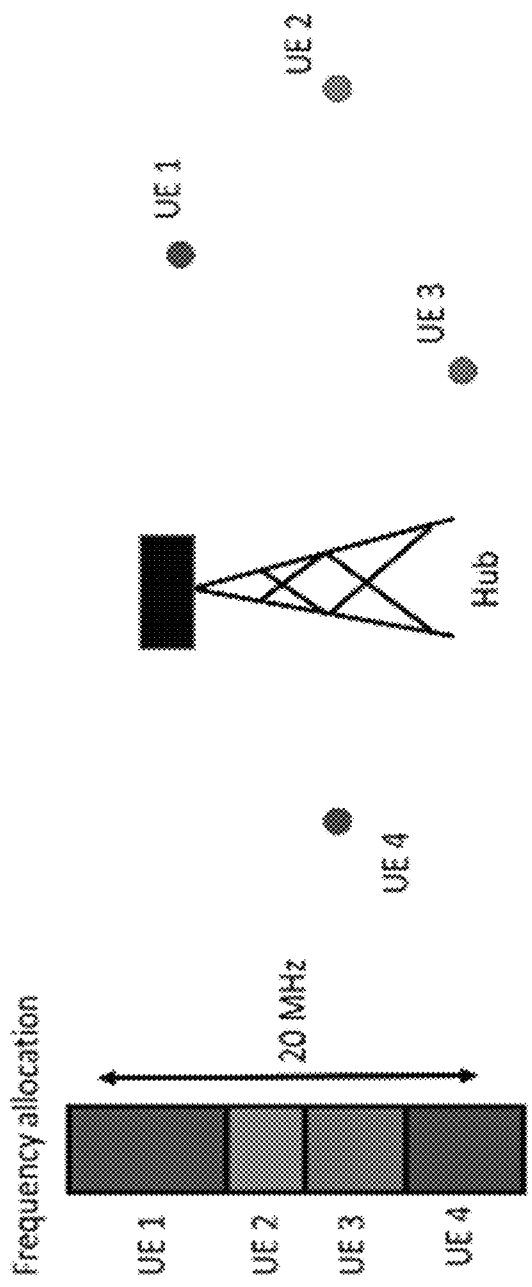
FIG. 44 depicts an example embodiment in which an orthogonal frequency division multiplexing access (OFDMA) scheme is used for communication.

Currently the common technique used for multiple access is orthogonal multiple access. This means that the hub breaks it's time and frequency resources into disjoint pieces and assigns them to the UEs. An example is shown in FIG. 44, where four UEs (UE1, UE2, UE3 and UE4) get four different frequency allocations and therefore signals are orthogonal to each other.

The advantage of orthogonal multiple access is that each UE experience its own private channel with no interference. The disadvantage is that each UE is only assigned a fraction of the available resource and so typically has a low data rate compared to non-orthogonal cases.

Precoding Multiple Access

Figure 45:
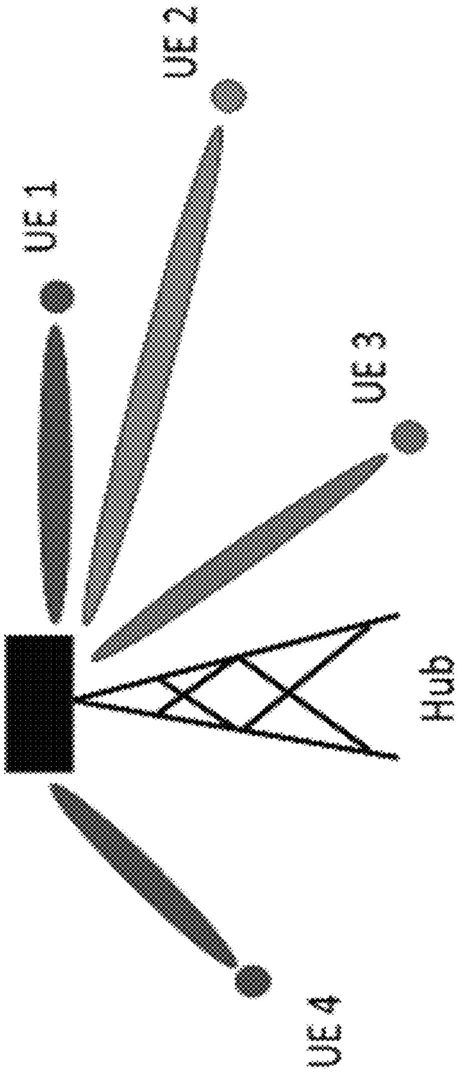
FIG. 45 illustrates the concept of precoding in an example network configuration.

Recently, a more advanced technique, precoding, has been proposed for multiple access. In precoding, the hub is equipped with multiple antennas. The hub uses the multiple antennas to create separate beams which it then uses to transmit data over the entire bandwidth to the UEs. An example is depicted in FIG. 45, which shows that the hub is able to form individual beams of directed RF energy to UEs based on their positions.

The advantage of precoding it that each UE receives data over the entire bandwidth, thus giving high data rates. The disadvantage of precoding is the complexity of implementation. Also, due to power constraints and noisy channel estimates the hub cannot create perfectly disjoint beams, so the UEs will experience some level of residual interference.

Introduction to Precoding

Precoding may be implemented in four steps: channel acquisition, channel extrapolation, filter construction, filter application.

Channel acquisition: To perform precoding, the hub determines how wireless signals are distorted as they travel from the hub to the UEs. The distortion can be represented mathematically as a matrix: taking as input the signal transmitted from the hubs antennas and giving as output the signal received by the UEs, this matrix is called the wireless channel.

Channel prediction: In practice, the hub first acquires the channel at fixed times denoted by $s_1, s_2, \ldots, s_n$. Based on these values, the hub then predicts what the channel will be at some future times when the pre-coded data will be transmitted, we denote these times denoted by $t_1, t_2, \ldots, t_m$.

Filter construction: The hub uses the channel predicted at $t_1, t_2, \ldots, t_m$ to construct precoding filters which minimize the energy of interference and noise the UEs receive.

Filter application: The hub applies the precoding filters to the data it wants the UEs to receive.

Channel Acquisition

This section gives a brief overview of the precise mathematical model and notation used to describe the channel.

Time and frequency bins: the hub transmits data to the UEs on a fixed allocation of time and frequency. This document denotes the number of frequency bins in the allocation by $N_f$ and the number of time bins in the allocation by $N_t$.

Number of antennas: the number of antennas at the hub is denoted by $L_h$, the total number of UE antennas is denoted by $L_u$.

Transmit signal: for each time and frequency bin the hub transmits a signal which we denote by $\varphi(f, t) \in \mathbb{C}^{L_h}$ for $f=1, \ldots, N_f$ and $t=1, \ldots, N_t$.

Receive signal: for each time and frequency bin the UEs receive a signal which we denote by $y(f, t) \in \mathbb{C}^{L_u}$ for $f=1, \ldots, N_f$ and $t=1, \ldots, N_t$.

White noise: for each time and frequency bin white noise is modeled as a vector of iid Gaussian random variables with mean zero and variance $N_0$. This document denotes the noise by $w(f, t) \in \mathbb{C}^{L_u}$ for $f=1, \ldots, N_f$ and $t=1, \ldots, N_t$.

Channel matrix: for each time and frequency bin the wireless channel is represented as a matrix and is denoted by $H(f, t) \in \mathbb{C}^{L_u \times L_h}$ for $f=1, \ldots, N_f$ and $t=1, \ldots, N_t$.

Figure 46:
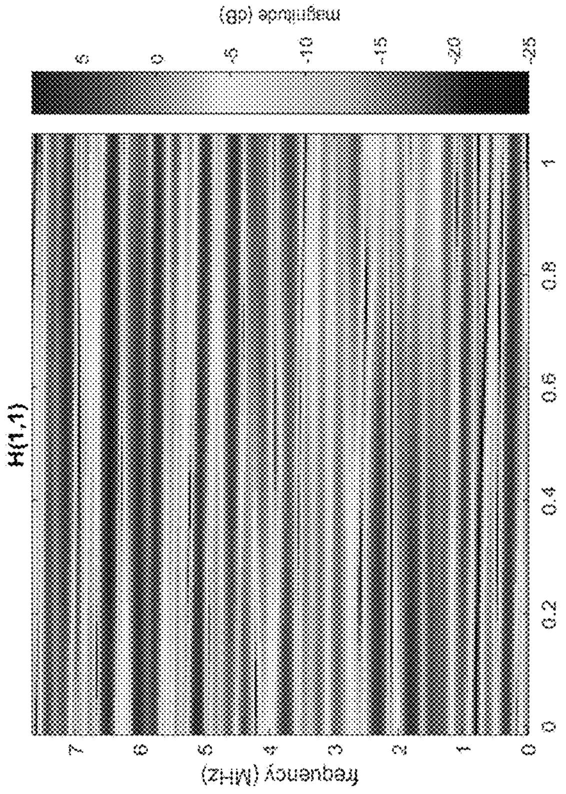
FIG. 46 is a spectral chart of an example of a wireless communication channel.

The wireless channel can be represented as a matrix which relates the transmit and receive signals through a simple linear equation:

$$y(f, t) = H(f, t)\varphi(f, t) + w(f, t) \tag{1}$$

for $f=1, \ldots, N_f$ and $t=1, \ldots, N_t$. FIG. 46 shows an example spectrogram of a wireless channel between a single hub antenna and a single UE antenna. The graph is plotted with time as the horizontal axis and frequency along the vertical axis. The regions are shaded to indicate where the channel is strong or weak, as denoted by the dB magnitude scale shown in FIG. 46.

Two common ways are typically used to acquire knowledge of the channel at the hub: explicit feedback and implicit feedback.

Explicit Feedback

In explicit feedback, the UEs measure the channel and then transmit the measured channel back to the hub in a packet of data. The explicit feedback may be done in three steps.

Pilot transmission: for each time and frequency bin the hub transmits a pilot signal denoted by $p(f, t) \in \mathbb{C}^{L_h}$ for $f=1, \ldots, N_f$ and $t=1, \ldots, N_t$. Unlike data, the pilot signal is known at both the hub and the UEs.

Channel acquisition: for each time and frequency bin the UEs receive the pilot signal distorted by the channel and white noise:

$$H(f, t)p(f, t) + w(f, t), \tag{2}$$

for $f=1, \ldots, N_f$ and $t=1, \ldots, N_t$. Because the pilot signal is known by the UEs, they can use signal processing to compute an estimate of the channel, denoted by $\hat{H}(f, t)$.

Feedback: the UEs quantize the channel estimates $\hat{H}(f, t)$ into a packet of data. The packet is then transmitted to the hub.

The advantage of explicit feedback is that it is relatively easy to implement. The disadvantage is the large overhead of transmitting the channel estimates from the UEs to the hub.

Implicit Feedback

Figure 47:
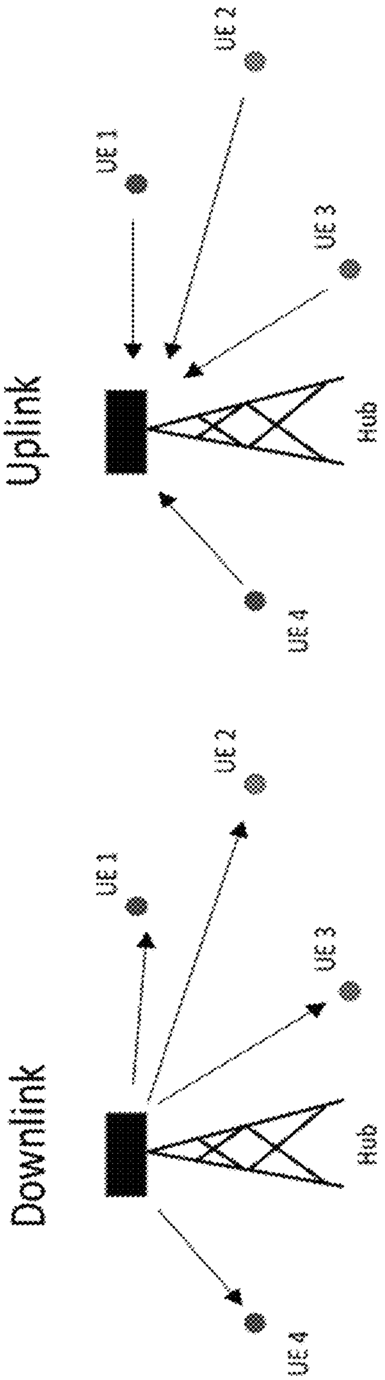
FIG. 47 illustrates examples of downlink and uplink transmission directions.

Implicit feedback is based on the principle of reciprocity which relates the uplink channel (UEs transmitting to the hub) to the downlink channel (hub transmitting to the UEs). FIG. 47 shows an example configuration of uplink and downlink channels between a hub and multiple UEs.

Specifically, denote the uplink and downlink channels by $H_{up}$ and $H$ respectively, then:

$$H(f, t) = AH_{up}^T(f, t)B, \tag{3}$$

for $f=1, \ldots, N_f$ and $t=1, \ldots, N_t$. Where $H_{up}^T(f, t)$ denotes the matrix transpose of the uplink channel. The matrices $A \in \mathbb{C}^{L_u \times L_u}$ and $B \in \mathbb{C}^{L_h \times L_h}$ represent hardware non-idealities. By performing a procedure called reciprocity calibration, the effect of the hardware non-idealities can be removed, thus giving a simple relationship between the uplink and downlink channels:

$$H(f, t) = H_{up}^T(f, t) \tag{4}$$

The principle of reciprocity can be used to acquire channel knowledge at the hub. The procedure is called implicit feedback and consists of three steps.

Reciprocity calibration: the hub and UEs calibrate their hardware so that equation (4) holds.

Pilot transmission: for each time and frequency bin the UEs transmits a pilot signal denoted by $p(f, t) \in \mathbb{C}^{L_u}$ for $f=1, \ldots, N_f$ and $t=1, \ldots, N_t$. Unlike data, the pilot signal is known at both the hub and the UEs.

Channel acquisition: for each time and frequency bin the hub receives the pilot signal distorted by the uplink channel and white noise:

$$H_{up}(f, t)p(f, t) + w(f, t) \tag{5}$$

for $f=1, \ldots, N_f$ and $t=1, \ldots, N_t$. Because the pilot signal is known by the hub, it can use signal processing to compute an estimate of the uplink channel, denoted by $\widehat{H_{up}}(f, t)$. Because reciprocity calibration has been performed the hub can take the transpose to get an estimate of the downlink channel, denoted by $\hat{H}(f, t)$.

The advantage of implicit feedback is that it allows the hub to acquire channel knowledge with very little overhead; the disadvantage is that reciprocity calibration is difficult to implement.

Channel Prediction

Figure 48:
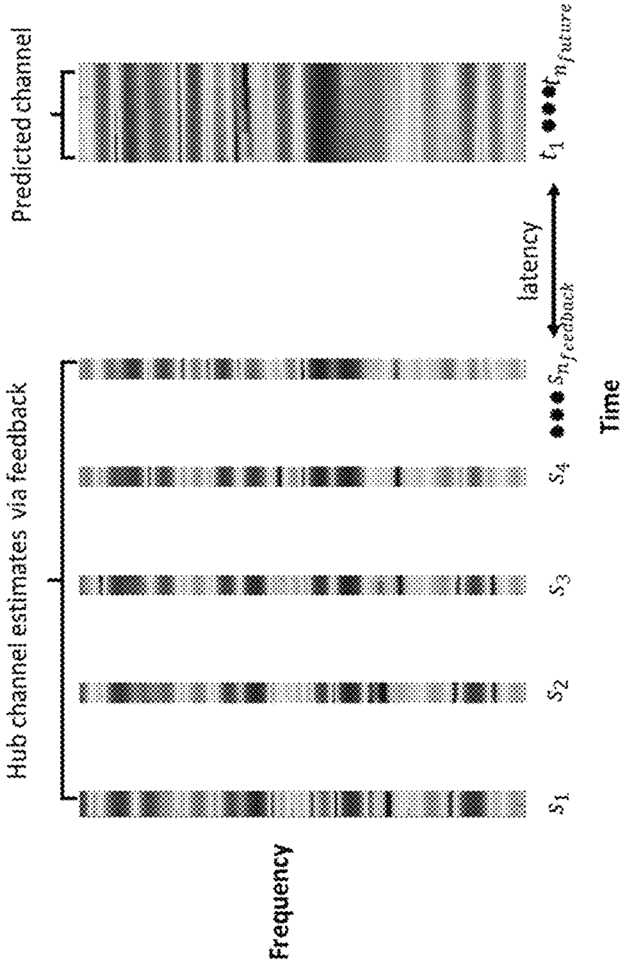
FIG. 48 illustrates spectral effects of an example of a channel prediction operation.

Using either explicit or implicit feedback, the hub acquires estimates of the downlink wireless channel at certain times denoted by $s_1, s_2, \ldots, s_n$ using these estimates it must then predict what the channel will be at future times when the precoding will be performed, denoted by $t_1, t_2, \ldots, t_m$. FIG. 48 shows this setup in which "snapshots" of channel are estimated, and based on the estimated snapshots, a prediction is made regarding the channel at a time in the future. As depicted in FIG. 48, channel estimates may be available across the frequency band at a fixed time slots, and based on these estimates, a predicated channel is calculated.

There are tradeoffs when choosing the feedback times $s_1, s_2, \ldots, s_n$.

Latency of extrapolation: Refers to the temporal distance between the last feedback time, $s_n$, and the first prediction time, $t_1$, determines how far into the future the hub needs to predict the channel. If the latency of extrapolation is large, then the hub has a good lead time to compute the pre-coding filters before it needs to apply them. On the other hand, larger latencies give a more difficult prediction problem.

Density: how frequent the hub receives channel measurements via feedback determines the feedback density. Greater density leads to more accurate prediction at the cost of greater overhead.

There are many channel prediction algorithms in the literature. They differ by what assumptions they make on the mathematical structure of the channel. The stronger the assumption, the greater the ability to extrapolate into the future if the assumption is true. However, if the assumption is false then the extrapolation will fail. For example:

Polynomial extrapolation: assumes the channel is smooth function. If true, can extrapolate the channel a very short time into the future ≈0.5 ms.

Bandlimited extrapolation: assumes the channel is a bandlimited function. If true, can extrapolated a short time into the future ≈1 ms.

MUSIC extrapolation: assumes the channel is a finite sum of waves. If true, can extrapolate a long time into the future ≈10 ms.

Precoding Filter Computation and Application

Using extrapolation, the hub computes an estimate of the downlink channel matrix for the times the pre-coded data will be transmitted. The estimates are then used to construct precoding filters. Precoding is performed by applying the filters on the data the hub wants the UEs to receive. Before going over details we introduce notation.

Channel estimate: for each time and frequency bin the hub has an estimate of the downlink channel which we denote by $\hat{H}(f, t) \in \mathbb{C}^{L_u \times L_h}$ for $f=1, \ldots, N_f$ and $t=1, \ldots, N_t$.

Precoding filter: for each time and frequency bin the hub uses the channel estimate to construct a precoding filter which we denote by $W(f, t) \in \mathbb{C}^{L_h \times L_u}$ for $f=1, \ldots, N_f$ and $t=1, \ldots, N_t$.

Data: for each time and frequency bin the UE wants to transmit a vector of data to the UEs which we denote by $x(f, t) \in \mathbb{C}^{L_u}$ for $f=1, \ldots, N_f$ and $t=1, \ldots, N_t$.

Hub Energy Constraint

When the precoder filter is applied to data, the hub power constraint is an important consideration. We assume that the total hub transmit energy cannot exceed $N_f N_t L_h$. Consider the pre-coded data:

$$W(f, t)x(f, t), \tag{6}$$

for $f=1, \ldots, N_f$ and $t=1, \ldots, N_t$. To ensure that the pre-coded data meets the hub energy constraints the hub applies normalization, transmitting:

$$\lambda W(f, t)x(f, t), \tag{7}$$

for $f=1, \ldots, N_f$ and $t=1, \ldots, N_t$. Where the normalization constant $\lambda$ is given by:

$$\lambda = \sqrt{\frac{N_f N_t L_h}{\sum_{f,t} \|W(f, t)x(f, t)\|^2}} \tag{8}$$

Receiver SNR

The pre-coded data then passes through the downlink channel, the UEs receive the following signal:

$$\lambda H(f, t)W(f, t)x(f, t) + w(f, t), \tag{9}$$

for $f=1, \ldots, N_f$ and $t=1, \ldots, N_t$. The UE then removes the normalization constant, giving a soft estimate of the data:

$$x_{soft}(f, t) = H(f, t)W(f, t)x(f, t) + \frac{1}{\lambda} w(f, t), \tag{10}$$

for $f=1, \ldots, N_f$ and $t=1, \ldots, N_t$. The error of the estimate is given by:

$$x_{soft}(f, t) - x(f, t) = H(f, t)W(f, t)x(f, t) - x(f, t) + \frac{1}{\lambda} w(f, t), \tag{11}$$

The error of the estimate can be split into two terms. The term $H(f, t)W(f, t) - x(f, t)$ is the interference experienced by the UEs while the term $1/\lambda w(f, t)$ gives the noise experienced by the UEs.

When choosing a pre-coding filter there is a tradeoff between interference and noise. We now review the two most popular pre-coder filters: zero-forcing and regularized zero-forcing.

Zero Forcing Precoder

Figure 49:
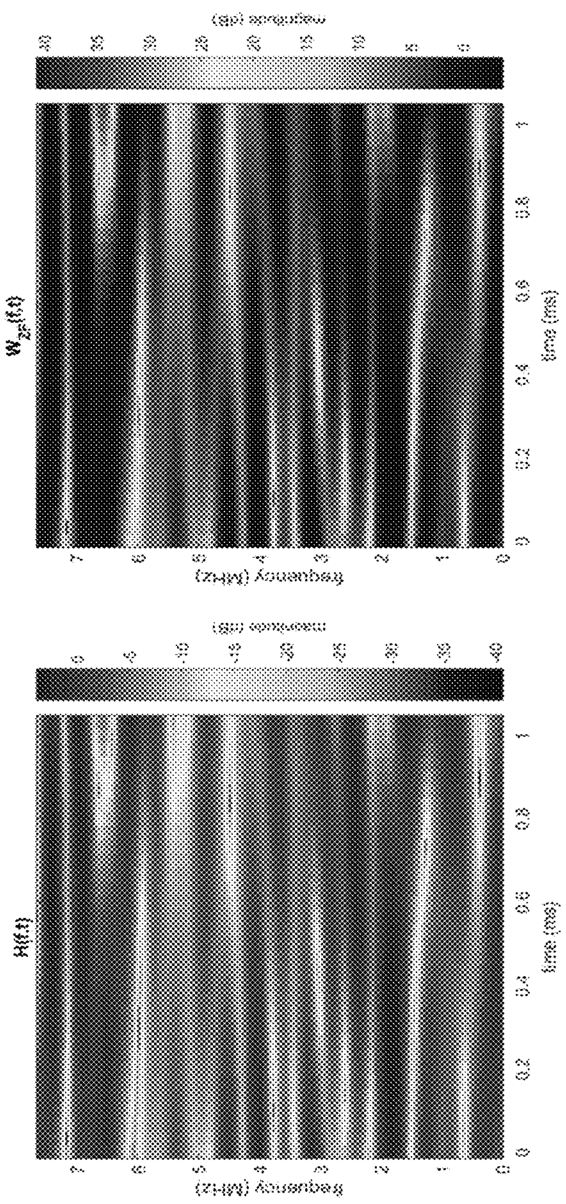
FIG. 49 graphically illustrates operation of an example implementation of a zero-forcing precoder (ZFP).

The hub constructs the zero forcing pre-coder (ZFP) by inverting its channel estimate:

$$W_{ZF}(f,t) = (\hat{H}*(f,t)\hat{H}(f,t))^{-1}\hat{H}*(f,t), \tag{12}$$

for f=1, . . . , $N_f$ and t=1, . . . , $N_t$. The advantage of ZPP is that the UEs experience little interference (if the channel estimate is perfect then the UEs experience no interference). The disadvantage of ZFP is that the UEs can experience a large amount of noise. This is because at time and frequency bins where the channel estimate $\hat{H}(f, t)$ is very small the filter $W_{ZF}(f, t)$ will be very large, thus causing the normalization constant $\lambda$ to be very small giving large noise energy. FIG. 49 demonstrates this phenomenon for a SISO channel.

Regularized Zero-Forcing Pre-Coder (rZFP)

Figure 50:
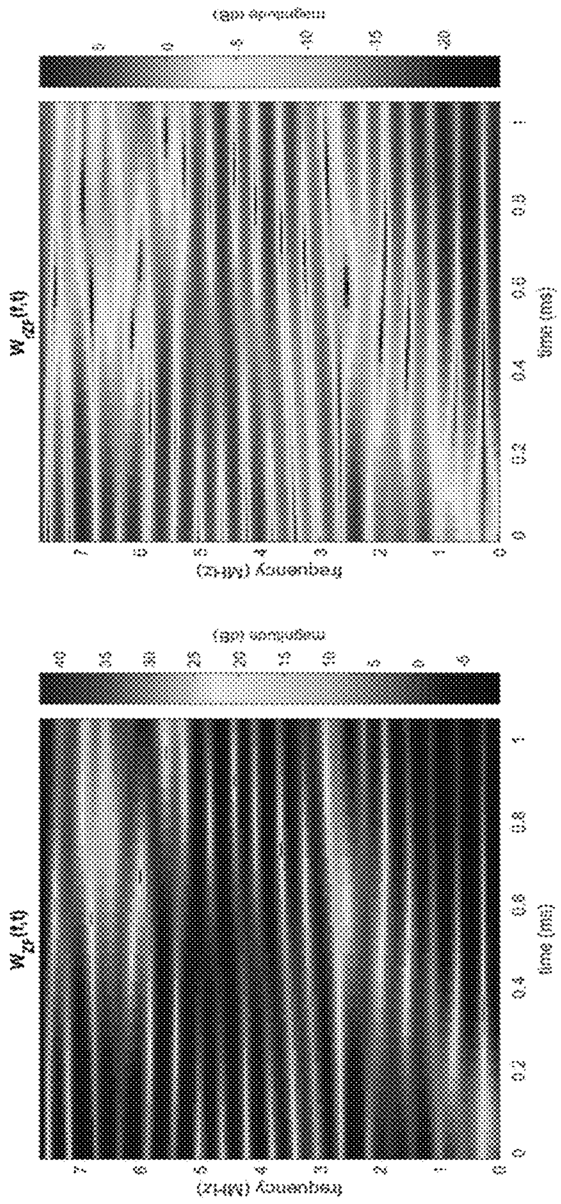
FIG. 50 graphically compares two implementations-a ZFP implementation and regularized ZFP implementation (rZFP).

To mitigates the effect of channel nulls (locations where the channel has very small energy) the regularized zero forcing precoder (rZFP) is constructed be taking a regularized inverse of its channel estimate:

$$W_{rZF}(f,t) = \left(\hat{H}^*(f,t)\hat{H}(f,t) + \alpha I\right)^{-1}\hat{H}^*(f,t), \tag{13}$$

for f=1, . . . , $N_f$ and t=1, . . . , $N_t$. Where $\alpha>0$ is the normalization constant. The advantage of rZFP is that the noise energy is smaller compared to ZPF. This is because rZFP deploys less energy in channel nulls, thus the normalization constant $\lambda$ is larger giving smaller noise energy. The disadvantage of rZFP is larger interference compared to ZFP. This is because the channel is not perfectly inverted (due to the normalization constant), so the UEs will experience residual interference. FIG. 50 demonstrates this phenomenon for a SISO channel.

Figure 51:
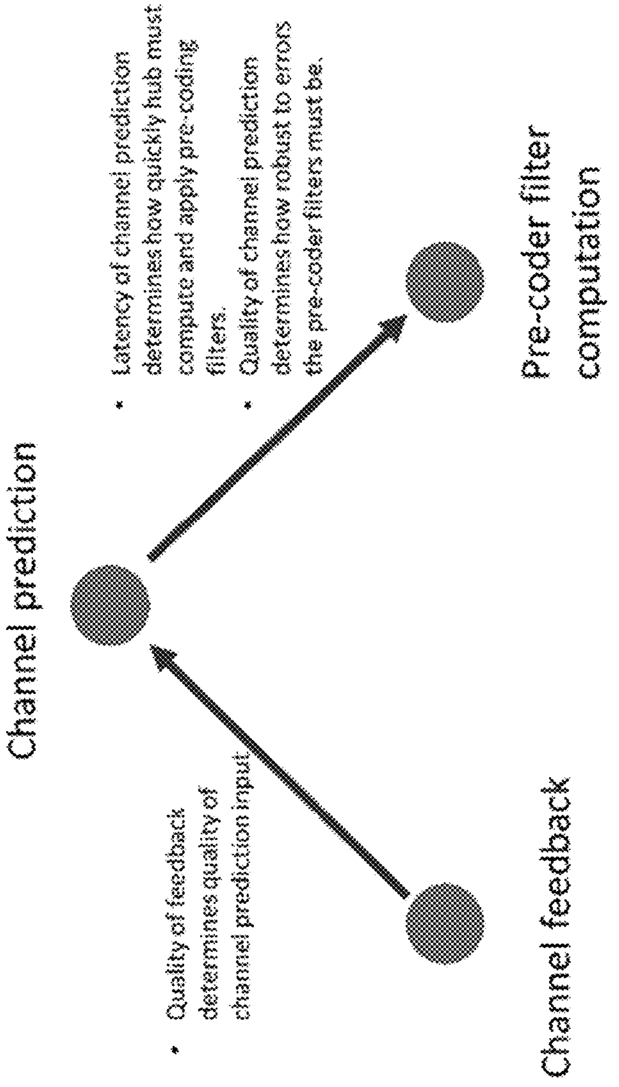
FIG. 51 shows components of an example embodiment of a precoding system.

As described above, there are three components to a precoding system: a channel feedback component, a channel prediction component, and a pre-coding filter component. The relationship between the three components is displayed in FIG. 51.

OTFS Precoding System

Various techniques for implementing OTFS precoding system are discussed. Some disclosed techniques can be used to provide the ability to shape the energy distribution of the transmission signal. For example, energy distribution may be such that the energy of the signal will be high in regions of time frequency and space where the channel information and the channel strength are strong. Conversely, the energy of the signal will be low in regions of time frequency and space where the channel information or the channel strength are weak.

Figure 52:
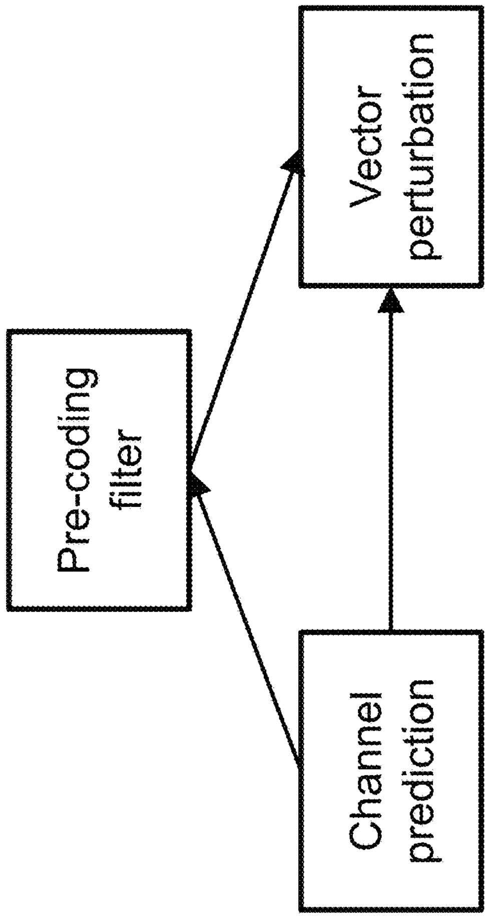
FIG. 52 is a block diagram depiction of an example of a precoding system.

Some embodiments may be described with reference to three main blocks, as depicted in FIG. 52.

Channel prediction: During channel prediction, second order statistics are used to build a prediction filter along with the covariance of the prediction error.

Optimal precoding filter: using knowledge of the predicted channel and the covariance of the prediction error: the hub computes the optimal precoding filter. The filter shapes the spatial energy distribution of the transmission signal.

Vector perturbation: using knowledge of the predicted channel, precoding filter, and prediction error, the hub perturbs the transmission signal. By doing this the hub shapes the time, frequency, and spatial energy distribution of the transmission signal.

Review of OTFS Modulation

A modulation is a method to transmit a collection of finite symbols (which encode data) over a fixed allocation of time and frequency. A popular method used today is Orthogonal Frequency Division Multiplexing (OFDM) which transmits each finite symbol over a narrow region of time and frequency (e.g., using subcarriers and timeslots). In contrast, Orthogonal Time Frequency Space (OTFS) transmits each finite symbol over the entire allocation of time and frequency. Before going into details, we introduce terminology and notation.

We call the allocation of time and frequency a frame. We denote the number of subcarriers in the frame by $N_f$. We denote the subcarrier spacing by df. We denote the number of OFDM symbols in the frame by $N_t$. We denote the OFDM symbol duration by dt. We call a collection of possible finite symbols an alphabet, denoted by A.

A signal transmitted over the frame, denoted by $\varphi$, can be specified by the values it takes for each time and frequency bin:

$$\varphi(f,t) \in \mathbb{C}, \tag{14}$$

for f=1, . . . , $N_f$ and t=1, . . . , $N_t$.

Figure 53:
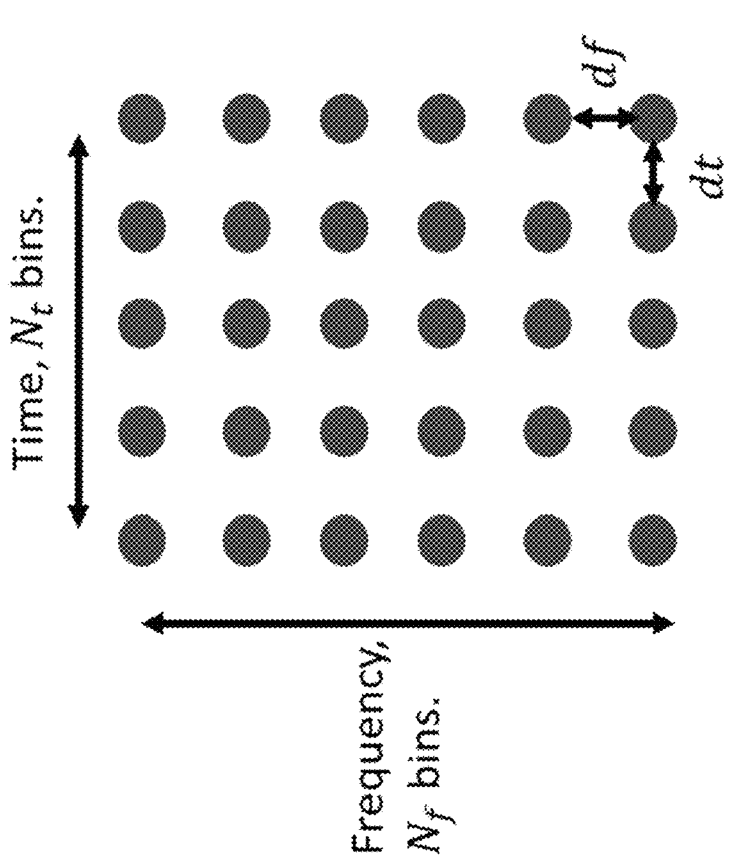
FIG. 53 shows an example of a quadrature amplitude modulation (QAM) constellation.
Figure 54:
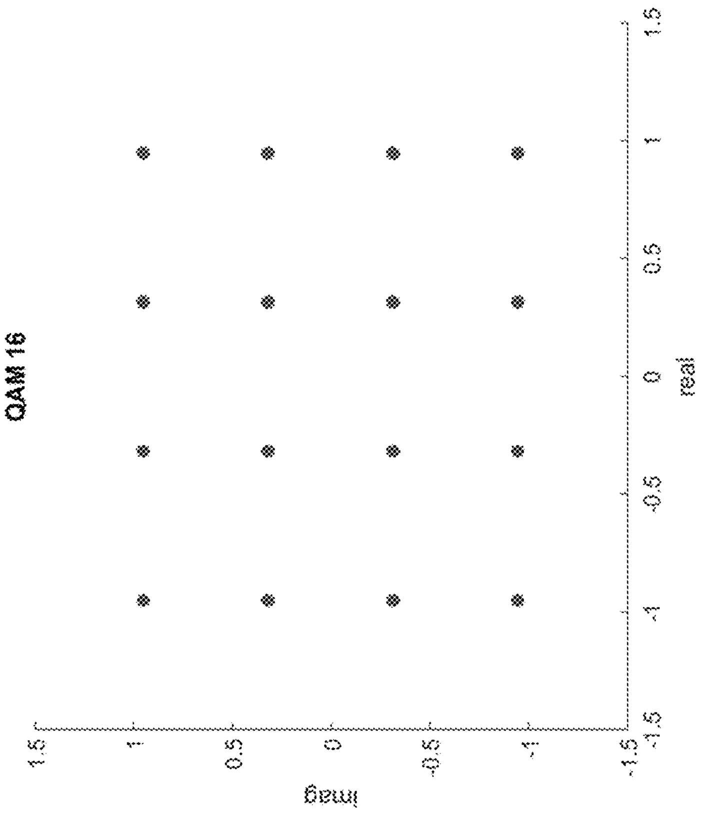
FIG. 54 shows another example of QAM constellation.

FIG. 53 shows an example of a frame along time (horizontal) axis and frequency (vertical) axis. FIG. 54 shows an example of the most commonly used alphabet: Quadrature Amplitude Modulation (QAM).

OTFS Modulation

Suppose a transmitter has a collection of $N_fN_t$ QAM symbols that the transmitter wants to transmit over a frame, denoted by:

$$x(f,t) \in A, \tag{15}$$

for f=1, . . . , $N_f$ and t=1, . . . , $N_t$. OFDM works by transmitting each QAM symbol over a single time frequency bin:

$$\varphi(f,t) = x(f,t) \tag{16a}$$

for f=1, . . . , $N_f$ and t=1, . . . , $N_t$. The advantage of OFDM is its inherent parallelism, this makes many computational aspects of communication very easy to implement. The disadvantage of OFDM is fading, that is, the wireless channel can be very poor for certain time frequency bins. Performing pre-coding for these bins is very difficult.

The OTFS modulation is defined using the delay Doppler domain, which is relating to the standard time frequency domain by the two-dimensional Fourier transform.

The delay dimension is dual to the frequency dimension. There are $N_\tau$ delay bins with $N_\tau=N_f$. The Doppler dimension is dual to the time dimension. There are $N_\nu$ Doppler bins with $N_\nu=N_t$.

A signal in the delay Doppler domain, denoted by $\Phi$, is defined by the values it takes for each delay and Doppler bin:

$$\varphi(\tau,\nu) \in \mathbb{C}, \tag{16b}$$

for $\tau$=1, . . . , $N_\tau$ and $\nu$=1, . . . , $N_\nu$.

Given a signal Φ in the delay Doppler domain, some transmitter embodiments may apply the two-dimensional Fourier transform to define a signal φ in the time frequency domain:

$$\varphi(f,t)=(F\phi)(f,t), \tag{17}$$

for f=1, . . . , $N_f$ and t=1, . . . , $N_t$. Where F denotes the two-dimensional Fourier transform.

Conversely, given a signal o in the time frequency domain, transmitter embodiments could apply the inverse two-dimensional Fourier transform to define a signal Φ in the delay Doppler domain:

$$\phi(\tau,\nu)=\left(F^{-1}\varphi\right)(\tau,\nu), \tag{18}$$

for τ=1, . . . , $N_\tau$ and ν=1, . . . , $N_\nu$.

Figure 55:
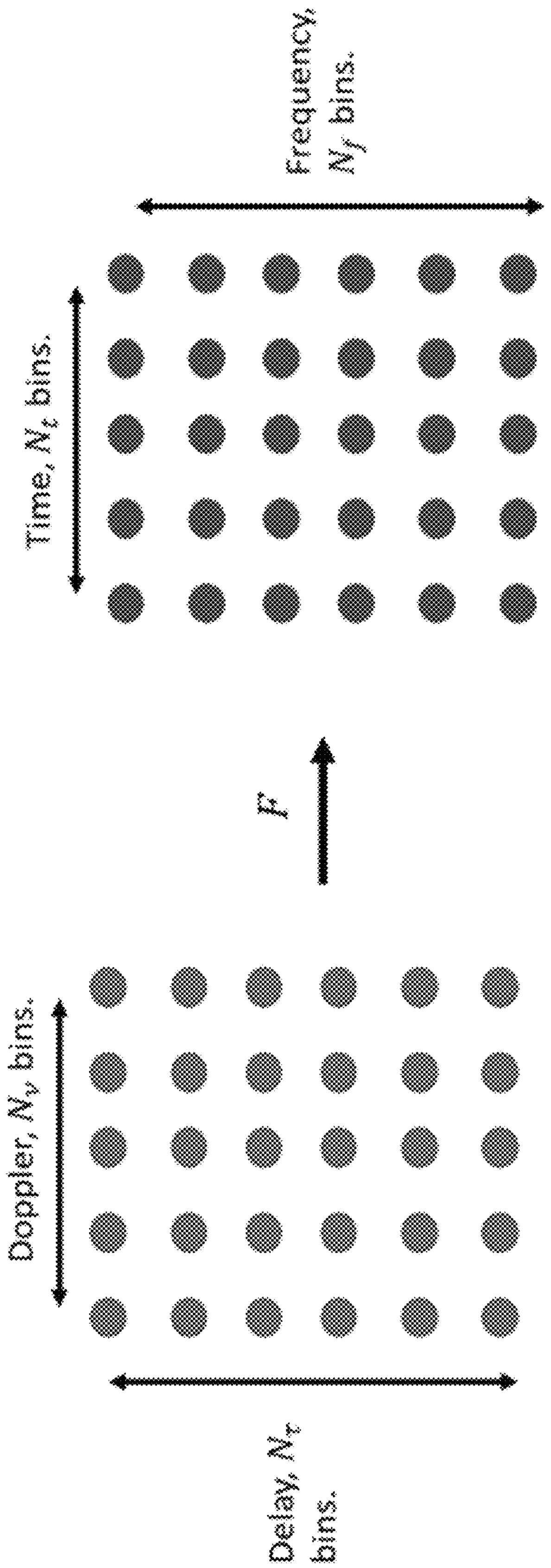
FIG. 55 pictorially depicts an example of relationship between delay-Doppler domain and time-frequency domain.

FIG. 55 depicts an example of the relationship between the delay Doppler and time frequency domains.

The advantage of OTFS is that each QAM symbol is spread evenly over the entire time frequency domain (by the two-two-dimensional Fourier transform), therefore each QAM symbol experience all the good and bad regions of the channel thus eliminating fading. The disadvantage of OTFS is that the QAM spreading adds computational complexity.

MMSE Channel Prediction

Figure 56:
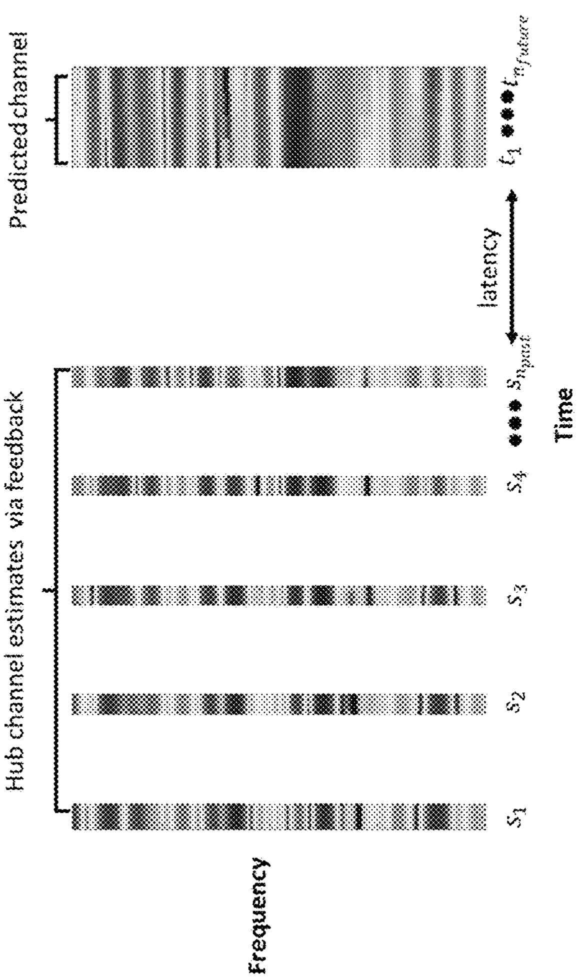
FIG. 56 is a spectral graph of an example of an extrapolation process.

Channel prediction is performed at the hub by applying an optimization criterion, e.g., the Minimal Mean Square Error (MMSE) prediction filter to the hub's channel estimates (acquired by either implicit or explicit feedback). The MMSE filter is computed in two steps. First, the hub computes empirical estimates of the channel's second order statistics. Second, using standard estimation theory, the hub uses the second order statistics to compute the MMSE prediction filter. Before going into details, we introduce notation:

We denote the number of antennas at the hub by $L_h$. We denote the number of UE antennas by $L_u$. We index the UE antennas by u=1, . . . , $L_u$. We denote the number frequency bins by $N_f$. We denote the number of feedback times by $n_{past}$. We denote the number of prediction times by $n_{future}$. FIG. 56 shows an example of an extrapolation process setup.

For each UE antenna, the channel estimates for all the frequencies, hub antennas, and feedback times can be combined to form a single NrLhnpast dimensional vector. We denote this by:

$$\hat{H}_{past}(u)\in\mathbb{C}^{N_fL_hn_{past}}, \tag{19}$$

Likewise, the channel values for all the frequencies, hub antennas, and prediction times can be combined to form a single $N_fL_hn_{future}$ dimensional vector. We denote this by:

$$H_{future}(u)\in\mathbb{C}^{N_fL_hn_{future}}, \tag{20}$$

In typical implementations, these are extremely high dimensional vectors and that in practice some form of compression should be used. For example, principal component compression may be one compression technique used.

Empirical Second Order Statistics

Empirical second order statistics are computed separately for each UE antenna in the following way:

At fixed times, the hub receives through feedback N samples of $\hat{H}_{past}(u)$ and estimates of $H_{future}(u)$. We denote them by: $\hat{H}_{past}(u)_i$ and $\hat{H}_{future}(u)_i$ for i=1, . . . , N.

The hub computes an estimate of the covariance of $\hat{H}_{past}(u)$, which we denote by $\hat{R}_{past}(u)$:

$$\hat{R}_{past}(u)=\frac{1}{N}\sum_{i=1}^{N}\hat{H}_{past}(u)_i\hat{H}_{past}(u)_i^* \tag{21}$$

The hub computes an estimate of the covariance of $H_{future}(u)$, which we denote by $\hat{R}_{future}(u)$:

$$\hat{R}_{future}(u)=\frac{1}{N}\sum_{i=1}^{N}\hat{H}_{future}(u)_i\hat{H}_{future}(u)_i^* \tag{22}$$

The hub computes an estimate of the correlation between $H_{future}(u)$ and $\hat{H}_{past}(u)$, which we denote by $\hat{R}_{past,future}(u)$:

$$\hat{R}_{future,past}(u)=\frac{1}{N}\sum_{i=1}^{N}\hat{H}_{future}(u)_i\hat{H}_{future}(u)_i^* \tag{23}$$

In typical wireless scenarios (pedestrian to highway speeds) the second order statistics of the channel change slowly (on the order of 1-10 seconds). Therefore, they should be recomputed relatively infrequently. Also, in some instances it may be more efficient for the UEs to compute estimates of the second order statistics and feed these back to the hub.

MMSE Prediction Filter

Using standard estimation theory, the second order statistics can be used to compute the MMSE prediction filter for each UE antenna:

$$C(u)=\hat{R}_{future,past}(u)\hat{R}_{past}^{-1}(u), \tag{24}$$

Where C(u) denotes the MMSE prediction filter. The hub can now predict the channel by applying feedback channel estimates into the MMSE filter:

$$\hat{H}_{future}(u)=C(u)\hat{H}_{past}(u). \tag{25}$$

Prediction Error Variance

We denote the MMSE prediction error by $\Delta H_{future}(u)$, then:

$$H_{future}(u)=\hat{H}_{future}(u)+\Delta H_{future}(u). \tag{26}$$

We denote the covariance of the MMSE prediction error by $R_{error}(u)$, with:

$$R_{error}(u) = \mathbb{E}[\Delta H_{future}(u)\Delta H_{future}(u)^*]. \tag{27}$$

Using standard estimation theory, the empirical second order statistics can be used to compute an estimate of $R_{error}(u)$:

$$\hat{R}_{error}(u) = C(u)\hat{R}_{past}(u)C(u)^* - C(u)\hat{R}_{future,past}(u)^* - \hat{R}_{future,past}(u)C(u)^* + \hat{R}_{future}(u) \tag{28}$$

Simulation Results

Figure 57:
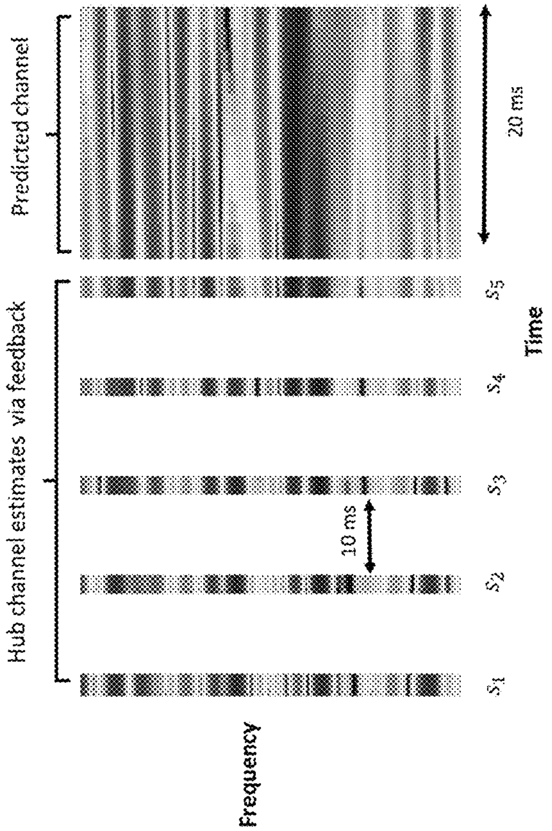
FIG. 57 is a spectral graph of another example of an extrapolation process.

We now present simulation results illustrating the use of the MMSE filter for channel prediction. Table 1 gives the simulation parameters and FIG. 57 shows the extrapolation setup for this example.

TABLE 1

| | |
|---|---|
| Subcarrier spacing | 15 kHz |
| Number of subcarriers | 512 |
| Delay spread | 3 μs |
| Doppler spread | 600 Hz |
| Number of channel feedback estimates | 5 |
| Spacing of channel feedback estimates | 10 ms |
| Prediction range | 0-20 ms into the future |

Figure 58:
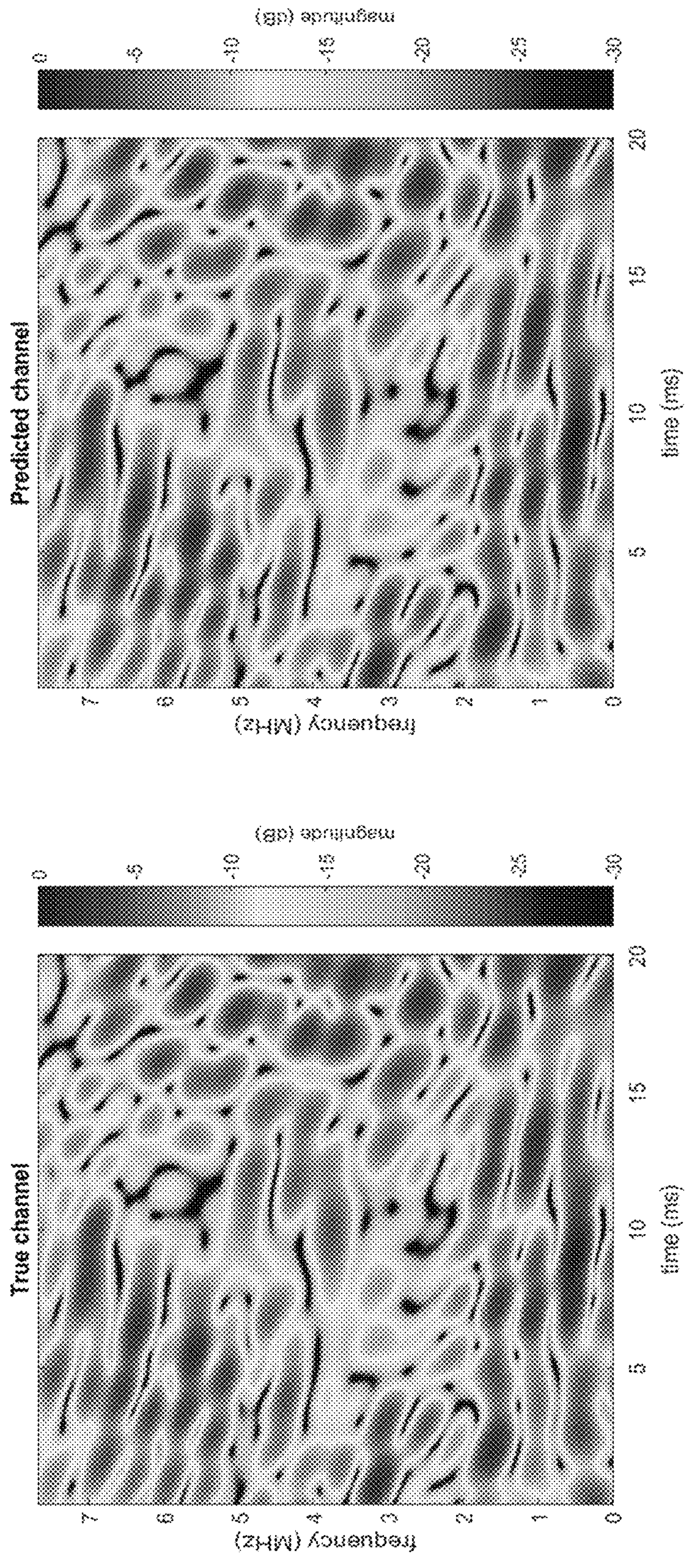
FIG. 58 compares spectra of a true and a predicted channel in some precoding implementation embodiments.

Fifty samples of $\hat{H}_{past}$ and $\hat{H}_{future}$ were used to compute empirical estimates of the second order statistics. The second order statistics were used to compute the MMSE prediction filter. FIG. 58 shows the results of applying the filter. The results have shown that the prediction is excellent at predicting the channel, even 20 ms into the future.

Block Diagrams

Figure 59:
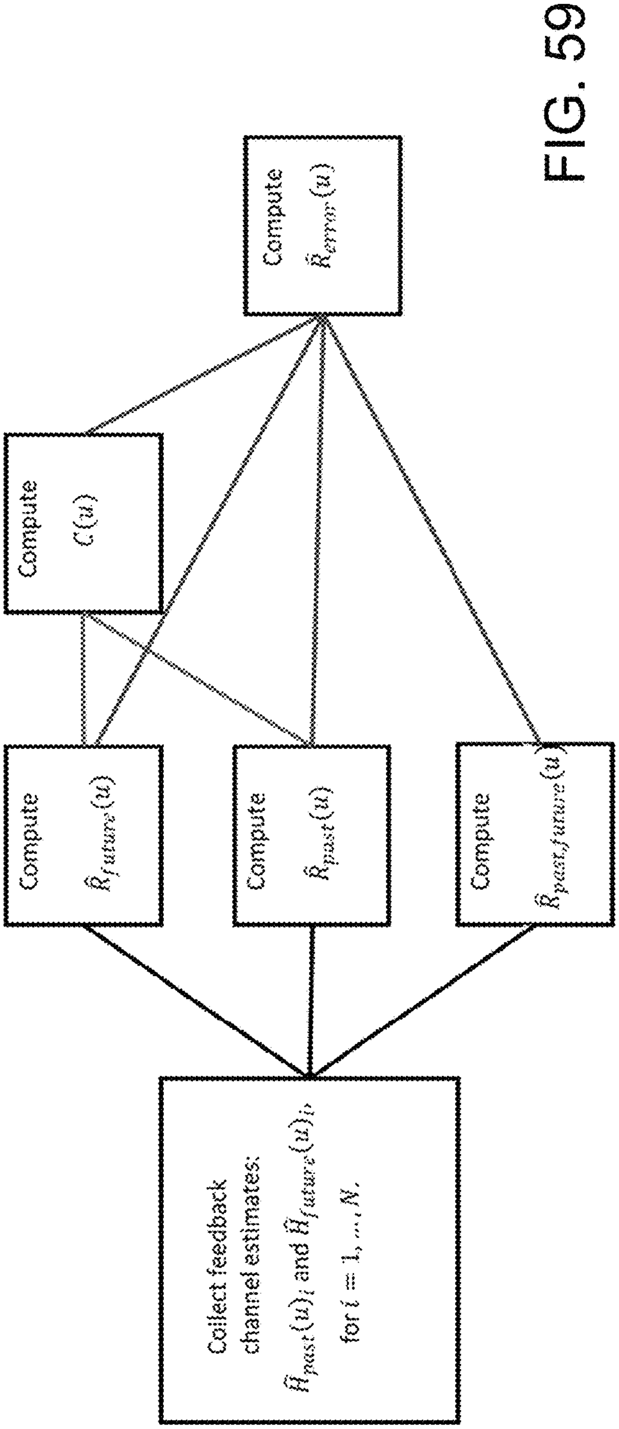
FIG. 59 is a block diagram depiction of a process for computing prediction filter and error covariance.
Figure 60:
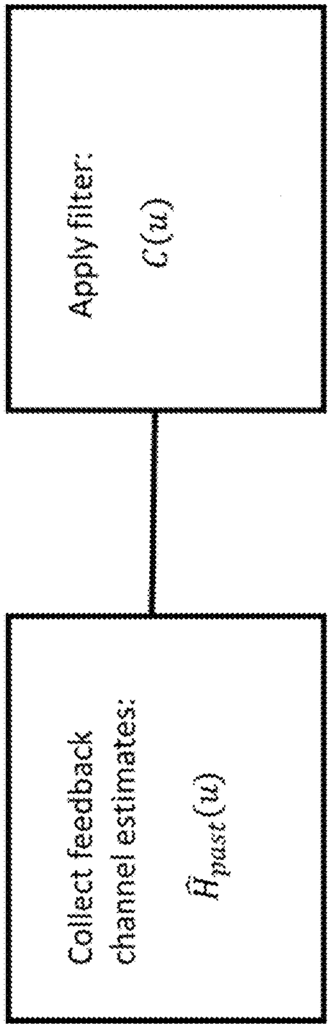
FIG. 60 is a block diagram illustrating an example of a channel prediction process.

In some embodiments, the prediction is performed independently for each UE antenna. The prediction can be separated into two steps:

1) Computation of the MMSE prediction filter and prediction error covariance: the computation can be performed infrequently (on the order of seconds). The computation is summarized in FIG. 59. Starting from left in FIG. 59, first, feedback channel estimates are collected. Next, the past, future and future/past correlation matrices are computed. Next the filter estimate C(u) and the error estimate are computed.
2) Channel prediction: is performed every time precoding is performed. The procedure is summarized in FIG. 60.

Optimal Precoding Filter

Using MMSE prediction, the hub computes an estimate of the downlink channel matrix for the allocation of time and frequency the pre-coded data will be transmitted. The estimates are then used to construct precoding filters. Precoding is performed by applying the filters on the data the hub wants the UEs to receive. Embodiments may derive the "optimal" precoding filters as follows. Before going over details we introduce notation.

Frame (as defined previously): precoding is performed on a fixed allocation of time and frequency, with $N_f$ frequency bins and $N_t$ time bins. We index the frequency bins by: f=1, . . . , $N_f$. We index the time bins by t=1, . . . , $N_t$.

Channel estimate: for each time and frequency bin the hub has an estimate of the downlink channel which we denote by $\hat{H}(f, t) \in \mathbb{C}^{L_u \times L_h}$.

Error correlation: we denote the error of the channel estimates by ΔH(f, t), then:

$$H(f, t) = \hat{H}(f, t) + \Delta H(f, t), \tag{29}$$

We denote the expected matrix correlation of the estimation error by $R_{\Delta H}(f, t) \in \mathbb{C}^{L_h \times L_h}$, with:

$$R_{\Delta H}(f, t) = \mathbb{E}[\Delta H(f, t)^* \Delta H(f, t)]. \tag{30}$$

The hub can be easily compute these using the prediction error covariance matrices computed previously: $\hat{R}_{error}(u)$ for u=1, . . . , $L_u$.

Signal: for each time and frequency bin the UE wants to transmit a signal to the UEs which we denote by $s(f, t) \in \mathbb{C}^{L_u}$.

Precoding filter: for each time and frequency bin the hub uses the channel estimate to construct a precoding filter which we denote by $W(f, t) \in \mathbb{C}^{L_h \times L_u}$.

White noise: for each time and frequency bin the UEs experience white noise which we denote by $n(f, t) \in \mathbb{C}^{L_u}$. We assume the white noise is iid Gaussian with mean zero and variance $N_0$.

Hub Energy Constraint

When the precoder filter is applied to data, the hub power constraint may be considered. We assume that the total hub transmit energy cannot exceed $N_f N_t L_h$. Consider the pre-coded data:

$$W(f, t)s(f, t), \tag{31}$$

To ensure that the pre-coded data meets the hub energy constraints the hub applies normalization, transmitting:

$$\lambda W(f, t)s(f, t), \tag{32}$$

Where the normalization constant λ is given by:

$$\lambda = \sqrt{\frac{N_f N_t L_h}{\sum_{f,t} \|W(f.t)s(f, t)\|^2}} \tag{33}$$

Receiver SINR

The pre-coded data then passes through the downlink channel, the UEs receive the following signal:

$$\lambda H(f, t)W(f, t)s(f, t) + n(f, t), \tag{34}$$

The UEs then removes the normalization constant, giving a soft estimate of the signal:

$$s_{soft}(f, t) = H(f, t)W(f, t)s(f, t) + \frac{1}{\lambda}n(f, t). \tag{35}$$

The error of the estimate is given by:

$$s_{soft}(f,t)-s(f,t)=H(f,t)W(f,t)s(f,t)-s(f,t)+\frac{1}{\lambda}n(f,t). \tag{36}$$

The error can be decomposed into two independent terms: interference and noise. Embodiments can compute the total expected error energy:

$$\text{expected error energy}=\sum_{f=1}^{N_f}\sum_{t=1}^{N_t}\mathbb{E}\|s_{soft}(f,t)-s(f,t)\|^2= \sum_{f=1}^{N_f}\sum_{t=1}^{N_t}\mathbb{E}\|H(f,t)W(f,t)s(f,t)-s(f,t)\|^2+\frac{1}{\lambda^2}\mathbb{E}\|n(f,t)\|^2= \sum_{f=1}^{N_f}\sum_{t=1}^{N_t}\left(\hat{H}(f,t)W(f,t)s(f,t)-s(f,t)\right)^*\left(\hat{H}(f,t)W(f,t)s(f,t)-s(f,t)\right)+(W(f,t)s(f,t))^*\left(R_{\Delta H}(f,t)+\frac{N_0L_u}{L_h}I\right)(W(f,t)s(f,t)) \tag{37}$$

Optimal Precoding Filter

We note that the expected error energy is convex and quadratic with respect to the coefficients of the precoding filter. Therefore, calculus can be used to derive the optimal precoding filter:

$$W_{opt}(f,t)=\left(\hat{H}(f,t)^*\hat{H}(f,t)+R_{\Delta H}(f,t)+\frac{N_0L_u}{L_h}I\right)^{-1}\hat{H}(f,t)^* \tag{38}$$

Accordingly, some embodiments of an OTFS precoding system use this filter (or an estimate thereof) for precoding.

Simulation Results

Figure 61:
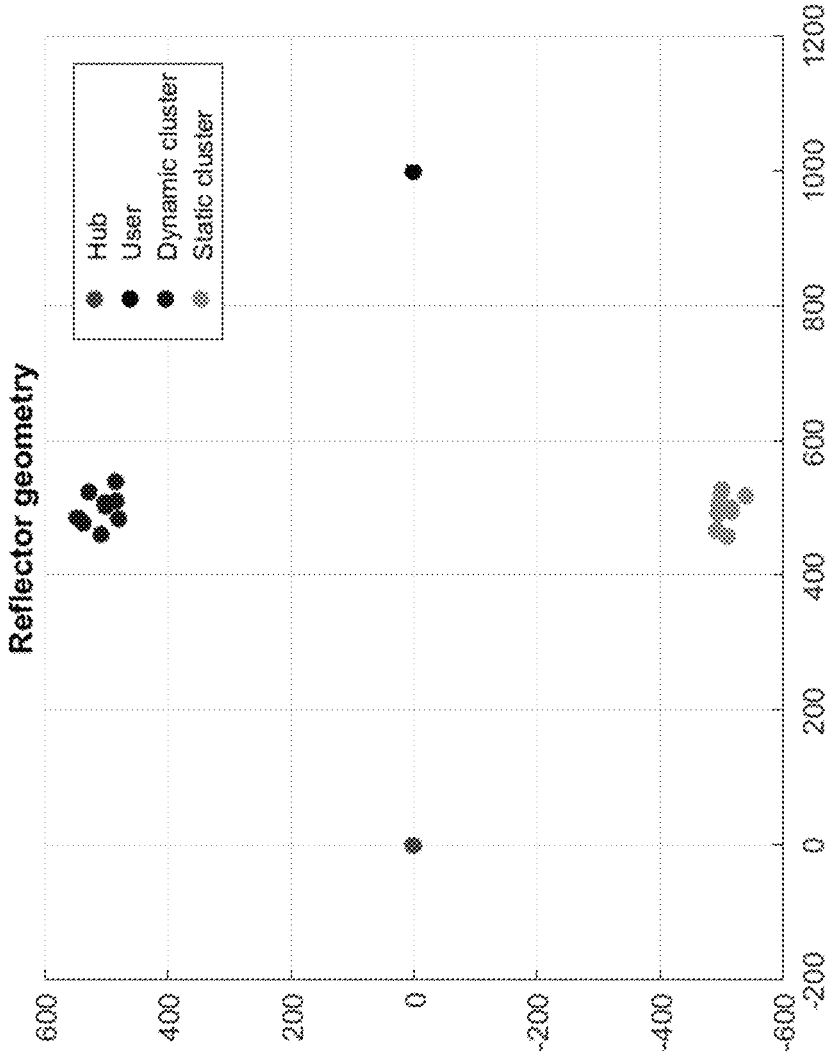
FIG. 61 is a graphical depiction of channel geometry of an example wireless channel.

We now present a simulation result illustrating the use of the optimal precoding filter. The simulation scenario was a hub transmitting data to a single UE. The channel was non line of sight, with two reflector clusters: one cluster consisted of static reflectors, the other cluster consisted of moving reflectors. FIG. 61 illustrates the channel geometry, with horizontal and vertical axis in units of distance. It is assumed that the hub has good Channel Side Information (CSI) regarding the static cluster and poor CSI regarding the dynamic cluster. The optimal precoding filter was compared to the MMSE precoding filter. FIG. 62A displays the antenna pattern given by the MMSE precoding filter. It can be seen that the energy is concentrated at ±45°, that is, towards the two clusters. The UE SINR is 15.9 dB, the SINR is relatively low due to the hub's poor CSI for the dynamic cluster.

Figure 62B:
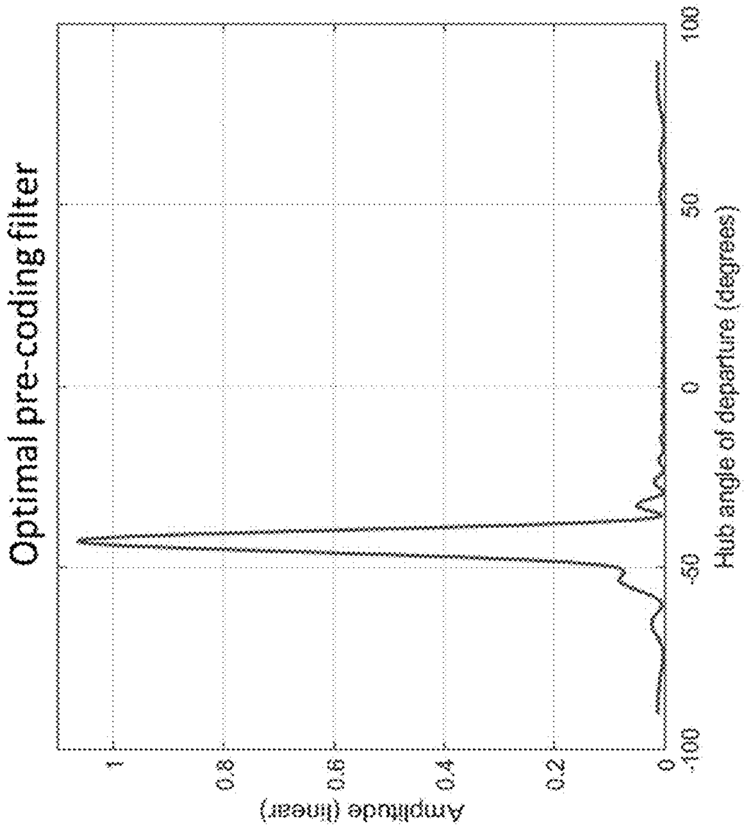
FIG. 62B is a graph showing an example of an optical pre-coding filter.
Figure 62A:
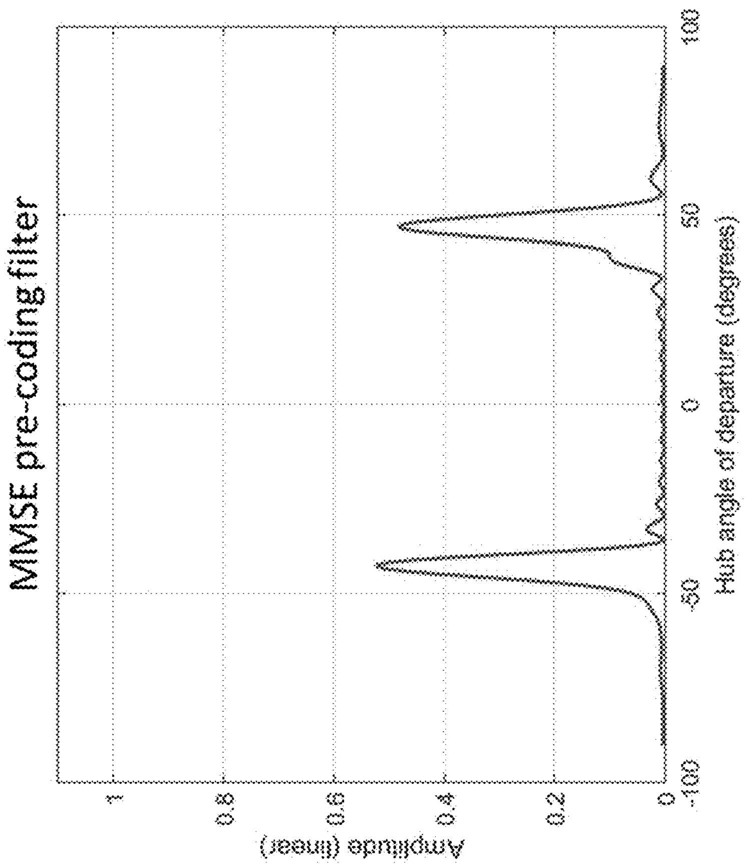
FIG. 62A is a graph showing an example of a precoding filter antenna pattern.

FIG. 62B displays the antenna pattern given by the optimal precoding filter as described above, e.g., using equation (38). In this example, the energy is concentrated at −45°, that is, toward the static cluster. The UE SINR is 45.3 dB, the SINR is high (compared to the MMSE case) due to the hub having good CSI for the static reflector.

The simulation results depicted in FIGS. 62A and 62B illustrate the advantage of the optimal pre-coding filter. The filter it is able to avoid sending energy towards spatial regions of poor channel CSI, e.g., moving regions.

Example Block Diagrams

Figure 63:
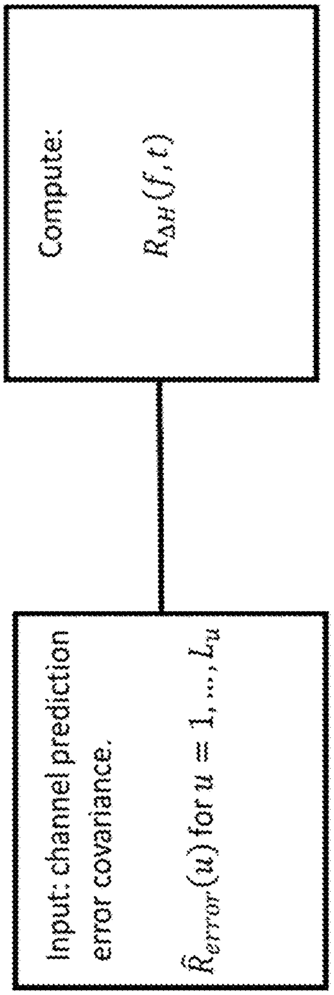
FIG. 63 is a block diagram showing an example process of error correlation computation.

Precoding is performed independently for each time frequency bin. The precoding can be separated into three steps:

[1] Computation of error correlation: the computation be performed infrequently (on the order of seconds). The computation is summarized in FIG. 63.

Figure 64:
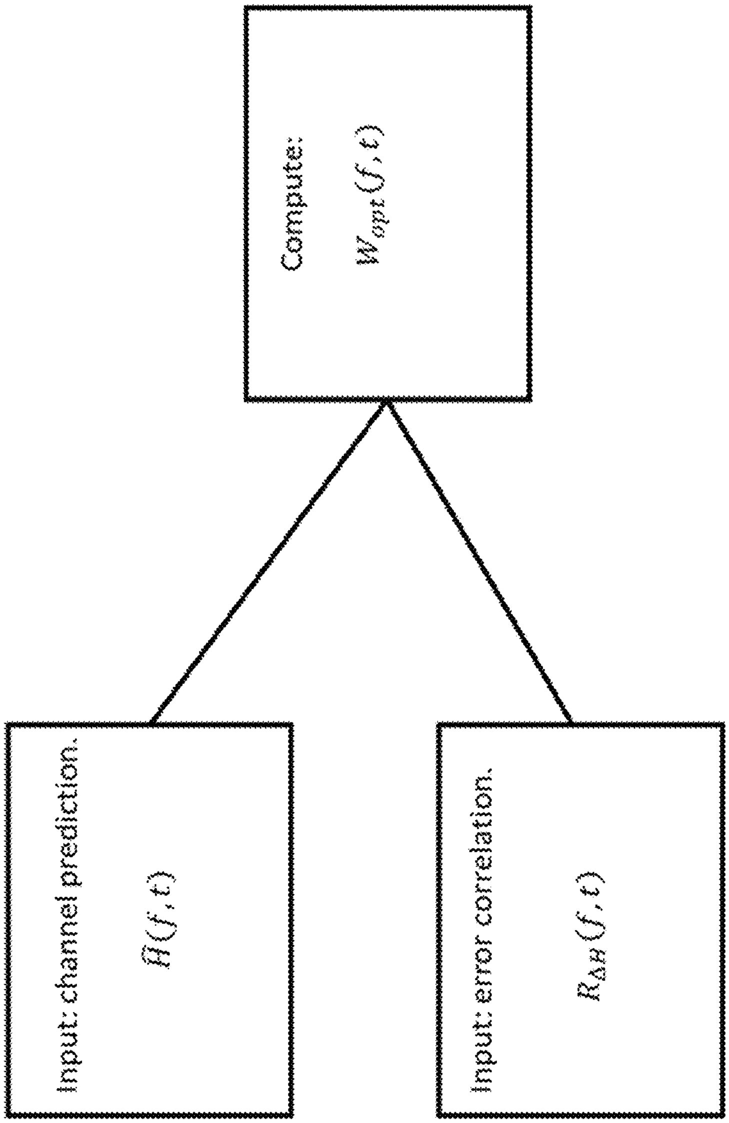
FIG. 64 is a block diagram showing an example process of precoding filter estimation.

[2] Computation of optimal precoding filter: may be performed every time pre-coding is performed. The computation is summarized in FIG. 64.

Figure 65:
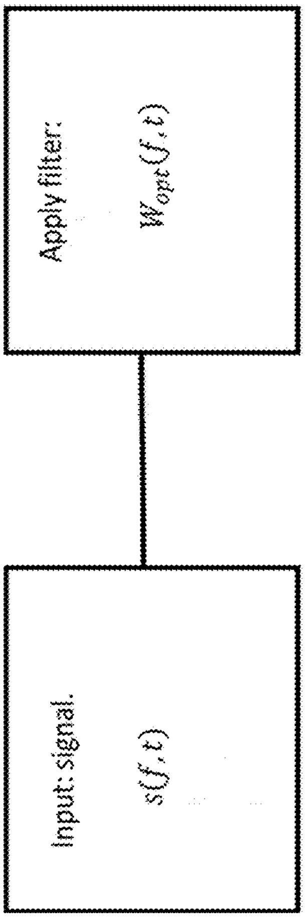
FIG. 65 is a block diagram showing an example process of applying an optimal precoding filter.

[3] Application of the optimal precoding filter: may be performed every time pre-coding is performed. The procedure is summarized in FIG. 65.

OTFS Vector Perturbation

Before introducing the concept of vector perturbation, we outline the application of the optimal pre-coding filter to OTFS.

OTFS Optimal Precoding

In OTFS, the data to be transmitted to the UEs are encoded using QAMs in the delay-Doppler domain. We denote this QAM signal by x, then:

$$x(\tau,\nu)\in A^{L_u}, \tag{39}$$

for $\tau=1,\ldots,N_\tau$ and $\nu=1,\ldots,N_\nu$. A denotes the QAM constellation. Using the two-dimensional Fourier transform the signal can be represented in the time frequency domain. We denote this representation by X:

$$X(f,t)=(Fx)(f,t), \tag{40}$$

for $f=1,\ldots,N_f$ and $t=1,\ldots,N_t$. F denotes the two-dimensional Fourier transform. The hub applies the optimal pre-coding filter to X and transmit the filter output over the air:

$$\lambda W_{opt}(f,t)X(f,t), \tag{41}$$

for $f=1,\ldots,N_f$ and $t=1,\ldots,N_t$. λ denotes the normalization constant. The UEs remove the normalization constant giving a soft estimate of X:

$$X_{soft}(f,t)=H(f,t)W_{opt}(f,t)X(f,t)+\frac{1}{\lambda}w(f,t), \tag{42}$$

for $f=1,\ldots,N_f$ and $t=1,\ldots,N_t$. The term w(f, t) denotes white noise. We denote the error of the soft estimate by E:

$$E(f,t)=X_{soft}(f,t)-X(f,t), \tag{43}$$

for $f=1,\ldots,N_f$ and $t=1,\ldots,N_t$. The expected error energy was derived earlier in this document:

$$\text{expected error energy}=\sum_{f=1}^{N_f}\sum_{t=1}^{N_t}\mathbb{E}\|X_{soft}(f,t)-X(f,t)\|^2= \sum_{f=1}^{N_f}\sum_{t=1}^{N_t}X(f,t)^*M_{error}(f,t)X(f,t) \tag{44}$$

Where:

$$M_{error}(f,t)=\left(\hat{H}(f,t)W_{opt}(f,t)-I\right)^*\left(\hat{H}(f,t)W_{opt}(f,t)-I\right)+ \ldots W_{opt}(f,t)^*\left(R_{\Delta H}(f,t)+\frac{N_0L_u}{L_h}\right)W_{opt}(f,t) \tag{45}$$

We call the positive definite matrix $M_{error}(f, t)$ the error metric.

Vector Perturbation

In vector perturbation, the hub transmits a perturbed version of the QAM signal:

$$x(\tau, \nu) + p(\tau, \nu), \tag{46}$$

for $\tau=1, \ldots, N_\tau$ and $\nu=1, \ldots, N_\nu$. Here, $p(\tau, \nu)$ denotes the perturbation signal. The perturbed QAMs can be represented in the time frequency domain:

$$X(f, t) + P(f, t) = (Fx)(f, t) + (Fp)(f, t), \tag{47}$$

for $f=1, \ldots, N_f$ and $t=1, \ldots, N_t$. The hub applies the optimal pre-coding filter to the perturbed signal and transmits the result over the air. The UEs remove the normalization constant giving a soft estimate of the perturbed signal:

$$X(f, t) + P(f, t) + E(f, t), \tag{48}$$

for $f=1, \ldots, N_f$ and $t=1, \ldots, N_t$. Where E denotes the error of the soft estimate. The expected energy of the error is given by:

$$\text{expected error energy} = \sum_{f=1}^{N_f} \sum_{t=1}^{N_t} (X(f, t) + P(f, t))^* M_{error}(f, t)(X(f, t) + P(f, t)) \tag{49}$$

The UEs then apply an inverse two dimensional Fourier transform to convert the soft estimate to the delay Doppler domain:

$$x(\tau, \nu) + p(\tau, \nu) + e(\tau, \nu), \tag{50}$$

for $\tau=1, \ldots, N_\tau$ and $\nu=1, \ldots, N_\nu$. The UEs then remove the perturbation $p(\tau, \nu)$ for each delay Doppler bin to recover the QAM signal x.

Collection of Vector Perturbation Signals

One question is: what collection of perturbation signals should be allowed? When making this decision, there are two conflicting criteria:

1) The collection of perturbation signals should be large so that the expected error energy can be greatly reduced.

2) The collection of perturbation signals should be small so the UE can easily remove them (reduced computational complexity):

$$x(\tau, \nu) + p(\tau, \nu) \rightarrow x(\tau, \nu) \tag{51}$$

Coarse Lattice Perturbation

An effective family of perturbation signals in the delay-Doppler domain, which take values in a coarse lattice:

$$p(\tau, \nu) \in B^{L_u}, \tag{52}$$

for $\tau=1, \ldots, N_\tau$ and $\nu=1, \ldots, N_\nu$. Here, B denotes the coarse lattice. Specifically, if the QAM symbols lie in the box: $[-r, r]\times j[-r, r]$ we take as our perturbation lattice $B=2r\mathbb{Z}+2rj\mathbb{Z}$. We now illustrate coarse lattice perturbation with an example.

EXAMPLES

Figure 66:
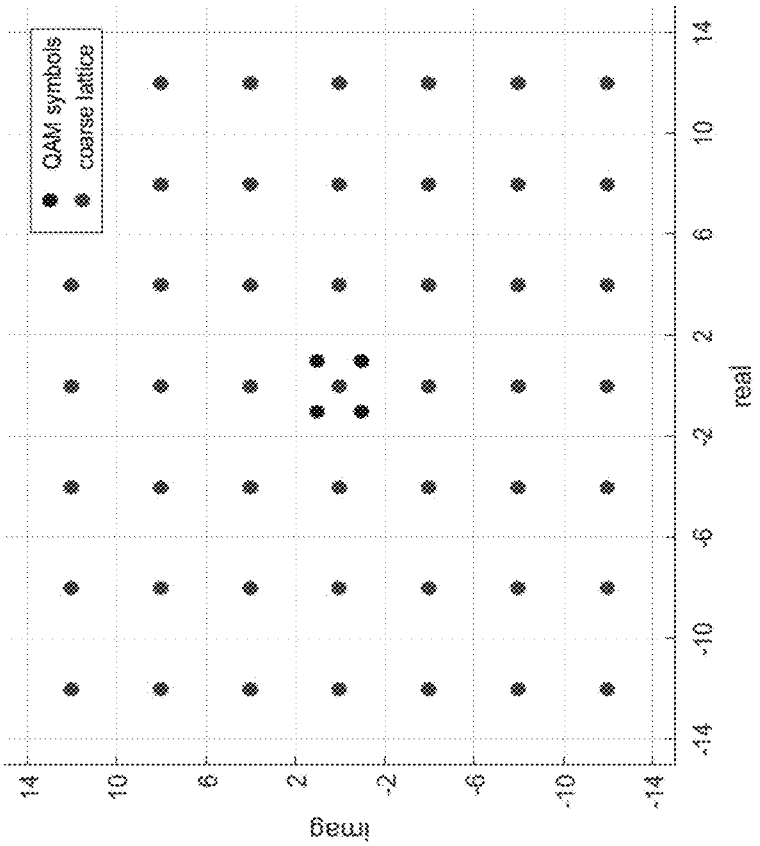
FIG. 66 is a graph showing an example of a lattice and QAM symbols.
Figure 67:
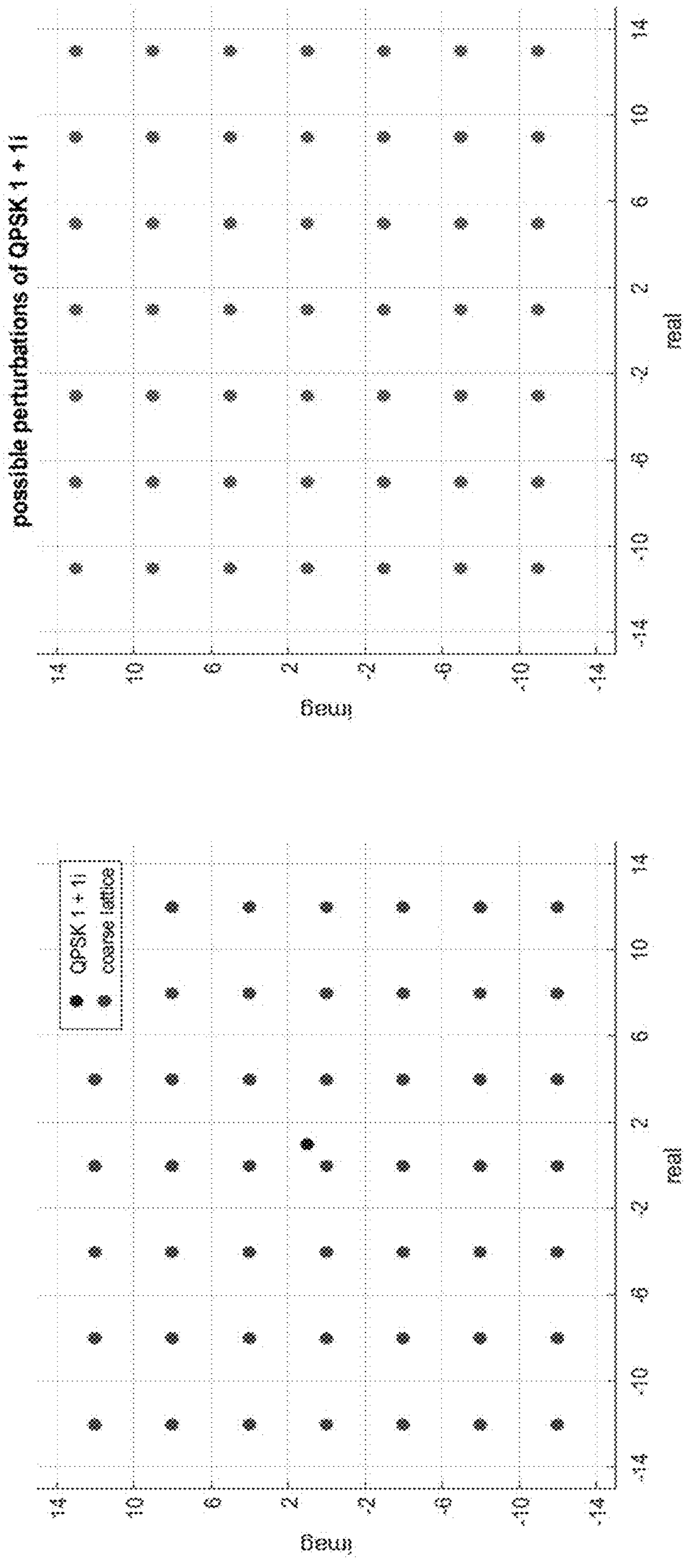
FIG. 67 graphically illustrates effects of perturbation examples.
Figure 68:
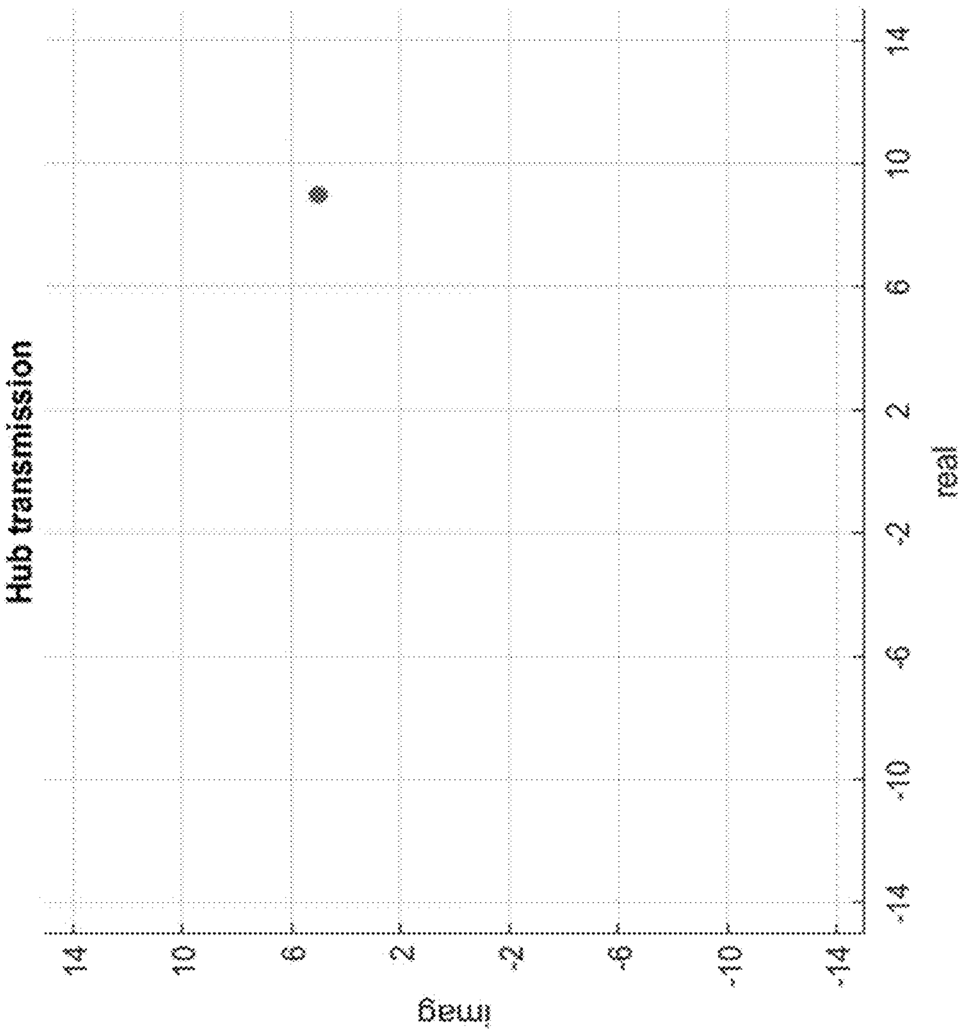
FIG. 68 is a graph illustrating an example of hub transmission.

Consider QPSK (or 4-QAM) symbols in the box $[-2,2]\times j[-2,2]$. The perturbation lattice is then $B=4\mathbb{Z}+4j\mathbb{Z}$. FIG. 66 illustrates the symbols and the lattice. Suppose the hub wants to transmit the QPSK symbol 1+1j to a UE. Then there is an infinite number of coarse perturbations of 1+1j that the hub can transmit. FIG. 67 illustrates an example. The hub selects one of the possible perturbations and transmits it over the air. FIG. 68 illustrates the chosen perturbed symbol, depicted with a single solid circle.

Figure 69:
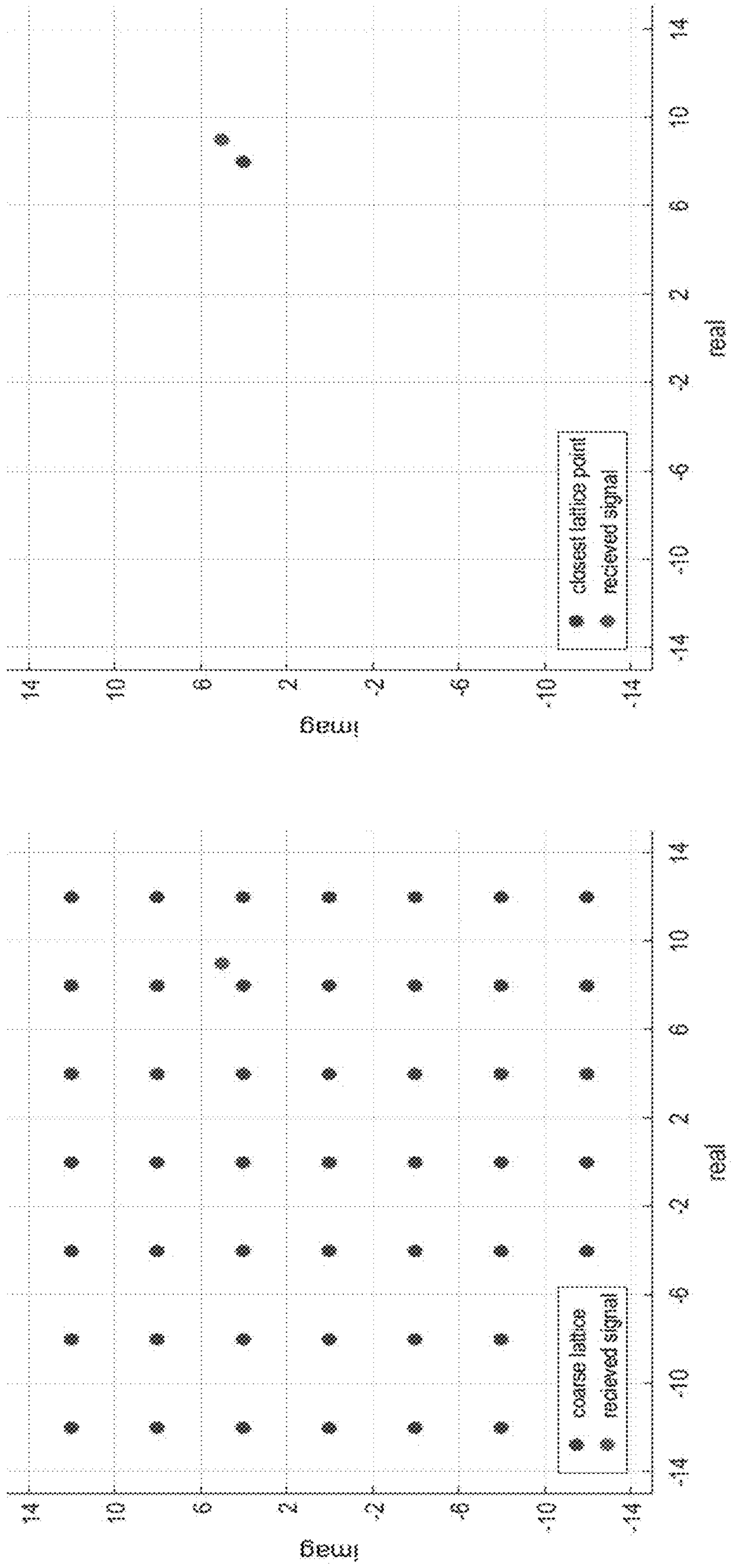
FIG. 69 is a graph showing an example of the process of a UE finding a closest coarse lattice point.

The UE receives the perturbed QPSK symbol. The UE then removes the perturbation to recover the QPSK symbol. To do this, the UE first searches for the coarse lattice point closest to the received signal. FIG. 69 illustrates this.

Figure 70:
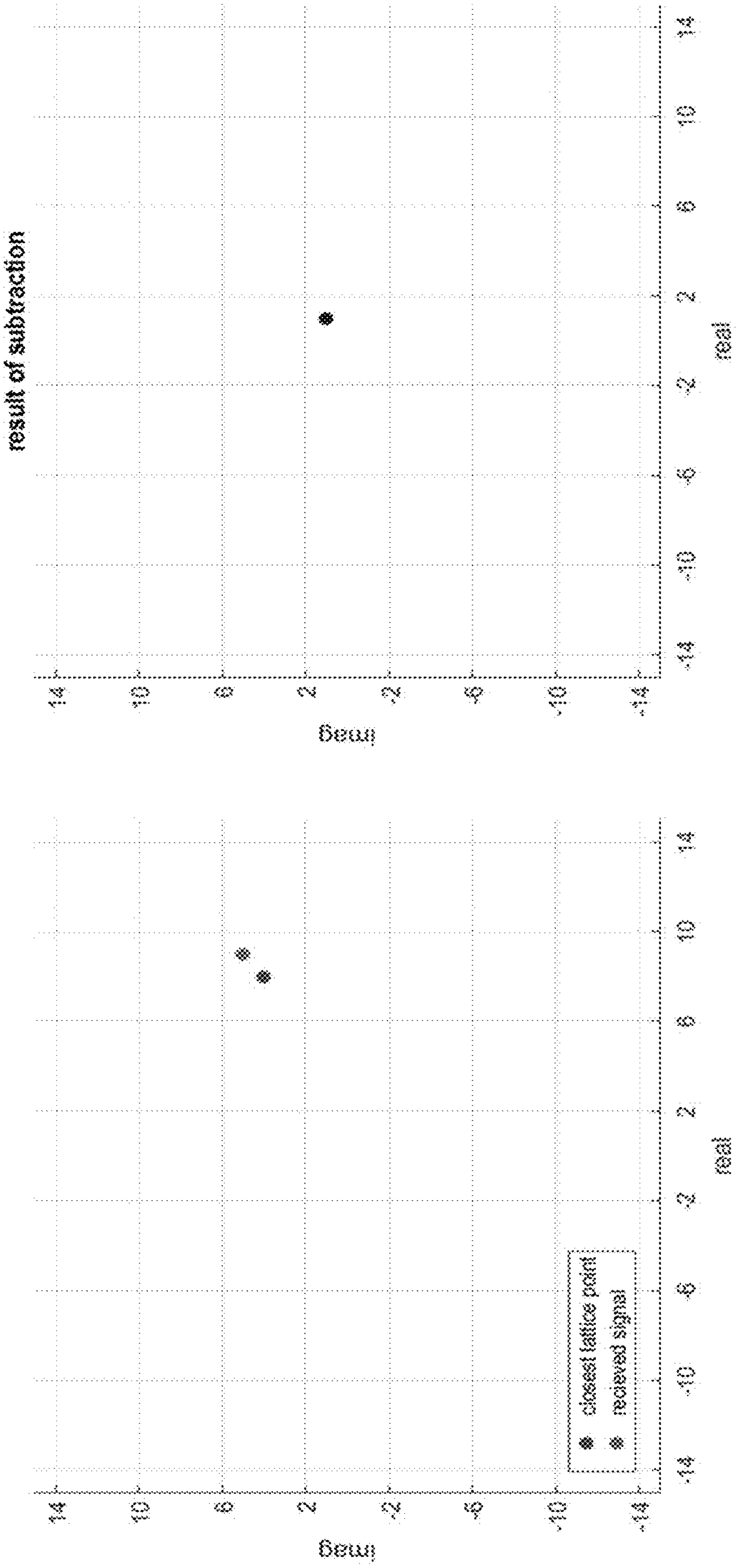
FIG. 70 is a graph showing an example process of UE recovering a QPSK symbol by subtraction.

The UE subtracts the closest lattice point from the received signal, thus recovering the QPSK symbol 1+1j. FIG. 70 illustrates this process.

Finding Optimal Coarse Lattice Perturbation Signal

The optimal coarse lattice perturbation signal, Popt, is the one which minimizes the expected error energy:

$$p_{opt} = \operatorname{argmin}_p \sum_{f=1}^{N_f} \sum_{t=1}^{N_t} (X(f, t) + P(f, t))^* M_{error}(f, t)(X(f, t) + P(f, t)) \tag{53}$$

The optimal coarse lattice perturbation signal can be computed using different methods. A computationally efficient method is a form of Thomlinson-Harashima precoding which involves applying a DFE filter at the hub.

Coarse Lattice Perturbation Example

We now present a simulation result illustrating the use of coarse lattice perturbation. The simulation scenario was a hub antenna transmitting to a single UE antenna. Table 2 displays the modulation parameters. Table 3 display the channel parameters for this example.

TABLE 2

| | |
|---|---|
| Subcarrier spacing | 30 kHz |
| Number of subcarriers | 256 |
| OFDM symbols per frame | 32 |
| QAM order | Infinity (uniform in the unit box) |

TABLE 3

| | |
|---|---|
| Number of reflectors | 20 |
| Delay spread | 2 µs |
| Doppler spread | 1 KHz |
| Noise variance | −35 dB |

Figure 71:
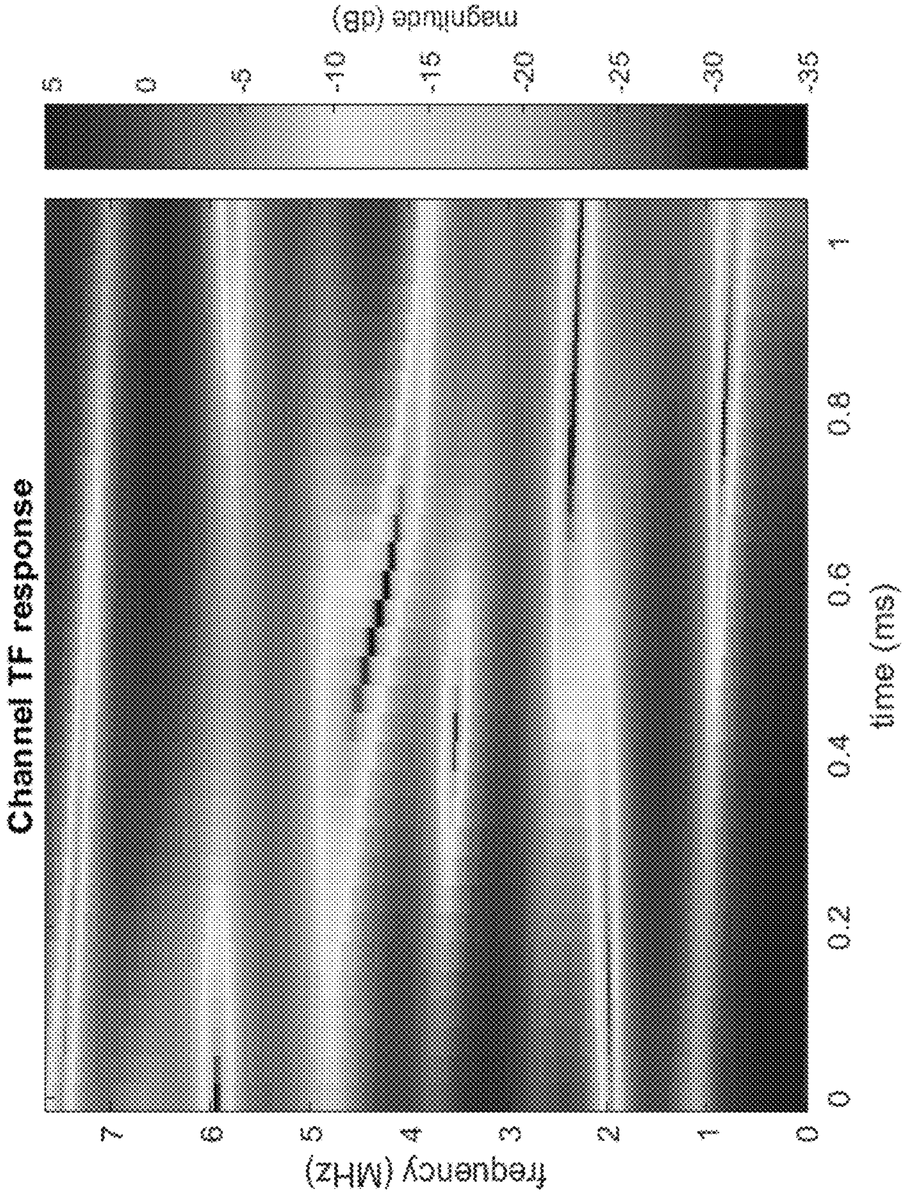
FIG. 71 depicts an example of a channel response.

FIG. 71 displays the channel energy in the time (horizontal axis) and frequency (vertical axis) domain.

Because this is a SISO (single input single output) channel, the error metric $M_{error}(f, t)$ is a positive scaler for each time frequency bin. The expected error energy is given by integrating the product of the error metric with the perturbed signal energy:

$$\text{expected error energy} = \sum_{f=1}^{N_f} \sum_{t=1}^{N_t} M_{error}(f, t)|X(f, t) + P(f, t)|^2 \quad (54)$$

Figure 72:
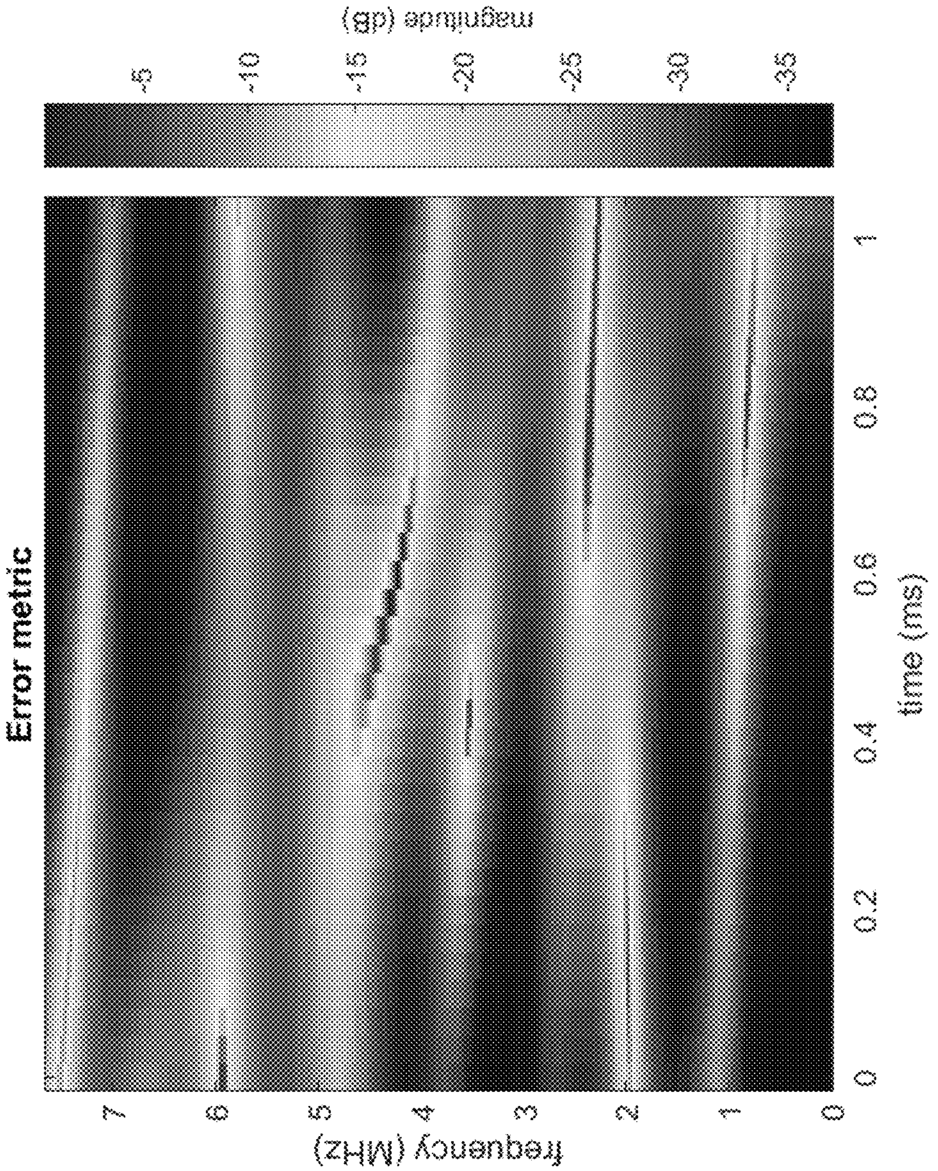
FIG. 72 depicts an example of an error of channel estimation.
Figure 73:
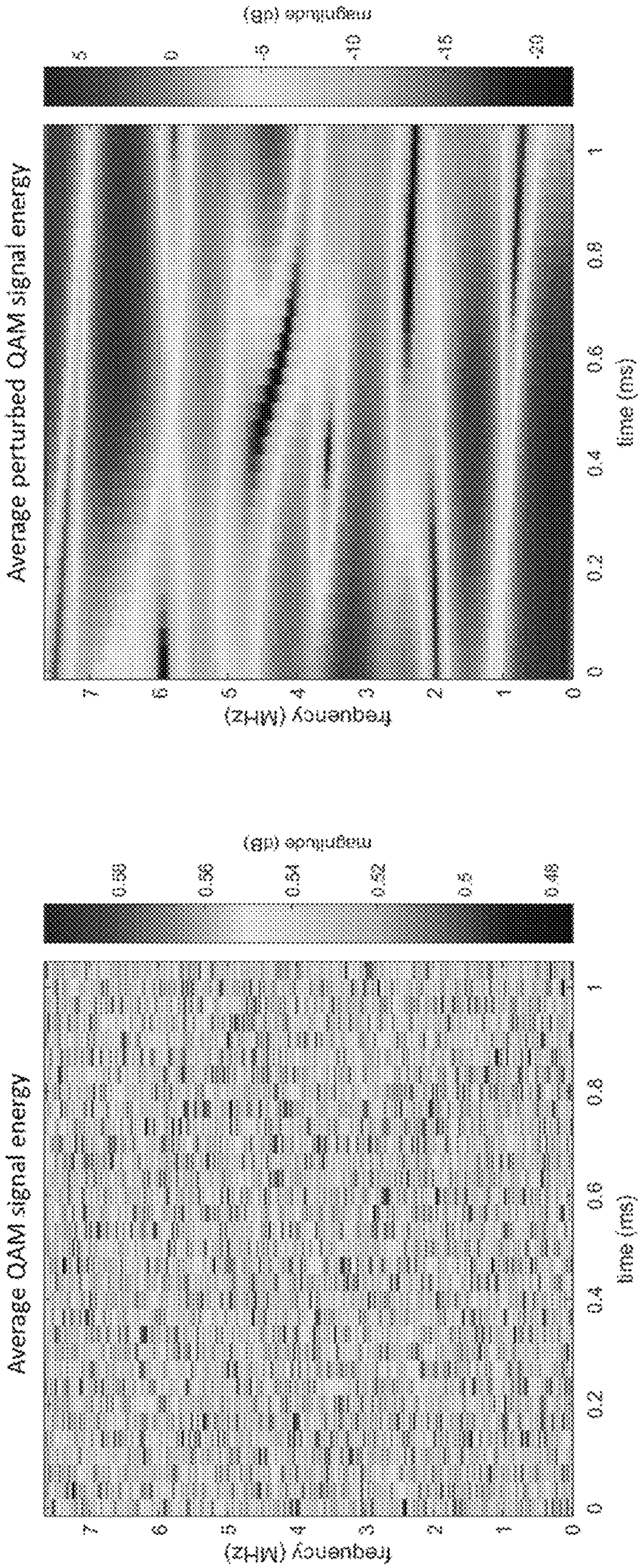
FIG. 73 shows a comparison of energy distribution of an example of QAM signals and an example of perturbed QAM signals.

FIG. 72 displays an example of the error metric. One hundred thousand random QAM signals were generated. For each QAM signal, the corresponding optimal perturbation signal was computed using Thomlinson-Harashima precoding. FIG. 73 compares the average energy of the QAM signals with the average energy of the perturbed QAM signals. The energy of QAM signals is white (evenly distributed) while the energy of the perturbed QAM signals is colored (strong in some time frequency regions and weak in others). The average error energy of the unperturbed QAM signal was −24.8 dB. The average error energy of the perturbed QAM signal was −30.3 dB. The improvement in error energy can be explained by comparing the energy distribution of the perturbed QAM signal with the error metric.

Figure 74:
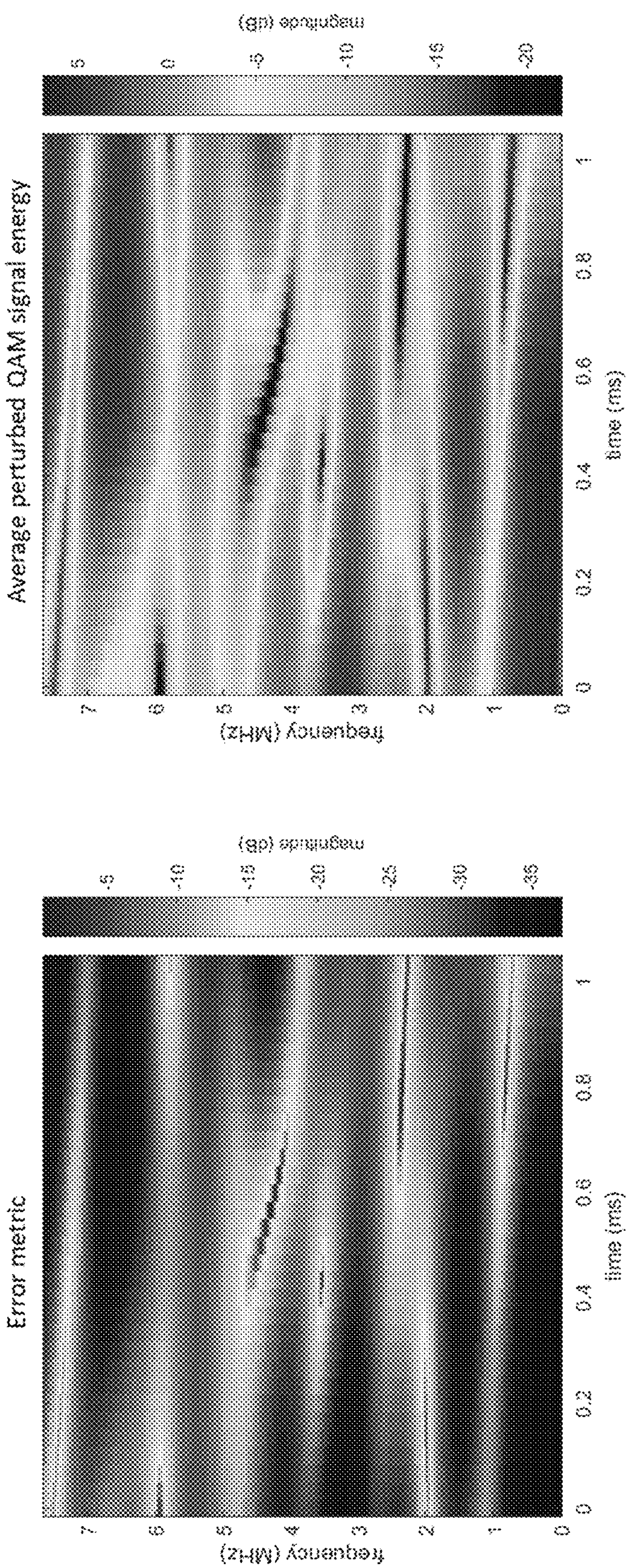
FIG. 74 is a graphical depiction of a comparison of an example error metric with an average perturbed QAM energy.

FIG. 74 shows a comparison of an example error metric with an average perturbed QAM energy. The perturbed QAM signal has high energy where the error metric is low, conversely it has low energy where the error metric is high.

The simulation illustrates the gain from using vector perturbation: shaping the energy of the signal to avoid time frequency regions where the error metric is high.

Block Diagrams

Vector perturbations may be performed in three steps. First, the hub perturbs the QAM signal. Next, the perturbed signal is transmitted over the air using the pre-coding filters. Finally, the UEs remove the perturbation to recover the data.

Figure 75:
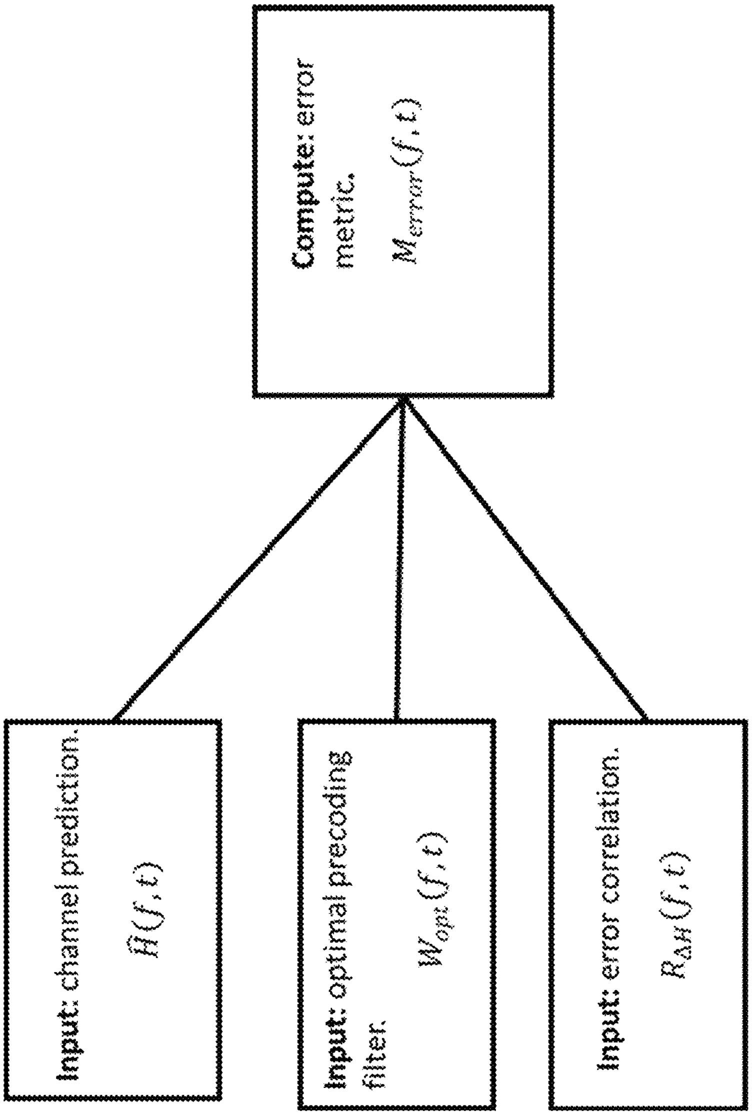
FIG. 75 is a block diagram illustrating an example process of computing an error metric.

Computation of error metric: the computation can be performed independently for each time frequency bin. The computation is summarized in FIG. 75. See also Eq. (45). As shown, the error metric is calculated using channel prediction estimate, the optimal coding filter and error correlation estimate.

Figure 76:
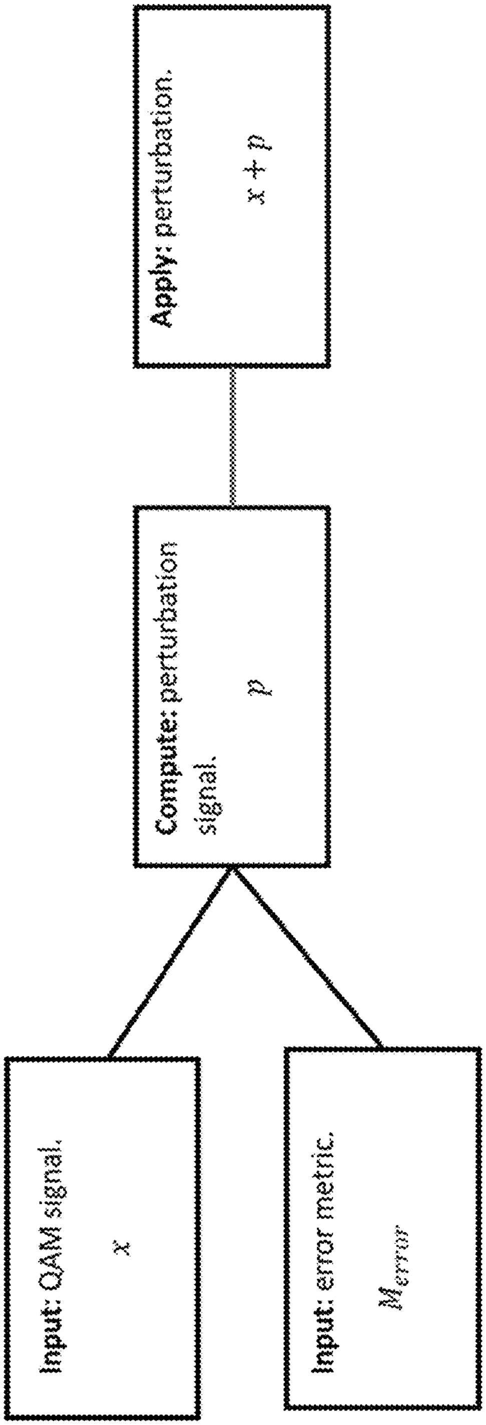
FIG. 76 is a block diagram illustrating an example process of computing perturbation.

Computation of perturbation: the perturbation is performed on the entire delay Doppler signal. The computation is summarized in FIG. 76. As shown, the QAM signal and the error metric are used to compute the perturbation signal. The calculated perturbation signal is additively applied to the QAM input signal.

Figure 77:
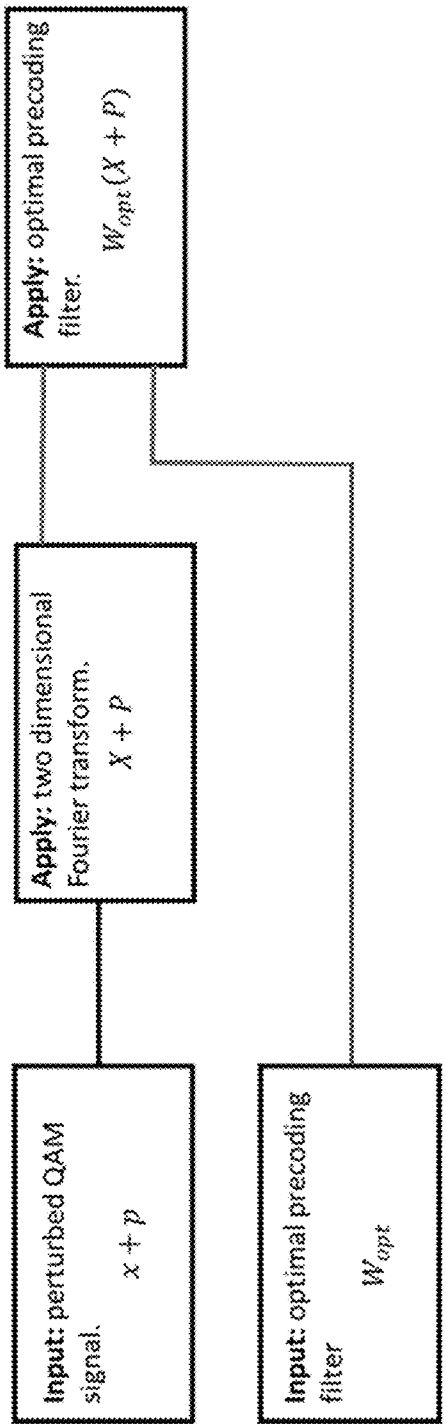
FIG. 77 is a block diagram illustrating an example of application of a precoding filter.

Application of the optimal precoding filter: the computation can be performed independently for each time frequency bin. The computation is summarized in FIG. 77. The perturbed QAM signal is processed through a two dimensional Fourier transform to generate a 2D transformed perturbed signal. The optimal precoding filter is applied to the 2D transformed perturbed signal.

Figure 78:
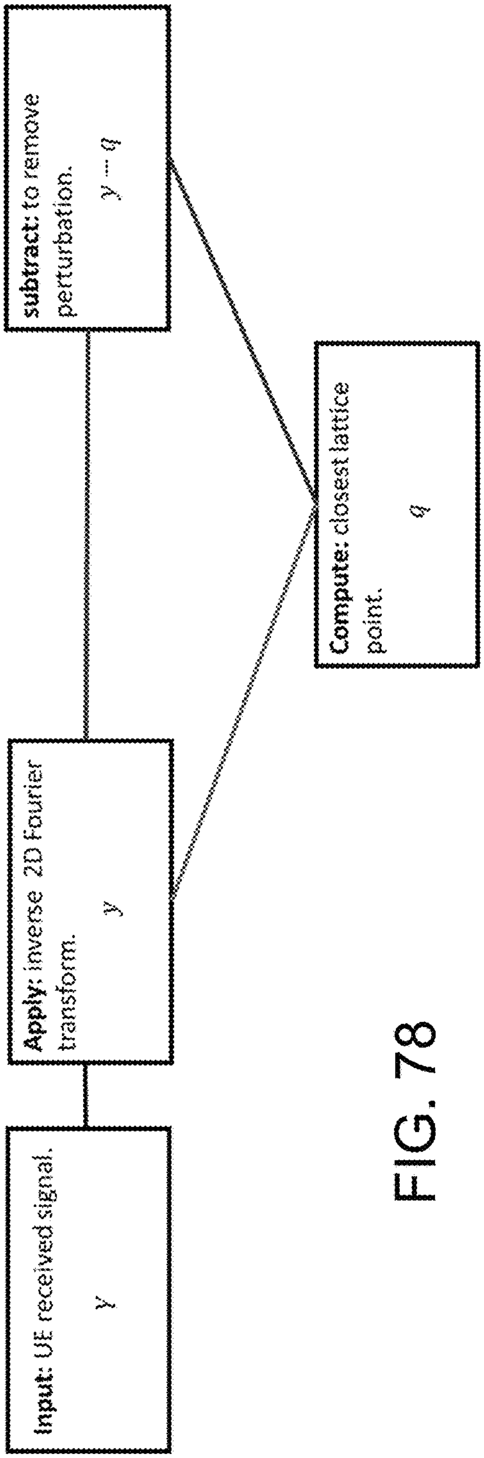
FIG. 78 is a block diagram illustrating an example process of UE removing the perturbation.

UEs removes perturbation: the computation can be FIG. 78. At UE, the input signal received is transformed through an inverse 2D Fourier transform. The closest lattice point for the resulting transformed signal is determined and then removed from the 2D transformed perturbed signal.

Spatial Tomlinson Harashima Precoding

This section provides additional details of achieving spatial precoding and the beneficial aspects of using Tomlinson Harashima precoding algorithm in implementing spatial precoding in the delay Doppler domain. The embodiments consider a flat channel (with no frequency or time selectivity).

Review of Linear Precoding

In precoding, the hub wants to transmit a vector of QAMs to the UEs. We denote this vector by $x \in \mathbb{C}^{L_u}$. The hub has access to the following information:

An estimate of the downlink channel, denoted by: $\hat{H} \in \mathbb{C}^{L_u \times L_h}$.

The matrix covariance of the channel estimation error, denoted by: $R_{\Delta H} \in \mathbb{C}^{L_h \times L_h}$.

From this information, the hub computes the "optimal" precoding filter, which minimizes the expected error energy experienced by the UEs:

$$W_{opt} = \left(\hat{H}^* \hat{H} + R_{\Delta H} + \frac{N_0 L_u}{L_h} I\right)^{-1} \hat{H}^*$$

By applying the precoding filter to the QAM vector the hub constructs a signal to transmit over the air: $\lambda W_{opt} x \in \mathbb{C}^{L_h}$, where $\lambda$ is a constant used to enforce the transmit energy constraints. The signal passes through the downlink channel and is received by the UEs:

$$\lambda H W_{opt} x + w,$$

Where $w \in \mathbb{C}^{L_u}$ denotes AWGN noise. The UEs remove the normalization constant giving a soft estimate of the QAM signal:

$$x + e,$$

where $e \in \mathbb{C}^{L_u}$ denotes the estimate error. The expected error energy can be computed using the error metric:

$$\text{expected error energy} = x^* M_{error} x$$

where $M_{error}$ is a positive definite matrix computed by:

$$M_{error} = (\hat{H} W_{opt} - I)^* (\hat{H} W_{opt} - I) + W_{opt}^* \left(R_{\Delta H} + \frac{N_0 L_u}{L_h}\right) W_{opt}$$

Review of Vector Perturbation

The expected error energy can be greatly reduced by perturbing the QAM signal by a vector $v \in \mathbb{C}^{L_u}$. The hub now transmits $\lambda W_{opt}(x+v) \in \mathbb{C}^{L_h}$. After removing the normalization constant, the UEs have a soft estimate of the perturbed QAM signal:

$$x + v + e$$

Again, the expected error energy can be computed using the error metric:

$$\text{expected error energy} = (x + v)^* M_{erro} (x + v)$$

The optimal perturbation vector minimizes the expected error energy:

$$v_{opt} = \text{argmin}_v (x+v)^* M_{error} (x+v).$$

Computing the optimal perturbation vector is in general NP-hard, therefore, in practice an approximation of the optimal perturbation is computed instead. For the remainder of the document we assume the following signal and perturbation structure:

The QAMs lie in the box [−1, 1]×j[−1, 1].

The perturbation vectors lie on the coarse lattice: $(2\mathbb{Z}+2j\mathbb{Z})^{L_u}$.

Spatial Tomlinson Harashima Precoding

In spatial THP a filter is used to compute a "good" perturbation vector. To this end, we make use of the Cholesky decomposition of the positive definite matrix $M_{error}$:

$$M_{error} = U^* D U,$$

where D is a diagonal matrix with positive entries and U is unit upper triangular. Using this decomposition, the expected error energy can be expressed as:

$$\text{expected error energy} = (U(x+v))^* D(U(x+v)) = z^* Dz = \sum_{n=1}^{L_u} D(n, n)|z(n)|^2,$$

where z=U(x+v). We note that minimizing the expected error energy is equivalent to minimizing the energy of the z entries, where:

$$z(L_u) = x(L_u) + v(L_u),$$

$$z(n) = x(n) + v(n) + \sum_{m=n+1}^{L_u} U(n, m)(x(m) + v(m)),$$

for n=1,2, . . . , $L_u$−1. Spatial THP iteratively choses a perturbation vector in the following way.

$$v(L_u) = 0$$

Suppose v(n+1), v(n+2), . . . , v($L_u$) have been chosen, then:

$$v(n) = -\mathcal{P}_{(2\mathbb{Z}+2j\mathbb{Z})}\left(x(n) + \sum_{m=n+1}^{L_u} U(n, m)(x(m) + v(m))\right)$$

where $\mathcal{P}_{(2\mathbb{Z}+2j\mathbb{Z})}$ denotes projection onto the coarse lattice. We note that by construction the coarse perturbation vector bounds the energy of the entries of z by two.

Figure 79:
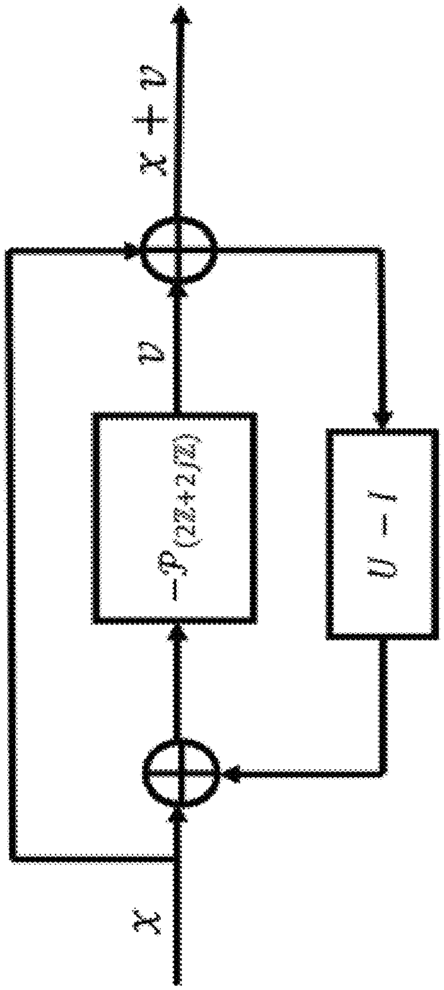
FIG. 79 is a block diagram illustrating an example spatial Tomlinson Harashima precoder (THP).

FIG. 79 displays a block diagram of spatial THP.

Simulation Results

We now present the results of a simple simulation to illustrate the use of spatial THP. Table 4 summarizes the simulation setup.

TABLE 4

| Simulation setup | |
|---|---|
| Number of hub antennas | 2 |
| Number of UEs | 2 (one antenna each) |
| Channel condition number | 10 dB |
| Modulation | PAM infinity (data uniformly disturbed on the interval [−1, 1]) |
| Data noise variance | −35 dB |
| Channel noise variance | −35 dB |

Figure 80:
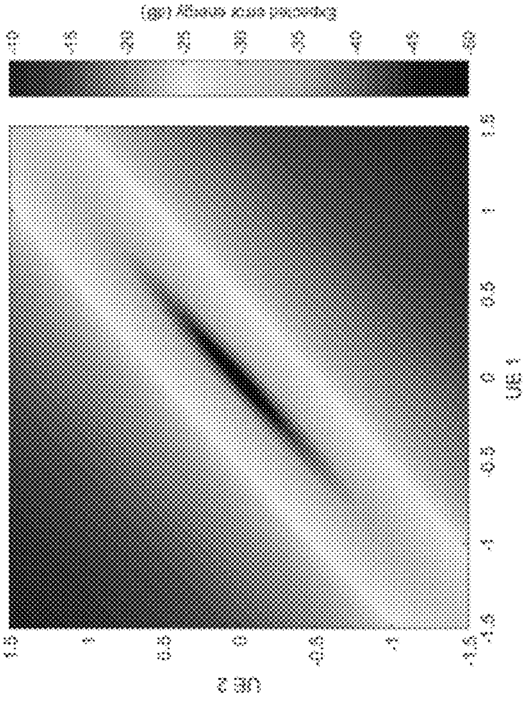
FIG. 80 is a spectral chart of the expected energy error for different exemplary pulse amplitude modulated (PAM) vectors.

FIG. 80 displays the expected error energy for different PAM vectors. We note two aspects of the figure.

The error energy is low when the signal transmitted to UE1 and UE2 are similar. Conversely, the error energy is high when the signals transmitted to the UEs are dissimilar. We can expect this pattern to appear when two UEs are spatially close together; in these situations, it is advantageous to transmit the same message to both UEs.

The error energy has the shape of an ellipses. The axes of the ellipse are defined by the eigenvectors of $M_{error}$.

Figure 81:
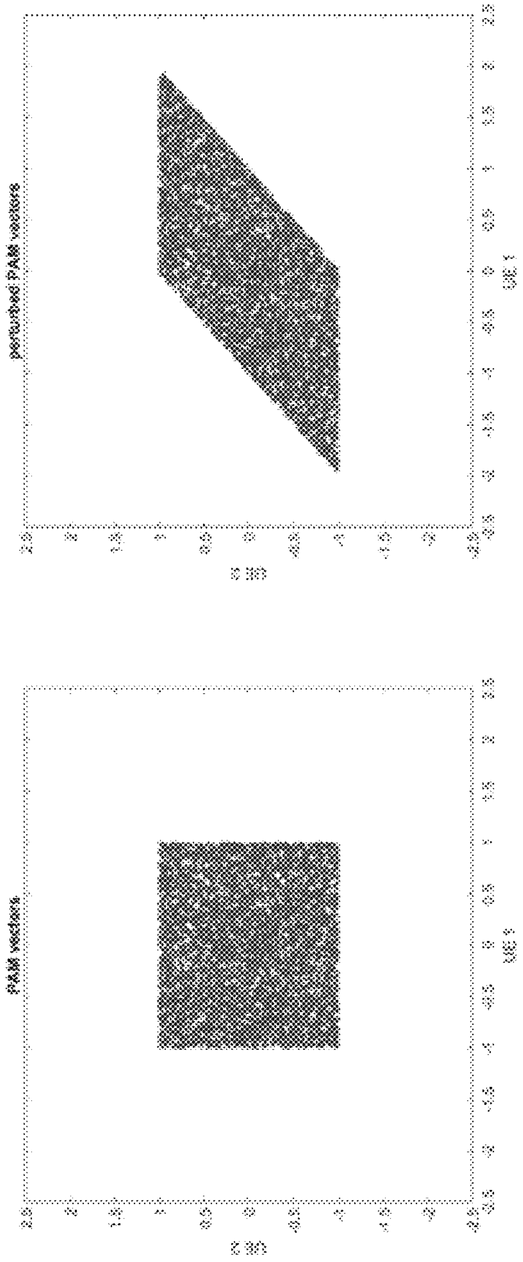
FIG. 81 is a plot illustrating an example result of a spatial THP.

A large number data of PAM vectors was generated and spatial THP was applied. FIG. 81 shows the result. Note that the perturbed PAM vectors are clustered along the axis with low expected error energy.

5. Channel Estimation for OTFS Systems

Figure 82:
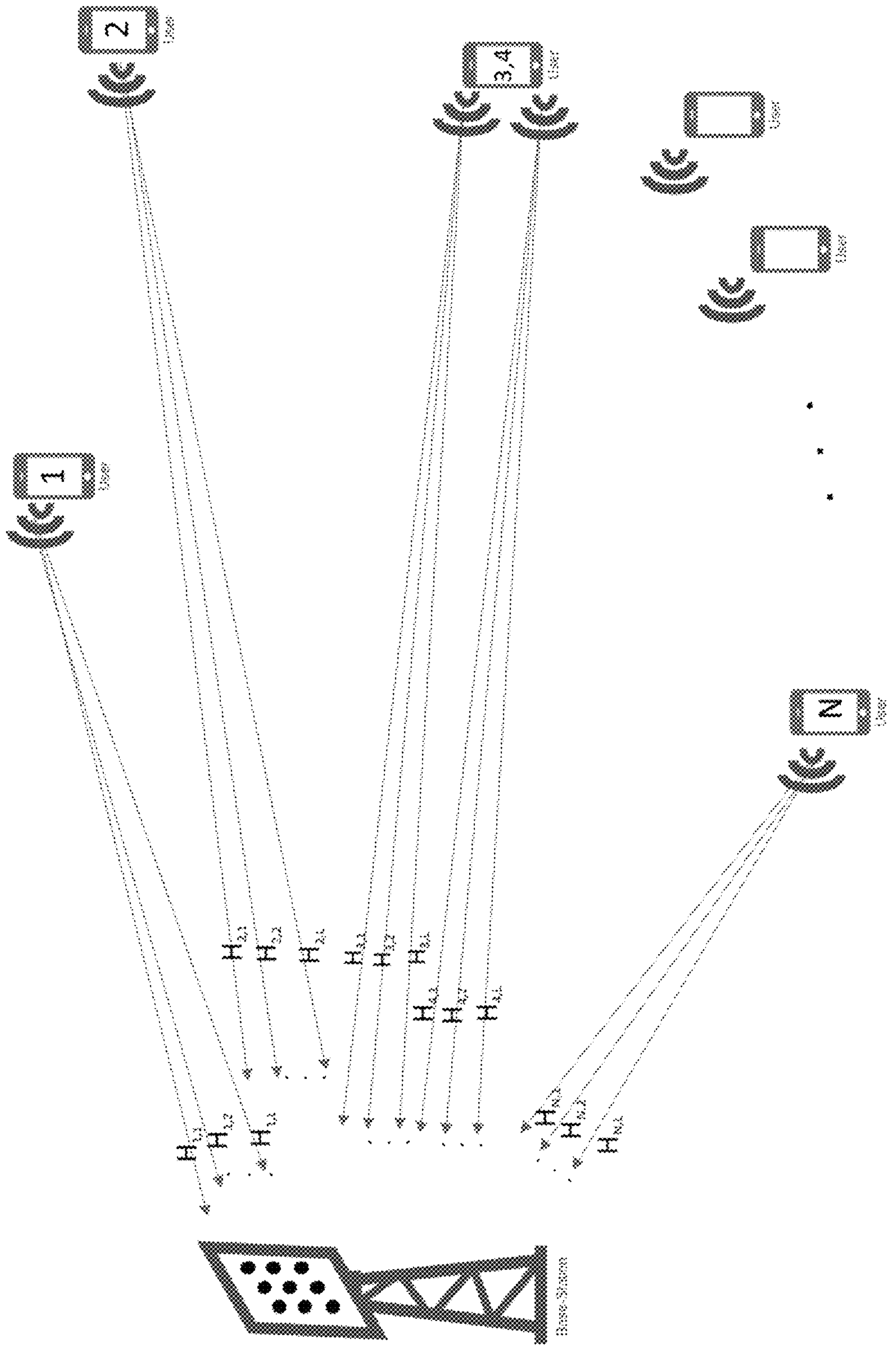
FIG. 82 shows an example of a wireless system including a base station with L antennas and multiple users.

This section overviews channel estimation for OTFS systems, and in particular, aspects of channel estimation and scheduling for a massive number of users. A wireless system, with a multi-antenna base-station and multiple user antennas, is shown in FIG. 82. Each transmission from a user antenna to one of the base-station antennas (or vice versa), experiences a different channel response (assuming the antennas are physically separated enough). For efficient communication, the base-station improves the users' received Signal-to-Interference-Noise-Ratio (SINR) by means of precoding. However, to precode, the base-station needs to have an accurate estimation of the downlink channels to the users during the transmission time.

In some embodiments, and when the channels are not static and when the number of users is very large, some of the challenges of such a precoded system include:

Accurately and efficiently estimating all the required channels

Predicting the changes in the channels during the downlink transmission time

Typical solutions in systems, which assume a low number of users and static channels, are to let each user transmit known pilot symbols (reference signals) from each one of its antennas. These pilots are received by all the base-station antennas and used to estimate the channel. It is important that these pilot symbols do not experience significant interference, so that the channel estimation quality is high. For this reason, they are typically sent in an orthogonal way to other transmissions at the same time. There are different methods for packing multiple pilots in an orthogonal (or nearly-orthogonal) way, but these methods are usually limited by the number of pilots that can be packed together (depending on the channel conditions) without causing significant interference to each other. Therefore, it becomes very difficult to have an efficient system, when the number of user antennas is high and the channels are not static. The amount of transmission resources that is needed for uplink pilots may take a considerable amount of the system's capacity or even make it unimplementable. For prediction of the channel, it is typically assumed that the channel is completely static and will not change from the time it was estimated till the end of the downlink transmission. This assumption usually causes significant degradation in non-static channels.

It is assumed that the downlink and uplink channels are reciprocal and after calibration it is possible to compensate for the difference in the uplink-downlink and downlink-uplink channel responses.

Embodiments of the disclosed technology include a system and a method for packing and separating multiple non-orthogonal pilots, as well as a method for channel prediction. In such a system, it is possible to pack together a considerably higher number of pilots comparing to other commonly used methods, thus allowing an accurate prediction of the channel for precoding.

Second-Order Training Statistics

The system consists of a preliminary training step, in which all users send uplink orthogonal pilots to the base-station. Although these pilots are orthogonal, they may be sent at a very low rate (such as one every second) and therefore do not overload the system too much. The base-station receives a multiple of $N_{SOS}$ such transmissions of these pilots, and use them to compute the second-order statistics (covariance) of each channel.

Figure 83:
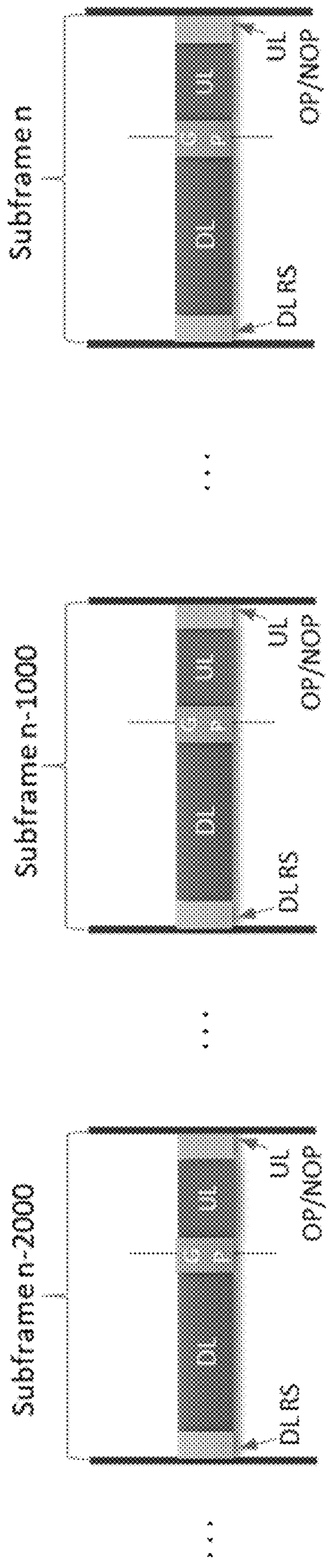
FIG. 83 shows an example of a subframe structure that can be used to compute second-order statistics for training.

FIG. 83 shows an example of such a system, where a subframe of length 1 msec consists of a downlink portion (DL), a guard period (GP) and an uplink portion (UL). Some of the uplink portion is dedicated to orthogonal pilots (OP) and non-orthogonal pilots (NOP). Each specific user is scheduled to send on these resources its pilots every 1000 subframes, which are equivalent to 1 sec. After the reception of $N_{SOS}$ subframes with pilots (equivalent to $N_{SOS}$ seconds), the base-station will compute the second-order statistics of this channel.

The computation of the second-order statistics for a user antenna u is defined as:

For each received subframe $i=1, 2, \ldots, N_{SOS}$ with orthogonal pilots and for each one of the L base-station receive antennas—estimate the channel along the entire frequency band ($N_f$ grid elements) from the pilots and store it as the i-th column of the matrix $H^{(u)}$ with dimensions $(N_f \cdot L) \times N_{SOS}$.

Compute the covariance matrix $R_{HH}^{(u)}=(H^{(u)})^H H^{(u)}$, where $(\bullet)^H$ is the Hermitian operator.

For the case that the channel $H^{(u)}$ is non-zero-mean, both the mean and the covariance matrix should be determined.

To accommodate for possible future changes in the channel response, the second-order statistics may be updated later, after the training step is completed. It may be recomputed from scratch by sending again $N_{SOS}$ orthogonal pilots, or gradually updated. One possible method may be to remove the first column of $H^{(u)}$ and attach a new column at the end and then re-compute the covariance matrix again.

The interval at which these orthogonal pilots need to be repeated depends on the stationarity time of the channel, e.g., the time during which the second-order statistics stay approximately constant. This time can be chosen either to be a system-determined constant, or can be adapted to the environment. In particular, users can determine through observation of downlink broadcast pilot symbols changes in the second-order statistics, and request resources for transmission of the uplink pilots when a significant change has been observed. In another embodiment, the base-station may use the frequency of retransmission requests from the users to detect changes in the channel, and restart the process of computing the second-order statistics of the channel.

To reduce the computational load, it is possible to use principal component analysis (PCA) techniques on $R_{HH}^{(u)}$. We compute $\{\lambda^{(u)}\}$, the $K^{(u)}$ most dominant eigenvalues of $R_{HH}^{(u)}$, arranged in a diagonal matrix $D^{(u)}=\text{diag}(\lambda_1^{(u)}, \lambda_2^{(u)}, \ldots, \lambda_{K^{(u)}}^{(u)})$ and their corresponding eigenvectors matrix $V^{(u)}$. Typically, $K^{(u)}$ will be in the order of the number of reflectors along the wireless path. The covariance matrix can then be approximated by $R_{HH}^{(u)} \approx V^{(u)} \cdot D^{(u)} \cdot (V^{(u)})^H$.

Non-Orthogonal Pilots

The non-orthogonal pilots (NOP), $P^{(u)}$, for user antenna u, may be defined as a pseudo-random sequence of known symbols and of size $N_{NOP}$, over a set of frequency grid elements. The base-station can schedule many users to transmit their non-orthogonal pilots at the same subframe using overlapping time and frequency resources. The base-station will be able to separate these pilots and obtain a high-quality channel estimation for all the users, using the method describes below.

Define the vector Y of size $(L \cdot N_{NOP}) \times 1$, as the base-station received signal over all its antennas, at the frequency grid elements of the shared non-orthogonal pilots. Let $\tilde{V}^{(u)}$ be the eigenvectors matrix $V^{(u)}$ decimated along its first dimension (frequency-space) to the locations of the non-orthogonal pilots.

The base-station may apply a Minimum-Mean-Square-Error (MMSE) estimator to separate the pilots of every user antenna:

For every user antenna u, compute $$R_{YY}^{(u)} = \left[\tilde{V}^{(u)} \odot P^{(u)}\right] \cdot D^{(u)} \cdot \left[\tilde{V}^{(u)} \odot P^{(u)}\right]^H$$

$$R_{XY}^{(u)} = \tilde{V}^{(u)} \cdot D^{(u)} \cdot \left[\tilde{V}^{(u)} P \odot^{(u)}\right]^H$$

Herein, $\odot$ is defined as the element-by-element multiplication. For a matrix A and vector B, the $A \odot B$ operation includes replicating the vector B to match the size of the matrix A before applying the element-by-element multiplication.

If principal component analysis (PCA) is not used, the covariance matrices can be computed directly as:

$$R_{YY}^{(u)} = \left(P^{(u)}\left[P^{(u)}\right]^H\right) \odot R_{HH}^{(u)}$$

$$R_{XY}^{(u)} = \left(1\left[P^{(u)}\right]^H\right) \odot R_{HH}^{(u)}$$

For the set of user antennas shared on the same resources $u \in U$, compute $$R_{YY} = \sum_{u \in U} R_{YY}^{(u)}$$

and invert it. Note that it is possible to apply PCA here as well by finding the dominant eigenvalues of $R_{YY}$ ($D_{R_{YY}}$) and their corresponding eigenvectors matrix ($V_{R_{YY}}$) and approximating the inverse with $R_{YY}^{-1} \approx V_{R_{YY}} \cdot D_{R_{YY}}^{-1} \cdot (V_{R_{YY}})^H$.

For each user antenna u, compute the pilot separation filter $$C_P^{(u)} = R_{XY}^{(u)} \cdot R_{YY}^{-1}$$

For each user antenna u, separate its non-orthogonal pilots by computing $$H_{NOP}^{(u)} = C_P^{(u)} \cdot Y$$

Note that $H_{NOP}^{(u)}$ is the channel response over the frequency grid-elements of the non-orthogonal pilots for the L base-station received antennas. It may be also interpolated along frequency to obtain the channel response over the entire bandwidth.

Prediction Training

Figure 84:
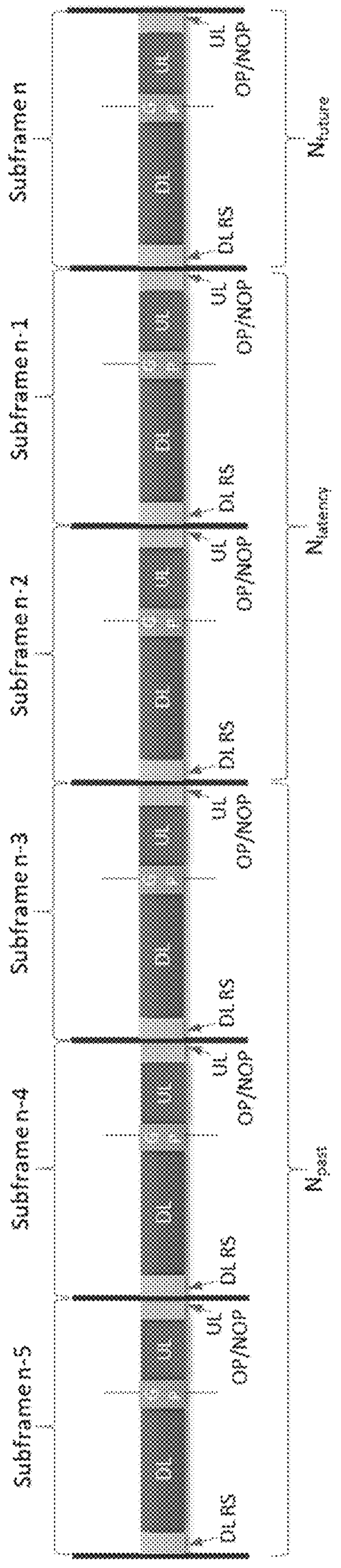
FIG. 84 shows an example of prediction training for channel estimation.

The method described in the previous section for separating non-orthogonal pilots is applied to train different users for prediction. In this step, a user sends uplink non-orthogonal pilots on consecutive subframes, which are divided to 3 different sections, as shown in the example in FIG. 84.

1. Past—the first $N_{past}$ subframes. These subframes will later be used to predict future subframes.
2. Latency—the following $N_{latency}$ subframes are used for the latency required for prediction and precoding computations.
3. Future—the last $N_{future}$ subframes (typically one), where the channel at the downlink portion will be later predicted.

Each user, is scheduled $N_{PR}$ times to send uplink non-orthogonal pilots on consecutive $N_{past}+N_{latency}+N_{future}$ subframes. Note that in one uplink symbol in the subframe, both orthogonal and non-orthogonal pilots may be packed together (although the number of orthogonal pilots will be significantly lower than the number of non-orthogonal pilots). The base-station applies the pilot separation filter for the non-orthogonal pilots of each user and computes $H_{NOP}^{(u)}$. To reduce storage and computation, the channel response may be compressed using the eigenvector matrix computed in the second-order statistics step $$H_K^{(u)} = \left(\tilde{V}^{(u)}\right)^H \cdot H_{NOP}^{(u)}$$

For subframes, which are part of the "Past" section, store $H_K^{(u)}$ as columns in the matrix $H_{past,(i)}^{(u)}$, where $i=1,2, \ldots, N_{PR}$. Use all or part of the non-orthogonal pilots to interpolate the channel over the whole or part of the downlink portion of the "Future" subframes, compress it using $\tilde{V}^{(u)}$ and store it as $H_{future,(i)}^{(u)}$. Compute the following covariance matrices:

$$R_{past,(i)}^{(u)} = H_{past,(i)}^{(u)} \cdot \left(H_{past,(i)}^{(u)}\right)^H$$

$$R_{future,(i)}^{(u)} = H_{future,(i)}^{(u)} \cdot \left(H_{future,(i)}^{(u)}\right)^H$$

$$R_{future\_past,(i)}^{(u)} = H_{future,(i)}^{(u)} \cdot \left(H_{past,(i)}^{(u)}\right)^H$$

After all $N_{PR}$ groups of prediction training subframes have been scheduled, compute the average covariance matrices for each user $$R_{past}^{(u)} = \frac{1}{N_{PR}} \sum_{i=1}^{N_{PR}} R_{past,(i)}^{(u)}$$

$$R_{future}^{(u)} = \frac{1}{N_{PR}} \sum_{i=1}^{N_{PR}} R_{future,(i)}^{(u)}$$

$$R_{future\_past}^{(u)} = \frac{1}{N_{PR}} \sum_{i=1}^{N_{PR}} R_{future\_past,(i)}^{(u)}$$

Finally, for each user compute the MMSE prediction filter $$C_{PR}^{(u)} = R_{future\_past}^{(u)} \cdot \left(R_{past}^{(u)}\right)^{-1}$$

and its error variance for the precoder $$R_E^{(u)} = R_{future}^{(u)} - C_{PR}^{(u)} \cdot \left(R_{future\_past}^{(u)}\right)^H.$$

Scheduling a Downlink Precoded Transmission

Figure 85:
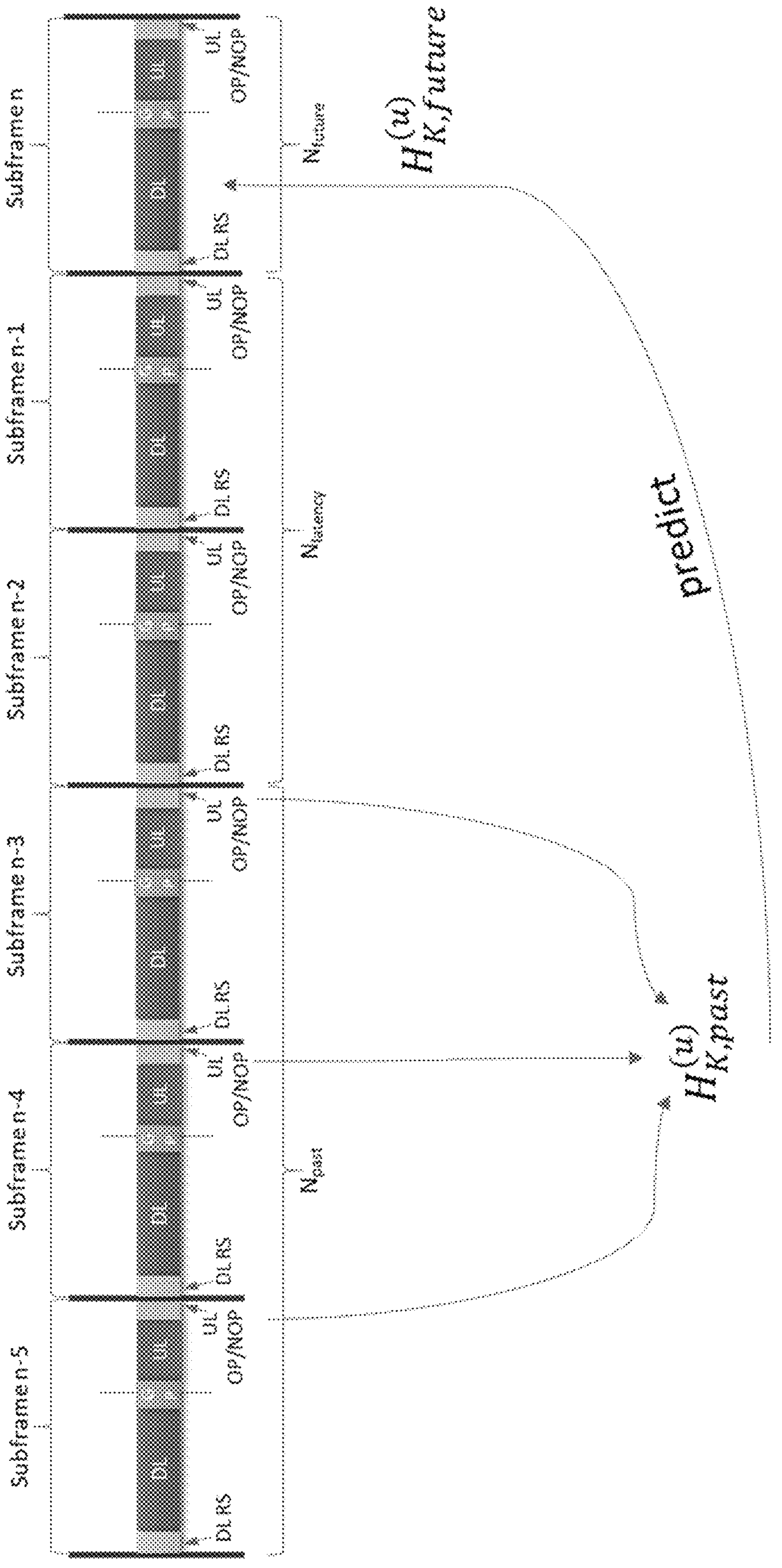
FIG. 85 shows an example of prediction for channel estimation.

For each subframe with a precoded downlink transmission, the base-station should schedule all the users of that transmission to send uplink non-orthogonal pilots for $N_{past}$ consecutive subframes, starting $N_{past}+N_{latency}$ subframes before it, as shown in FIG. 85. The base-station will separate the non-orthogonal pilots of each user, compress it and store the channel response as $H_{K,past}^{(u)}$. Then, it will apply the prediction filter to get the compressed channel response for the future part $$H_{K,future}^{(u)} = C_{PR}^{(u)} \cdot H_{K,past}^{(u)}$$

Finally, the uncompressed channel response is computed as $$H_{future}^{(u)} = \tilde{V}^{(u)} \cdot H_{K,future}^{(u)}$$

The base-station may correct for differences in the reciprocal channel by applying a phase and amplitude correction, α(f), for each frequency grid-element $$H_{future\_reciprocity}^{(u)}(f) = \alpha(f) \cdot H_{future}^{(u)}(f)$$

Then, use $H_{future\_reciprocity}^{(u)}$ and $R_E^{(u)}$ of the participating users to compute the precoder for the downlink transmission.

Scheduling of the Uplink Pilots

If during a frame there are multiple orthogonal resources available for pilot transmission (e.g., different timeslots or different frequency grid elements), then the set of uplink pilots that needs to be transmitted can be divided into sets such that each set is transmitted on a different resource. The criterion of for the division into sets can be, e.g., the achievable pilot SINR. The transmission of non-orthogonal pilots leads to a reduction in the achievable pilot SINR, which is the more pronounced the stronger the alignment of the vector spaces containing the correlation matrices from different users is. Thus, arranging users in sets such that two pilots with very similar correlation matrices are not transmitted at the same time improves performance. However, other criteria are possible as well. For example, for users that have only a low SINR during data transmission, achieving a high pilot SINR might be wasteful; thus, achieving an optimal "matching" of the pilot SINR to the data SINR might be another possible criterion.

The embodiments of the disclosed technology described in this section may be characterized, but not limited, by the following features:

- A wireless system in which a network node performs precoded downlink transmissions, which support a massive number of users, consisting of channel prediction, reciprocity adjustment and precoding, based on the second-order statistics of the channels.
- A system including a mix of uplink orthogonal pilots and non-orthogonal pilots.
- Computing the second-order statistics of a channel based on orthogonal pilots.
- Separating non-orthogonal pilots from multiple users, using second-order statistics and computation of channel estimation.
- Training for prediction of channel estimates.
- Scheduling non-orthogonal uplink pilots based on second-order statistics.
- Compressing channel responses using PCA

6. Pilot Scheduling to Reduce Transmission Overhead

This section covers scheduling pilots to reduce transmission overhead and improve the throughput of a wireless communication system. One possible FWA system design is based on separating users based on their angular power spectra. For example, users can operate in parallel if they do not create "significant" interference in each other's "beams." A beam may for example be a Luneburg beam. A precoding vector can also be associated with a beam pattern. However, for ease of explanation, the word "precoder pattern" is used in the present description. Consider as an example a system with 8 beams in a 90-degree sector, such that any two adjacent beams have overlapping beam patterns, while beams whose difference of indices is at least 2 are orthogonal to each other. If there is a pure line of sight (LoS), or a small angular spread around the LoS direction, then a spatial reuse factor of 2 may be possible. For example, beams 1, 3, 5, and 7 can operate in parallel (and similarly beam 2, 4, 6, 8). However, most channels provide a larger angular spread than can be handled by such a configuration, so that only beams with a wider angular separation may use the same time/frequency resources; e.g., a reuse factor on the order of 4 may be achieved. This means that only 2 users can operate on the same time-frequency resources within one sector, so that the overall performance gain compared to traditional systems is somewhat limited.

Considerably better spatial reuse can be achieved when the user separation is based on instantaneous channel state information, using joint receive processing of the multiple beam signals, and joint precoding, for the uplink and downlink, respectively. To take the example of the uplink, with N antenna (beam) ports, N signals can be separated, so that N users can be active at the same time (and analogously for the downlink). The simplest way to achieve this is zero-forcing, though it may suffer from poor performance in particular if users are close together (in mathematical terms, this occurs if their channel vectors are nearly linearly dependent). More sophisticated techniques, such as turbo equalization in the uplink, and Tomlinson-Harashima Precoding (THP) in the downlink can improve the performance further. Such implementations can increase signal to interference plus noise ratio (SINR) for the users, though they may not increase the degrees of freedom.

However, while these methods have great advantages, they rely on the knowledge of the instantaneous channel state information (CSI) for the processing, while the beam-based transmission can be performed simply by the time-averaged (for FWA) or second order (for mobile) systems CSI. The problem is aggravated by two facts:

1) while N users can be served in parallel (since they are separated by their different instantaneous CSI), the pilots cannot be separated this way (because the CSI is not yet known when the pilots are transmitted—it is a "chicken and egg" problem). Thus, pilots can be separated based on their average or second-order statistics.
2) OTFS modulation may have a higher pilot overhead compared to, e.g., OFDMA, because of the spreading of the information over the whole time-frequency plane, such that each user attempts to determine the CSI for the whole bandwidth.

Example System Model and Basic Analysis

A. Assumptions for the Analysis

An example system is described and for ease of explanation, the following assumptions are made:

1) Luneburg lens with 8 beams. Adjacent beams have overlap, beams separated by at least 1 other beam have a pattern overlap separation of better than 30 dB. However, in general, any number of beams may be used.
2) For the uplink, no use of continuous pilots. Channels might be estimated either based on the pilots embedded in the data packets. Alternatively, placing a packet in a queue for, say 4 ms, to allow transmission of uplink pilots before the transmission of data can improve channel estimation performance.
3) For the downlink, every UE observes broadcast pilots, which, in this example, are sent periodically or continuously, and extrapolates the channel for the next downlink frame. It then might send this information, in quantized form, to the BS (for the case that explicit channel state feedback is used).
4) The discussion here only considers the basic degrees of freedom for the pilot tones, not the details of overhead associated with delay-Doppler versus time-frequency multiplexing. In some implementations, both may give approximately the same overhead.
5) A frame structure with 1 ms frame duration is used. Different users may transmit in different frames. It is assumed that in the uplink and for the precoded pilots of the downlink, two pilots are transmitted per user, one at the beginning of the frame, and one at the end of the frame, so that interpolation can be done. For the broadcast pilots in the downlink, this may not be done, since it will be transmitted once per frame anyway, so that interpolation and extrapolation is implicitly possible.
6) A system bandwidth of 10 MHz is assumed.

B. Efficiency of an Example System

The following presents a first example calculation of the pilot overhead when the pilots in all beams are kept completely orthogonal. For the example, first compute the degrees of freedom for the pilot for each user. With 10 MHz bandwidth and 1 ms frame duration, and two polarizations, there are in general 10,000 "resolvable bins" (degrees of freedom) that can be used for either data transmission or pilot tone transmission. The propagation channel has 200 degrees of freedom (resolvable delay bin 100 ns and 5 microseconds maximum excess delay means 50 delay coefficients characterize the channel, plus two resolvable Doppler bins within each channel, on each of two polarizations). Thus, the pilot tones for each user constitute an overhead of 2% of the total transmission resources. Due to the principle of OTFS of spreading over the whole system bandwidth and frame duration, the pilot tone overhead does not depend on the percentage of resources assigned to each user, but is a percentage of taken over all resources. This implies a high overhead when many users with small number of bytes per packet are active.

If completely orthogonalizing the users in the spatial and polarization domains, then the pilot overhead gets multiplied with the number of beams and polarizations. In other words, reserve a separate delay-Doppler (or time-frequency) resource for the pilot of each beam, which ensures that there is no pilot contamination. The broadcast pilots in the downlink need therefore 16% of the total resources (assuming communication in a sector) or 64% (for a full circular cell). The following examples will mostly concentrate on a single sector.

Similarly, for the uplink pilots, orthogonal pilots may be used for each of the users, in each of the beams. This results in a 16% overhead per user; with multiple users, this quickly becomes unsustainable.

The overhead for digitized feedback from the users can also be considerable. Since there are 200 channel degrees of freedom, quantization with 24 bit (12 bits each on I and Q branch) results in 4.8 Mbit/s for each user. Equivalently, if assuming on average 16 QAM (4 bit/s/Hz spectral efficiency), 1200 channel degrees of freedom are used up for the feedback of quantized information from a single user. This implies that the feedback of the digitized information is by a factor 6 less spectrally efficient than the transmission of an analog uplink pilot whose information can be used. Furthermore, the feedback is sent for the channel state information (CSI) from each BS antenna element to the customer premises equipment (CPE) or user device. Even though the feedback can be sent in a form that allows joint detection, in other words, the feedback info from users in different beams can be sent simultaneously, the overall effort for such feedback seems prohibitively large.

In addition, it is useful to consider the overhead of the embedded pilots for the downlink, where they are transmitted precoded in the same way as the data, and thus are used for the demodulation. By the nature of zero-forcing precoding, pilots can be transmitted on each beam separately. Thus, the overhead for the embedded downlink pilots is about 2% of the resources times the average number of users per beam.

For explicit feedback, there is yet another factor to consider, namely the overhead for the uplink pilots that accompany the transmission of the feedback data. This tends to be the dominant factor. Overhead reduction methods are discussed in the next section.

Overhead Reduction Methods

From the above description, it can be seen that overhead reduction is useful. The main bottlenecks indeed are the downlink broadcast pilots and the uplink pilots, since these pilots have to be sent on different time-frequency (or delay/Doppler) resources in different beams. However, under some circumstances, overhead reduction for the feedback packets is important as well. Before going into details, it is worth repeating why transmitters cannot transmit pilots on all beams all the time. Neither the UL pilots nor the broadcast DL pilots are precoded. To separate the pilots from/to different users, transmitters would have to beamform, but in order to beamform, a transmitter should know the channel, e.g., have decided pilots. Thus, a continuous transmission of pilots leads to "pilot contamination", e.g., the signals from/to users employing the same pilots interfere with each other and lead to a reduced pilot SINR. Since the pilot quality determines the capability of coherently decoding the received data signal, reduction of the pilot SINR is—to a first approximation—as detrimental as reduction of the data SINR. While countermeasures such as joint equalization and decoding are possible, they greatly increase complexity and still result in a performance loss.

One effective method of reducing pilot contamination is minimum mean square error (MMSE) filtering, which achieves separation of users with the same pilot tones by projection of the desired users' pilot onto the null-space of the channel correlation matrix of the interfering user. This reduces interference, though at the price of reduced signal power of the desired user. This method can be combined with any and all of the methods described below, and, in some situations, such a combined method will achieve the best performance. In some embodiments, linearly dependent pilot tones for the different users (instead of sets of users that use the same pilots within such a set, while the pilots in different sets are orthogonal to each other) may be used. Again, such a whitening approach can be used in conjunction with the methods described here.

A. Pilot Scheduling

The previous derivations assumed that the downlink broadcast and uplink pilots in different beams are on orthogonal resources, in order to reduce the overhead. Such an arrangement may not be needed when the angular spectra of the users are sufficiently separated. The simplest assumption is that each user has only a very small angular spread; then users that are on beams without overlaps (beam 1,3,5, . . . etc.) can be transmitted simultaneously. For a larger angular spread, a larger spacing between the beams is used. Still, if, e.g., every 4th beam can be used, then the overall overhead for the downlink broadcast pilots reduces, e.g., from 32% to 16% in one sector. Equally importantly, the overhead remains at 16% when moving from a sector to a 360 degree cell.

However, this consideration still assumes that there is a compact support of the angular power spectrum, and there is no "crosstalk", e.g., between a beam at 0 degree and one at 60 degree. Often, this is not the case. In the presence of scattering objects, the sets of directions of contributions from/to different user devices can be quite different, and not simply a translation (in angle domain) of each other. If simply basing the beam reuse on the "worst case", one might end up with complete orthogonalization. Thus, for every deployment, it is useful to assess individually what the best pattern is for a spatial reuse of the pilots. This is henceforth called "pilot scheduling".

Before describing some examples of pilot scheduling embodiments, note that it is based on the knowledge of the power transfer matrix (PTM). The PTM may be a K×M matrix, where M is the number of beams at the BS, and K is the number of UEs. The (l,j)th entry of the PMT is then the amount of power (averaged over small-scale fading or time) arriving at the j-th beam when the i-th UE transmits with unit power (one simplification we assume in this exemplary description is that the PTM is identical for the two polarizations, which is reasonable, e.g., when there is sufficient frequency selectivity such that OTFS averages out small-scale fading over its transmission bandwidth; in any case generalization to having different PMT entries for different polarization ports is straightforward). For example, in the uplink, the receiver (base station) should know when a particular user transmits a pilot tone, in which beams to anticipate appreciable energy. This might again seem like a "chicken and egg" problem, since the aim of the pilot transmission is to learn about the channel between the user and the BS. However, the PTM is based on the knowledge of the average or second order channel state information (CSI). Since this property of a channel changes very slowly (on the order of seconds for mobile systems, on the order of minutes or more for FWA), learning the PTM does not require a significant percentage of time-frequency resources. While provisions should be taken in the protocol for suitable mechanisms, those pose no fundamental difficulty, and the remainder of the report simply assumes that PTM is known.

1) Pilot scheduling for the uplink: as mentioned above, the PTM contains information about the amount of power that is transferred from the ith user to the jth beam. Now, given the PTM, the question is: when can two uplink pilots be transmitted on the same time-frequency resources?

The answer may depend on the subsequent data transmission, for example, if the criterion is: "is the loss of capacity resulting from the imperfect beamforming vectors is less than the spectral efficiency gain of the reduced pilot overhead". Conventional techniques do not consider such a criterion. This aspect of inquiry can be used in many advantageous ways:

a) It is not necessary to have highly accurate (contamination-free) pilots if the subsequent data transmission uses a low-order QAM anyways.

b) The pilot scheduling depends on the receiver type. First, different receivers allow different modulation schemes (even for the same SINR). Second, a receiver with iterative channel estimation and data decoding might be able to deal with more pilot contamination, since it processes the decoded data (protected by forward error correction FEC) to improve the channel estimates and reduce contamination effects.

c) The pilot scheduling, and the pilot reuse, may change whenever the transmitting users change. A fixed scheduling, such as beams 1,5,9, . . . etc. may be highly suboptimum.

d) Given the high overhead for uplink pilots, allowing considerable pilot contamination, and use of associated low SINR and modulation coding scheme (MCS), is reasonable, in particular for small data packets.

e) For an FWA system, it may be reasonable to allow uplink transmission without embedded pilots, basing the demodulation solely on the average channel state. However, due to the clock drift, a few pilots for phase/timing synchronizations may still be used, but no pilots may be used for channel re-estimation. For those short packets, a reduced-order MCS may be used. Alternatively, the short packets could be transmitted on a subband of the time-frequency resources, where the subband could even be selected to provide opportunistic scheduling gain.

The optimum scheduler may be highly complicated, and may change whenever the combination of considered user devices changes. Due to the huge number of possible user combinations in the different beams, it may not even possible to compute the optimum scheduler for each combination in advance and then reuse. Thus, a simplified (and suboptimum) scheduler may have to be designed.

2) Pilot scheduling for the downlink: The scheduler for the downlink broadcast pilots has some similarities to the uplink pilots, in that it is based on the PTM. However, one difference is worth noting: the scheduler has to provide acceptable levels of pilot contamination for all users in the system, since all users are monitoring the broadcast pilots and extrapolate the channel in order to be able to feed back the extrapolated channel when the need arises. Thus, the reuse factor of the broadcast pilots may be large (meaning there is less reuse) than for the uplink pilots. For the computation of the pilot schedule, a few things may be taken into account:

a) the schedule may only be changed when the active user devices change, e.g., a modem goes to sleep or wakes up. This happens on a much rarer basis than the schedule change in the uplink, which happens whenever the actually transmitting user devices change.

b) In the downlink pilots, it may not be exactly known what pilot quality will be required at what time (e.g., the required SINR), since the transmitting user schedule is not yet known (e.g., when the pilots are transmitted continuously). Thus, it may be assumed that data transmission could occur without interference (e.g., all other beams are silent because there are no data to transmit), so that the data transmission for the user under consideration happens with the MCS that is supported by the SNR.

c) It is possible that one (or a few) user devices become a "bottleneck", in the sense that they require a large reuse factor when all other users might allow dense reuse. It is thus useful to consider the tradeoff of reducing the pilot quality to these bottleneck user devices and reducing the MCS for the data transmission, as this might lead to an increase of sum spectral efficiency, and may be performed by taking minimum (committed) service quality constraints into account.

Since broadcast pilots are always transmitted from the BS, and can be only either transmitted or not transmitted (there is no power control for them), the number of possible combinations is manageable (2^8), and it is thus possible to compute the SINR at all users in the cell for all pilot schedules, and check whether they result in acceptable SNR at all users, and pick the best one. As outlined above, there is no need to recompute the schedule, except when the set of active user devices changes. When considering a combination of this scheme with MMSE receivers, scheduling should be based on the SINR that occurs after the MMSE filtering.

B. Exploiting the Properties of FWA

One way for reducing the overhead is to exploit the special properties of FWA channels, namely that the instantaneous channel is the average channel plus a small perturbation. This can be exploited both for reducing the reuse factor, and for more efficient quantization.

1) Reducing the reuse factor: The goal of the pilot tones is to determine the CSI for each user device with a certain accuracy. Let us consider the uplink: for the i-th user in the j-th beam, the CSI can be written as $H^{av}_{ij}+\Delta H_{ij}$; the power ratio $(\Delta H_{ij}/H^{av}_{ij})^2$ is the temporal Rice factor for this particular link $K_{ij}$. Now any pilot contamination based on $H^{av}_{ij}$ is known and can be eliminated by interference cancellation. Thus, denoting the kj-th entry of the PTM $C_{kj}$, then a naïve assessment of the pilot contamination would say that the achievable pilot SIR in the j-th beam is $C_{ij}/C_{kj}$. However, by first subtracting the known contribution $H^{av}_{kj}$ from the overall received signal, $K_{kj}C_{ij}/C_{kj}$ can be achieved. Having thus improved the SIR for each user, the system can employ a much smaller reuse factor (that is, reduce overhead). In practice this method can probably reduce the reuse factor by about a factor of 2. The same approach can also be applied in the downlink. The improvement that can be achieved will differ from user device to user device, and the overall reuse factor improvement will be determined by the "bottleneck links" (the ones requiring the largest reuse factor). Some embodiments can sacrifice throughput on a few links if that helps to reduce the pilot reuse factor and thus overhead, as described above. When combining this method with MMSE filtering, the procedure may occur in two steps: first, the time-invariant part of the channel is subtracted. The time-variant part is estimated with the help of the MMSE filtering (employing the channel correlation matrix of the time-variant part), and then the total channel is obtained as the sum of the time-invariant and the thus-estimated time-variant channel.

2) Improved quantization: Another question is the level of quantization that is to be used for the case that explicit feedback is used. Generally, the rule is that quantization noise is 6 dB for every bit of resolution. The 12 bit resolution assumed above for the feedback of the CSI thus amply covers the desired signal-to-quantization-noise ratio and dynamic range. However, in a fixed wireless system, implementations do not need a large dynamic range margin (the received power level stays constant except for small variations), and any variations around the mean are small. Thus, assume a temporal Rice factor of 10 dB, and an average signal level of −60 dBm. This means that the actual fluctuations of the signal have a signal power of −70 dBm. 4-bit quantization provides −24 dB quantization noise, so that the quantization noise level is at −94 dBm, providing more than enough SIR. Embodiments can thus actually reduce the amount of feedback bits by a factor of 3 (from 12-bit as assumed above to 4 bits) without noticeable performance impact.

3) Adaptivity of the methods: The improvements described above use the decomposition of the signal into fixed and time-varying parts, and the improvements are the larger the larger the temporal Rice factor is. Measurements have shown that the temporal Rice factor varies from cell to cell, and even UE to UE, and furthermore might change over time. It is thus difficult to determine in advance the reduction of the reuse factor, or the suitable quantization. For the reduction of the reuse factor, variations of the Rice factor from cell to cell and between user devices such as UEs can be taken care of as a part of the pilot scheduling design, as described above. Changes in the temporal Rice factor (e.g., due to reduced car traffic during nighttime, or reduction of vegetation scatter due to change in wind speed) might trigger a new scheduling of pilots even when the active user set has not changed. For the quantization, the protocol should not contain a fixed number of quantization bits, but rather allow an adaptive design, e.g., by having the feedback packet denote in the preamble how many bits are used for quantization.

C. Reduction Methods for Small Packet Size

The most problematic situation occurs when a large number of users, each with a small packet, are scheduled within one frame. Such a situation is problematic no matter whether it occurs in the uplink or the downlink, as the pilot overhead in either case is significant. This problem can be combatted in two ways (as alluded to above)

1) reduce the bandwidth assigned to each user. This is a deviation from the principle of full-spreading OTFS, but well aligned with other implementations of OTFS that can assign a subband to a particular user, and furthermore to various forms of OFDMA.

The two design trade-offs of the approach are that (i) it may use a more sophisticated scheduler, which now considers frequency selectivity as well, and (ii) it is a deviation from the simple transmission structure described above, where different users are designed different timeslots and/or delay/Doppler bins. Both of these issues might be solved by a multi-subband approach (e.g., 4 equally spaced subbands), though this may trade off some performance (compared to full OTFS) and retains some significant pilot overhead, since at least CSI in the 4 chosen subbands has to be transmitted.

2) transmit the small packets without any pilots, relying on the average CSI for suppression of inter-beam interference. It is noteworthy that for the downlink, an implementation can sacrifice SIR (due to pilot contamination) on some links without disturbing others. Imagine that precise CSI for UE j is available, while it is not available for UE k. An implementation can thus ensure that the transmission for k lies in the exact null-space of j, since the CSI vector hj=[$h_{1j}$; $h_{2j}$; . . . ] is known accurately, and thus its nullspace can be determined accurately as well. So, if the link to j wants to send a big data packet for which the use of a high-order MCS is essential, then the system can invest more resources (e.g., reduce pilot imprecision) for this link, and reap the benefits.

3) For the uplink, the approach 2 may not work: in order to have high SINR for the signal from the j-th user, it is advantageous to suppress the interference from all other users that are transmitting in parallel. Thus, instead one approach may be to provide orthogonalization in time/frequency (or delay/Doppler) between the group of users that needs low pilot contamination (usually large packets, so that the efficiency gain from transmitting pilots outweighs the overhead), and another group of users (the ones with small packets) that do not transmit pilots (or just synchronization pilots) and thus are efficient, yet have to operate with lower-order MCS due to the pilot contamination. It must be noted that methods 2 and 3 only work for FWA systems, where one can make use of the average CSI to get a reasonable channel estimate without instantaneous pilots. When migrating to a mobile system, it is recommended to move to approach 1.

Examples for the Achievable Gain

This section describes some examples of the gain that can be achieved by the proposed methods versus a baseline system. It should be noted that the gain will be different depending on the number of users, the type of traffic, and particularly the directional channel properties. There are examples where the simple orthogonalization scheme provides optimum efficiency, so that no gain can be achieved, and other examples where the gain can be more than an order of magnitude. The section will use what can be considered "typical" examples. Ray tracing data for typical environments and traffic data from deployed FWA or similar systems, for example, can be used to identify a typical or representative system.

A. Gain of Pilot Scheduling

One purpose of pilot scheduling is to place pilots on such time-frequency resources that they either do not interfere significantly with each other, or that the capacity loss by using more spectral resources for pilots is less than the loss one would get from pilot contamination. In a strictly orthogonal system, there is no pilot contamination, but 16% of all spectral resources must be dedicated to the downlink pilots, and a fraction 0.16*Nupb of the resources for the uplink pilots, where Nupb is the number of users per beam in the uplink. For a full 360 degree Cell, the numbers are 64% and 0.64*Nupb.

A possibly simplest form of pilot scheduling is just a reuse of the pilot in every P-th beam, where P is chosen such that the interference between two beams separated by P is "acceptable" (either negligible, or with a sufficiently low penalty on the capacity of the data stream). This scheme achieves a gain of 36/P in a completely homogeneous environment. For a suburban LoS type of environment, P is typically 4, so that the pilot overhead can be reduced by a factor of 9 (almost an order of magnitude) for a 360 degree cell. Equivalently, for the uplink pilots, the number of users in the cell can be increased by a factor of 9 (this assumes that the overhead for the uplink pilots dominates the feedback overhead, as discussed above).

Simple scheduling may work only in an environment with homogeneous channel and user conditions. It can be seen that a single (uplink) user with angular spread covering P0 beams would entail a change in the angular reuse factor to P0 (assuming that a regular reuse pattern for all users is used), thus reducing the achievable gain. The more irregular the environment, the more difficult it is to find a reasonable regular reuse factor, and in the extreme case, complete orthogonalization might be necessary for regular reuse patterns, while an irregular scheduling that simply finds the best combination of users for transmitting on the same spectral resources, could provide angular reuse factors on the order of 10. However, in an environment with high angular dispersion (e.g., microcell in a street canyon), where radiation is incident on the BS from all directions, even adaptive scheduling cannot provide significant advantages over orthogonalization.

In conclusion, pilot scheduling provides an order-of-magnitude reduction in pilot overhead, or equivalently an order of magnitude larger number of users that can be accommodated for a fixed pilot overhead, compared to full orthogonalization. Compared to simple (regular) pilot reuse, environment-adaptive scheduling retains most of the possible gains, while regular scheduling starts to lose its advantages over complete orthogonalization as the environment becomes more irregular.

B. Exploiting FWA Properties for Pilot Scheduling

The exploitation of FWA properties can be more easily quantified if we retain the same reuse factor P as we would have with a "regular" scheme, but just make use of the better signal-to-interference ratio of the pilots (e.g., reduced pilot contamination). As outlined in Sec. 3.2, the reduction in the pilot contamination is equal to the temporal Rice factor. Assuming 15 dB as a typical value, and assuming a high-enough SNR that the capacity of the data transmission is dominated by pilot contamination, the SINR per user is thus improved by 15 dB. Since 3 dB SNR improvement provide 1 bit/s/Hz increase in spectral efficiency, this means that for each user, capacity is increased by 5 bit/s/Hz. Assuming 32 QAM as the usual modulation scheme, an implementation can double the capacity through this scheme.

A different way to look at the advantages is to see how much the number of users per beam can be increased, when keeping the pilot SIR constant. This can depend on the angular spectrum of the user devices. However, with a 15 dB suppression of the interference, one can conjecture that (with suitable scheduling), a reuse factor of P=2, and possibly even P=1, is feasible. This implies that compared to the case where an implementation does not use this property, a doubling or quadrupling of the number of users is feasible (and even more in highly dispersive environments)

In summary, exploiting the FWA properties for pilot scheduling doubles the capacity, or quadruples the number of users C. Exploiting the FWA Properties for Reduction of Feedback Overhead As outlined above, exploiting the FWA properties allow to reduce the feedback from 12 bit to 4 bit, thus reducing overhead by a factor of 3. Further advantages can be gained if the time-variant part occurs only in the parts of the impulse response with small delay, as has been determined experimentally. Then the feedback can be restricted to the delay range over which the time changes occur. If, for example, this range is 500 ns, then the feedback effort is reduced by a further factor of 10 (500 ns/5 microsec). In summary, the reduction of the feedback overhead can be by a factor of 3 to 30.

7. Reciprocal Geometric Precoding

Embodiments of the disclosed technology include a method for applying MU-MIMO (Multi-User Multiple-In-Multiple-Out) in a wireless system. In MU-MIMO, a transmitter with multiple antennas (typically a cellular base-station) is transmitting to multiple independent devices (also referred to as UE-User Equipment), each having one or more receiving antennas, on the same time and frequency resources. To enable a receiving device to correctly decode its own targeted data, a precoder is applied to the transmitted signal, which typically tries to maximize the desired received signal level at the receiving device and minimize the interference from transmissions targeted to other devices. In other words, maximize the SINR (Signal to Interference and Noise Ratio) at each receiving device. The transmitted signal is arranged in layers, where each layer carries data to a specific user device.

Figure 86:
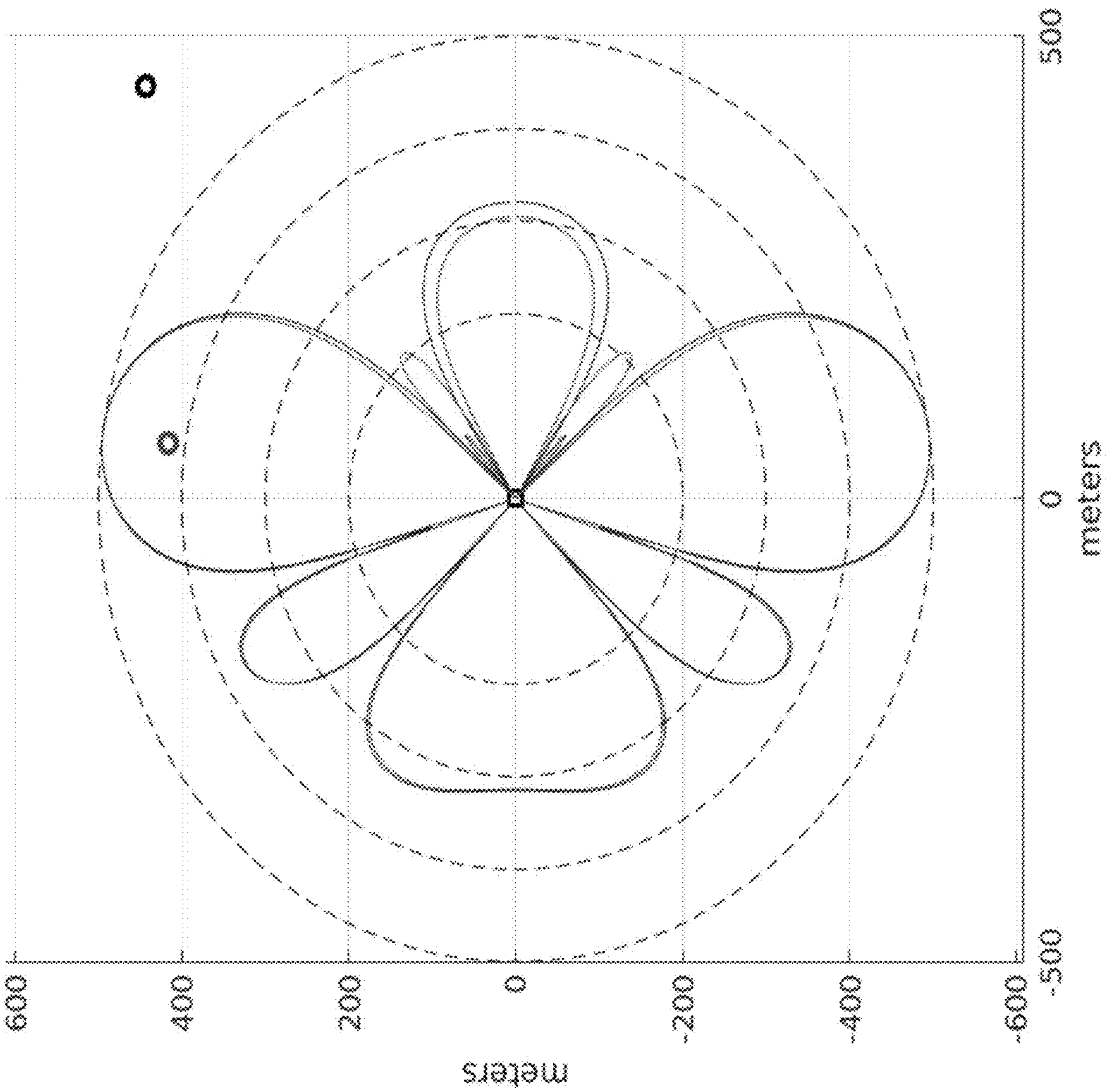
FIG. 86 shows an example transmission pattern using precoding in a communication network.

A spatial precoder is a precoder that operates in the spatial domain by applying in each layer different weights and phases to the transmission of each antenna. This shapes the wave-front of the transmitted signal and drives more of its energy towards the targeted device, while minimizing the amount of energy that is sent towards other devices. FIG. 86 shows an example of a spatial precoder.

To simplify the following description, without any loss of generality, the downlink transmitting device is referred to as the base-station (BS) and the downlink receiving device is referred to as the UE (see, for example, FIG. 1A).

Codebook-Based Precoding

In this technique there is a predefined set of known precoders, available for both BS and UE. Upon receiving a precoded transmission, a UE may blindly assume that each one of the precoders was used and try to decode the received signal accordingly. This method is not very efficient, especially when the codebook is large. Another approach is based on feedback. The UE analyzes a reception of a known reference signal by computationally applying different precoders from the codebook. The UE selects the precoder that maximizes its received SINR and sends a feedback to the BS, which one is the preferable precoder.

In some implementations, this technique has the following limitations:

(1) The codebook has a limited number of entries and therefore, may not have a good enough spatial resolution to optimally address all the cases of the targeted UE. Also, the computational complexity at the UE, grows when this codebook is large.

(2) Each UE selects the best precoder for itself, however, this precoder may not be optimal for other UEs. To address that, the BS needs to carefully selects the set of UE for each precoded transmission, in such a way, that their precoders are as orthogonal as possible. This imposes a heavy constraint on the scheduler at the BS, especially in scenarios with a large number of layers.

Precoding Based on Explicit Feedback

From the dirty paper coding theorem, we can derive that if all the channels from the BS antennas to the receiving UE antennas are known, we can optimally precode the transmission to all UE. The implementation of such a precoding scheme in a real system, is challenging and may require that the UE will send feedback to the BS on the received downlink channel. When the UE or any of the wireless channel reflectors are mobile, the feedback of the channel response may no longer represent the state of the channel, at the time the precoder is applied and prediction may also be required. Note, that this precoder, in some sense, tries to invert the channel.

Reciprocal Geometric Precoding

A wireless channel is a super-position of reflections. A geometric precoder is based on the geometry of these reflectors. This geometry tends to change relatively slow comparing to typical communication time scales. For example, considering the spatial domain, the Angle of Arrival (AoA) of the rays from the wireless reflectors (or directly from the UE) to the BS antennas, will be relatively constant in a time scale of tens of milliseconds and frequency independent. This is unlike the channel state, which is time and frequency dependent. The reciprocal property of the wireless channel allows us to use information about the channel obtained from uplink transmissions (UE to BS) for downlink precoded transmissions (BS to UE).

The geometric precoder, projects the transmission of each layer into a subspace, which is spanned by the reflectors of a specific user and orthogonal as much as possible to the reflectors of other layers. This subspace is time and frequency independent and relies solely on the geometry of the channel. The channel geometry is captured by means of a covariance matrix. The proposed technique may use uplink reference signals to compute the channel response at each one of the BS receiving antennas and the covariance matrix of these measurements.

For example, in an LTE/5G NR system, the BS may use the uplink Sounding Reference Signals (SRS) transmitted by a UE, or the uplink Demodulation Reference Signals (DMRS) to compute the channel response at different time and frequency resource elements and from them compute the spatial covariance matrix.

More formally, let i=1, . . . , K be a user (or layer) index and L represent the number of BS antennas. Let $H_i(f, t)$ be a complex column vector, representing the channel response at the L BS antennas, at time t=1, . . . , $N_t$ and frequency f=1, . . . , $N_f$. Note, that $N_t$ may be 1 and $N_f$ may also represent a small part of the used bandwidth. The L×L covariance matrix may be computed directly by $$R_i = \frac{1}{N_f \cdot N_t} \sum_{f,t} H_i(f, t) \cdot H_i^H(f, t)$$

Herein, $(\bullet)^H$ is the Hermitian operator, or indirectly using techniques like maximum likelihood (e.g., a Toeplitz maximum likelihood technique).

Finding the Vector Space

Let K represent the number of users for the precoded transmission and $R_i$ their uplink spatial covariance matrices. Let's also assume some normalized uplink power allocation for each user, denoted by $q_i \geq 0$ and satisfying, $\Sigma_{i=1}^{K} q_i = 1$.

The optimal uplink vector space, V_i^★, that spans the desired channels from the user to the BS and orthogonal to the channels from the other users, is the one that maximizes the SINR at the BS:

$$V_i^* = \underset{V_i}{\operatorname{argmax}} \left\{ \frac{q_i V_i^H R_i V_i}{\sum_{j \neq i} q_j V_i^H R_j V_i + N_0} \right\}$$

Herein, the enumerator term is the signal and the denominator terms are the interference and the additive noise variance.

Herein, $V_i^*$ can be directly computed as the maximum eigenvector of the following uplink SINR matrix:

$$SINR_i^{(UL)} = \left( \sum_{j \neq i} q_j R_j + N_0 I \right)^{-1} \cdot q_i R_i$$

Downlink Duality

Due to the reciprocal property of the wireless channel, the same vector space computed for the uplink can be used for downlink precoding as well. Therefore, by using just uplink reference signals, we can obtain the optimal vector space for the downlink. This is in contrasts to the explicit feedback method, which required actual channel state information of the downlink to be transmitted as data in the uplink, or the codebook-based precoding approach, which requires feedback of the selected precoder.

However, the selected uplink power allocation is not dual and therefore not optimal for the downlink. In the uplink, the BS receives, per layer, different channels and projects them all into a single vector space, whereas in the downlink the UE receives on the same channel, transmissions on different vector spaces.

In can be mathematically proven, that there exists a dual power allocation, $p_i \geq 0$ for the downlink, satisfying $\Sigma_{i=1}^{K} p_i = 1$, that can achieve the same SINR as the uplink:

$$SINR_i^{*(UL)} = \frac{q_i V_i^{*H} R_i V_i^*}{\sum_{j \neq i} q_j V_i^{*H} R_j V_i^* + N_0} = \frac{p_i V_i^{*H} R_i V_i^*}{\sum_{j \neq i} p_j V_j^{*H} R_i V_j^* + N_0} = SINR_i^{*(DL)}$$

Downlink Power Allocation

To compute the dual downlink power allocation, we define a user cross-interference matrix, $A_{K \times K}^{(DL)}$, with entries $$A_{i,j}^{(DL)} = \begin{cases} SINR_i^{*(UL)} \cdot \dfrac{N_0}{V_i^{*H} R_i V_i^*} & i = j \\ SINR_i^{*(UL)} \cdot \dfrac{\left(V_j^{*H} R_i V_j^* + N_0\right)}{V_i^{*H} R_i V_i^*} & i \neq j \end{cases}$$

Herein, i, j=1, . . . , K. Note, that a dual cross-interference matrix can be computed for the uplink as well.

It can be mathematically proven that the optimal power allocation for the downlink is derived from the normalized absolute value of the elements of the maximum eigenvector of $A^{(DL)}$, denoted by $V_{A^{(DL)}}$:

$$p_i = \frac{|V_{A^{(DL)}}(i)|}{\sum_i |V_{A^{(DL)}}(i)|}$$

Note, that this power allocation is statistically targeting equal SINR at each receiving UE. However, when scheduling users, a BS may adjust this power allocation to allow different SINRs for different UE, according to their downlink traffic requirements.

Precoder

The precoder for user i is computed as $$P_i = p_i \cdot conj(V_i^*)$$

Examples of Reference Signals

This precoder, which projects the transmitted signal into different vector spaces, does not "invert" the channel and the UE must equalize the channel. Therefore, the UE must receive precoded reference signals as well along with the precoded data. The reference signals may be one of the conventional reference signals, such as a demodulation reference signal or a sounding reference signal. Alternatively, or in addition, a new reference signal may be used for facilitating the computations described herein.

Scheduling

When the number of available users for precoded downlink transmission is larger than K, the BS may want to specifically select K users that are spatially separated as much as possible. The BS may use the spatial covariance matrices, $R_i$, to determine this set of users.

Example Procedure

One example procedure for computing a reciprocal geometric precoder is as follows:

(1) Choose an uplink power allocation (may be simply a uniform allocation, $q_i=1/K$).

(2) For each user i, receive uplink reference signals and compute channel response $H_i(f, t)$ (3) For each user i, from the received channel response, compute covariance matrix $R_i$ (4) For each user i, compute uplink SINR matrix, $SINR_i^{(UL)}$, and find its maximum eigenvector $V_i^*$ (5) Compute downlink user cross-interference matrix, $A^{(DL)}$ and find its maximum eigenvector $V_{A^{(DL)}}$ (6) For each user i, compute downlink power allocation, $p_i$ from $V_{A^{(DL)}}$ (7) For each user i, compute geometric precoder $P_i$ from $p_i$ and $V_i^*$

8. Spectral Sharing Wireless Systems

A spectral sharing wireless system is a system where multiple streams of information are transmitted over the same time and frequency resources. Similar systems are also known as multi-user multiple input multiple output (MU-MIMO) systems. Generally, these systems have two different types of communication signals:

Common—In the downlink, these transmitted signals are targeting all user devices. They may consist of reference signals, control channels, broadcast channels, etc. In the uplink, these transmitted signals are originating from multiple user devices and may consist of reference signals, control channels, random access channels, etc.

User-specific—In the downlink, these transmitted signals are targeting one or more user devices, which share the same spectrum. Each user device has its own specific data stream(s) (also known as a layers). In the uplink, these transmitted signals are originating from multiple user devices and contain specific data streams coming from each user device and shared on the same spectrum.

For example, in the Third Generation Partnership Project (3GPP) Long Term Evolution (LTE) or the fifth generation new radio (5G NR) systems, common downlink signals may be cell reference signals (CRS), physical downlink control channel PDCCH and physical broadcast synchronization channel PBSCH, common uplink signals may be sounding reference signal SRS, physical uplink shared control channel PUSCH and physical random access channel PRACH, user-specific downlink signals may be physical downlink shared channel PDSCH and user-specific uplink signals may be physical uplink control channel PUCCH.

In some implementations, overlaying transmissions of multiple user-specific data streams on the same frequency and time resources is enabled by multiple antennas at the base-station and the usage of the spatial domain. A different spatial precoder is applied to each data stream targeting a specific user device. The choice of precoders in existing systems relies on downlink channel feedback for a channel response, codebook selection or beam matching index. Some of these methods do not perform very well and some overload the system with the amount of feedback transmissions that has to be processed in a given time budget. These closed-loop methods typically have poor performance with mobility.

The embodiments of spectrum sharing wireless systems may use only a small set of uplink channel measurements to schedule and communicate with multiple user devices on the same frequency and time resources on both downlink and uplink, even in FDD systems, and are very efficient and robust to mobility.

In existing wireless systems, not all user devices support advanced MU-MIMO transmission modes. These legacy user devices may operate under the assumption that there is no spectrum sharing at all. These user devices may not have any means, or may only have partial means, to provide downlink channel feedback of any sort, and may not support precoded reference signals, which may be required for the equalization of the precoded data transmissions. In these embodiments, spectral sharing transmissions are possible even to and from these legacy user devices, without any modifications to their existing hardware or software.

8.1 Example Embodiments of a Common Precoder

Let $P_c$ represent the common precoder. In the downlink, the purpose of the common precoder is to emit a signal that will reach all the user-devices in the base-station's sector, or a region served by the base station. In the uplink, the common precoder is used for all the cases where the reception is not from a small known set of multiple user devices. Note that in the uplink processing it is actually a "post-coder" that is applied to the received signal. However, for simplicity, the term "precoder" will be used for the uplink as well.

An example of a common precoder is an isotropic precoder that generates a signal with equal angular energy. Mathematically, this precoder is a discrete delta function in the spatial domain (e.g., across spatial positioning of antenna array elements) and a constant value in the transformed angular domain.

$$P_c = [0, \ldots, 0, 1, 0, \ldots, 0]$$

$$\mathcal{F}\{P_c\} = \text{constant}$$

where $\mathcal{F}\{\bullet\}$ is the discrete Fourier transform.

Figure 87:
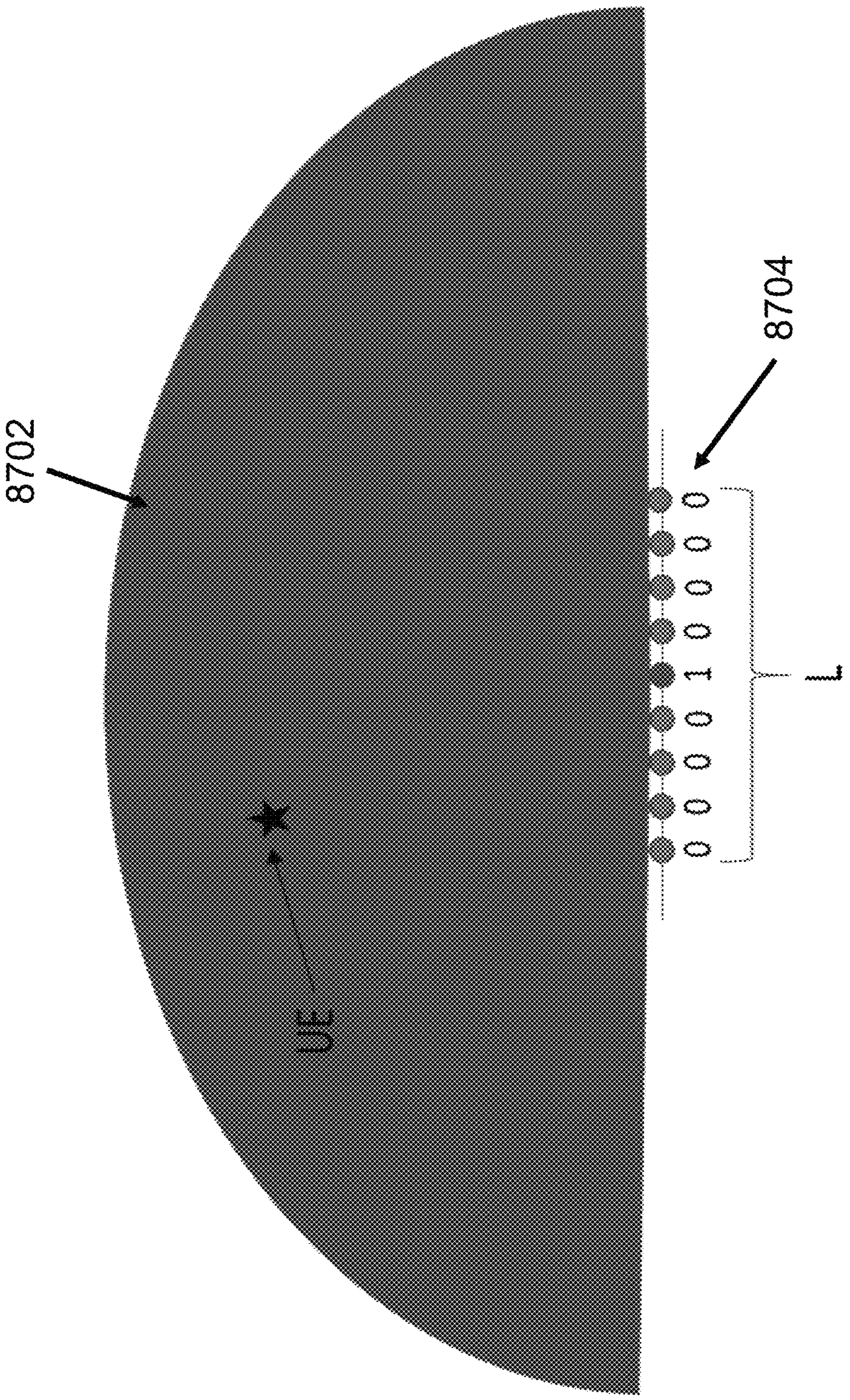
FIG. 87 shows an example of a common precoder.

FIG. 87 illustrates such a precoder. Note, that the common precoder is not required to be constant over time and frequency. Different time and frequency resources may use different common precoders. The semicircle 8702 represents constant energy over all angles. The black star represents a user device (or User Equipment). The blue and red small circles 8704 represent the antennas and the numbers beneath them are the precoder weights.

8.2 Example Embodiments of a User Device-Specific Precoder

Figure 88:
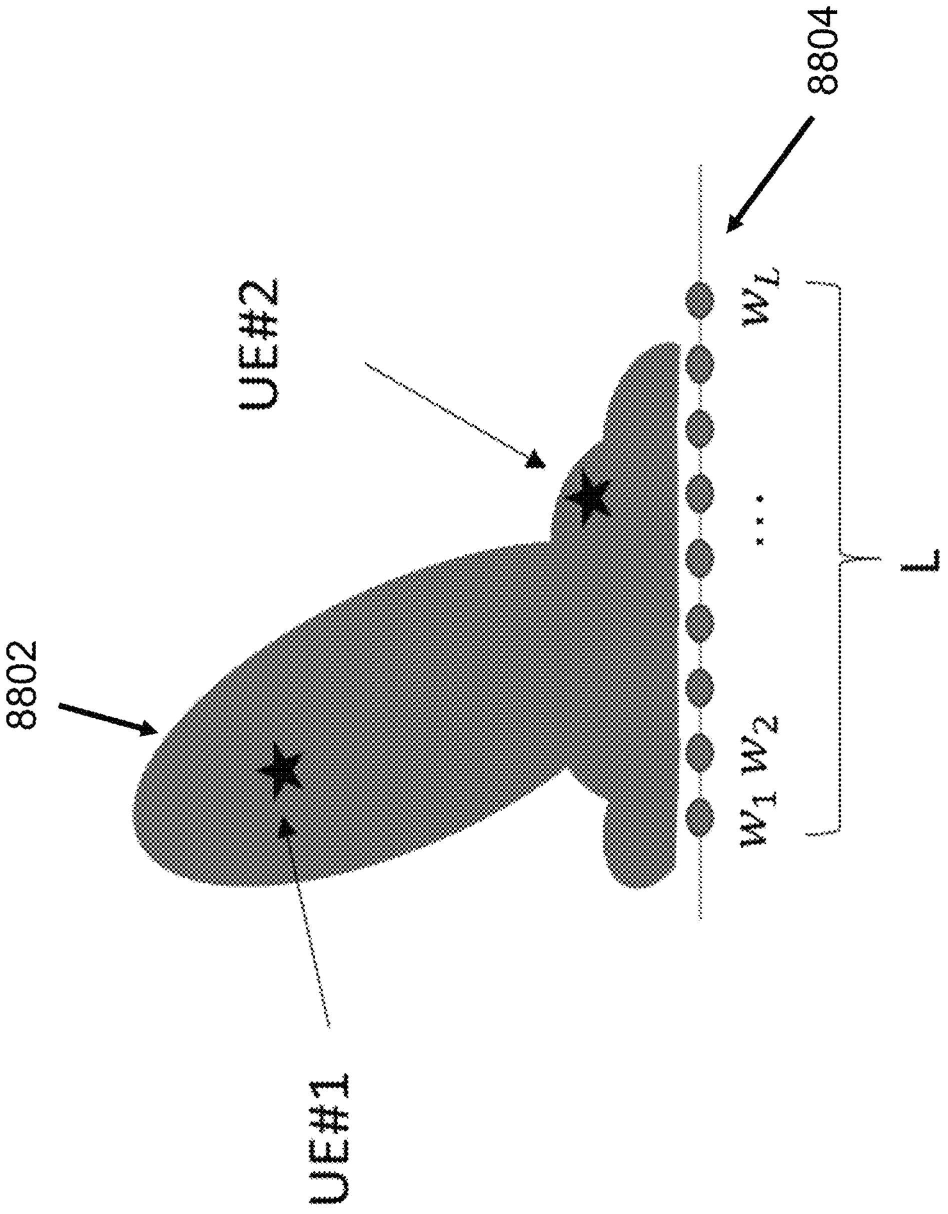
FIG. 88 shows an example of a user-specific precoder.

Let, $P_{us}^i=[w_1^i, w_2^i, \ldots, w_L^i]$, be the user-specific precoder for user i, where $w_l^i$, l=1, . . . , L, are complex weights. In the downlink, the purpose of the user-specific precoder is to maximize the received signal energy at the specific user device, while minimizing the interference to the other receiving user devices. In other words, maximize the Signal to Interference and Noise Ratio (SINR) at a specific user device. In the reciprocal uplink, the purpose of the precoder (post-coder) is to maximize the received signal energy at the base-station from a specific user device, while minimizing the received interfering signals from other transmitting user devices. FIG. 88 illustrates an example of such a precoder. The blue shape represents a radiation pattern. Most of the energy is focused towards UE #1 (as shown by lobe 8802), which is the target user device, while minimal energy is targeted towards the direction of UE #2 (another receiving user device). The weights applied to each antenna are shown below the antennas in the array 8804.

8.3 Example Embodiments of Downlink Sharing of Physical Channels

In the downlink, the base station may use its frequency and time resources to multiplex different physical channels. Some of these channels may be transmitted through common precoders and some through user-specific precoders. Table 5 shows an example of such multiplexing of physical channels. Note that each frequency and time resource element may be transmitted with a single or multiple precoders, depending on how many data streams are sharing this element. User-specific precoded data will typically share a resource element with multiple user-devices. However, transmission of data for a single user device on a resource element, may also be done using a common precoder.

Table 5 shows Downlink physical channels sharing example, using 3GPP terminology. The grid represents frequency and time resources (22×14). The same information is also shown in FIG. 89A by color-coding. Italicized entries (with same grayscale in FIG. 89A) represent common precoding and un-italicized entries (with common grayscale coding) represent user-specific precoding. Rows 1-7 represent user-specific precoded data transmission (PDSCH) for multiple user devices, along with some common precoded reference signals (CRS) and common precoded control channel (PDDCH). Rows 8-11 represent a common precoded broadcast channel transmission (PBCH). Rows 12-15 represent a common precoded single user device data transmission (PDSCH) with no spectrum sharing. Rows 16-22 represent a user-specific precoded data transmission (PDSCH) with reference signals (DMRS) for multiple user devices and common precoded reference signals (CRS).

TABLE 5

Example of sharing downlink physical channels

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | *PDCCH* | *PDCCH* | PDSCH | *CRS* | PDSCH | PDSCH | PDSCH | PDSCH | PDSCH | *CRS* | PDSCH | PDSCH | PDSCH | PDSCH |
| 2 | *CRS* | *PDCCH* | PDSCH | PDSCH | PDSCH | PDSCH | CRS | PDSCH | PDSCH | PDSCH | PDSCH | PDSCH | *CRS* | PDSCH |
| 3 | *PDCCH* | *PDCCH* | PDSCH | PDSCH | PDSCH | PDSCH | PDSCH | PDSCH | PDSCH | PDSCH | PDSCH | PDSCH | PDSCH | PDSCH |
| 4 | *PDCCH* | *PDSCH* | PDSCH | PDSCH | PDSCH | PDSCH | PDSCH | PDSCH | PDSCH | PDSCH | PDSCH | PDSCH | PDSCH | PDSCH |
| 5 | *PDCCH* | *PDCCH* | PDSCH | *CRS* | PDSCH | PDSCH | PDSCH | PDSCH | PDSCH | *CRS* | PDSCH | PDSCH | PDSCH | PDSCH |
| 6 | *CRS* | *PDCCH* | PDSCH | PDSCH | PDSCH | PDSCH | *CRS* | PDSCH | PDSCH | PDSCH | PDSCH | PDSCH | *CRS* | PDSCH |
| 7 | *PDCCH* | *PDCCH* | PDSCH | PDSCH | PDSCH | PDSCH | PDSCH | PDSCH | PDSCH | PDSCH | PDSCH | PDSCH | PDSCH | PDSCH |
| 8 | *PBCH* | *PBCH* | *PBCH* | *PBCH* | *PBCH* | *PBCH* | *PBCH* | *PBCH* | *PBCH* | *PBCH* | *PBCH* | *PBCH* | *PBCH* | *PBCH* |
| 9 | *PBCH* | *PBCH* | *PBCH* | *PBCH* | *PBCH* | *PBCH* | *PBCH* | *PBCH* | *PBCH* | *PBCH* | *PBCH* | *PBCH* | *PBCH* | *PBCH* |
| 10 | . . . | . . . | . . . | . . . | . . . | . . . | . . . | . . . | . . . | . . . | . . . | . . . | . . . | . . . |
| 11 | *PBCH* | *PBCH* | *PBCH* | *PBCH* | *PBCH* | *PBCH* | *PBCH* | *PBCH* | *PBCH* | *PBCH* | *PBCH* | *PBCH* | *PBCH* | *PBCH* |
| 12 | *PBCH* | *PBCH* | *PBCH* | *PBCH* | *PBCH* | *PBCH* | *PBCH* | *PBCH* | *PBCH* | *PBCH* | *PBCH* | *PBCH* | *PBCH* | *PBCH* |
| 13 | *PDSCH* | *PDSCH* | *PDSCH* | *PDSCH* | *PDSCH* | *PDSCH* | *PDSCH* | *PDSCH* | *PDSCH* | *PDSCH* | *PDSCH* | *PDSCH* | *PDSCH* | *PDSCH* |
| 14 | . . . | . . . | . . . | . . . | . . . | . . . | . . . | . . . | . . . | . . . | . . . | . . . | . . . | . . . |
| 15 | *PDSCH* | *PDSCH* | *PDSCH* | *PDSCH* | *PDSCH* | *PDSCH* | *PDSCH* | *PDSCH* | *PDSCH* | *PDSCH* | *PDSCH* | *PDSCH* | *PDSCH* | *PDSCH* |
| 16 | PDSCH | DMRS | PDSCH | *CRS* | PDSCH | PDSCH | PDSCH | PDSCH | DMRS | *CRS* | PDSCH | PDSCH | PDSCH | PDSCH |
| 17 | *CRS* | PDSCH | PDSCH | PDSCH | PDSCH | DMRS | *CRS* | PDSCH | PDSCH | PDSCH | PDSCH | DMRS | *CRS* | PDSCH |
| 18 | PDSCH | PDSCH | PDSCH | PDSCH | PDSCH | PDSCH | PDSCH | PDSCH | PDSCH | PDSCH | PDSCH | PDSCH | PDSCH | PDSCH |
| 19 | PDSCH | DMRS | PDSCH | PDSCH | PDSCH | PDSCH | PDSCH | PDSCH | DMRS | PDSCH | PDSCH | PDSCH | PDSCH | PDSCH |
| 20 | PDSCH | PDSCH | PDSCH | *CRS* | PDSCH | DMRS | PDSCH | PDSCH | PDSCH | *CRS* | PDSCH | DMRS | PDSCH | PDSCH |
| 21 | *CRS* | PDSCH | PDSCH | PDSCH | PDSCH | PDSCH | *CRS* | PDSCH | PDSCH | PDSCH | PDSCH | PDSCH | *CRS* | PDSCH |
| 22 | PDSCH | PDSCH | PDSCH | PDSCH | PDSCH | PDSCH | PDSCH | PDSCH | PDSCH | PDSCH | PDSCH | PDSCH | PDSCH | PDSCH |

8.4 Example Embodiments of Uplink Sharing of Physical Channels

Different uplink physical channels may be multiplexed within the frequency and time resources. The base-station receives at all its antennas the uplink transmissions from all sources and process it.

Common channels, which may represent transmissions cases which are not from a small known set of multiple user devices, are processed with a common precoder, P_c (l,f,t). The received and processed data in the base-station is:

$$Y_{Pc}(f,t)=\sum_{l=1}^{L}P_c(l,f,t)\cdot\left[\sum_i H^i(l,f,t)\cdot X^i(f,t)+n(l,f,t)\right].$$

Herein, f and t are frequency and time indexes, $X^i(f, t)$ are uplink data symbols from user device i, $H^i(l, f, t)$ is the frequency channel response from user device i to antenna l, and n(l, f, t) is an additive noise term.

time resources (20×14). Italicized and commonly colored entries represent common precoding and un-italicized and commonly color coded entries represent user-specific precoding. Rows 1-4 represent user-specific uplink data transmissions (PUSCH) with demodulation reference signals (DMRS) from multiple user devices, to be processed with user-specific precoders. Rows 5-8 represents common uplink control channel transmissions (PUCCH), to be processed with a common precoder. Rows 9-12 represents common uplink random access channel transmissions (PRACH), to be processed with a common precoder. Rows 13-16 represent user-specific uplink data transmissions (PUSCH) with demodulation reference signals (DMRS) from multiple user devices, to be processed with user-specific precoders, except for the last column, which has common sounding reference signals (SRS), which may be processed with a common precoder. Rows 17-20 has a single user-specific data transmission with demodulation reference signals, which may be processed with a common precoder or with a user-specific precoder.

TABLE 6

Example of sharing uplink physical channels

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | PUSCH | PUSCH | DMRS | PUSCH | PUSCH | PUSCH | PUSCH | DMRS | PUSCH | PUSCH | PUSCH | PUSCH | PUSCH | PUSCH |
| 2 | PUSCH | PUSCH | DMRS | PUSCH | PUSCH | PUSCH | PUSCH | DMRS | PUSCH | PUSCH | PUSCH | PUSCH | PUSCH | PUSCH |
| 3 | ... | ... | ... | ... | ... | ... | ... | ... | ... | ... | ... | ... | ... | ... |
| 4 | PUSCH | PUSCH | DMRS | PUSCH | PUSCH | PUSCH | PUSCH | DMRS | PUSCH | PUSCH | PUSCH | PUSCH | PUSCH | PUSCH |
| 5 | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* |
| 6 | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* |
| 7 | ... | ... | ... | ... | ... | ... | ... | ... | ... | ... | ... | ... | ... | ... |
| 8 | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* | *PUCCH* |
| 9 | *PRACH* | *PRACH* | *PRACH* | *PRACH* | *PRACH* | *PRACH* | *PRACH* | *PRACH* | *PRACH* | *PRACH* | *PRACH* | *PRACH* | *PRACH* | *PRACH* |
| 10 | *PRACH* | *PRACH* | *PRACH* | *PRACH* | *PRACH* | *PRACH* | *PRACH* | *PRACH* | *PRACH* | *PRACH* | *PRACH* | *PRACH* | *PRACH* | *PRACH* |
| 11 | ... | ... | ... | ... | ... | ... | ... | ... | ... | ... | ... | ... | ... | ... |
| 12 | *PRACH* | *PRACH* | *PRACH* | *PRACH* | *PRACH* | *PRACH* | *PRACH* | *PRACH* | *PRACH* | *PRACH* | *PRACH* | *PRACH* | *PRACH* | *PRACH* |
| 13 | PUSCH | PUSCH | DMRS | PUSCH | PUSCH | PUSCH | PUSCH | DMRS | PUSCH | PUSCH | PUSCH | PUSCH | PUSCH | *SRS* |
| 14 | PUSCH | PUSCH | DMRS | PUSCH | PUSCH | PUSCH | PUSCH | DMRS | PUSCH | PUSCH | PUSCH | PUSCH | PUSCH | *SRS* |
| 15 | ... | ... | ... | ... | ... | ... | ... | ... | ... | ... | ... | ... | ... | ... |
| 16 | PUSCH | PUSCH | DMRS | PUSCH | PUSCH | PUSCH | PUSCH | DMRS | PUSCH | PUSCH | PUSCH | PUSCH | PUSCH | *SRS* |
| 17 | *PUSCH* | *PUSCH* | *DMRS* | *PUSCH* | *PUSCH* | *PUSCH* | *PUSCH* | *DMRS* | *PUSCH* | *PUSCH* | *PUSCH* | *PUSCH* | *PUSCH* | *PUSCH* |
| 18 | *PUSCH* | *PUSCH* | *DMRS* | *PUSCH* | *PUSCH* | *PUSCH* | *PUSCH* | *DMRS* | *PUSCH* | *PUSCH* | *PUSCH* | *PUSCH* | *PUSCH* | *PUSCH* |
| 19 | ... | ... | ... | ... | ... | ... | ... | ... | ... | ... | ... | ... | ... | ... |
| 20 | *PUSCH* | *PUSCH* | *DMRS* | *PUSCH* | *PUSCH* | *PUSCH* | *PUSCH* | *DMRS* | *PUSCH* | *PUSCH* | *PUSCH* | *PUSCH* | *PUSCH* | *PUSCH* |

Similarly, user-specific channels are processed with their user-specific precoders:

$$Y^i_{P_{us}}(f,t)=\sum_{l=1}^{L}P^i_{us}(l,f,t)\cdot\left[\sum_i H^i(l,f,t)\cdot X^i(f,t)+n(l,f,t)\right].$$

Figure 92:
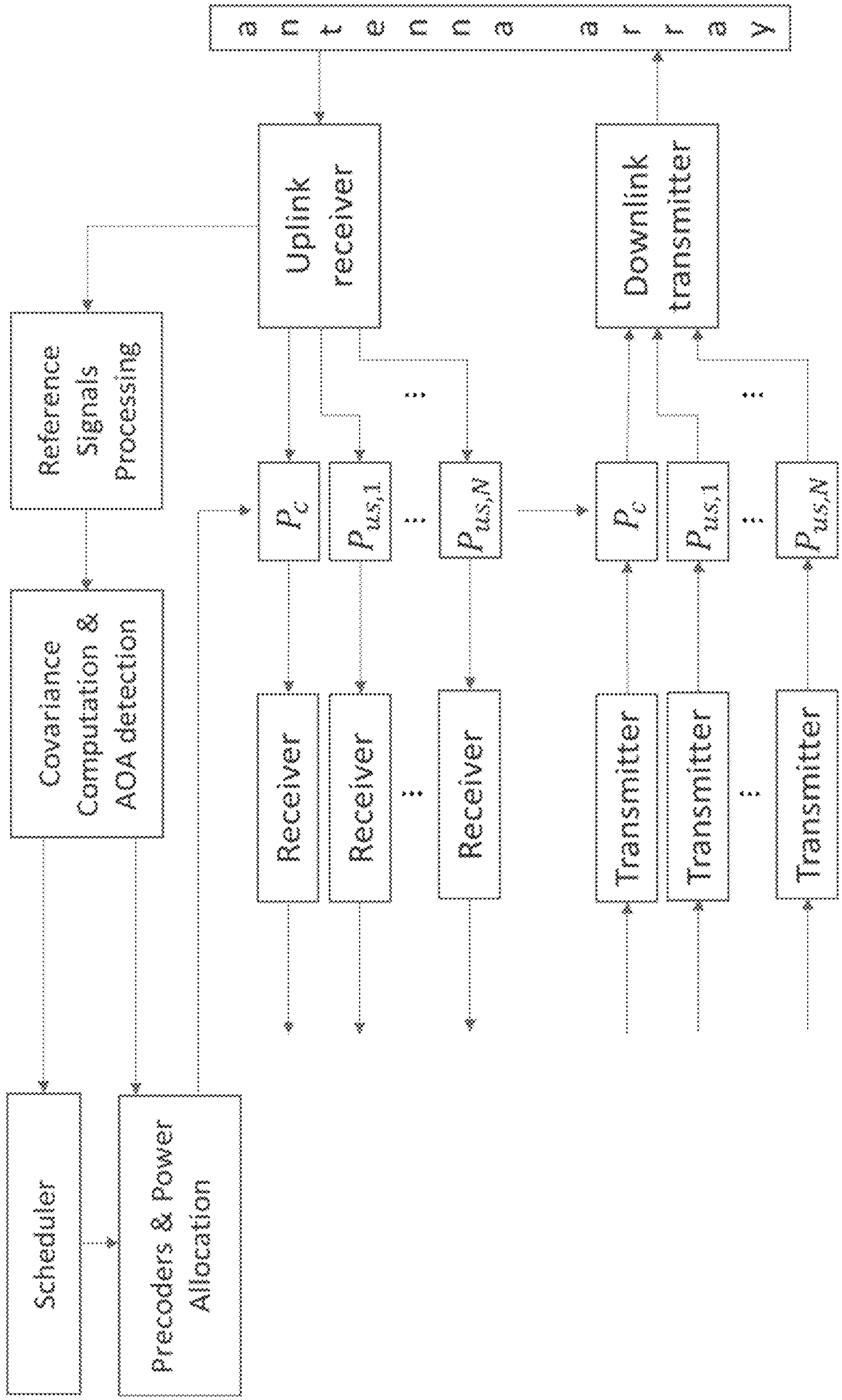
FIG. 92 is a block diagram showing an example of a network-side device.

The operation of applying the user-specific precoders to the received uplink signal acts as a channel decoupler, which converts a MU-MIMO link to a parallel system with decoupled SISO links, $Y_{P_{us}}{}^i$. This enables parallel implementation of independent receivers at the base-station (as shown in FIG. 92).

Table 6 (and FIG. 89B) shows an example for such multiplexing of physical channels. Here as well, the selection of precoder type is per resource element. User-specific precoded data will typically share the resource element with multiple user devices. However, processing of data from a single user on a resource element, may also be done using a common precoder.

Table 6 shows uplink physical channels sharing example, using 3GPP terminology. The grid represents frequency and 8.5 Examples of Initial Procedures Herein, the procedures required for a user device to transmit/receive data on a shared spectrum are described. Before that, the base-station may schedule the user to transmit/receive as a single user device without any spectral sharing.

An example procedure may be as follows:

1. User device transmits uplink reference signals. These reference signals may be dedicated for channel sounding or may be a part of an uplink data transmission. For example, SRS or uplink DMRS in LTE/5G NR.
2. The base station may compute from received reference signals, an uplink channel response, $H^i(l, f, t)$.
3. The base station may compute a spatial covariance matrix $R_i$ of dimensions L×L. There are different methods for computing this covariance matrix. For example, averaging out across $N_f$ tones and $N_t$ time samples rank-1 covariance matrices, directly computed from the channel response:

$$R_i = \frac{1}{N_f N_t}\sum_{f,t} H^i(l,f,t)\cdot\left(H^i(l,f,t)\right)^H.$$

Herein, $(\bullet)^H$ is the Hermitian conjugate operation. Other more advanced techniques to compute $R_i$, such as Maximum Likelihood or parameterized covariance construction may also be applied.

4. The base station may detect main angle of arrival (AOA) of the radiation waves. The concept of main AOA assumes that the wireless channel reflections are typically coming in some angular spread around a main angle. This step is useful for scheduling users that have some angular separation. Different techniques may be used for computing the main AOA. For example, transforming the spatial channel response to the angular domain and detecting the angle with the highest energy. Alternatively, more sophisticated techniques that detect the angles of the reflectors, such as L−1 minimization and Maximum Likelihood may also be applied. If a user does not have a distinguish main AOA, such in some cases of complete Non-Line-Of-Sight (NLOS), or very large angular spread, the base-station may decide to keep this user device as a single user and not share the spectrum for it with other devices.
5. Once the base-station computed the spatial covariance matrix and the main AOA for a user device, it is ready for scheduling of spectral sharing uplink or downlink transmissions. Note, that both these measurements are robust and not very sensitive to mobility, as they rely solely on the geometry of the channel, which typically changes slowly. The base-station may refresh and update these metrics, based on the channel conditions and/or a rate of change of channel conditions.

8.6 Examples of Scheduling

Figure 90:
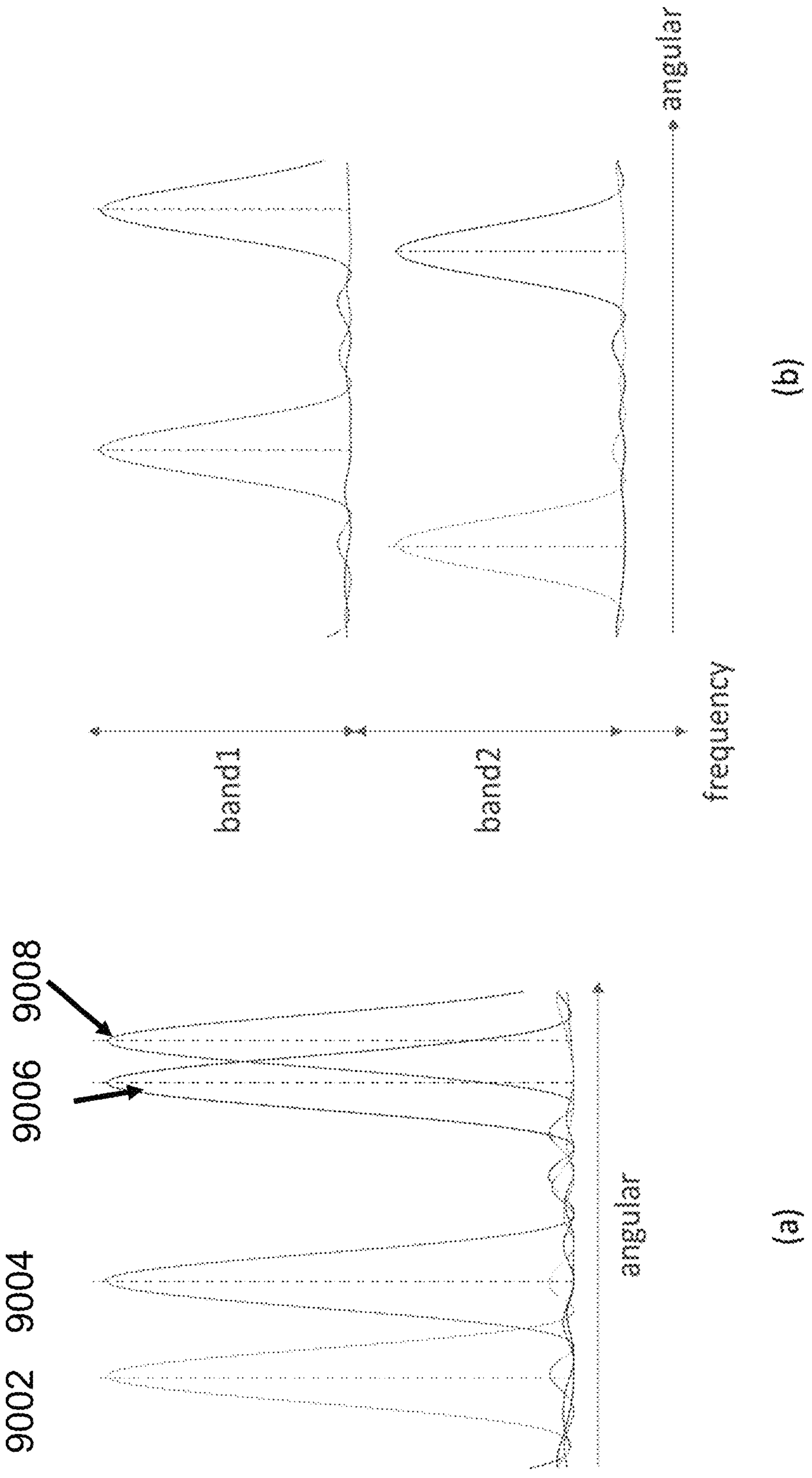
FIG. 90 shows an example of two-dimensional scheduling.

For spectral sharing wireless systems, the scheduling algorithm needs to take into consideration, on top of the standard metrics such as traffic requirements (throughput, latency, etc.) and channel conditions (frequency response, SINR, etc.), also the angular separation of the users. The minimum angular separation is a function of the number of base-station antennas, beam structure and required SINR. For a set of users that needs to be scheduled for a downlink or uplink transmission in a specific time frame, the scheduling algorithm needs to allocate user devices on a two-dimensional plane of frequency and angle. Using the detected main AOA, the scheduling algorithm selects user devices with enough angular separation to minimize the cross-interference between all the user devices sharing the same frequency and time resources elements. FIG. 90 shows an example of such scheduling for 4 user devices. The beam patterns 9002, 9004, 9006 and 9008 represent four UEs, plotted along the angular axis in the horizontal direction. On the right, one possible method of separating these transmissions includes using time/frequency locations for 9004 and 9008 that are separated in angular domain, and similarly combining 9002, 9006 transmission to occur at same time/frequencies.

8.7 Examples of Precoder Computations

Once a set of user devices is selected for a spectral sharing transmission, the base-station can compute from their covariance matrices, the precoders to be applied to either the downlink transmission, or the uplink reception. A precoder may be computed as a vector that maximizes some criterion, typically SINR related.

In its general form, the precoder may satisfy the following conditions:

A. Maximizing the signal energy in some angular sector. This focuses the energy toward the main AOA of the targeted user device.
B. Minimizing the signal energy in some angular sectors. This reduces the interference towards the other user devices sharing the spectrum.
C. Minimizing the signal energy compared to a reference beam in some angular sector. This shapes the beam to match a reference beam (which will typically be the beam of the common precoder).

In the downlink, the energy of the precoders may also be scaled by some power allocation, to further control the receive SINR of each user device, as described in the previous sections.

As an example, precoder computation for 2 user devices may consist of computing a precoder for the first user device as a vector that maximizes the signal energy at the main AOA of the first user device, while minimizing the signal energy at the direction of the main AOA of the second user device, and computing a precoder for the second user device, as a vector that maximizes the signal energy at the main AOA of the second user device, while minimizing the signal energy at the direction of the main AOA of the first user device.

8.8 Examples of Precoding in FDD

The computation of the precoder is based on uplink channel measurements only. In general, the computed precoders are correct for the uplink frequency and should only be applied to the uplink reception. In FDD, for the downlink, the computed precoders should be scaled up or down by the ratio of the downlink to uplink frequencies.

The equations below explain the scaling procedure for a linear antenna array with antenna spacing of $\Delta x$. Let $P_{UL}$ be a computed precoder vector and let $\alpha=f_{DL}/f_{UL}$ be the frequencies ratio. The continuous spatial function of the uplink precoder may be expressed as:

$$\tilde{P}_{UL}(x) = \sum_{l=1}^{L} P_{UL}(l)\cdot \text{sinc}\left(\frac{x-(l-1)}{\Delta x}\right).$$

The precoder vector for the downlink is obtained by sampling a continuous downlink precoder function, $\tilde{P}_{DL}(x)$, in the spatial domain, defined as a scaled version of $\tilde{P}_{UL}(x)$ by a factor of $\alpha$, i.e., $$\tilde{P}_{DL}(x) = P_{UL}(\alpha x) = \sum_{l=1}^{L} P_{UL}(l)\cdot \text{sinc}\left(\frac{\alpha x-(l-1)}{\Delta x}\right).$$

Herein, the discrete precoder vector for the downlink is:

$$P_{DL}(l) = \tilde{P}_{DL}(x)\,\big|_{x=(l-1)\Delta x}\,.$$

Herein, l=1, . . . , L. Note that this scaling operation may also be implemented as a resampling operation of the uplink precoder vector by a factor of $\alpha^{-1}$.

Alternatively, for some methods of parameterized construction of the covariance matrix $R_i$, the detected main AOA may be scaled by a factor of $\alpha$, generating a scaled covariance matrix adapted for the downlink frequency and no further scaling of the precoder vector is required.

Figure 93B:
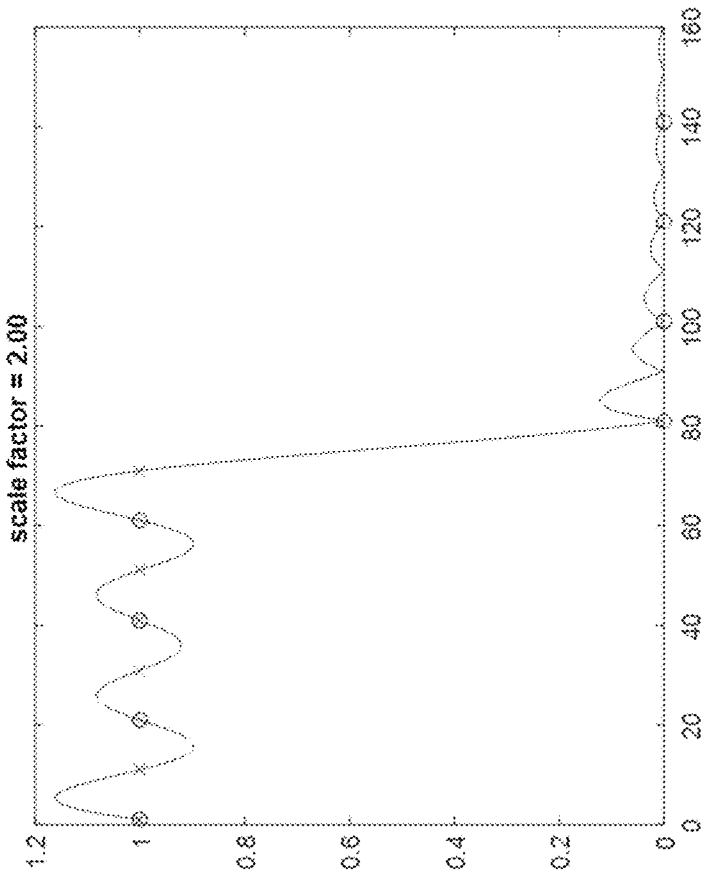
FIGS. 93A and 93B show examples of scaling operations with scale factors 0.5 and 2.0, respectively.
Figure 93A:
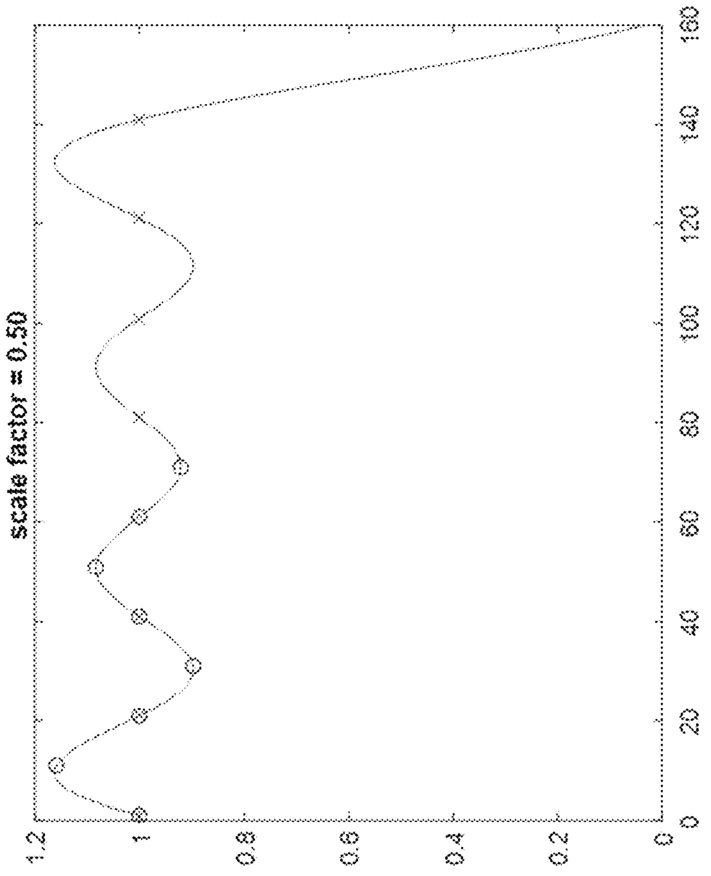

FIG. 93A shows a scaling example in which scale factor is 0.5. In FIG. 93A, original estimated channel response is shown by X marks. This represents, for example, results of measurements performed on the uplink signals. The circle samples represent resulting scaled response derived according to the three equations above.

FIG. 93B shows another example in which the scale factor is 2. While the examples in FIGS. 93A and 93B are relatively simple scale factors, they are included to further explain the concept of scaling operation disclosed in the present document.

8.9 Examples of Pre-Compensation

Figure 91:
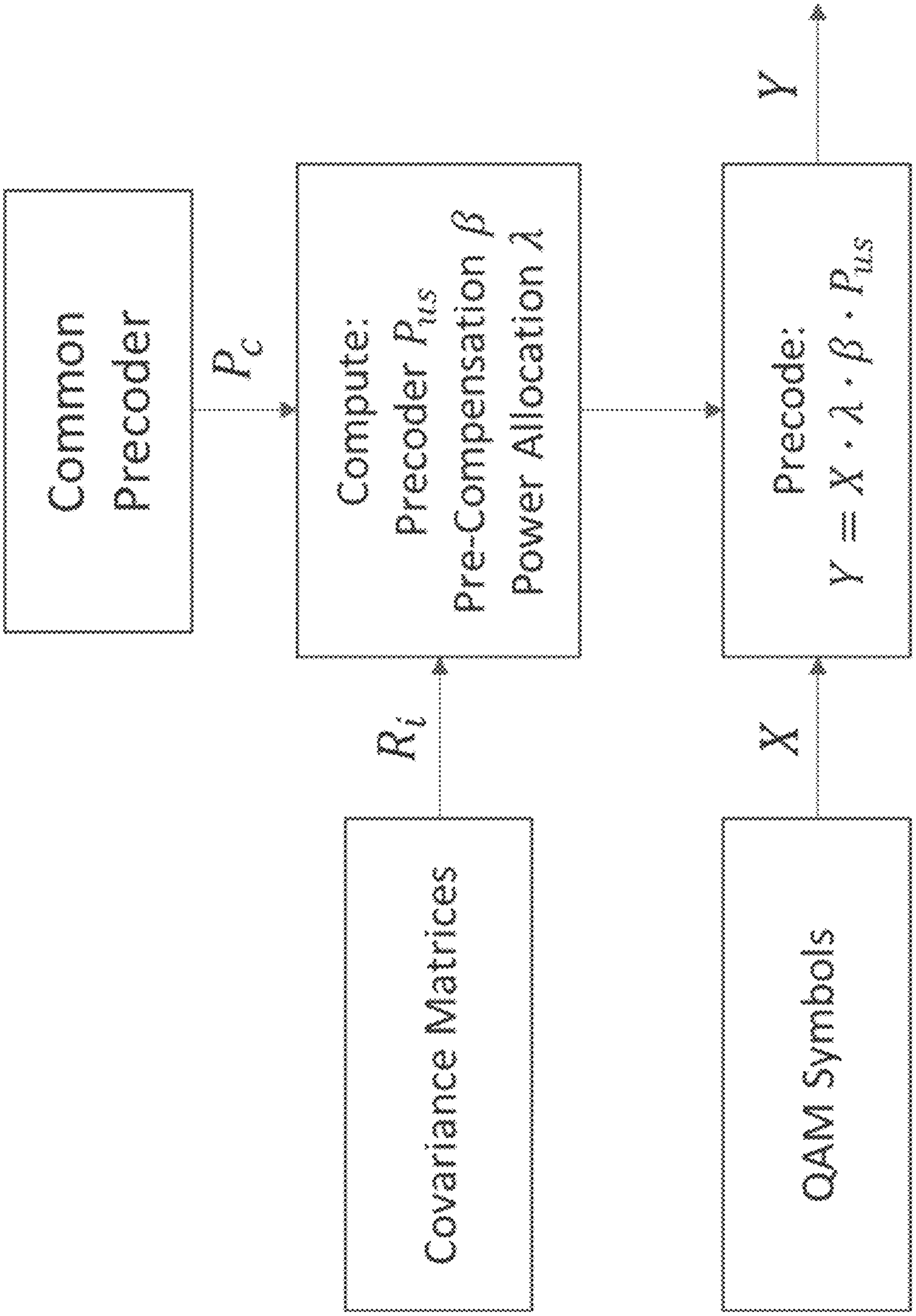
FIG. 91 shows an example of a pre-compensation operation.

To support legacy user devices, which do not support precoded reference signals, pre-compensation of their precoded QAM symbols should be performed. The pre-compensation factor scales all precoded QAM symbols of the user-specific data stream that is transmitted to that user device in the downlink, as illustrated in FIG. 91. The purpose of the pre-compensation factor is to compensate for the difference in the channel response between the user-specific precoder and the common precoder. This way, the receiving device, receives a user-specific precoded transmission with a channel response that is like the common precoded channel response. Then, the user-device may equalize its user-specific data transmission with reference signals that were transmitted while using the common precoder.

In FIG. 91, the covariance matrices and the common precoder are used for computing the user-specific precoder vectors P_us, the power allocation λ and the pre-compensation β. Then, each QAM (or QPSK) symbol, X, for that user-specific stream is scaled by λ and β and then multiply by the precoder. The output is the scaled and precoded vector Y.

For example, in LTE, legacy devices may only support transmission mode 1 (TM1) and are not designed to receive multi-user transmissions or to use precoded reference signals for equalization (DMRS). The only available reference signals for equalization of PDSCH data are the cell-reference signals (CRS). In a spectral sharing system, as described in this document, CRS may be precoded with a common precoder and multiple PDSCH transmissions may be precoded with user-specific precoders, sharing the same spectrum. Due to the pre-compensation of the QAM symbols, a user device will receive both CRS and PDSCH with the same channel response and will be able to equalize it and decode it.

8.10 Examples of Base Station Architectures

The spectral sharing system, may be implemented at the base-station with independent parallel receivers/transmitters, as shown in FIG. 92. No joint processing in required in the receivers or transmitters to cancel out cross-interference between the users. Only the computation of precoders takes into consideration, the different users sharing the spectrum.

As shown in FIG. 92, signals to/from the antenna array that is used for transmission or reception of signals may be processed as follows. An uplink receiver circuit may receive signals from antenna arrays. The reference signal portion may be passed to a reference signal processing system that performs the covariance computation and angle of arrival computations. The results of these computations are provided to a scheduler and/or a precoder/power allocator for future use. The user-specific signals may be passed through postcoders Pc, Pus, 1 . . . Pus, N for N user devices and corresponded post-processed signal may be used for data receiver be a receiver that performs demodulation/error correction coding and so on.

On the transmit-side, streams for each user device may be passed through the pre-coder and through downlink transmission circuitry and applied to the antenna array for transmission in the downlink direction.

8.11 Examples of Extensions to Multi-Layer Communication

Figure 94:
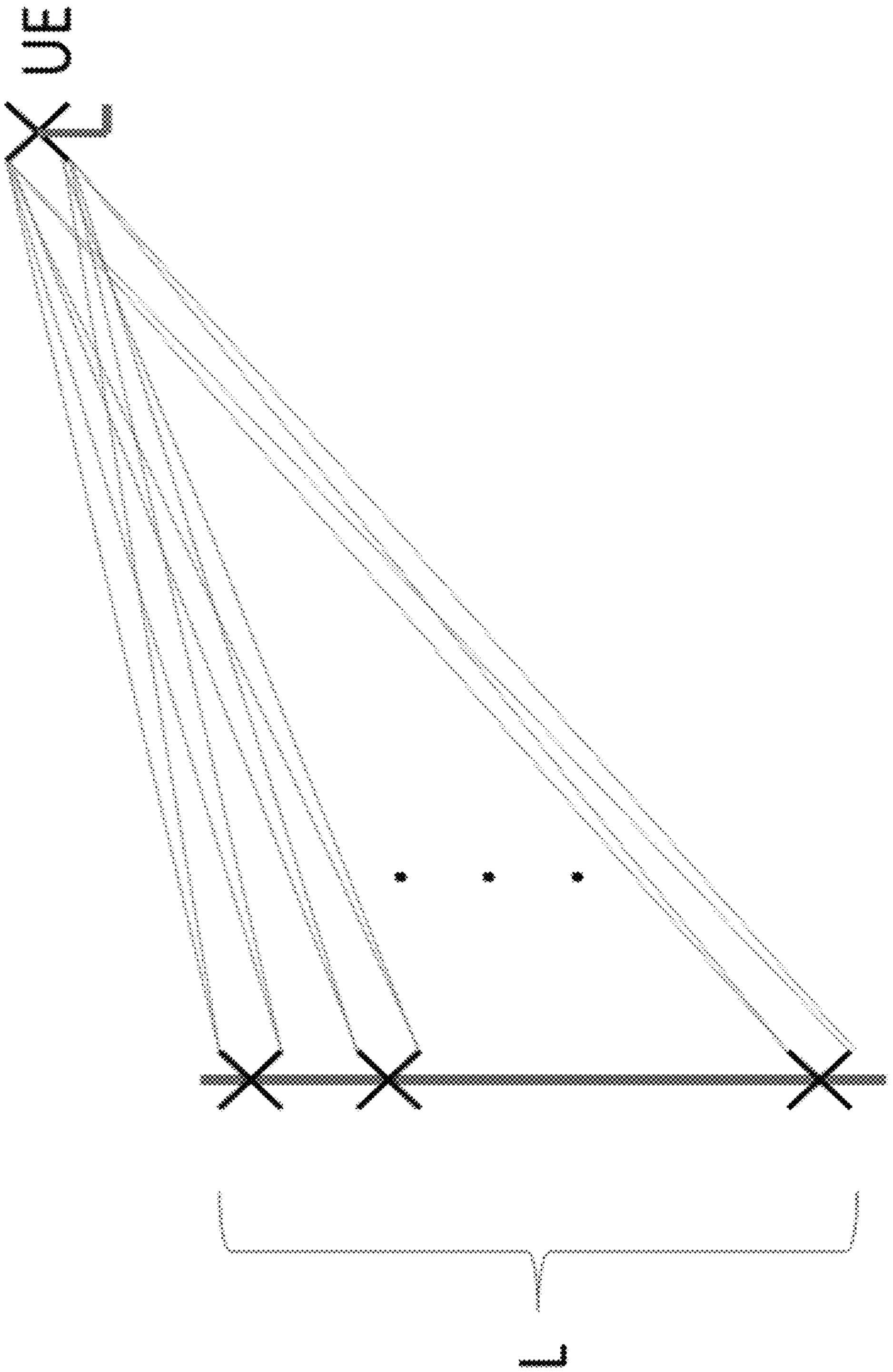
FIG. 94 shows a dual polarization link example.

The scheme described in the previous subsections, can be easily extended from single polarization antennas to dual polarization antennas. Each one of the L base station antennas may be a dual polarization antenna and the user device may have a dual polarization antenna as well. With this configuration, it is possible to transmit two independent data streams (or layers) from the base-station to a user device and from a user device to the base-station. Each dual polarization antenna at the base station forms a 2×2 link with the dual polarization antenna at the user device, as seen in FIG. 94. Both dual polarization antennas may use the same exact precoders. The covariance matrices, used for precoders' computation, may be derived from the uplink channel response of any of the dual polarization antennas, or both.

FIG. 94 shows an example of a dual polarization link between a base-station and a user device (UE). The base-station's antennas in this example are on a linear antenna array on the left side, marked with 'X's and the user device is on the right. Each base-station's dual-polarization antenna forms a 2×2 link to the dual polarization antenna of the user device.

Figure 95:
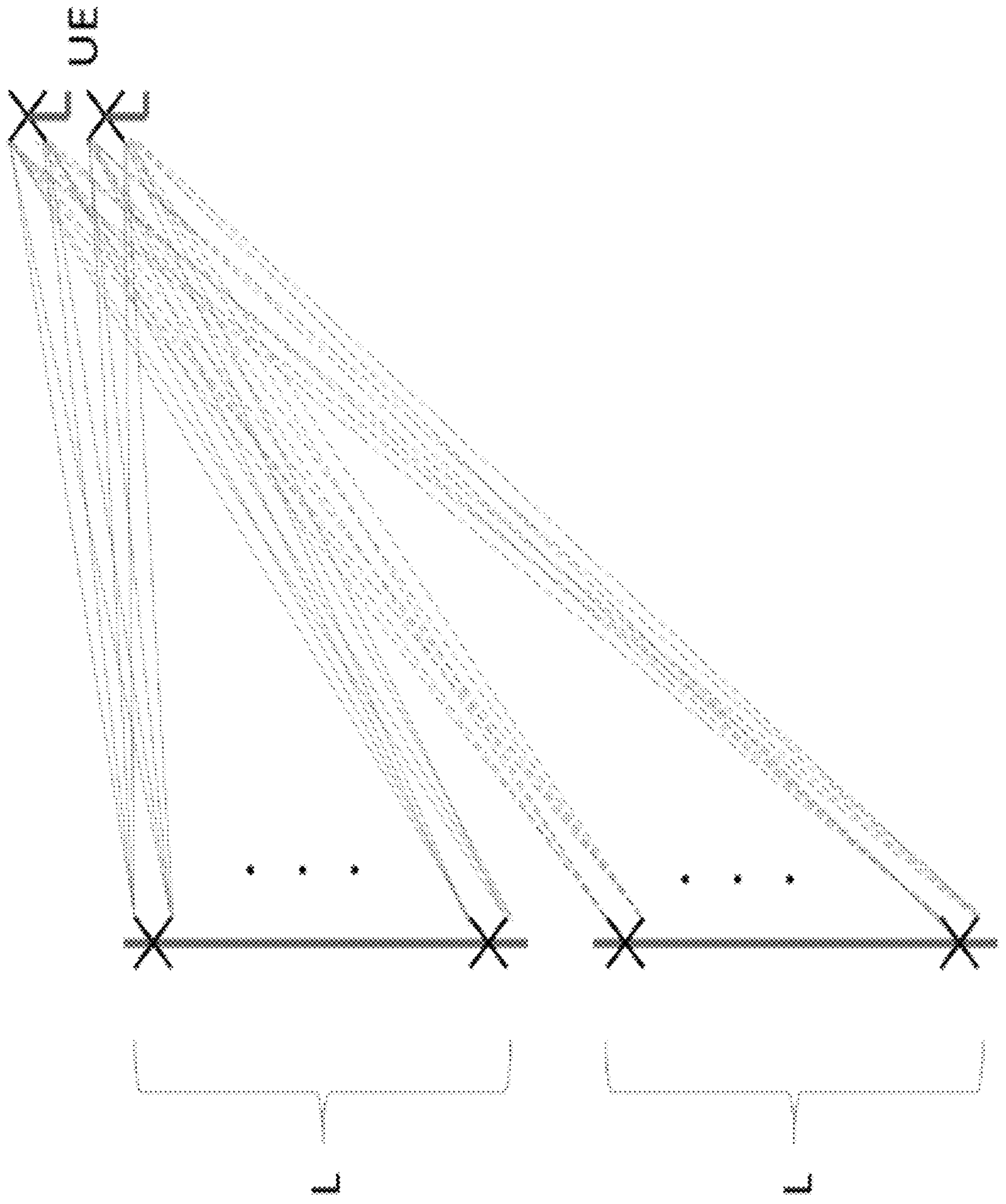
FIG. 95 shows an example with two antenna arrays, with each antenna array having L dual polarization antennas.

This multi-layer per use-device concept can be further extended to more than two layers, by using additional antenna arrays at the base station, spaced apart from each other and multiple dual polarization antennas at the user device, as seen in the example of FIG. 95.

FIG. 95 shows a multi-layer per user device example. The base-station has 2 antenna arrays, each with L dual polarization antennas. The user device has 2 dual-polarization antennas. This is equivalent to L 4×4 links to the user device.

8.12 Examples of Extensions to Multiple Base Stations

The multi-layer scheme, as described above, can be implemented on separate base-stations spaced apart from each other. Each base-station may have one or more antenna arrays and the user device may have multiple antennas. The transmission/reception of each base-station may be independent of the other base-stations or coordinated using a side-link.

9. Example Methods and Embodiments of the Disclosed Technology

In some embodiments, a wireless communication device (e.g., the PoP device depicted in FIG. 3 or 4 or the hub 102 depicted in FIG. 1B) includes a feed port comprising multiple input feeds and a precoding subsystem that is electrically connected to the feed port and an antenna subsystem electrically connected to the precoding subsystem. The antenna subsystem is configured to transmit an output signal of the precoding subsystem to multiple wireless stations using multiple beams. The precoding subsystem is configured to perform a precoding operation on an input signal from the feed port, wherein the precoding operation maximizes a desired signal level to interference ratio of transmissions to the multiple wireless stations. For example, the precoding subsystem may be configured to implement one or more of the various precoding techniques described in the present document. In some embodiments, the wireless communication device may spread each symbol to be transmitted on transmission over all antennas by processing through the precoding subsystem in a manner that radiates energy of the symbol over the multiple antennas such that, at a desired receiver's location, the various waveforms carrying a portion of the symbol constructively and destructively add up to maximize symbol energy at the desired receiver while minimizing interference from other waveforms.

In some embodiments, the antenna sub-system comprises one or more antennas that are spatially separated. In some embodiments, the antenna sub-system comprises one or more Luneburg antennas. In some embodiments, the one or more Luneburg antennas are spatially separated. In some embodiments, the one or more antennas are configured to transmit or receive using a dual polarization mode. In some implementations, e.g., as described with reference to FIGS. 5 to 15, 41, 42, 87, 88 etc., Luneburg antennas provide an advantageous configuration to be able to create beams for transmission. Furthermore, as described with reference to these figures, input feeds or radiative elements (or receptive elements) of these antennas may be moveable along three dimensions-back and forth or sideways with respect to the direction of transmission, in order to control beam angle and beam width of the desired transmission (or reception) configuration. Additional examples are described below, and further throughout the present document.

In some embodiments, the output signal comprises a number of signals that is equal or greater than a number of the multiple wireless stations. These signals may be components of output signal that may represent multiple logical signal streams which may be combined to achieve directionality, e.g., as described with respect to FIG. 7.

In some embodiments, positions of the multiple input feeds are adjustable to control a beam directionality of the transmissions.

In some embodiments, the antenna sub-system comprises one or more antenna arrays. In some embodiments, the one or more antenna arrays are configured to transmit using a dual polarization mode.

In some embodiments, the input signal comprises a dual-polarized signal.

In some embodiments, the wireless communication device uses single-layer links for communication with some of the multiple wireless stations. Alternatively, in some embodiments, the wireless communication device uses multi-layer links for communication with some of the multiple wireless stations. In some embodiments, the wireless communication device is configured to operate in a time division duplexed transmission mode. In some embodiments, the wireless communication device is configured to operate in a frequency division duplexed transmission mode.

In some embodiments, the precoding operation uses a precoding matrix that is dynamically evaluated by the precoding subsystem based on channel measurements in an uplink direction.

In some embodiments, the precoding operation on the input signal is performed based on uplink channel measurements from the multiple wireless stations such that a transmitted signal to interference ratio is maximized.

In some embodiments, the precoding subsystem uses a precoder computed based on a non-precoded beam radiation pattern for the wireless communication device.

In some embodiments, the precoding subsystem uses a precoder that is designed to maximize the desired signal level to interference ratio at transmission angles corresponding to locations of the wireless stations.

In another example aspect, a wireless communication device (e.g., the PoP device depicted in FIG. 3 or 4 or the hub 102 depicted in FIG. 1B) is disclosed. The device includes a feed port comprising multiple output feeds, a postcoding subsystem that is electrically connected to the feed port, and an antenna subsystem electrically connected to the postcoding subsystem. The antenna subsystem is configured to receive wireless transmissions from multiple wireless stations over multiple beams and provide the wireless transmissions as an input signal to the postcoding subsystem. The postcoding subsystem is configured to perform a postcoding operation on the input signal and provide an output signal to the feed port, wherein the postcoding operation maximizes a desired signal level to interference ratio of transmissions from the multiple wireless stations.

In some embodiments, the antenna sub-system comprises one or more antennas that are spatially separated.

In some embodiments, the antenna sub-system comprises one or more Luneburg antennas.

In some embodiments, the one or more Luneburg antennas are spatially separated.

In some embodiments, the one or more antenna are configured to transmit or receive using a dual polarization mode.

In some embodiments, the output signal comprises a number of signals that is equal or greater than a number of the multiple wireless stations.

In some embodiments, positions of the multiple input feeds are adjustable to control a beam directionality of the transmissions received from the multiple wireless stations.

In some embodiments, the antenna sub-system comprises one or more antenna arrays.

In some embodiments, the one or more antenna arrays are configured to receive using a dual polarization mode.

In some embodiments, the output signal comprises a dual-polarized signal.

In some embodiments, the wireless communication device uses single-layer links for communication with some of the multiple wireless stations.

In some embodiments, the wireless communication device uses multi-layer links for communication with some of the multiple wireless stations.

In some embodiments, the wireless communication device is configured to operate in a time division duplexed transmission mode.

In some embodiments, the wireless communication device is configured to operate in a frequency division duplexed transmission mode.

In some embodiments, the postcoding operation uses a postcoding matrix that is dynamically evaluated by the postcoding subsystem based on channel measurements in an uplink direction.

In some embodiments, the postcoding operation on the input signal is performed based on uplink channel measurements from the multiple wireless stations such that a received signal to interference ratio is maximized.

In some embodiments, the postcoding subsystem uses a postcoder computed based on a non-postcoded beam radiation pattern for the wireless communication device.

In some embodiments, the postcoding subsystem uses a postcoder that is designed to maximize the desired signal level to interference ratio at reception angles corresponding to locations of the wireless stations.

Figure 96:
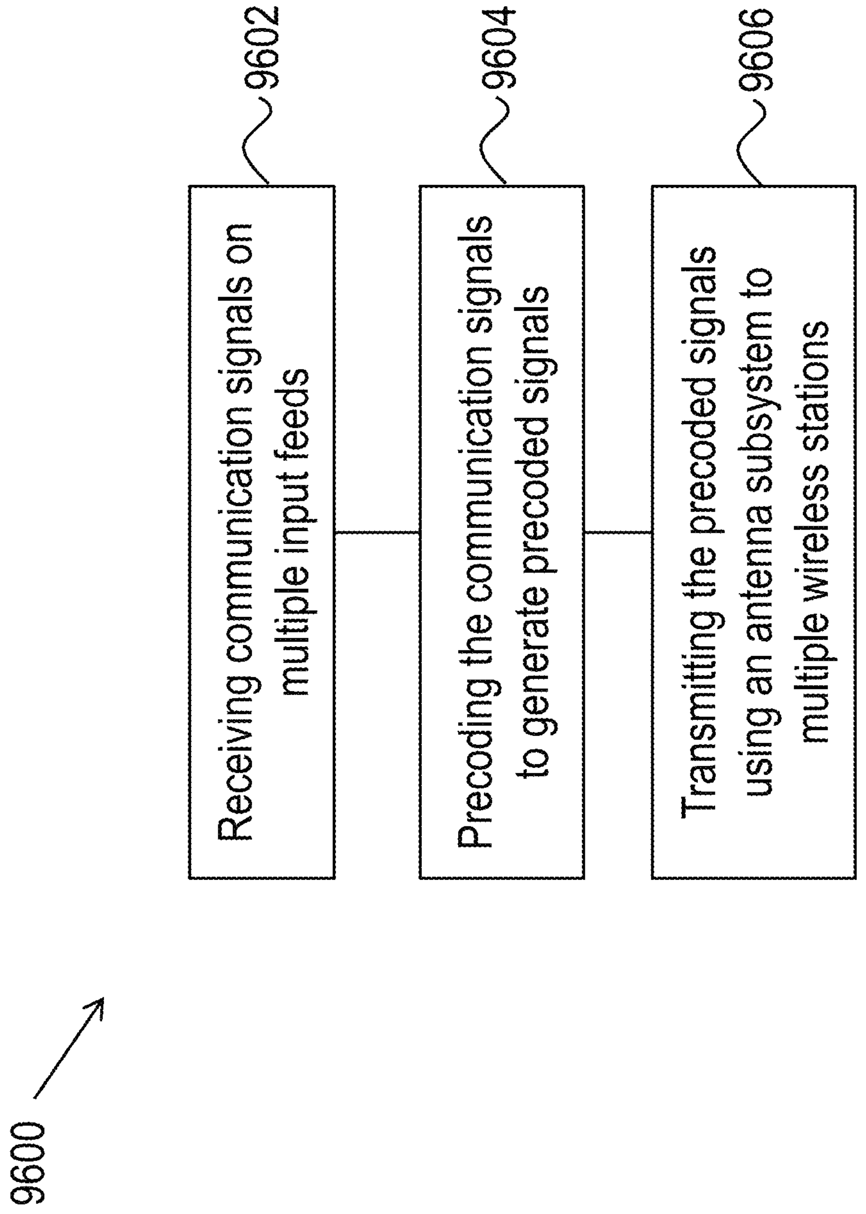
FIG. 96 is a flowchart for an example method of wireless communication.

FIG. 96 is a flowchart for a method 9600 of wireless communication. The method 9600 includes receiving (9602) communication signals on multiple input feeds, precoding (9604) the communication signals to generate precoded signals and transmitting (9606) the precoded signals using an antenna subsystem to multiple wireless stations, wherein the precoding maximizes a desired signal level to interference ratio of transmissions to the multiple wireless stations.

Figure 97:
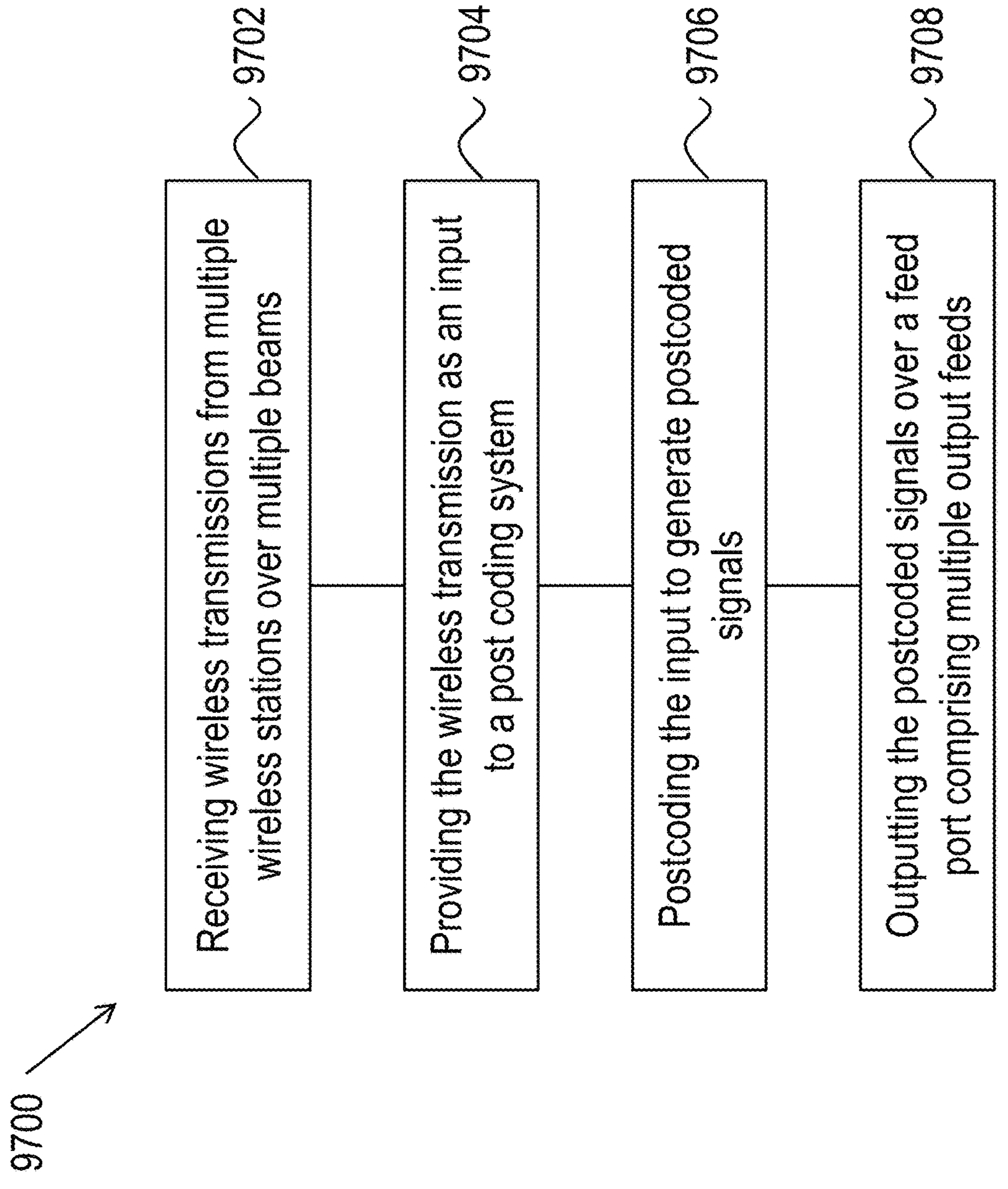
FIG. 97 is a flowchart for another example method of wireless communication.

FIG. 97 is a flowchart for a method 9700 of wireless communication. The method 9700 includes receiving (9702) wireless transmissions from multiple wireless stations over multiple beams and providing (9704) the wireless transmission as an input to a post coding system, postcoding (9706) the input to generate postcoded signals, outputting (9708) the postcoded signals over a feed port comprising multiple output feeds, wherein the postcoding maximizes a desired signal level to interference ratio of transmissions from the multiple wireless stations.

In some embodiments, the antenna sub-system comprises one or more antennas that are spatially separated. In some embodiments, the antenna sub-system comprises one or more Luneburg antennas. In some embodiments, the one or more Luneburg antennas are spatially separated.

In some embodiments, the one or more antennas are configured to transmit or receive using a dual polarization mode.

In some embodiments, the output signal comprises a number of signals that is equal or greater than a number of the multiple wireless stations.

In some embodiments, positions of the multiple input feeds are adjustable to control a beam directionality of the transmissions received from the multiple wireless stations.

In some embodiments, the antenna sub-system comprises one or more antenna arrays.

In some embodiments, the one or more antenna arrays are configured to receive using a dual polarization mode.

In some embodiments, the output signal comprises a dual-polarized signal.

In some embodiments, the wireless communication device uses single-layer links for communication with some of the multiple wireless stations.

In some embodiments, the wireless communication method uses multi-layer links for communication with some of the multiple wireless stations.

In some embodiments, the wireless communication is performed in a time division duplexed transmission mode.

In some embodiments, the wireless communication is performed in a frequency division duplexed transmission mode.

In some embodiments, the postcoding operation uses a postcoding matrix that is dynamically evaluated by the postcoding subsystem based on channel measurements in an uplink direction.

In some embodiments, the postcoding operation on the input signal is performed based on uplink channel measurements from the multiple wireless stations such that a received signal to interference ratio is maximized.

In some embodiments, the postcoding subsystem uses a postcoder computed based on a non-postcoded beam radiation pattern for the wireless communication method.

In some embodiments, the postcoding subsystem uses a postcoder that is designed to maximize the desired signal level to interference ratio at reception angles corresponding to locations of the wireless stations.

Figure 98:
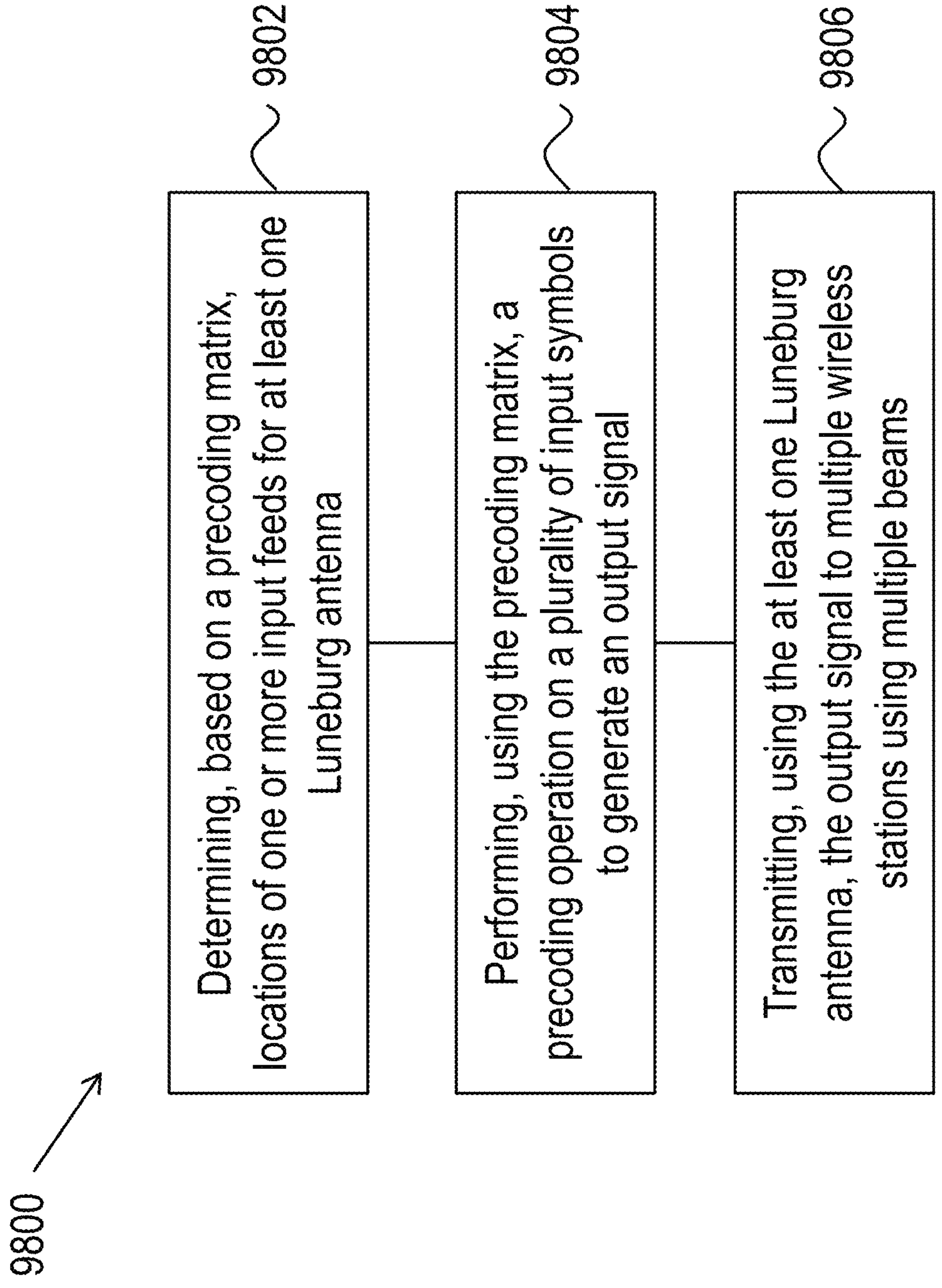
FIG. 98 is a flowchart for yet another example method of wireless communication.

FIG. 98 is a flowchart for a method 9800 of wireless communication. The method 9800 includes determining (9802), based on a precoding matrix, locations of one or more input feeds for at least one Luneburg antenna, performing (9804), using the precoding matrix, a precoding operation on a plurality of input symbols to generate an output signal, and transmitting (9806), using the at least one Luneburg antenna, the output signal to multiple wireless stations using multiple beams.

In some embodiments, the method 9800 further includes configuring, based on the locations, a beam angle for each of the multiple beams for each of the at least one Luneburg antenna.

In some embodiments, the beam angle controls a directionality of a respective beam of the multiple beams.

In some embodiments, a function modeling the beam angle (θ) is determined as:

$$b_k(\theta) = 2 \times \frac{J_1(2\pi u)}{2\pi u},$$

Herein, $J_1(\cdot)$ is a Bessel function of the first kind, $u=(a/\lambda)\cdot\sin(\theta-\overline{\theta}_k)$, λ is a wavelength of a carrier frequency of the output signal, a is a constant, and $\overline{\theta}_k$ is a center of a desired angular beam.

In some embodiments, the one or more input feeds for the at least one Luneburg antenna are mechanically adjustable.

In some embodiments, the one or more input feeds comprise 27 input feeds arranged in 3 different elevation rows, each comprising 9 input feeds.

In some embodiments, each of the one or more input feeds are adjustable in azimuth and in elevation.

In some embodiments, the output signal comprises a dual-polarized signal.

In some embodiments, the at least one Luneburg antenna is spatially separated.

In some embodiments, the precoding operation maximizes a desired signal level to interference ratio of transmissions to the multiple wireless stations.

Figure 99:
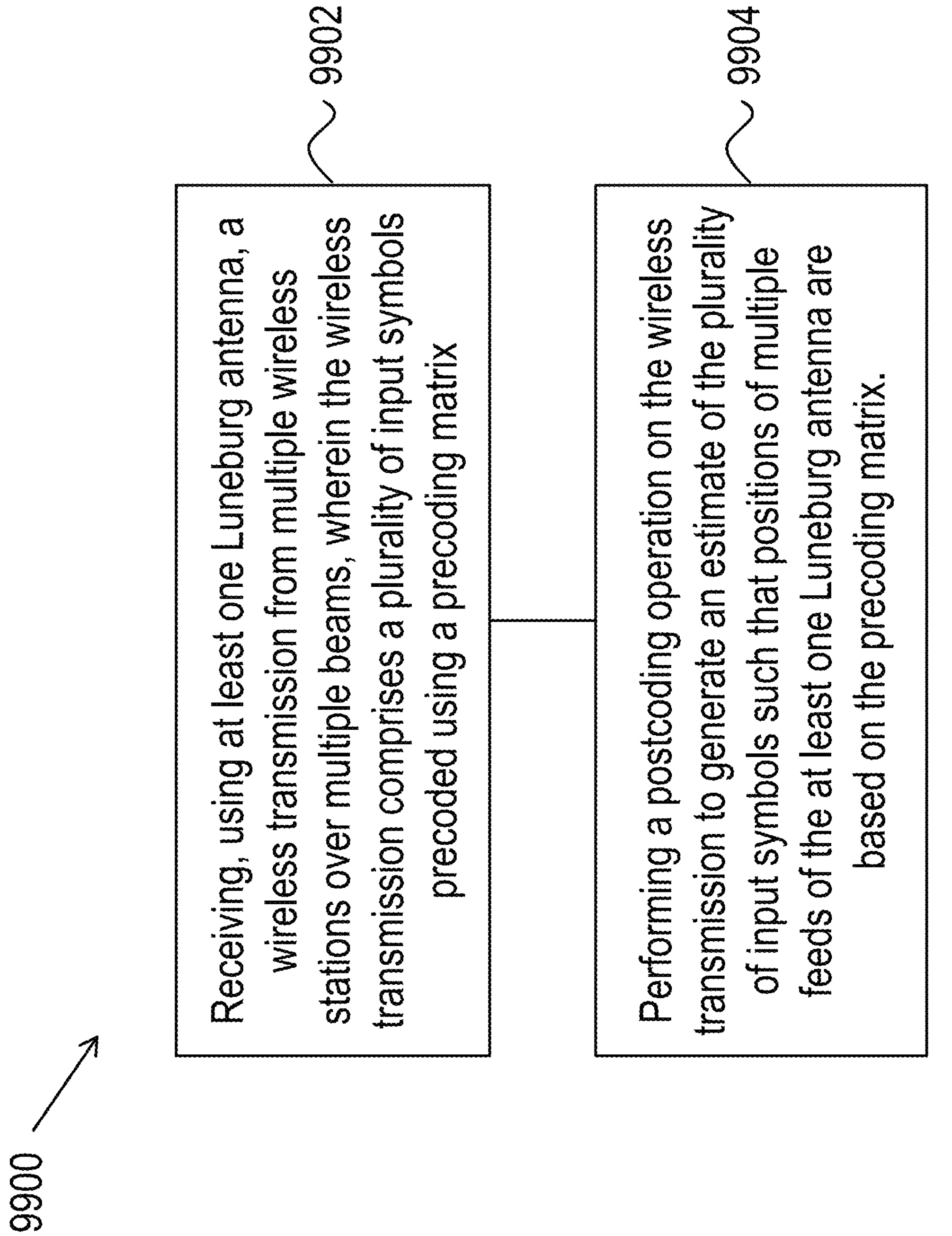
FIG. 99 is a flowchart for yet another example method of wireless communication.

FIG. 99 is a flowchart for a method 9900 of wireless communication. The method 9900 includes receiving (9902), using at least one Luneburg antenna, a wireless transmission from multiple wireless stations over multiple beams, wherein the wireless transmission comprises a plurality of input symbols precoded using a precoding matrix, and performing (9904) a postcoding operation on the wireless transmission to generate an estimate of the plurality of input symbols, wherein positions of multiple feeds of the at least one Luneburg are is based on the precoding matrix.

In some embodiments, the postcoding operation uses a postcoding matrix that is dynamically adjusted based on channel measurements in an uplink direction.

In some embodiments, the at least one Luneburg antenna is spatially separated.

In some embodiments, the at least one Luneburg antenna is configured to receive using a dual polarization mode.

In some embodiments, the postcoding operation maximizes a desired signal level to interference ratio of transmissions to the multiple wireless stations.

In some embodiments, the postcoding operation is performed based on uplink channel measurements from the multiple wireless stations such that a received signal to interference ratio is maximized.

In some embodiments, the wireless communication with the multiple wireless stations uses single-layer links for communication with some of the multiple wireless stations.

In some embodiments, the wireless communication with the multiple wireless stations uses multi-layer links for communication with some of the multiple wireless stations.

In some embodiments, the wireless communication is performed in a time division duplexed transmission mode.

In some embodiments, the wireless communication is performed in a frequency division duplexed transmission mode.

In the above-described methods and apparatus, the wireless station may be a stationary wireless station such as a hub or a transmission tower of a cellular network or the wireless station may be a mobile wireless device such as a user equipment (UE).

Figure 100:
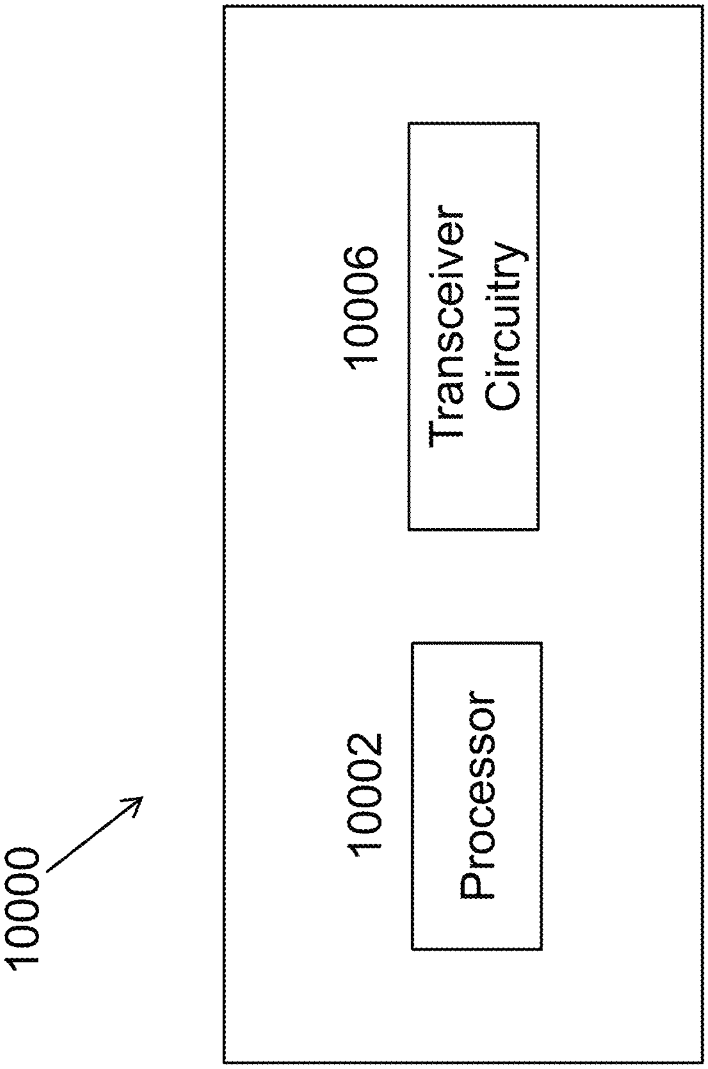
FIG. 100 shows an example of a wireless transceiver apparatus.

FIG. 100 depicts an example of a wireless communication apparatus 10000 that may be used to implement the methods and techniques described in the present document and attachments. The apparatus 10000 includes a processor 10002 and transceiver circuitry 10006. The processor 10002 may be programmed to implement some of the disclosed techniques. The transceiver circuitry 10006 may be used to implement the transmission or reception functions described herein. In some embodiments, the apparatus 10000 may include the Luneburg antenna disclosed herein. Alternatively, the Luneburg antenna may be external to the apparatus 10000.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:

receiving communication signals on multiple input feeds;

precoding the communication signals to generate precoded signals, and transmitting the precoded signals using an antenna sub-system to multiple wireless stations using multiple beams, wherein the antenna sub-system comprises a Luneburg antenna of a hemispherical shape formed by a plurality of tiles, wherein a beamwidth of at least one of the multiple beams transmitted from the Luneburg antenna is smaller than a width of a tile of the plurality of tiles, wherein the precoding maximizes a desired signal level to interference ratio of transmissions to the multiple wireless stations.

2. The method of claim 1, wherein the antenna sub-system comprises one or more antennas that are spatially separated.

3. The method of claim 1, wherein the antenna sub-system comprises multiple Luneburg antennas.

4. The method of claim 3, wherein the multiple Luneburg antennas are spatially separated.

5. The method of claim 2, wherein the one or more antennas are configured to transmit or receive using a dual polarization mode.

6. The method of claim 1, wherein the precoded signals comprise a number of signals that is equal or greater than a number of the multiple wireless stations.

7. The method of claim 1, wherein positions of the multiple input feeds are adjustable to control a beam directionality of the transmissions.

8. The method of claim 1, wherein the antenna sub-system comprises one or more antenna arrays.

9. The method of claim 8, wherein the one or more antenna arrays are configured to transmit using a dual polarization mode.

10. The method of claim 1, wherein the precoding is performing using a precoding matrix that is dynamically evaluated by a precoding subsystem based on channel measurements in an uplink direction.

11. The method of claim 1, wherein the precoding is performed based on uplink channel measurements from the multiple wireless stations such that a transmitted signal to interference ratio is maximized.

12. The method of claim 10, wherein the precoding subsystem uses a precoder computed based on a non-precoded beam radiation pattern for a wireless communication device.

13. The method of claim 10, wherein the precoding subsystem uses a precoder that is designed to maximize the desired signal level to interference ratio at transmission angles corresponding to locations of the wireless stations.

14. A method of wireless communication, comprising:

transmitting, via an antenna subsystem comprising a Luneburg antenna of a hemispherical shape, wireless signals to multiple wireless stations using multiple beams;

receiving the wireless signals from multiple wireless stations over multiple beams;

providing the wireless signals as an input to a postcoding subsystem, postcoding the input to generate postcoded signals, and outputting the postcoded signals over a feed port comprising multiple output feeds, wherein the postcoding maximizes a desired signal level to interference ratio of transmissions from the multiple wireless stations;

wherein the hemispherical shape of the Luneburg antenna comprises a plurality of tiles, and wherein a beamwidth of at least one of the multiple beams transmitted from the Luneburg antenna is smaller than a width of a tile of the plurality of tiles.

15. The method of claim 14, wherein the wireless communication is performed in a time division duplexed transmission mode.

16. The method of claim 14, wherein the wireless communication is performed in a frequency division duplexed transmission mode.

17. The method of claim 14, wherein the postcoding is performed using a postcoding matrix that is dynamically evaluated by the postcoding subsystem based on channel measurements in an uplink direction.

18. The method of claim 14, wherein the postcoding is performed based on uplink channel measurements from the multiple wireless stations such that a received signal to interference ratio is maximized.

19. The method of claim 14, wherein the postcoding subsystem uses a postcoder computed based on a non-postcoded beam radiation pattern for a wireless communication method.

20. The method of claim 14, wherein the postcoding subsystem uses a postcoder that is designed to maximize the desired signal level to interference ratio at reception angles corresponding to locations of the multiple wireless stations.

* * * * *